(12) United States Patent
Underbrink et al.

(10) Patent No.: US 8,593,345 B2
(45) Date of Patent: Nov. 26, 2013

(54) SIGNAL PROCESSING SYSTEM FOR SATELLITE POSITIONING SIGNALS

(75) Inventors: Paul A. Underbrink, Lake Forest, CA (US); Henry D. Falk, Long Beach, CA (US); Steven A. Gronemeyer, Cedar Rapids, IA (US); Chittharanjan Dassannacharya, Noida (IN); Charles P. Norman, Huntington Beach, CA (US); Nicolas Vantalon, Nice (FR); Vojislav Protic, Palo Alto, CA (US)

(73) Assignee: CSR Technology Inc., San Jose, CA (US)

( * ) Notice: Subject to any disclaimer, the term of this patent is extended or adjusted under 35 U.S.C. 154(b) by 0 days.

(21) Appl. No.: 13/400,390

(22) Filed: Feb. 20, 2012

(65) Prior Publication Data

US 2012/0313817 A1 Dec. 13, 2012

Related U.S. Application Data

(63) Continuation of application No. 10/570,833, filed as application No. PCT/US2004/028926 on Sep. 2, 2004, now Pat. No. 8,138,972.

(51) Int. Cl.
*G01S 19/32* (2010.01)

(52) U.S. Cl.
USPC .................................................. 342/357.72

(58) Field of Classification Search
USPC .................................................. 342/357.72
See application file for complete search history.

(56) References Cited

U.S. PATENT DOCUMENTS

| | | |
|---|---|---|
| 3,939,474 A | 2/1976 | Coleman et al. |
| 4,426,712 A | 1/1984 | Gorsi-Popiel |
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |

(Continued)

FOREIGN PATENT DOCUMENTS

| | | |
|---|---|---|
| EP | 0511741 | 11/1992 |
| GB | 2115195 | 1/1983 |

(Continued)

OTHER PUBLICATIONS

Japanese Office Action with Translation dated Sep. 13, 2001.

(Continued)

*Primary Examiner* — Jack W Keith
*Assistant Examiner* — Frank J McGue
(74) *Attorney, Agent, or Firm* — RatnerPrestia

(57) ABSTRACT

A signal processing system for processing satellite positioning signals is described. The system comprises at least one processor and a signal processor operating under a number of operational modes. The signal processor includes at least one of a signal processing subsystem, a fast Fourier transform (FFT) subsystem, and a memory subsystem that are each dynamically and independently configurable in response to the operational modes. Further, the system includes a controller that couples to control transfer of data among the signal processing subsystem and the FFT subsystem via the memory subsystem. Configurability of the memory subsystem includes configuring the memory subsystem into regions according to the operational modes where each region is accessible in one of a number of manners according to the operational modes.

23 Claims, 123 Drawing Sheets

(56) References Cited

U.S. PATENT DOCUMENTS

| | | | |
|---|---|---|---|
| 4,785,463 A | 11/1988 | Janc et al. | |
| 4,809,005 A | 2/1989 | Counselman, III | |
| 4,821,294 A | 4/1989 | Thomas, Jr. | |
| 4,890,233 A | 12/1989 | Ando et al. | |
| 4,894,662 A | 1/1990 | Counselman | |
| 4,998,111 A | 3/1991 | Ma et al. | |
| 5,014,066 A | 5/1991 | Counselman, III | |
| 5,036,329 A | 7/1991 | Ando | |
| 5,043,736 A | 8/1991 | Darnell et al. | |
| 5,108,334 A | 4/1992 | Eschenbach et al. | |
| 5,202,829 A | 4/1993 | Geier | |
| 5,225,842 A | 7/1993 | Brown et al. | |
| 5,257,195 A | 10/1993 | Hirata | |
| 5,293,170 A | 3/1994 | Lorenz et al. | |
| 5,311,195 A | 5/1994 | Mathis et al. | |
| 5,323,164 A | 6/1994 | Endo | |
| 5,343,209 A | 8/1994 | Sennott et al. | |
| 5,345,244 A | 9/1994 | Gildea et al. | |
| 5,347,284 A | 9/1994 | Volpi et al. | |
| 5,347,536 A | 9/1994 | Meehan | |
| 5,365,450 A * | 11/1994 | Schuchman et al. | 455/456.3 |
| 5,379,224 A | 1/1995 | Brown et al. | |
| 5,402,347 A | 3/1995 | McBurney et al. | |
| 5,402,441 A | 3/1995 | Washizu et al. | |
| 5,416,712 A | 5/1995 | Geier et al. | |
| 5,420,593 A | 5/1995 | Niles | |
| 5,424,949 A * | 6/1995 | Applegate et al. | 701/14 |
| 5,440,313 A | 8/1995 | Osterdock et al. | |
| 5,450,344 A | 9/1995 | Woo et al. | |
| 5,504,684 A | 4/1996 | Lau et al. | |
| 5,535,278 A | 7/1996 | Cahn et al. | |
| 5,592,173 A | 1/1997 | Lau et al. | |
| 5,625,668 A | 4/1997 | Loomis et al. | |
| 5,663,734 A | 9/1997 | Krasner | |
| 5,663,735 A | 9/1997 | Eshenback | |
| 5,781,156 A | 7/1998 | Krasner | |
| 5,786,789 A | 7/1998 | Janky | |
| 5,812,087 A | 9/1998 | Krasner | |
| 5,825,327 A | 10/1998 | Krasner | |
| 5,828,694 A | 10/1998 | Schipper | |
| 5,831,570 A | 11/1998 | Ammar et al. | |
| 5,831,574 A | 11/1998 | Krasner | |
| 5,841,396 A | 11/1998 | Krasner | |
| 5,845,203 A | 12/1998 | LaDue | |
| 5,854,605 A | 12/1998 | Gildea | |
| 5,874,914 A | 2/1999 | Krasner | |
| 5,877,724 A | 3/1999 | Davis | |
| 5,877,725 A | 3/1999 | Kalafus | |
| 5,883,594 A | 3/1999 | Lau | |
| 5,884,214 A | 3/1999 | Krasner | |
| 5,889,474 A | 3/1999 | LaDue | |
| 5,903,654 A | 5/1999 | Milton et al. | |
| 5,907,578 A | 5/1999 | Pon et al. | |
| 5,907,809 A | 5/1999 | Molnar et al. | |
| 5,917,444 A | 6/1999 | Loomis et al. | |
| 5,920,283 A | 7/1999 | Shaheen et al. | |
| 5,923,703 A | 7/1999 | Pon et al. | |
| 5,926,131 A | 7/1999 | Sakumoto et al. | |
| 5,936,572 A | 8/1999 | Loomis et al. | |
| 5,943,363 A | 8/1999 | Hanson et al. | |
| 5,945,944 A | 8/1999 | Krasner | |
| 5,963,582 A | 10/1999 | Stansell, Jr. | |
| 5,966,403 A | 10/1999 | Pon | |
| 5,977,909 A | 11/1999 | Harrison et al. | |
| 5,982,324 A | 11/1999 | Watters et al. | |
| 5,987,016 A | 11/1999 | He | |
| 5,999,124 A | 12/1999 | Sheynblat | |
| 6,002,362 A | 12/1999 | Gudat | |
| 6,002,363 A | 12/1999 | Krasner | |
| 6,009,551 A | 12/1999 | Sheynblat | |
| 6,016,119 A | 1/2000 | Krasner | |
| 6,040,798 A | 3/2000 | Kinal et al. | |
| 6,041,222 A | 3/2000 | Horton et al. | |
| 6,047,017 A | 4/2000 | Cahn et al. | |
| 6,052,081 A | 4/2000 | Krasner | |
| 6,061,018 A | 5/2000 | Sheynblat | |
| 6,064,336 A | 5/2000 | Krasner | |
| 6,104,338 A | 8/2000 | Krasner | |
| 6,104,340 A | 8/2000 | Krasner | |
| 6,107,960 A | 8/2000 | Krasner | |
| 6,111,540 A | 8/2000 | Krasner | |
| 6,121,923 A * | 9/2000 | King | 342/357.42 |
| 6,131,067 A | 10/2000 | Girerd et al. | |
| 6,133,871 A | 10/2000 | Krasner | |
| 6,133,873 A | 10/2000 | Krasner | |
| 6,133,874 A | 10/2000 | Krasner | |
| 6,150,980 A | 11/2000 | Krasner | |
| 6,178,195 B1 | 1/2001 | Durboraw, III et al. | |
| 6,236,354 B1 | 5/2001 | Krasner | |
| 6,252,542 B1 | 6/2001 | Sikina et al. | |
| 6,263,034 B1 | 7/2001 | Kanack et al. | |
| 6,313,786 B1 | 11/2001 | Sheynblat et al. | |
| 6,327,473 B1 | 12/2001 | Soliman et al. | |
| 6,344,749 B1 | 2/2002 | Williams | |
| 6,389,291 B1 | 5/2002 | Pande et al. | |
| 6,414,987 B1 | 7/2002 | Pon | |
| 6,421,696 B1 | 7/2002 | Horton | |
| 6,466,612 B2 | 10/2002 | Kohli et al. | |
| 6,480,529 B1 * | 11/2002 | Sih et al. | 375/152 |
| 6,529,829 B2 | 3/2003 | Turetzky et al. | |
| 6,633,255 B2 | 10/2003 | Krasner | |
| 6,650,694 B1 | 11/2003 | Brown et al. | |
| 6,684,158 B1 | 1/2004 | Garin et al. | |
| 6,707,423 B2 | 3/2004 | Turetzky et al. | |
| 6,765,931 B1 * | 7/2004 | Rabenko et al. | 370/493 |
| 6,784,831 B1 * | 8/2004 | Wang et al. | 342/357.63 |
| 6,873,288 B2 | 3/2005 | Heppe | |
| 2002/0064209 A1 | 5/2002 | Turetzky et al. | |
| 2002/0113734 A1 * | 8/2002 | King | 342/357.13 |
| 2002/0142783 A1 | 10/2002 | Yoldi | |
| 2003/0091324 A1 * | 5/2003 | Tominaga | 386/46 |
| 2003/0104818 A1 | 6/2003 | Kotzin | |
| 2003/0154025 A1 | 8/2003 | Fuchs | |
| 2003/0176204 A1 | 9/2003 | Abraham | |
| 2004/0130484 A1 | 7/2004 | Krasner | |
| 2005/0018795 A1 * | 1/2005 | Studenny et al. | 375/343 |

FOREIGN PATENT DOCUMENTS

| | | |
|---|---|---|
| GB | 2 335 554 | 9/1999 |
| JP | 58-105632 | 6/1983 |
| JP | 7-36035 | 5/1986 |
| JP | 4-326079 | 11/1992 |
| JP | 200128551 | 1/2001 |
| JP | 2003-50272 | 2/2003 |
| WO | WO 90/11652 | 10/1990 |
| WO | WO 02/04975 | 7/2000 |
| WO | WO 00/45191 | 8/2000 |
| WO | WO 03/003807 | 1/2003 |
| WO | WO 03/098258 | 11/2003 |

OTHER PUBLICATIONS

Avagnina et al., "Definition of a Reconfigurable and Modular Multi-Standard Navigation Receiver", GPS Solutions, Springer Berlin, Apr. 2, 2003, pp. 33-40.

Harada et al., "A New Small-Size Multi-Mode and Multi-Task Software Radio Prototype for Future Intelligent Transport Systems", IEICE Transaction of Communications, Dec. 1, 2002, E85-B, No. 12, pp. 2703-2715.

Japanese Office Action with translation dated Apr. 26, 2010.

Soliman et al., GPS One: A hybrid position location system, 2000 IEEE, pp. 334-335.

Van Nee, D.J.R., Coenen, A.J.R.M., "New Fast GPS Code-Acquisition Using FFT," Electronic Letters, vol. 27, No. 2, pp. 158-160 (1991).

Van Nee, D.J.R. Coenen, A.J.R.M., "Novel Fast GPS/GLONASS Code Acquisition Technique Using Low Update Rate FFT," Electronic Letters, vol. 28, No. 9, pp. 863-865 (1992).

Office Action for U.S. Appl. No. 10/570,833, filed Oct. 5, 2009, mailed May 18, 2001.

* cited by examiner

SiRFStar3 Core Major Subsystem

INPUT SAMPLE SUBSYSTEM PARTITIONING

SUBSYSTEM 1 PARTITIONING

SIGNAL PROCESSOR SUBSYSTEM FLOW

SYSTEM 2 DATA FLOW CONTROL

FFT CONTROLLER FLOW

FIG. 23 SUBSYSTEM2 / FIFO2 / SUBSYSTEM3 FLOW

SEQUENCER STATE MACHINE FLOW

MEMORY SUBSYSTEM

MEMORY DATA PATH FLOW

1 MSEQ ACQ / 1/8 MSEC TRACK MODE PROCESS FLOW

COLD START ACQUISITION MODE PROCESS FLOW fftMode = 0  {4,8}          STRIDE=1, TWIDDLE MODULO = 4
0,1,2,3 fftMode = 1  {8,8}      STRIDE=2, TWIDDLE MODULO = 8
OR   fftMode = 2  {8,16}
0,4,2,6
1,5,3,7 fftMode = 3  {16,16}    STRIDE=4, TWIDDLE MODULO = 16
OR   fftMode = 4  {16,32}
0,4,8,c
1,9,5,d
2,a,6,e
3,b,7,f fftMode = 5  {20,32}         STRIDE=4, TWIDDLE MODULO = 16
10,12,11,13 - MAY HAVE COLLISIONS
00,08,04,0c
01,09,05,0d
02,0a,06,0e
03,0b,07,0f

FFT - ORDER OF DATA NEEDED

FIG. 39 twidModSel = 2, modulo 16:
    twiddled position = ( t1Twid[3:2] < t1Twid[1:0] < tapPosition[1:0] )
    twiddleSel        = ( t1Twid[3:2] < t1Twid[1:0] )

twidModSel = 1, modulo 8:
    twiddled position = ( (1'b0, t1Twid[2]) < t1Twid[1:0] < tapPosition[1:0] )
    twiddleSel        = ( (1'b0, t1Twid[2]) < t1Twid[1:0] )

twidModSel = 0, modulo 4:
    twiddled position = ( (1'b0, 1'b0) < t1Twid[1:0] < tapPosition[1:0] )
    twiddleSel        = ( (1'b0, 1'b0) < t1Twid[1:0] )

COHERENT RAM INPUT TWIDDLE SELECT

FIG. 40

| NUMBER OF 8KBYTE BLOCKS MAPPED | DSP32K_SWI_ENB | DSP64K_MAP_ENB | MAP_BLK[2:0] | DSP ADDRESS RANGE | CPU NORMAL MAPPED SBU2 ADDRESS RANGE | CPU SOFT MAPPED SBU2 ADDRESS RANGE | CPU HARD SWITCH ASB ADDRESS RANGE |
|---|---|---|---|---|---|---|---|
| 1 | 0 | 0 | XXX | 0x0000_0000-0x0001_FFFF | 0xC020_0000-0xC021_FFFF | NA | NA |
|   | 1 | X | XXX | 0x0000_0000-0x0001_7FFF | 0xC021_8000-0xC021_FFFF | NA | 0x6001_0000-0x6001_7FFF |
|   | 0 | 1 | 000 | 0x0000_0000-0x0001_DFFF | 0xC021_E000-0xC021_FFFF | 0x6001_0000-0x6001_1FFF | NA |
| 2 | 0 | 0 | XXX | 0x0000_0000-0x0001_FFFF | 0xC020_0000-0xC021_FFFF | NA | NA |
|   | 1 | X | XXX | 0x0000_0000-0x0001_7FFF | 0xC021_8000-0xC021_FFFF | NA | 0x6001_0000-0x6001_7FFF |
|   | 0 | 1 | 001 | 0x0000_0000-0x0001_BFFF | 0xC021_C000-0xC021_FFFF | 0x6001_0000-0x6001_3FFF | NA |
| 3 | 0 | 0 | XXX | 0x0000_0000-0x0001_FFFF | 0xC020_0000-0xC021_FFFF | NA | NA |
|   | 1 | X | XXX | 0x0000_0000-0x0001_7FFF | 0xC021_8000-0xC021_FFFF | NA | 0x6001_0000-0x6001_7FFF |
|   | 0 | 1 | 010 | 0x0000_0000-0x0001_9FFF | 0xC021_A000-0xC021_FFFF | 0x6001_0000-0x6001_5FFF | NA |
| 4 | 0 | 0 | XXX | 0x0001_0000-0x0001_FFFF | 0xC020_0000-0xC021_FFFF | NA | NA |
|   | 1 | X | XXX | 0x0000_0000-0x0001_7FFF | 0xC021_8000-0xC021_FFFF | NA | 0x6001_0000-0x6001_7FFF |
|   | 0 | 1 | 011 | 0x0000_0000-0x0001_7FFF | 0xC021_8000-0xC021_FFFF | 0x6001_0000-0x6001_7FFF | NA |
| 5 | 0 | 0 | XXX | 0x0001_0000-0x0001_FFFF | 0xC020_0000-0xC021_FFFF | NA | NA |
|   | 1 | 0 | XXX | 0x0000_0000-0x0001_7FFF | 0xC021_8000-0xC021_FFFF | NA | 0x6001_0000-0x6001_7FFF |
|   | 1 | 1 | 100 | 0x0000_0000-0x0001_5FFF | 0xC021_6000-0xC021_FFFF | 0x6001_8000-0x6001_9FFF | 0x6001_6000-0x6001_7FFF |
|   | 0 | 1 | 100 | 0x0000_0000-0x0001_5FFF | 0xC021_6000-0xC021_FFFF | 0x6001_0000-0x6001_9FFF | NA |

FIG. 66A

| NUMBER OF 8KBYTE BLOCKS MAPPED | DSP32K_SWI_ENB | DSP64K_MAP_ENB | MAP_BLK[2:0] | DSP ADDRESS RANGE | CPU NORMAL MAPPED SBU2 ADDRESS RANGE | CPU SOFT MAPPED SBU2 ADDRESS RANGE | CPU HARD SWITCH ASB ADDRESS RANGE |
|---|---|---|---|---|---|---|---|
| 6 | 0 | 0 | XXX | 0x0001_0000-<br>0x0001_FFFF | 0xC020_0000-<br>0xC021_FFFF | NA | NA |
|   | 1 | 0 | XXX | 0x0000_0000-<br>0x0001_7FFF | 0xC021_8000-<br>0xC021_FFFF | NA | 0x6001_0000-<br>0x6001_7FFF |
|   | 1 | 1 | 101 | 0x0000_0000-<br>0x0001_3FFF | 0xC021_4000-<br>0xC021_FFFF | 0x6001_8000-<br>0x6001_BFFF | 0x6001_0000-<br>0x6001_7FFF |
|   | 0 | 1 | 101 | 0x0000_0000-<br>0x0001_3FFF | 0xC021_4000-<br>0xC021_FFFF | 0x6001_0000-<br>0x6001_BFFF | NA |
| 7 | 0 | 0 | XXX | 0x0001_0000-<br>0x0001_FFFF | 0xC020_0000-<br>0xC021_FFFF | NA | NA |
|   | 1 | 0 | XXX | 0x0000_0000-<br>0x0001_7FFF | 0xC021_8000-<br>0xC021_FFFF | NA | 0x6001_0000-<br>0x6001_7FFF |
|   | 1 | 1 | 110 | 0x0000_0000-<br>0x0001_1FFF | 0xC021_2000-<br>0xC021_FFFF | 0x6001_8000-<br>0x6001_DFFF | 0x6001_0000-<br>0x6001_7FFF |
|   | 0 | 1 | 110 | 0x0000_0000-<br>0x0001_1FFF | 0xC021_2000-<br>0xC021_FFFF | 0x6001_0000-<br>0x6001_DFFF | NA |
| 8 | 0 | 0 | XXX | 0x0001_0000-<br>0x0001_FFFF | 0xC020_0000-<br>0xC021_FFFF | NA | NA |
|   | 1 | 0 | XXX | 0x0000_0000-<br>0x0001_7FFF | 0xC021_8000-<br>0xC021_FFFF | NA | 0x6001_0000-<br>0x6001_7FFF |
|   | 1 | 1 | 111 | 0x0000_0000-<br>0x0000_FFFF | 0xC021_0000-<br>0xC021_FFFF | 0x6001_8000-<br>0x6001_EFFF | 0x6001_0000-<br>0x6001_7FFF |
|   | 0 | 1 | 111 | 0x0000_0000-<br>0x0000_FFFF | 0xC021_0000-<br>0xC021_FFFF | 0x6001_0000-<br>0x6001_FFFF | NA |

| HW CONTROLLED | SW CONTROLLED | ENABLED FOR STALLS |
|---|---|---|
| HW SS2 ON | SW SS2 ON | |
| HW SS3 ON | SW SS3 ON | |
| HW SS2 ACTIVE | | |
| HW SS3 ACTIVE | | |
| HW SET SS2 FINISHED CHAN | SW CLEAR SS2 FINISHED CHAN | ss2 WAIT |
| HW SET SS3 FINISHED CHAN | SW CLEAR SS3 FINISHED CHAN | ss2 WAIT, ss3 WAIT |
| HW SET SS3 pdi DONE | SW CLEAR SS3 pdi DONE | |
| HW FIFO1 OVERFLOW | SW CLEAR FIFO1 OVERFLOW | |
| HW SS3 coh accum CLIP | SW CLEAR SS2 coh accum CLIP | |

FIG. 88

-SS2: FIFO1 chan initiation overflow detect
  -shut down SS2 (ss2OnSS2 = 0) and SS3 (ss3OnSS2 = 0)
  -set fifo1Overflw semaphore and interrupt (if enabled)

-SS3: FIFO2 errors--none identified that would cause termination

-SS3: NCS timeout--occurs when ncsCount reaches greater than ncsCountMod
  -if ncsStopNormalEn = 1 then shut down SS2 (ss2OnSS3 = 0) and SS3 (ss3OnSS3 = 0)
  -set ncsComplete semaphore and interrupt (if enabled)
  -bit sync mode : allow all T1 offsets to complete before terminating channel or setting semaphore
  -odd/even/multFreq : allow all runs to complete before terminating channel or setting semaphore -SS3: NCS overflow prevention or autoscale termination event, very strong signal detect
  -ncs overflow occurs if all autoscale bits are used up and another scale would be required on next pass
  -autoscale termination event occurs if ncs autoscale adjust detected on current PDI and (ncsCount < ncsASStop[currentAS])
  -stop NCS accumulations
    -If ncsStopEarlyEn = 1 then:
      1) shut down SS2 (ss2OnSS3 = 0) and SS3 (ss3OnSS3 = 0)
      2) set ncsComplete semaphore and interrupt (if enabled)
    -otherwise disable ncs accumulation and peak generation for ncs duration and then start up again
  -set ncsComplete semaphore and interrupt (if enabled)
  -bit sync mode : allow all T1 offsets to complete before terminating channel or setting semaphore
  -odd/even/multFreq : allow all runs to complete before terminating channel or setting semaphore -SS3: SW command asynchronous ncsShutOff
  -allows SW clean way to turn off channel
  -commanded by semaphore
  -SS3 complete current context and upon channel shut down it resets ss2OnSS3 and ss3OnSS3
    -this allows cleaning out from shared FIFO2 of any data generated by the channel

FIG. 89

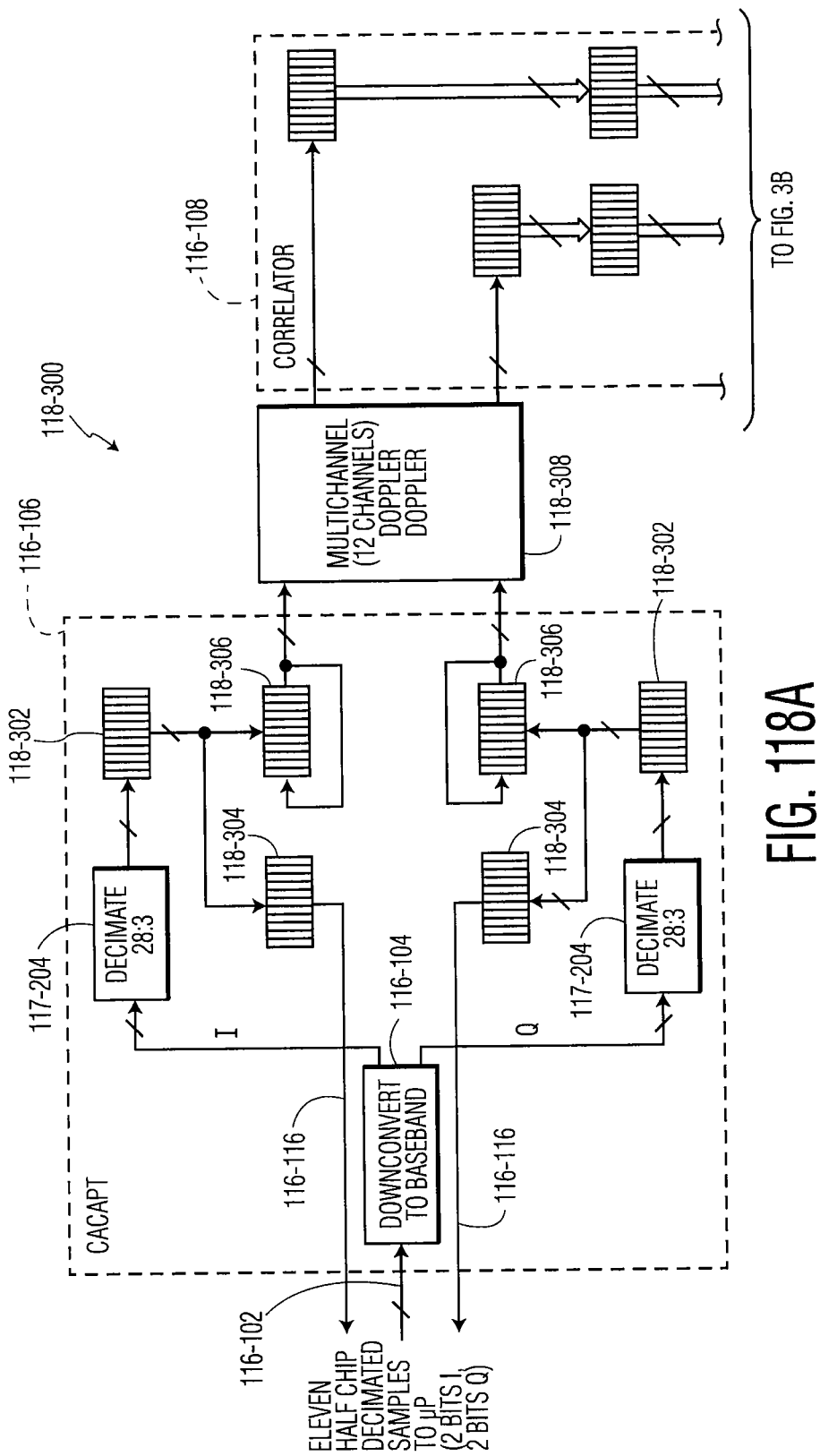

SIGNAL PROCESSING SYSTEM FOR SATELLITE POSITIONING SIGNALS

RELATED APPLICATIONS

This application is a continuation of U.S. patent application Ser. No. 10/570,833 filed Oct. 5, 2009 now U.S. Pat. No. 8,138,972. This application also relates to and claims priority from the following U.S. patent application Ser. No. 09/498,893, filed Feb. 7, 2000 (U.S. Pat. No. 7,545,854); Ser. No. 09/604,595, filed Jun. 27, 2000 (U.S. Pat. No. 7,711,038); Ser. No. 10/369,853, filed Feb. 20, 2003; Ser. No. 10/632,051, filed Jul. 30, 2003; Ser. No. 10/194,627, filed Jul. 12, 2002 (U.S. Pat. No. 5,577,448); Ser. No. 10/385,198, filed Mar. 10, 2003 (U.S. Pat. No. 6,915,208); Ser. No. 10/155,614, filed May 22, 2002 (U.S. Pat. No. 6,684,158); Ser. No. 09/910,092, filed Jul. 20, 2001 (U.S. Pat. No. 7,197,305); Ser. No. 09/910,404, filed Jul. 20, 2001 (U.S. Pat. No. 6,680,695); Ser. No. 09/909,716, filed Jul. 20, 2001 (U.S. Pat. No. 7,106,786; Ser. No. 10/244,293, filed Sep. 16, 2002 U.S. Pat. No. 6,707,423); Ser. No. 10/712,789, filed Nov. 12, 2003 U.S. Pat. No. 7,183,972; Ser. No. 10/666,551, filed Sep. 18, 2003 (U.S. Pat. No. 7,239,271); Ser. No. 09/551,047, filed Apr. 18, 2000 U.S. Pat. No. 6,580,557); Ser. No. 09/551,276, filed Apr. 18, 2000 (U.S. Pat. No. 6,931,055); Ser. No. 09/551,802, filed Apr. 18, 2000 (U.S. Pat. No. 6,952,440); Ser. No. 09/552,469, filed Apr. 18, 2000 (U.S. Pat. No. 6,788,655); Ser. No. 09/552,759, filed Apr. 18, 2000 (U.S. Pat. No. 6,714,158); Ser. No. 09/732,956, filed Dec. 7, 2000, (U.S. Pat. No. 6,675,003); Ser. No. 09/735,249, filed Dec. 11, 2000 (U.S. Pat. No. 6,917,644); Ser. No. 09/886,427, filed Jun. 20, 2001 U.S. Pat. No. 7,127,351); Ser. No. 10/099,497 filed Mar. 13, 2002 U.S. Pat. No. 6,724,811); Ser. No. 10/101,138 filed Mar. 18, 2002 (U.S. Pat. No. 6,748,015); Ser. No. 10/246,584, filed Sep. 18, 2002 (U.S. Pat. No. 6,760,364); Ser. No. 10/263,333, filed Oct. 2, 2002 (U.S. Pat. No. 7,148,844); Ser. No. 10/309,647, filed Dec. 4, 2002 (U.S. Pat. No. 6,930,634); Ser. No. 10/320,932, filed Dec. 16, 2002 (U.S. Pat. No. 6,788,735); Ser. No. 10/412,146, filed Apr. 11, 2003 (U.S. Pat. No. 6,853,338); Ser. No. 10/423,137, filed Apr. 25, 2003 (U.S. Pat. No. 6,917,331); Ser. No. 10/600,174, filed Jun. 20, 2003 (U.S. Pat. No. 6,985,811); Ser. No. 10/600,190, filed Jun. 20, 2003; Ser. No. 10/644,311, filed Aug. 19, 2003 (U.S. Pat. No. 7,002,516); 60/499,961, filed Sep. 2, 2003; Ser. No. 10/658,185, filed Sep. 9, 2003 (U.S. Pat. No. 7,082,292); Ser. No. 10/696,522, filed Oct. 28, 2003 (U.S. Pat. No. 7,047,368); Ser. No. 10/706,167, filed Nov. 12, 2003 (U.S. Pat. No. 7,116,704); Ser. No. 10/715,656, filed Nov. 18, 2003 (U.S. Pat. No. 7,035,613); Ser. No. 10/722,694, filed Nov. 24, 2003 (U.S. Pat. No. 7,406,114); Ser. No. 10/762,852, filed Jan. 22, 2004 (U.S. Pat. No. 7,639,180); 60/546,816, filed Feb. 23, 2004; 60/547,384, filed Feb. 23, 2004; and Ser. No. 10/874,637, filed Jun. 22, 2004 (U.S. Pat. No. 7,546,423); and PCT Patent Application titled "Control and Features For Satellite Positioning System Receivers, filed on Sep. 2, 2004 with serial number that claims priority to applications 60/499,961 and 60/546,816. The contents of these patents and applications are incorporated herein by reference.

FIELD

Embodiments of the invention are in the field of systems and methods for processing global positioning system ("GPS") signals, determining geographical location using the processing GPS signals, and related functions.

BACKGROUND

The worldwide utilization of wireless devices such as two-way radios, pagers, portable televisions, personal computers (PCs), personal communication systems (PCSs), personal digital assistants (PDAs), cellular telephones or mobile telephones, Bluetooth® devices, satellite radio receivers, Satellite Positioning systems (SPSs) such as Global Positioning System (GPS), also known as NAVSTAR, and automotive telematic systems is growing at a rapid pace. As a result, current trends are calling for the incorporation of as many features as possible into these wireless devices. As one example, there is currently a demand to incorporate SPS services into a broad range of these electronic devices and systems.

The SPS systems, including systems for processing GPS signals, include various hardware and software components generally designed to accomplish the task of geographically locating a GPS receiver as quickly as possible to the highest degree of accuracy possible. GPS systems have become remarkably capable since the very first GPS units became available. Advances in semiconductor technology and microprocessor technology have helped make this improved capability possible. In addition, consumer and government demand for small, fast, GPS-capable devices (for example, E911-compliant cell phones) have helped drive GPS system design improvements.

As used herein GPS capability is the capability to receive and process GPS signals, and further, to use the processed GPS signals to generate accurate position information. More and more devices include GPS availability. Therefore, manufacturers of a wide variety of products desire or require the ability to insert GPS hardware and software into their product designs. Of course, it is desirable for the GPS hardware to use as little semiconductor die space as possible, and for the GPS hardware and software system to be as economical as possible in its demands for memory and power.

Designing GPS systems within these constraints usually forces a series of choices among speed, size, power usage, etc. Most existing GPS system designs thus embody a set of tradeoffs. Most existing GPS systems provide little or no flexibility once designed. For example, they are not readily reconfigurable to process or store data differently under different conditions in order to perform most efficiently at any given time. Typically, the amount of memory made available to a GPS system (either in a stand-alone GPS system, or in another system such as a cell phone) is highly dependent on factors such as the type of signal processing performed and on the absolute limit of memory available.

Another disadvantage of many existing GPS systems is that they rely much of the time on other systems for aiding data in order to provide a position within acceptable time limits. For example, a GPS system in a cell phone may constantly require time aiding, and possibly other aiding, from the cellular network in order to perform effectively. Existing GPS systems may not be capable of acquiring GPS signals within a required time without aiding. This may be acceptable if the time information is always available and if the provision of the time information does not impact other system performance aspects. However, a system that is designed to rely on aiding to meet performance requirements is not capable of performing satisfactorily without aiding, and further is not flexible enough to perform well in both aided and unaided situations.

BRIEF DESCRIPTION OF THE DRAWINGS

Embodiments of the invention are described with the aid of the drawings, which are not intended to be limiting. In the drawings, similar reference numbers identify similar elements or acts.

FIG. 39 is a block diagram illustrating a coherent RAM input twiddle select algorithm according to an embodiment.

FIG. 40 is a block diagram of twiddle generation according to an embodiment.

FIGS. 66A and 66B show an address map that supports memory sharing, under and embodiment.

FIG. 88 is a list of the SS2, SS3, and FIFO1 semaphores, including HW controlled semaphores, SW controlled semaphores and "pause" semaphores in one embodiment.

FIG. 89 is a list of termination conditions for SS2 and SS3 according to an embodiment.

FIGS. 118A and 118B are block diagrams of the system, under an embodiment.

FIG. 119 is another block diagram of the system, under an embodiment.

FIG. 120 is a flow diagram for reducing/eliminating auto- and cross-correlation in weak signal systems, under an embodiment.

DETAILED DESCRIPTION

A GPS system and method is described, including at least embodiments of hardware architecture, control logic, signal processing logic, and memory management logic. Embodiments of the GPS system and method are dynamically reconfigurable. For example, memory may be dynamically reconfigured to be accessed by various subsystems in different manners under different conditions. Although examples of an overall memory size available to the GPS system and method are described for illustration, other sizes are possible using the same principles described. In addition, access to external memory in addition to the memory shown is possible with the hardware and software described.

The GPS system described processes GPS data at a very high rate, which is an aspect that allows the GPS system to have superior performance without aiding, even in the absence of ideal conditions, such as excellent satellite visibility. In one aspect of the GPS system, extremely powerful time domain matched filtering in combination with fast Fourier transforms ("FFTs") facilitate processing a large amount of data per unit time. FFT operations are used to multiply the number of signal samples used by a factor as high as fifteen or twenty. As an example, the system produces as many as 200,000 effective real time correlators. Conventional GPS systems typically process the GPS signal directly through a number of physical correlators, each of which is actually logic-dedicated to making one correlation. This limits conventional GPS systems to approximately 40,000 effective correlators.

This performance improvement is accomplished by the GPS system with a memory bandwidth consumption of approximately 400 Mbytes/sec. Therefore, the GPS system is capable of producing these correlations with as little as a 64 Kbytes of memory. Compared to the power of conventional systems, the GPS system is more efficient in terms of power usage, cycle-count, and memory usage. As described more fully below, this is partly made possible by the optimization and configurability of multiple subsystems.

The GPS system described is capable of operating in various modes of GPS signal acquisition and processing, as most appropriate for a situation. The UPS system switches between modes automatically as directed by a host processor. The various subsystems may be configured differently in different operations modes. The operational modes will be described in more detail later and include: mode 1, a "cold start"; mode 2, a "coarse-aided acquisition" mode; and mode 3, "high-resolution", or "tracking" mode.

Figure 1:
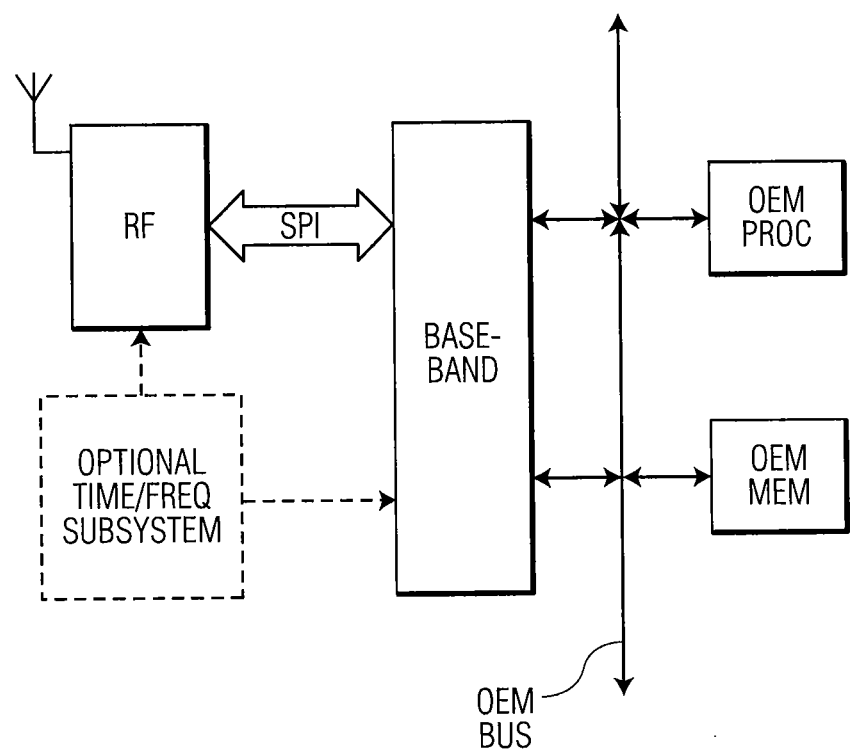
FIG. 1 is a block diagram of an embodiment of a GPS system.

FIG. 1 is a block diagram of an embodiment of a GPS system, including radio frequency ("RF") components and baseband components. In one embodiment, the RF components and the baseband components interface to an original equipment manufacturer ("OEM"), or "host" processor and OEM memory through an OEM bus. As will be described below, the baseband components include memory components. Optionally, the OEM memory is not required to be accessed by the baseband components. Other possible arrangements include all of the RF components and the baseband components on one chip with all of the required memory and processing power to perform GPS functions. The GPS system is capable of operating effectively without aiding information, or alternatively, it may operate with aiding information from a variety of sources.

Figure 1A:
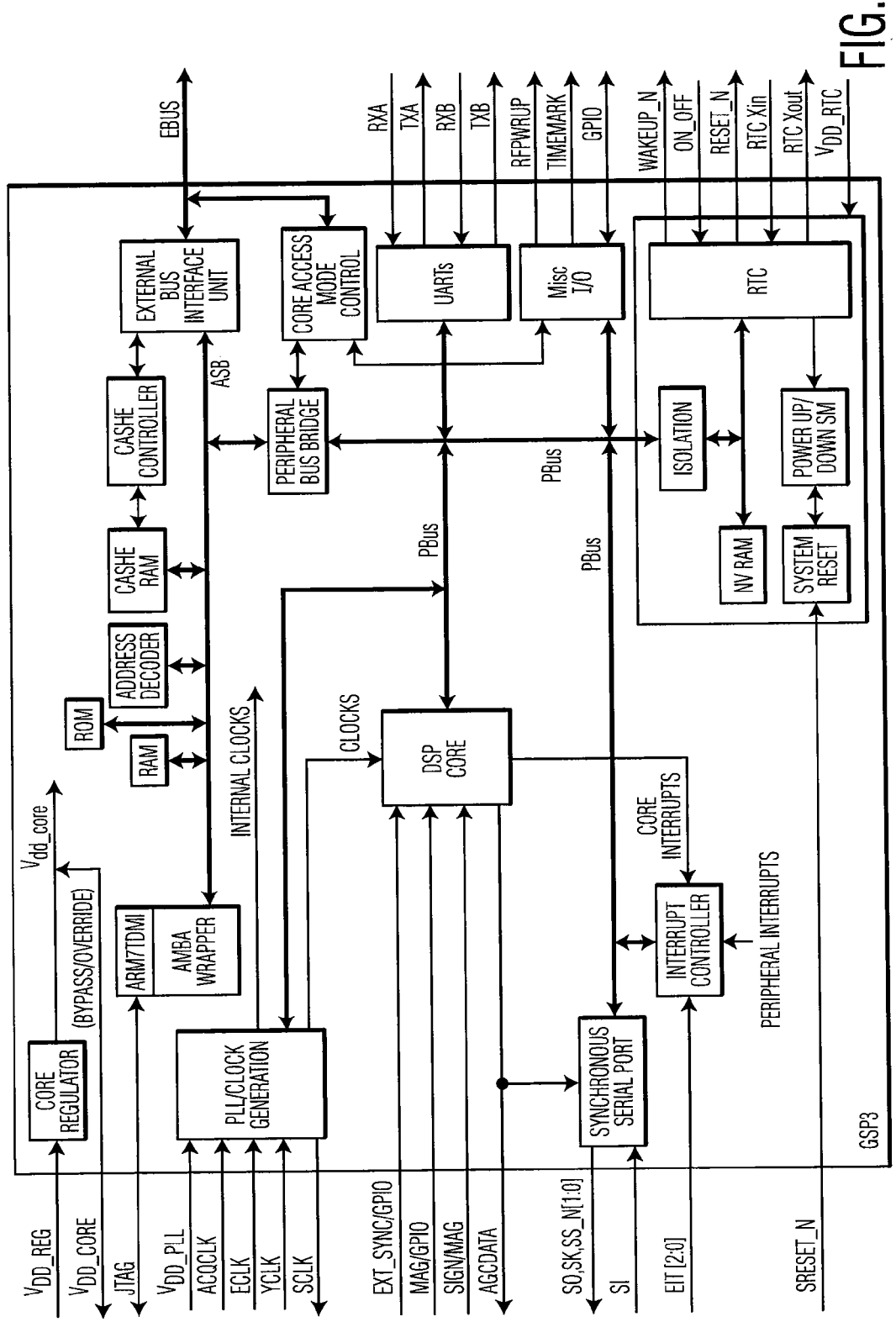
FIG. 1A is a block diagram of an embodiment of a baseband chip system.

FIG. 1A is a block diagram of one embodiment of a baseband chip, including a digital signal processor ("DSP"), an ARM processor, clock components, various memory components, various interface components for external and internal communication, etc.

Figure 2:
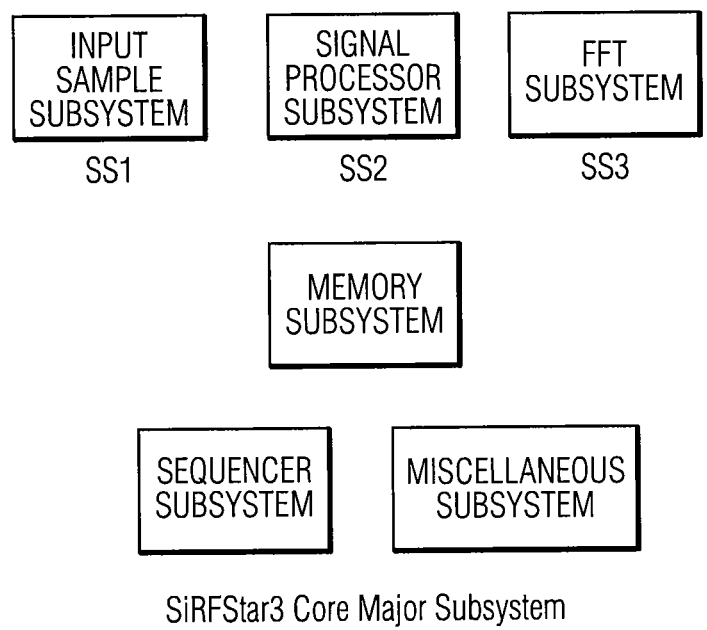
FIG. 2 is a block diagram showing significant subsystems of one embodiment of a baseband chip.

FIG. 2 is a block diagram showing significant subsystems of one embodiment of a baseband chip, including an input sample subsystem, a signal processor subsystem, an FFT subsystem, a memory subsystem, a sequencer subsystem, and another "miscellaneous" subsystem. For convenience herein the subsystems will be referred to as follows:

subsystem 1=input subsystem;
subsystem 2=signal processing subsystem;
subsystem 3=FFT subsystem;
subsystem 4=sequencer/control subsystem; and
subsystem 5=memory/arbitration subsystem.

The division of tasks or functionality between the subsystems is a design choice. In different embodiments of the invention, the different subsystems may share functionalities in different ways, or there may be more a less subsystems. For example, in some embodiments shown herein the sequencer/control subsystem is not a separate subsystem. Rather part of the sequencer functionality resides on subsystem 2 and the remaining functionality resides on subsystem 3.

Figure 3:
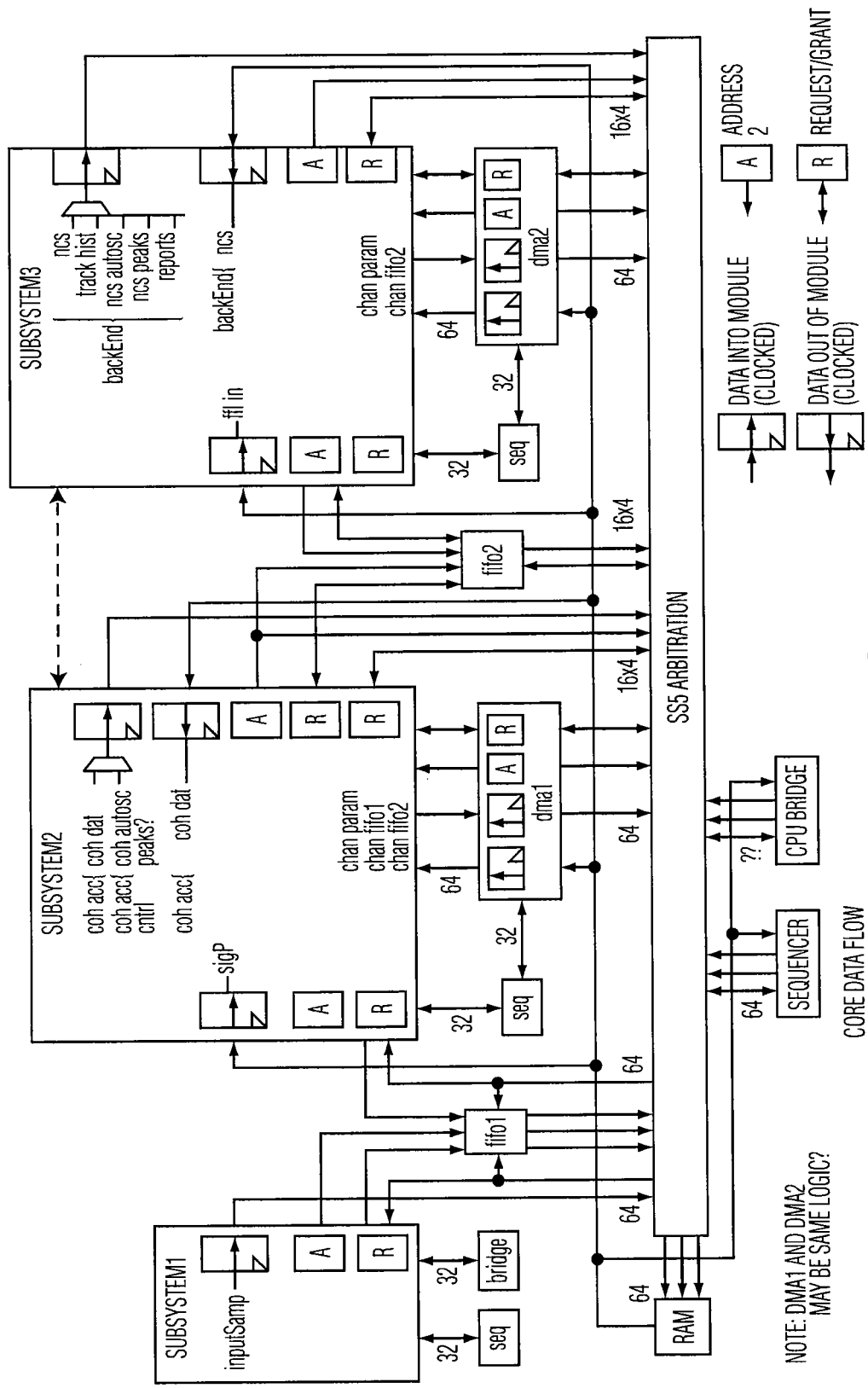
FIG. 3 is a block diagram illustrating an overview of the general data flow of the GPS system in one embodiment.

FIG. 3 is a block diagram illustrating an overview of the general data flow of the GPS system in one embodiment, and further illustrating a conceptual arrangement of various subsystems. As shown, subsystems 1, 2, and 3 arbitrate for access to a random access memory ("RAM"). As described further below, the RAM is logically divided into four sections, but in various embodiments can be any number of physical memory devices, either internal to the GPS system, or external to the GPS system.

Figure 4:
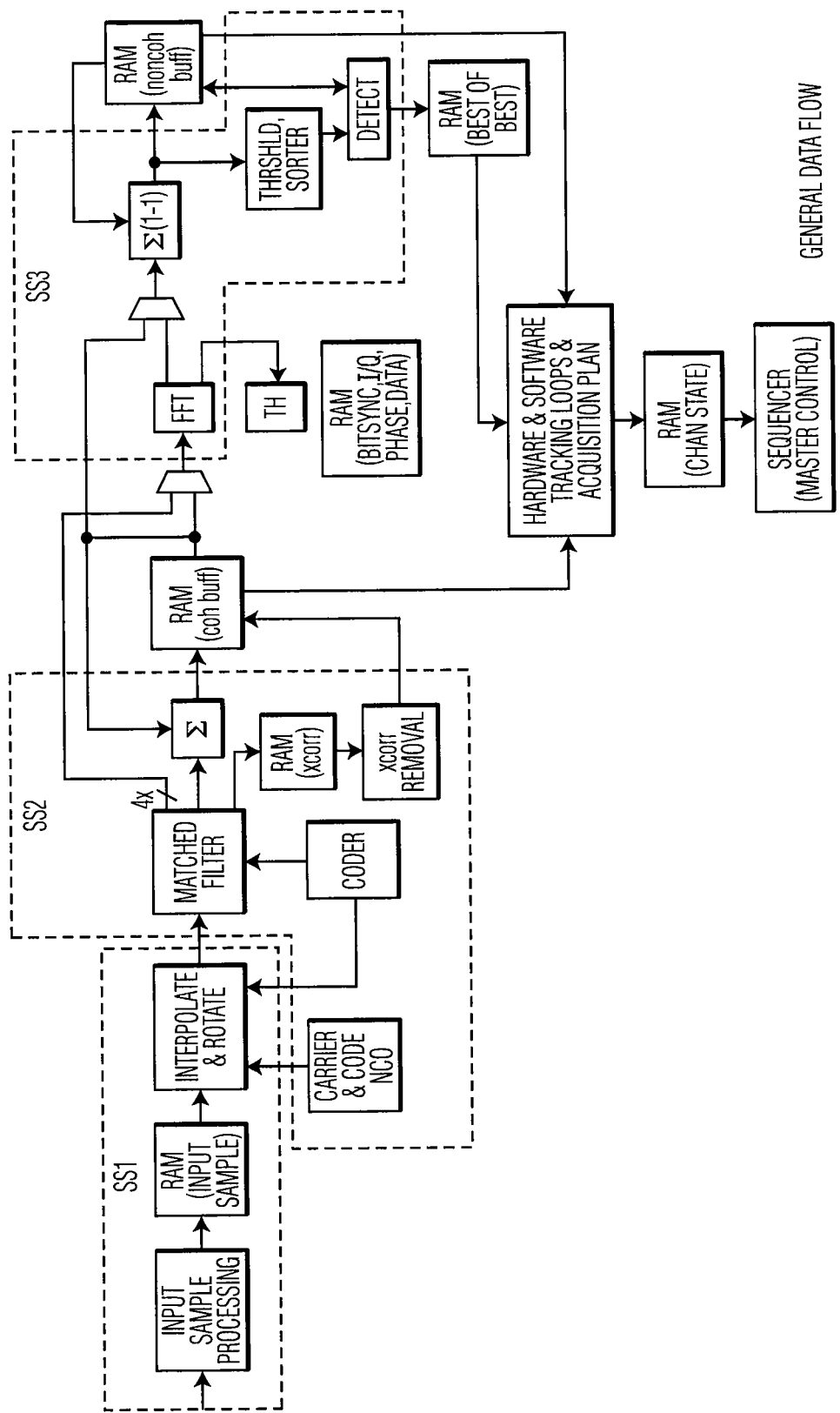
FIG. 4 is a block diagram illustrating general data flow of the GPS system with greater detail.

A signal flow for one system embodiment is shown in FIG. 4. An RF signal is received in the input sample processing block or subsystem 1. Subsystem 1 includes a counter chain that is a divide-down from an input sampling clock and other clocks that provide time and frequency references against the input sampling.

Figure 5:
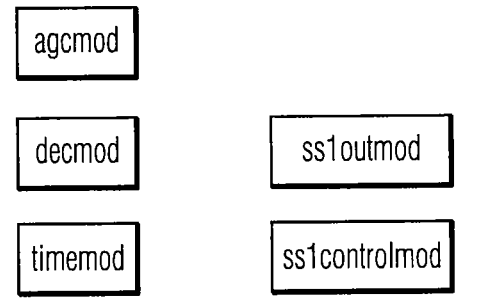
FIG. 5 is a block diagram showing functional blocks of subsystem 1 in one embodiment.

FIG. 5 shows basic functional modules within subsystem 1.

Figure 6:
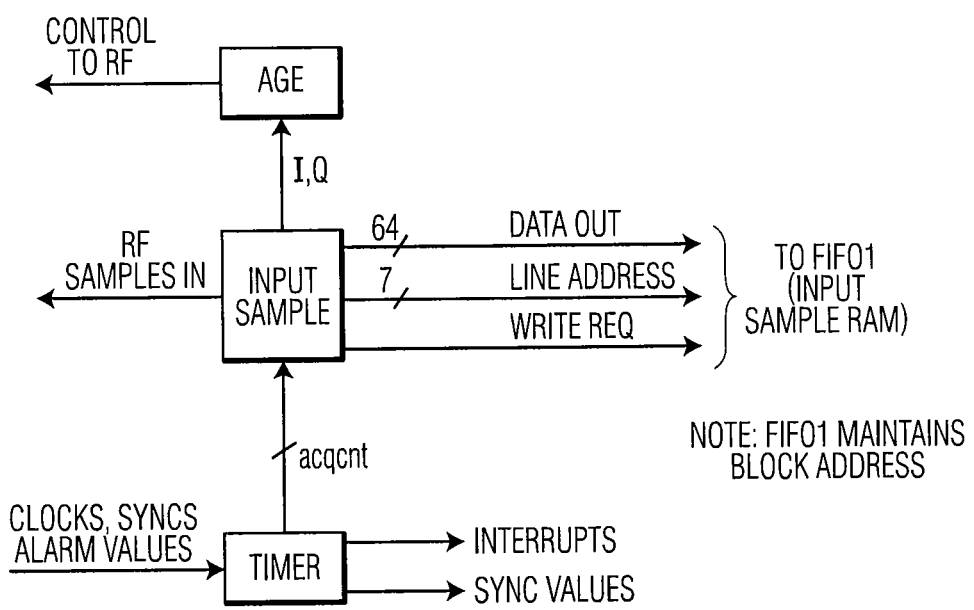
FIG. 6 is a block diagram showing more detail of subsystem 1 partitioning in one embodiment.

FIG. 6 shows additional detail of the basic functional modules within subsystem 1. The automatic gain control ("AGC") looks at the RF samples coming into the input sample block. There is a down-counter in the AGC. Input samples have a magnitude of one or zero. A value of one corresponds to a strong signal. When a sample has a value of one, the AGC counts down. If it counts down too much, the signal is too large, so AGC send control signal to RF telling it to decrease the gain, and vice versa.

Figure 7:
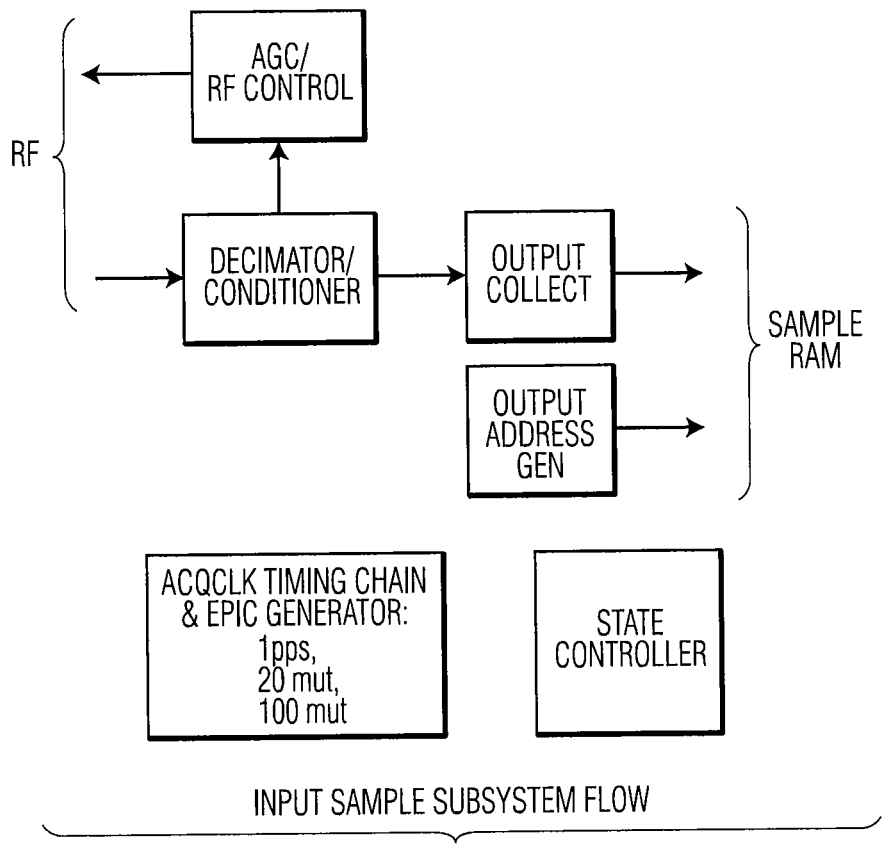
FIG. 7 is a block diagram showing an embodiment of a subsystem 1 input sample flow.

FIG. 7 shows additional detail of the basic subsystem 1 data flow.

Figure 8:
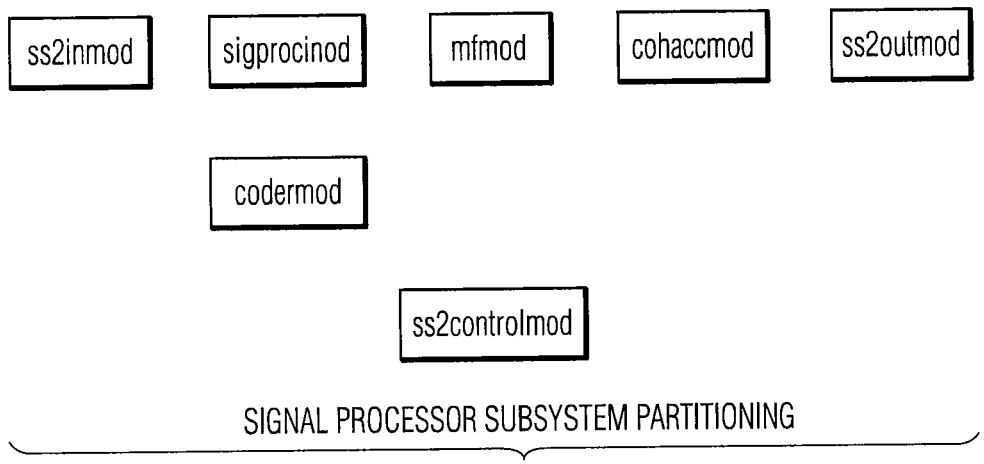
FIG. 8 is a block diagram showing functional blocks of subsystem 2 in one embodiment.

FIG. 8 shows different blocks in subsystem 2, the signal processor subsystem.

Figure 9:
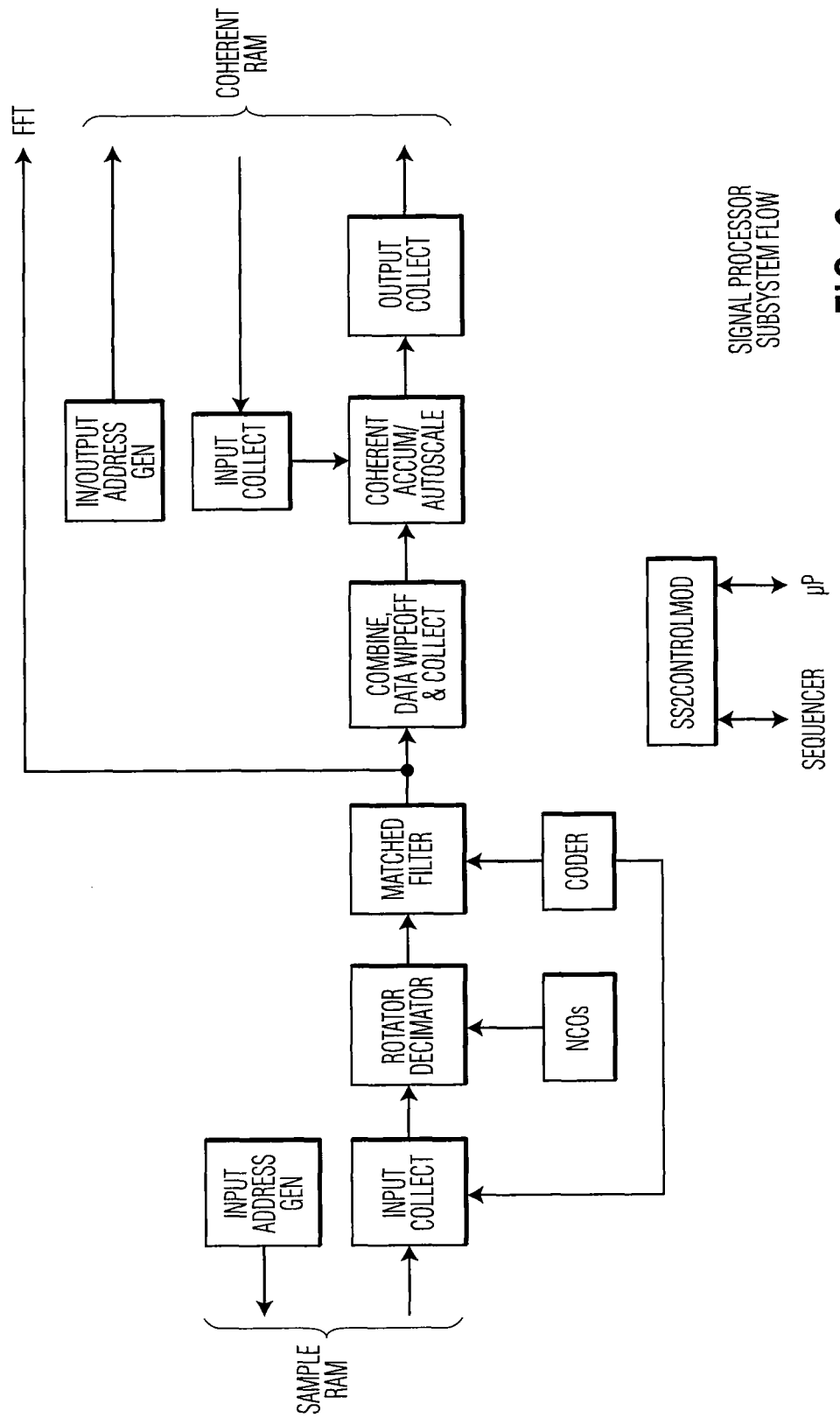
FIG. 9 is a block diagram showing another embodiment of a subsystem 2 flow.

FIG. 9 is an alternative block diagram of subsystem 3 without the cross-correlation elements.

Figure 10:
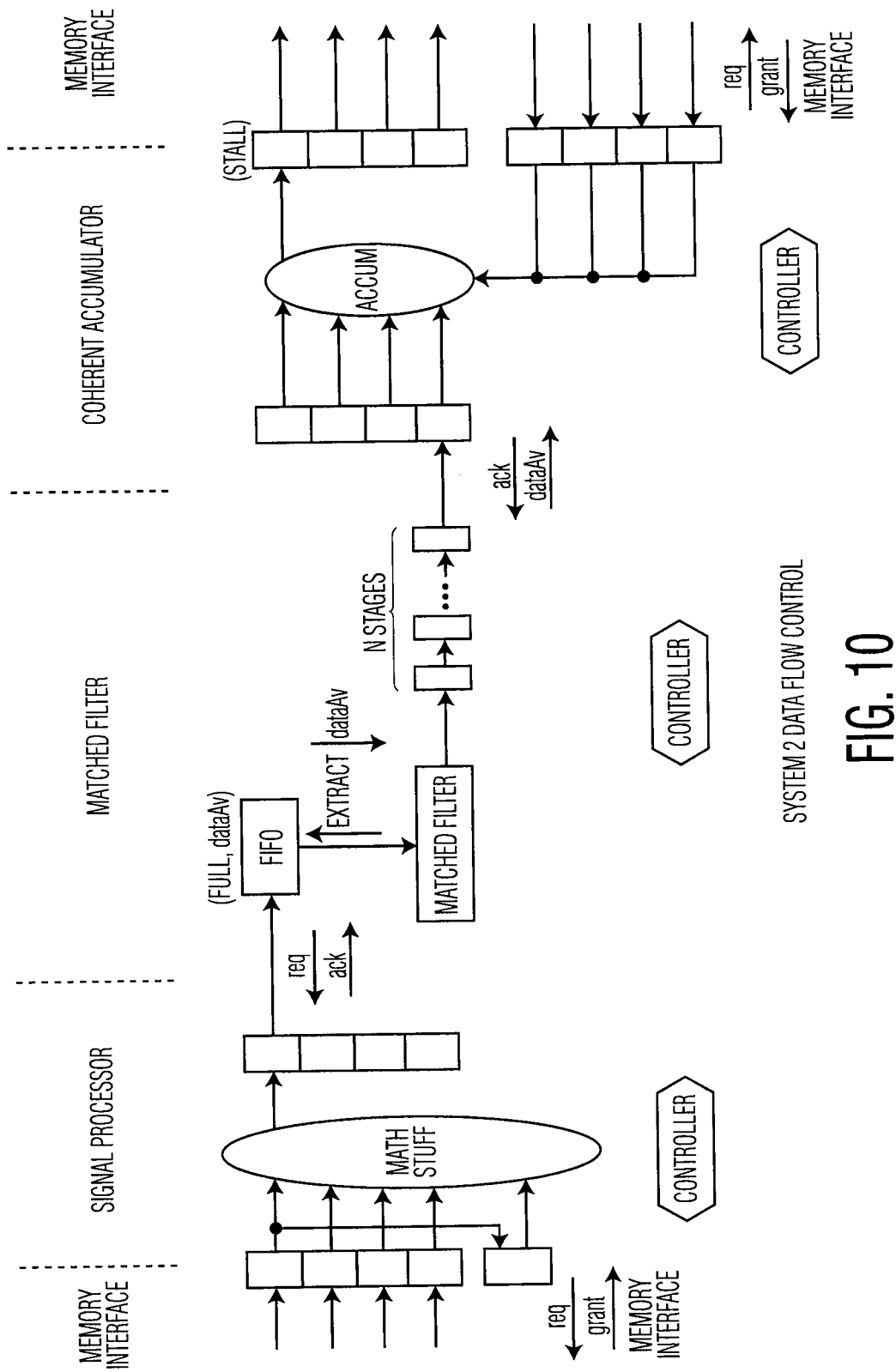
FIG. 10 is a block diagram showing an embodiment of a subsystem 2 data flow control.

FIG. 10 shows a data flow for an embodiment of subsystem 2. This diagram illustrates pipeline stages and registers for the flow control. Each titled section, such as "memory interface", "signal processor", etc., has a control mechanism and each acts as its own state machine. There are hand-offs between the sections as data flows left to right.

Figure 11:
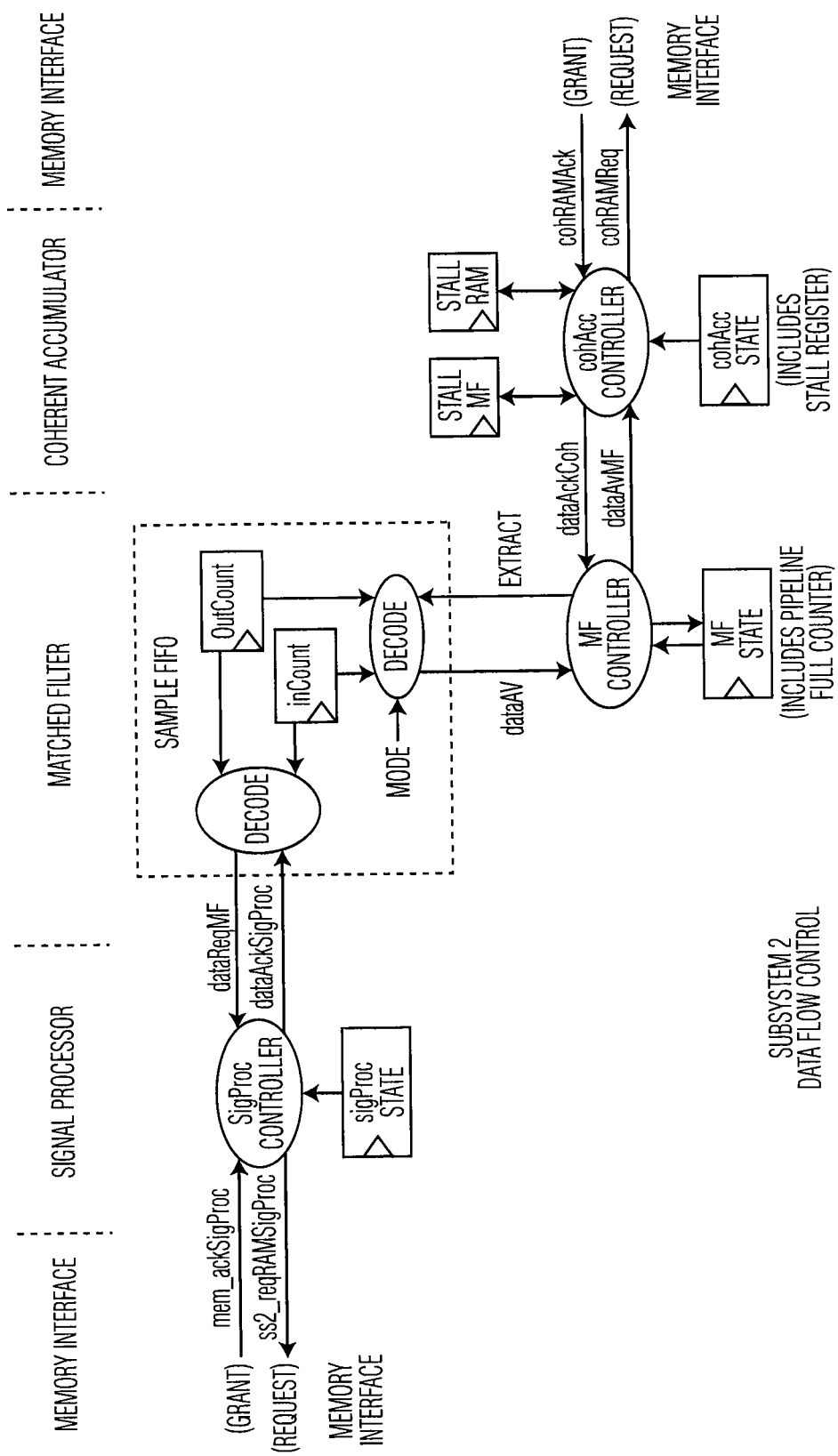
FIG. 11 is a block diagram showing another embodiment of a subsystem 2 data flow control.

FIG. 11 is another diagram of data flow in an embodiment of subsystem 2 that shows critical paths to be considered in timing analysis.

Figure 12:
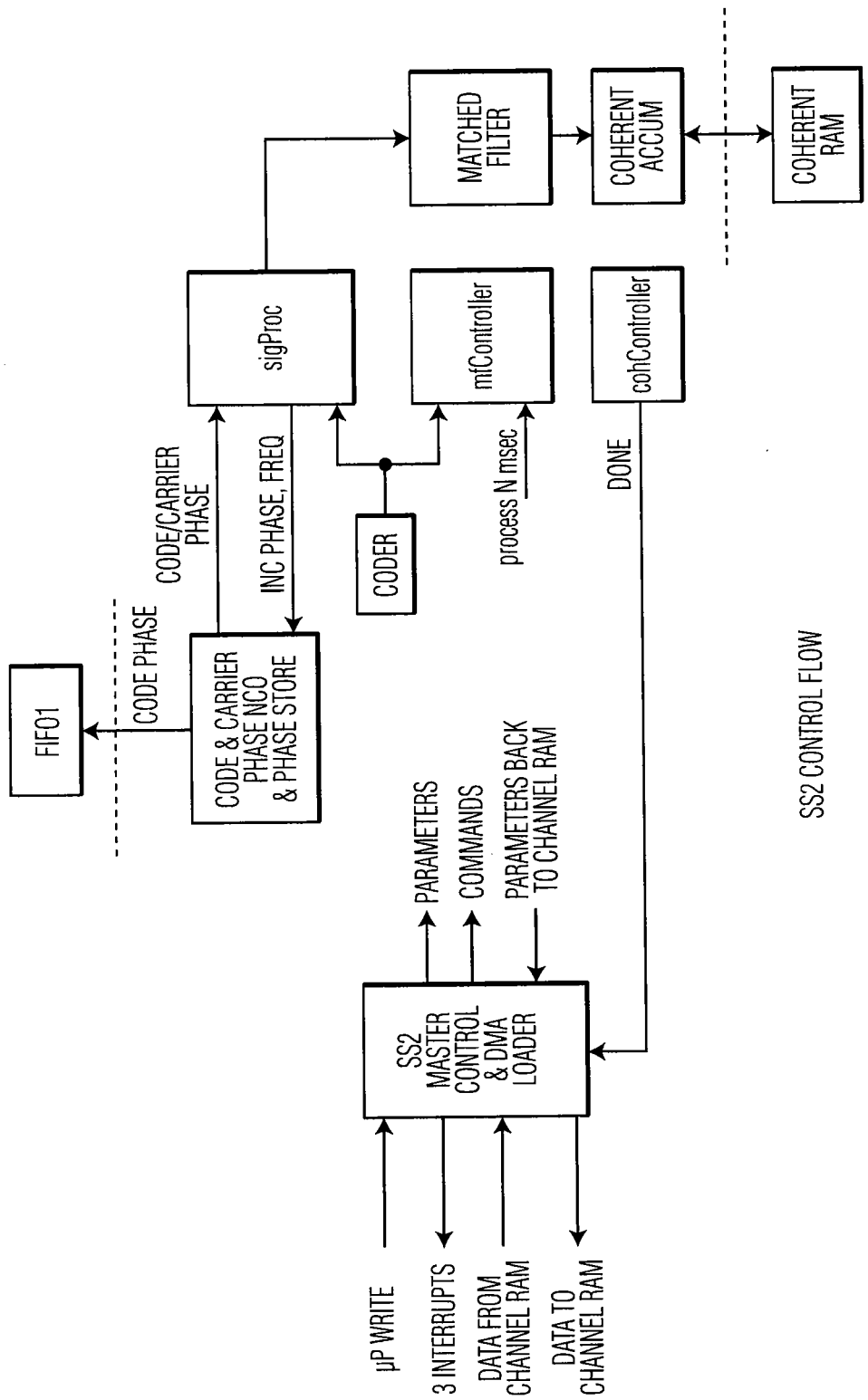
FIG. 12 is a block diagram showing an embodiment of a subsystem 2 control flow.

FIG. 12 is a diagram showing a subsystem 2 control flow in one embodiment. A master control is to the left of the diagram. The matched filter controller is programmed to process for a number of milliseconds, and the code and carrier NCO are programmed with starting positions. The matched filter controller draws data from the FIFO1 to the code and carrier NCO and then into the signal processor and from signal processor to the matched filter, then to the coherent accumulator and then to coherent RAM, which coherently accumulates.

In one embodiment, there are different ways to implement the matched filter so that it processes data for a certain number of milliseconds. The matched filter draws data from the signal processor until it stops requiring data. Then the signal processor stops producing data. The coherent accumulator takes whatever the matched filter outputs and coherently accumulates it. The matched filter decides when to change channels to process data from a different channel, or data from a different satellite vehicle. The matched filter effectively says "stop processing" when it has processed for the period of time.

Figure 13:
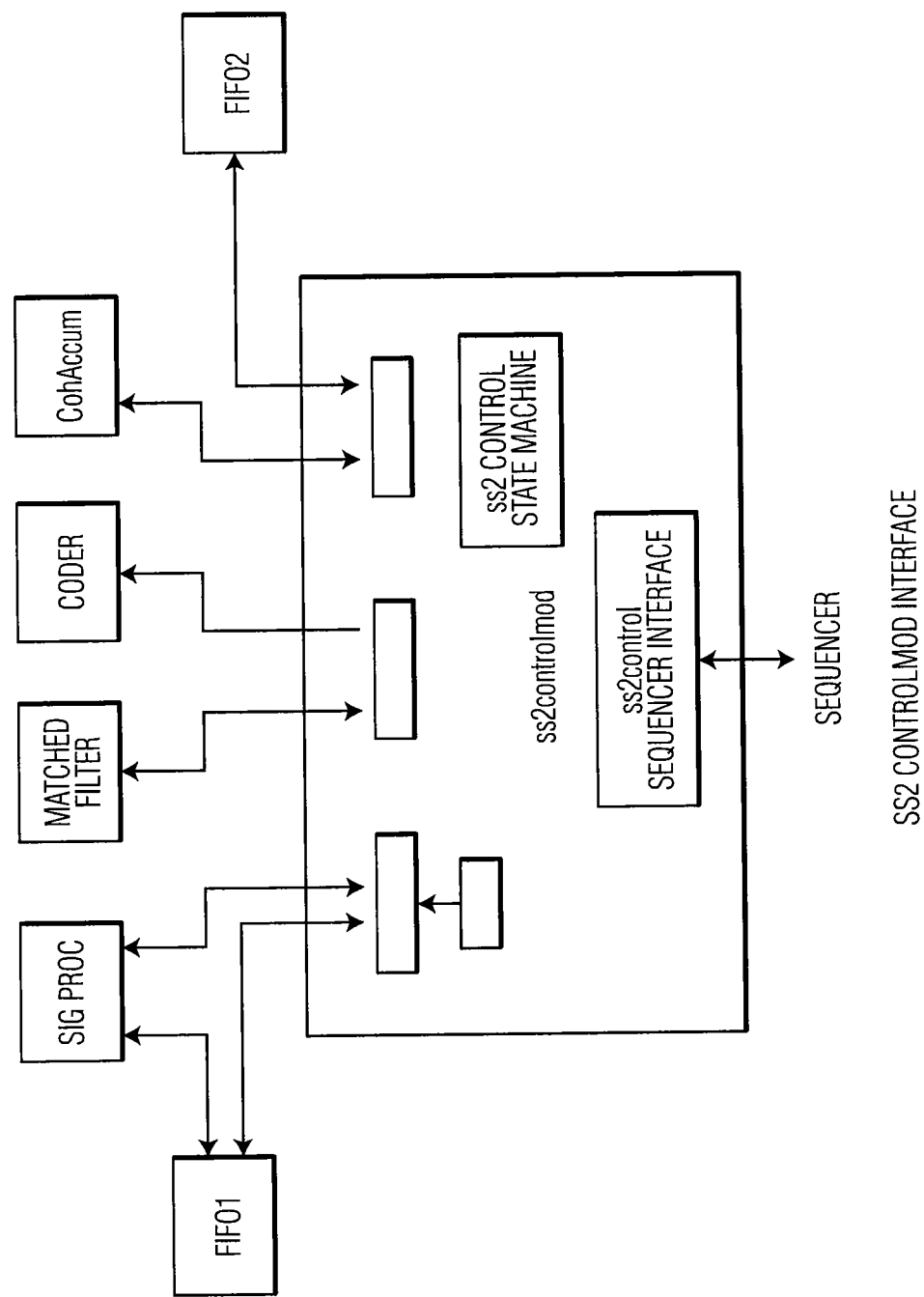
FIG. 13 is a block diagram showing an embodiment of a subsystem 2 control module interface.

FIG. 13 Is a block diagram of an embodiment of the controller on the left of FIG. 12 showing more detail regarding its communication with different modules (e.g., signal processor, matched filter, coder, etc.). The controller initializes processing. There is a channel RAM region of RAM accesses by the subsystem 2 control module. This is part of an embodiment in which the sequencer functionality is divided between subsystem 2 and subsystem 3. The portion of the sequencer instantiated in subsystem 2 is shown here. When a channel is initiated, the control module accesses the channel RAM and pulls in channel parameters required for subsystem 2 to process that particular channel. It then programs the signal processor, the coder, the matched filter, and the coherent accumulator with their parameters required to process that channel. The parameters, for example, tell the matched filter to run for a certain number of milliseconds, then when it is done the matched filter tells the subsystem 2 control module know that it is finished, and the controller can move on to the next channel. There is a linked list in the channel RAM that stores the location of the channel RAM for the next channel, and so on.

In one embodiment, different channels are programmed to operate in different modes as enumerated above (cold start, coarse-aided acquisition, and tracking modes). The parameters stored in the channel RAM allow the subsystems to be programmed appropriately for a particular channel in a particular mode. The channels access the subsystems in a time multiplexed manner.

Figure 14:
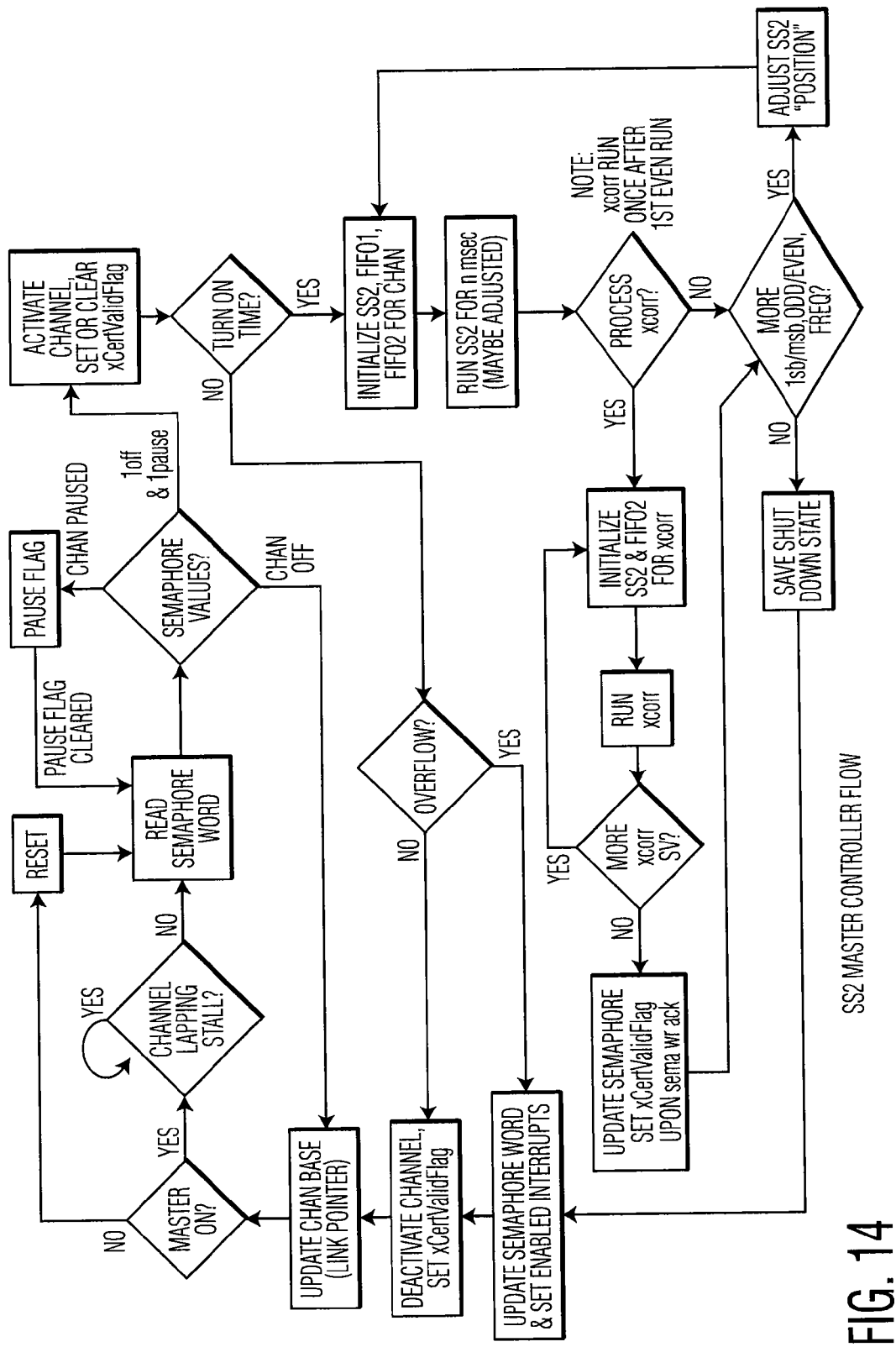
FIG. 14 is a block diagram of a subsystem 2 master controller flow in an embodiment.
Figure 15:
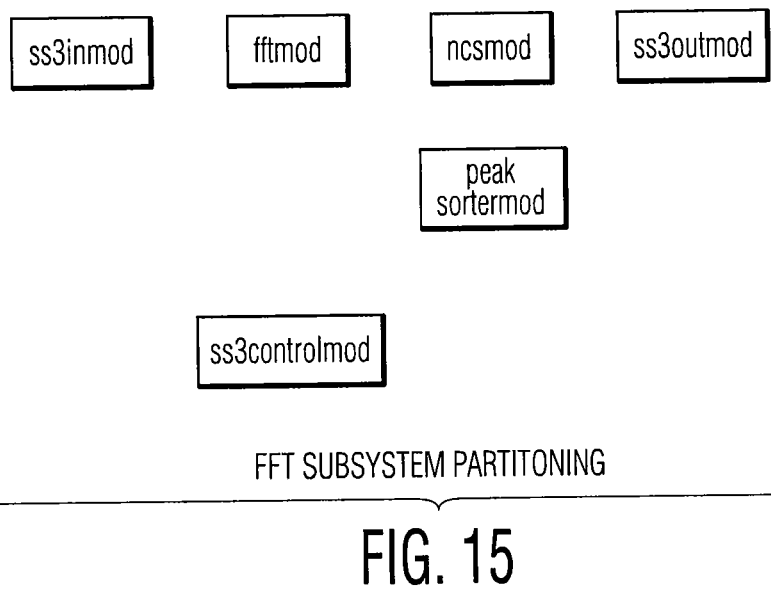
FIG. 15 is a block diagram of subsystem 3 modules in an embodiment.

FIG. 14 shows a master controller flow for one embodiment of subsystem 2.

FIG. 13 shows various modules and module partitioning of one embodiment of a fast Fourier transform ("FFT") subsystem 3.

Figure 16:
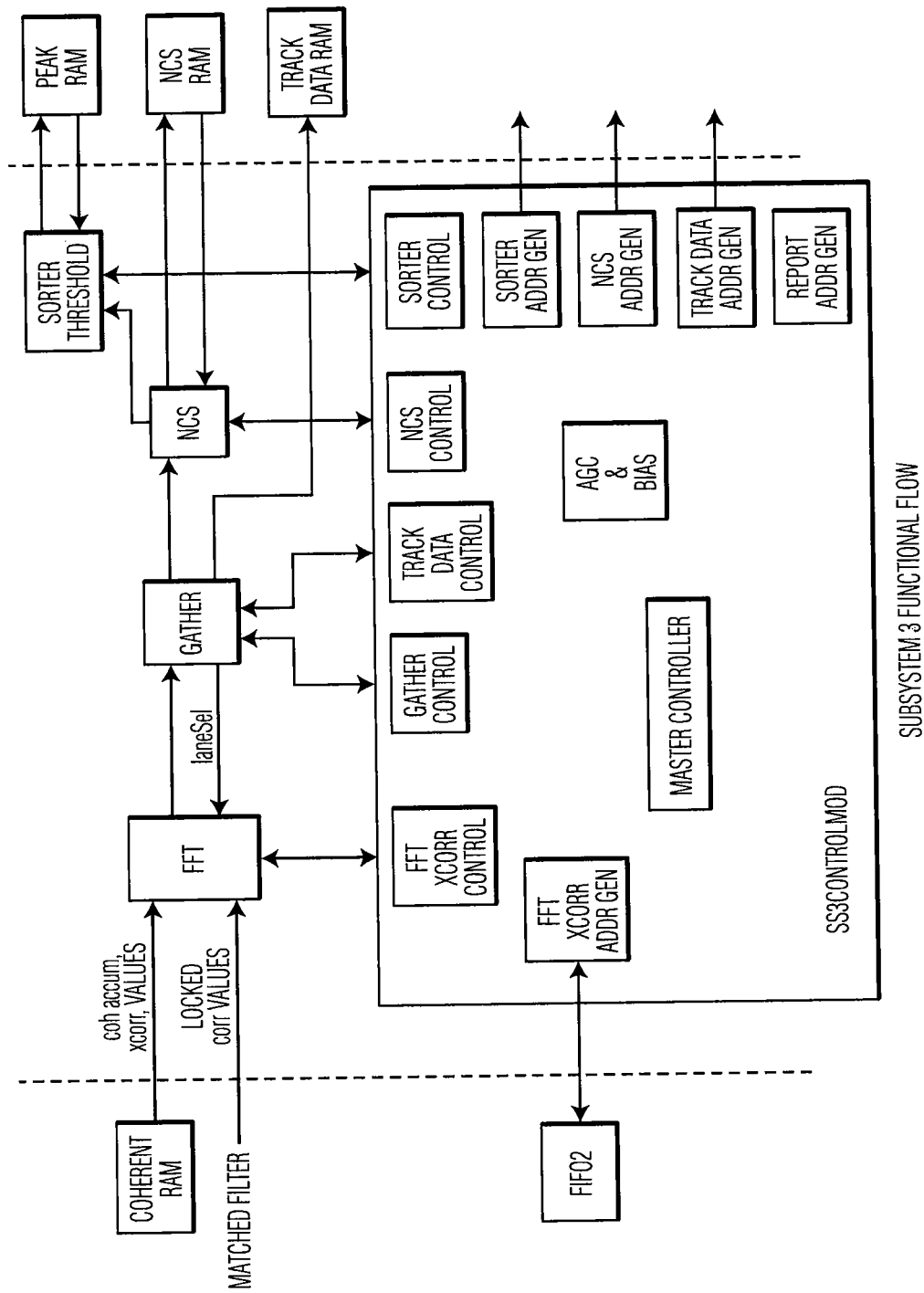
FIG. 16 is a block diagram of a subsystem 3 functional flow in an embodiment.

FIG. 16 shows more detail of an embodiment of subsystem 3. A subsystem 3 control module is shown at the bottom of the diagram, and is similar in function to the subsystem 2 control module. The dashed lines represent the interface from the subsystem to memory. Peak RAM, NCS RAM, etc, are regions in memory. The coherent RAM is also a region in memory. The FIFO2, however, is a FIFO2 control structure that controls the access between subsystem 2 and subsystem 3 to the memory. For example, the FIFO2 lets subsystem 3 know when there is data to operate on in the coherent RAM. FIFO2 also lets subsystem 2 know when it is about to overwrite data that subsystem 3 has not used yet. There is a corresponding FIFO1 between subsystem 1 and subsystem 2 that control access to the input sample RAM.

Figure 17:
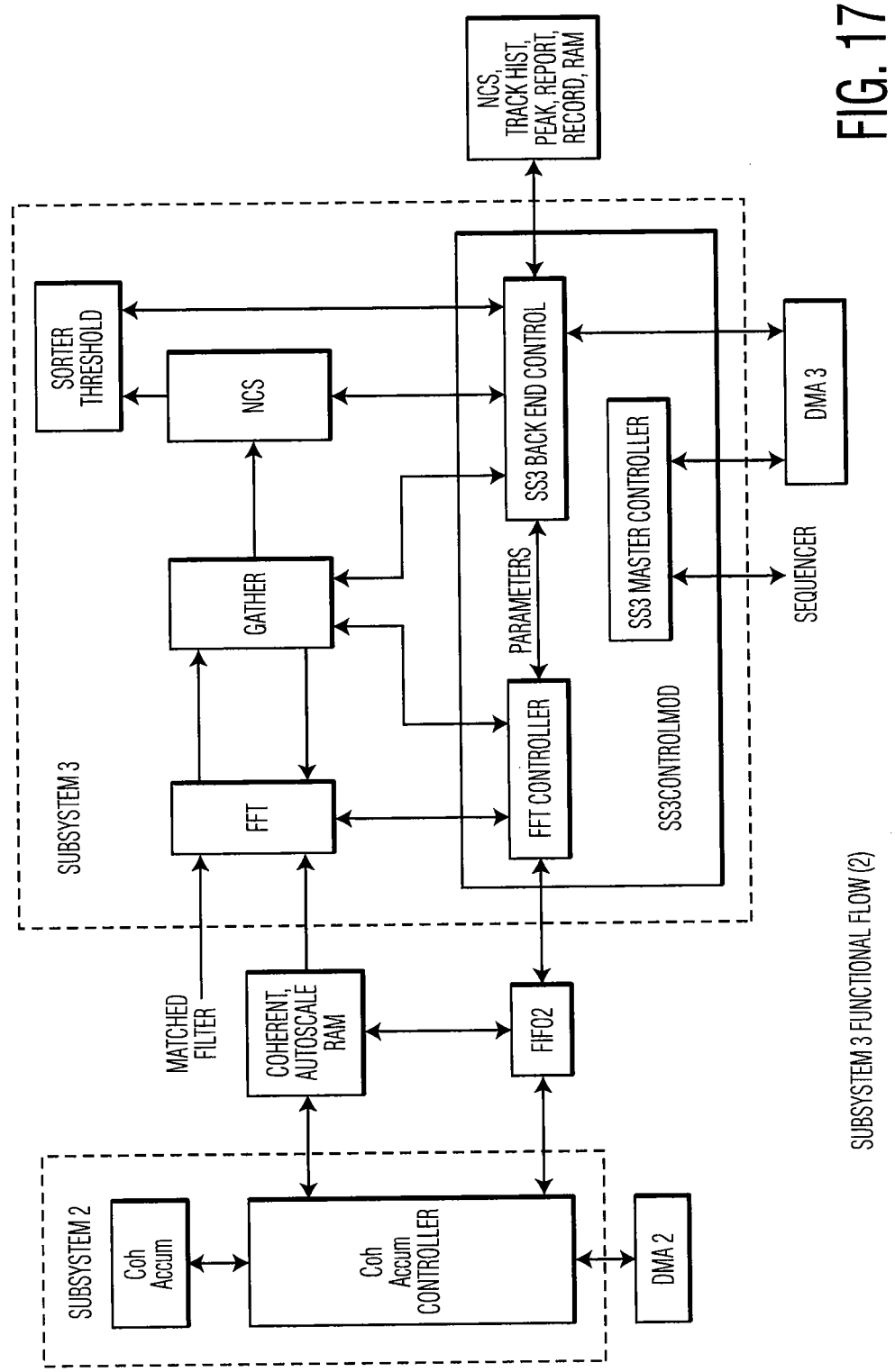
FIG. 17 is another block diagram of a subsystem 3 functional flow in an embodiment.

FIG. 17 shows a subsystem 3 data flow, including FIFO2. The data going from subsystem2 to subsystem3 is controlled by FIFO2 structure. The actual data is in the coherent RAM, right above FIFO2. The FFT takes a certain number of sample inputs out of the coherent RAM and performs an FFT on them. The FFT generate a number of frequencies as dictated by the particular processing mode. As and example, for an 8 sample, 16 point FFT, the FFT generates 16 frequencies. Not all of the 16 frequencies may be of interest. For example, the outer frequencies may not be useful. The gather module accepts only a programmed number of frequencies. The number of frequencies is programmable.

The gather module selects the desired frequencies, packs them in a more compact form and passes them on to the NCS, which is a non-coherent accumulator. Although not shown here, the output of the gather mod goes to the track history RAM ("TH"). The output of the gather module is coherent data (still having distinct I and Q components). Non-coherent data is stored in NCS. Selected coherent data is stored by the TH for later examination and processing by software. At the top of the diagram, there is a line that goes to the sorter threshold module. There is a large amount of information generated by the NCS module. It may not be desirable to save it, e.g., in an initial acquisition mode. It may be desirable to process, for a particular satellite vehicle, odd and even half-chip and multiple frequencies, each of which will generate a relatively large data array. So as the data is generated, the data is processed and peak sorted. The eight largest values are stored, as well as information regarding where they occurred, such as what tap number, what frequency, and whether it was at an odd or even half-chip. At the end of a context that is all stored in the peak sorter.

Context is a term used herein to denote the completion of processing of one channel for a subsystem. At the end of the context the peaks are saved, either when the channel is about to enter subsystem 3, or when processing is almost done, so that software can examine the peaks and make its determinations.

Figure 18:
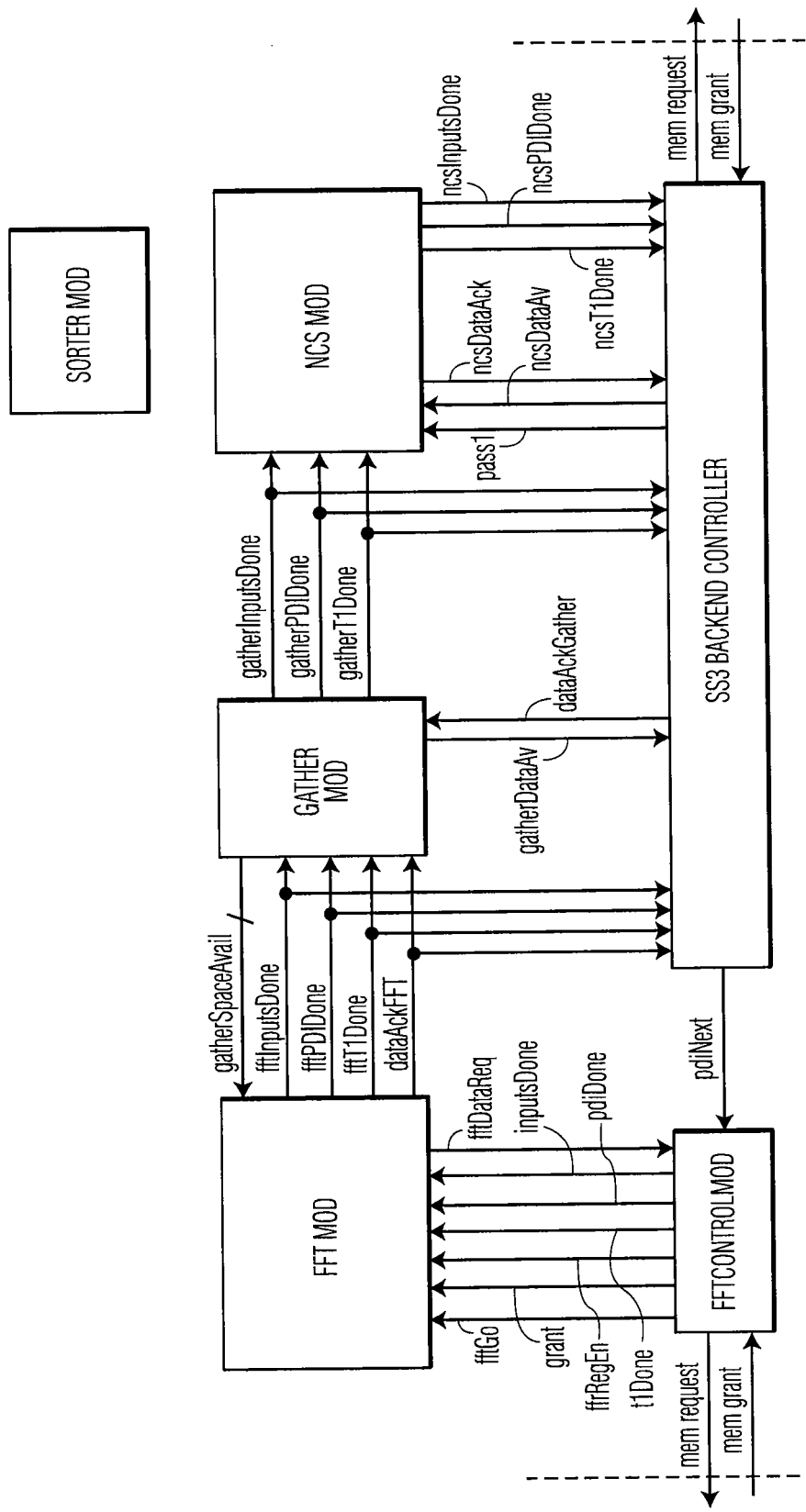
FIG. 18 is a block diagram of a subsystem 3 control flow in an embodiment.

FIG. 18 shows timing signals for a subsystem 3 control flow. Two timing division terms are used herein, e.g. T1 and PDI (or pre-detect integration) will now be defined. A T1 is basically how long it takes to coherently accumulate in the coherent accumulator that is fed from the output of the matched filter.

Suppose the matched filter is operating in a full matched filter mode. The output of the matched filter is a full millisecond worth of coherent accumulations. The coherent accumulations take the full millisecond allotted for coherent accumulations. Each time processing includes a particular tap position, there will be another full millisecond of coherent accumulations produced. The coherent accumulator adds a first and second millisecond worth of coherent accumulations to get 2 milliseconds of coherent accumulations. More or less than 2 milliseconds of coherent accumulations can be programmed. The completion of the programmed number of milliseconds of coherent accumulations for a tap constitutes a T1's worth of coherent accumulations. There are variations with different modes, such as in the length of T1 in milliseconds. In some modes, it is desirable to accumulate longer to look for a weaker signal. When coherent accumulation is finished, non-coherent accumulation starts For a ⅛ matched filter (a low-resolution mode), then each one of the ⅛ fractional blocks accumulate ⅛ ms in one shot. The matched filter is thus run through 8 times into the coherent accumulator to produce one ms worth of coherent accumulations. This is repeated as required to get a predetermined number of ms of coherent accumulations.

Each T1 represents one input sample into the FFT. For example, for an 8 sample, 16 point FFT, 8 T1s are required to feed into the FFT. This is called a PDI; 8 T1s in one shot constitute a PDI.

Each T1 represents an input sample to the FFT. However many T1s are fed into the FFT at one time constitute a PDI.

FIG. 18 illustrate the need to keep track of T1 boundaries and PDI boundaries. This is facilitates by the "done" signals. FIG. 18 shows a pipeline flow starting from the FFT to the gather module to the NCS. The subsystem3 backend controller initiates the subsystem. The pdiNext signal starts the FFT processing data. Then the NCS needs to let the backend controller know "I completed processing that PDI, what next"?

Figure 19:
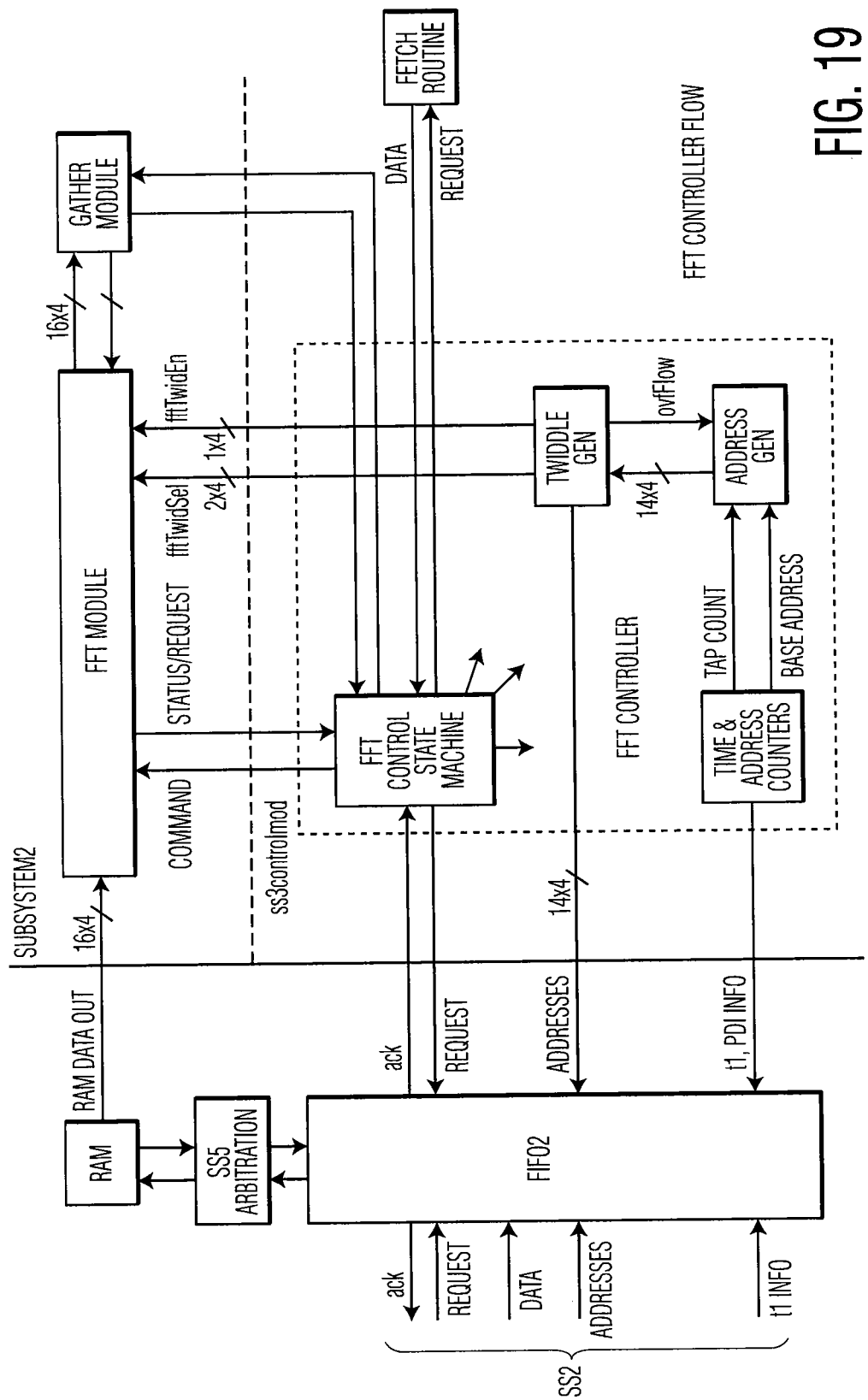
FIG. 19 is a block diagram of a subsystem 3 FFT controller flow in an embodiment.

FIG. 19 shows detail of the FFT controller, including time and address counters. The FFT controller keeps track of the location of data in the coherent RAM that is required to feed the FFT. The controller that knows what cycle the FFT is in and what information the FFT needs. The controller generates an address and an indication of the status of FFT processing.

The FFT core includes a four point FFT. In order to configure a 16 point FFT the 4 point FFT is run repeatedly in a particular pattern to generate the 16 point FFT. Since this core is a 4 point FFT it needs 4 T1 input samples at a time. However, subsystem 2 generates the T1s in a linear fashion. The FFT may require the T1s in bit reversed order. For example, say the FFT needs 4 T1s at a time out of 8, being 2, 7, 3, and 1 on the first shot and some other pattern on the next shot. A twiddle algorithm stores the output of subsystem 2 into 4 diff physical RAMS in an optimal pattern such that the data required by subsystem 3 can be accesses 4 T1s at a time without a data collision. Without the twiddle algorithm and dividing the RAM into four areas, it would be necessary to perform more memory reads. The algorithm knows which 4 T1s the FFT will need at one time and assures that they are stored in different RAMs (or RAM areas). FIGS. 35-43 illustrate hardware and logic aspects of FFT address twiddling in an embodiment.

Figure 20:
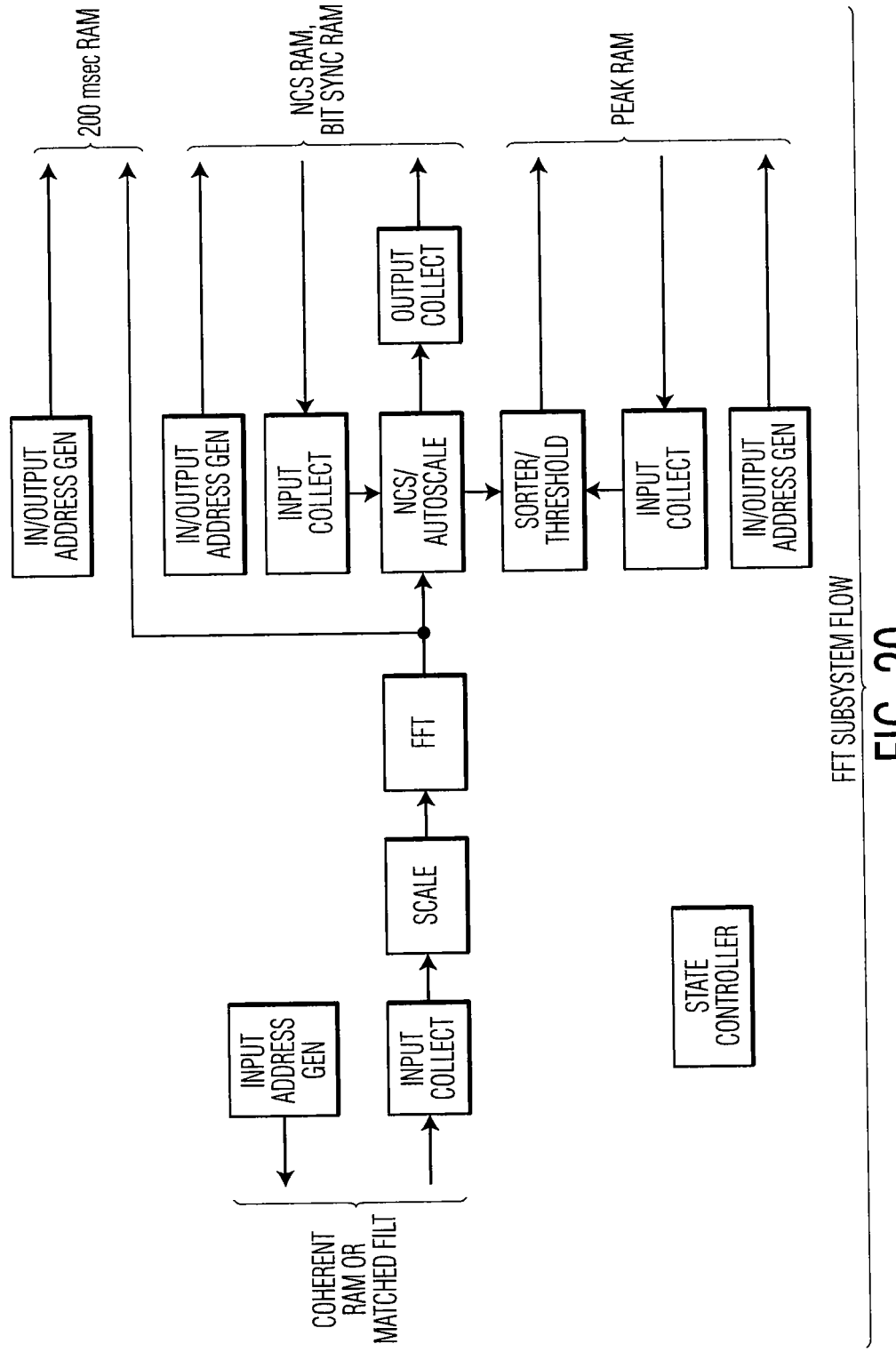
FIG. 20 is a block diagram of a subsystem 3 FFT flow in an embodiment.

FIG. 20 shows a basic subsystem 3 flow in one embodiment. The scaling module shown performs descaling. The descaling is necessary because the data is scaled as follows. In the coherent accumulator, there is a relatively narrow pipeline for the data to flow through, and the dynamic range is very large. Given, for example, only 8 bits of I data and 8 bits of Q data for which there is room in the coherent RAM. The 8 bits of I and Q are thus associated with an exponent, or scale. There is an auto function such that bumps the exponent by one and scales back the 8 bits by one when the accumulator nears overflow for the 8 bits. Scaling is done by subsystem 2 when it feeds the data into the coherent RAM. Each T1 has an assoc scale values. Different scale values cannot be fed into the FFT, such as when 4 T1s at a time are fed into the FFT. So the scale module normalizes all the data to the same scale. The output of the FFT is passed to the NCS, which has its own scaling function. Thus, coherent and non-coherent scaling may take place.

Figure 21:
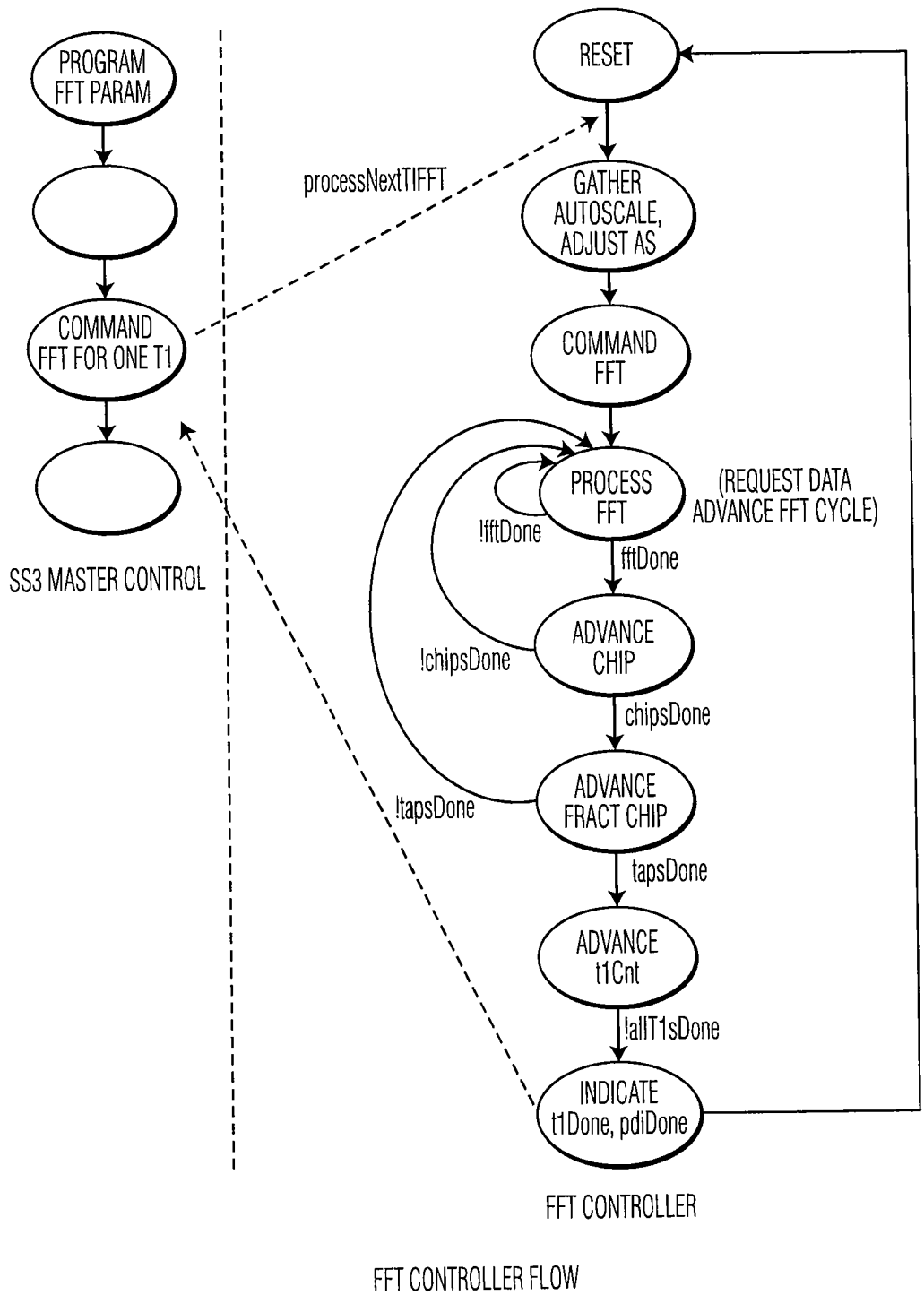
FIG. 21 is a block diagram of a subsystem 3 FFT controller flow in an embodiment.

FIG. 21 shows how the FFT cycles through under control of the subsystem 3 controller. The FFT processes for a particular chip position, completes the FFT and then needs to be told to advance to the next chip position. This is a detail of the FFT controller state machine.

Figure 22:
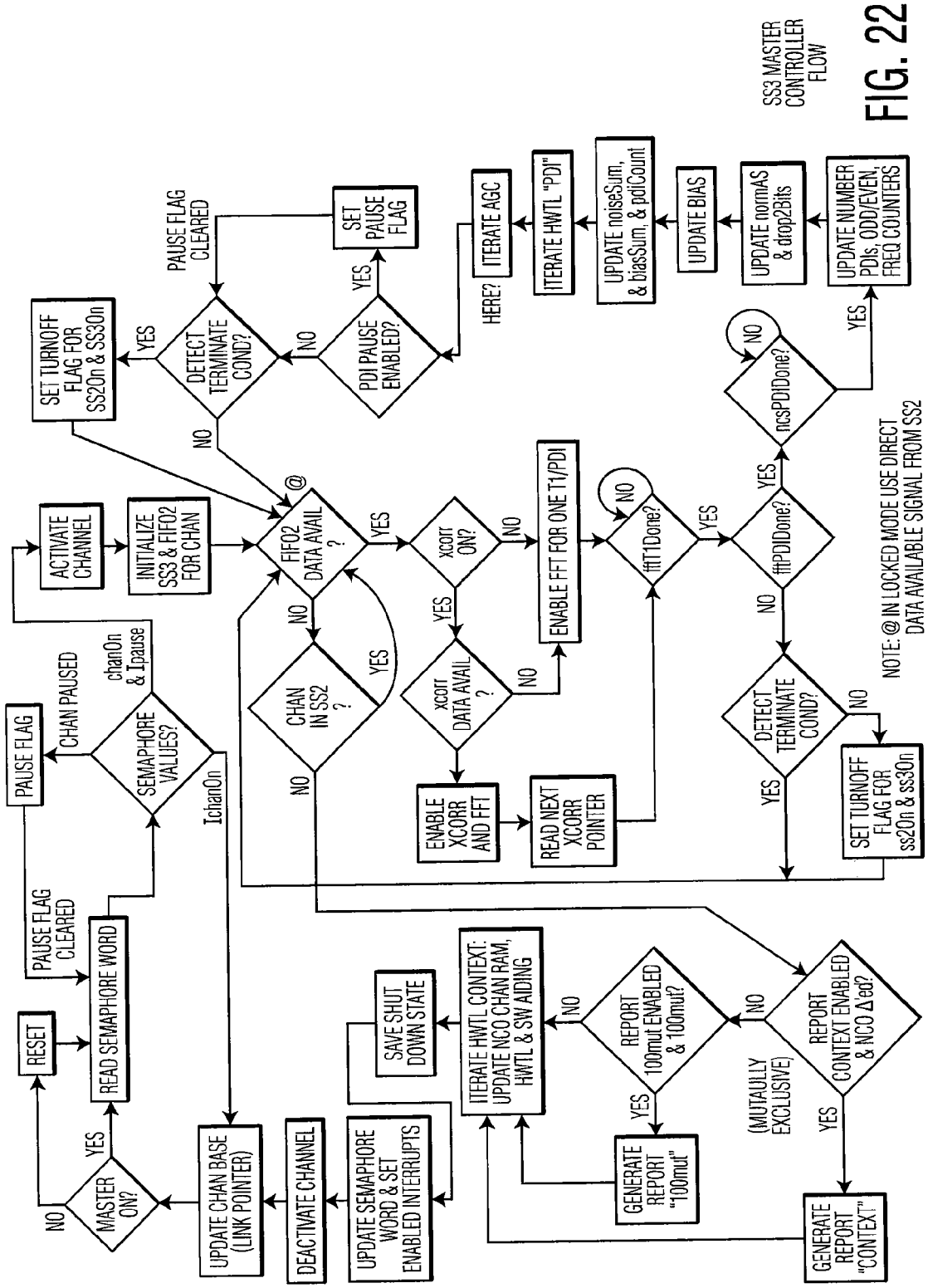
FIG. 22 is a block diagram of a subsystem 3 master controller flow in an embodiment.

FIG. 22 shows a flow chart for the subsystem 3 master controller. A semaphore word indicates various data that must be quickly disseminated between the subsystems on start up. The data is required to be exchanged between three quasi-asynchronous processes: subsystem 2, subsystem 3 and software. Each one may run on its own and gets information from the others. Information in the semaphore word may include, a 100 ms report creation, a phase adjust in subsystem 3 to be performed, various status flags from one subsystem to another, etc. The subsystems, hardware and software read the semaphore word and makes decisions.

The controller initializes subsystem 3 and FIFO2 (see near top center) that basically tells it to go out to the channel RAM, pull out the channel parameters and program subsystem 3 for the channel. The "FIFO2 data available" says subsystem 3 needs data from the coherent RAM, so it needs to know if the data is available. If it is not, it waits for it to become available. This involves lapping rules which control a lot of the sequencing between subsystem 2 and subsystem 3. Subsystem 2 and subsystem 3 process a linked list of channels. Subsystem 2 processes a channel and moves on, and then subsystem 3 to come into the channel, takes the data out and processes it. Subsystem 2 should not get ahead of subsystem 3. Subsystem 2 can catch up to subsystem 3 but must be just behind it.

The "FIFO2 data available?" decision block and the "channel in subsystem 2?" decision block are part of the lapping rule. If data is not avail, subsystem 3 is directed not to leave the channel yet, because subsystem 2 may be producing data for subsystem 3. When subsystem 2 leaves, subsystem 3 may leave the channel.

Cross-correlation functionality is also shown. In one embodiment, subsystem 2 produces the basic cross-correlation data, and subsystem 3 actually removes the cross-correlation data.

Referring to the "FFTT1 done?" decision block, there is a bit synch mode in processing is performed for multiple T1 offsets within a PDI. If not in bit synch mode, every time, e.g., if it is an 8 sample, 16 point FFT (this would not be a bit synch mode), after 8 T1s are processed into the FFT, the next full 8 T1s, or the next PDI, is fed into the FFT. On the other hand, in bit synch mode, there are 20 T1s because each one is 1 ms. It is thus necessary to figure out 20 hypothesis bit positions. There is a 20 ms ambiguity in the bit positions. There are 20 ms in a GPS data bit, and the CA code repeats each ms. An alignment can be performed in the CA code. With bit synch, the one ms ambiguity within the 20 ms is removed. Different T1 offsets are tried for different hypotheses.

When a PDI is completed, the flow goes to the bottom right of the diagram. It is determined whether another odd or even, or another frequency is desired. Subsystem 2 generates even and odd multiple frequencies that subsystem 3 needs to process. A HW tracking loop is iterated, certain scaled and bias parameters are updated as shown on the right upward-going flow. On the leftmost flow is the cleanup for the channel when the context is about to end. The semaphore word is updated to reflect whatever happened during the last context for the channel. HW tracking, and report generation (100 ms report or context report as appropriate) also occur. Then the channel is deactivated, and the active bit in the semaphore word is set to zero. The linked list in the channel RAM is consulted to determine which channel will have access to the hardware next.

Figure 23:
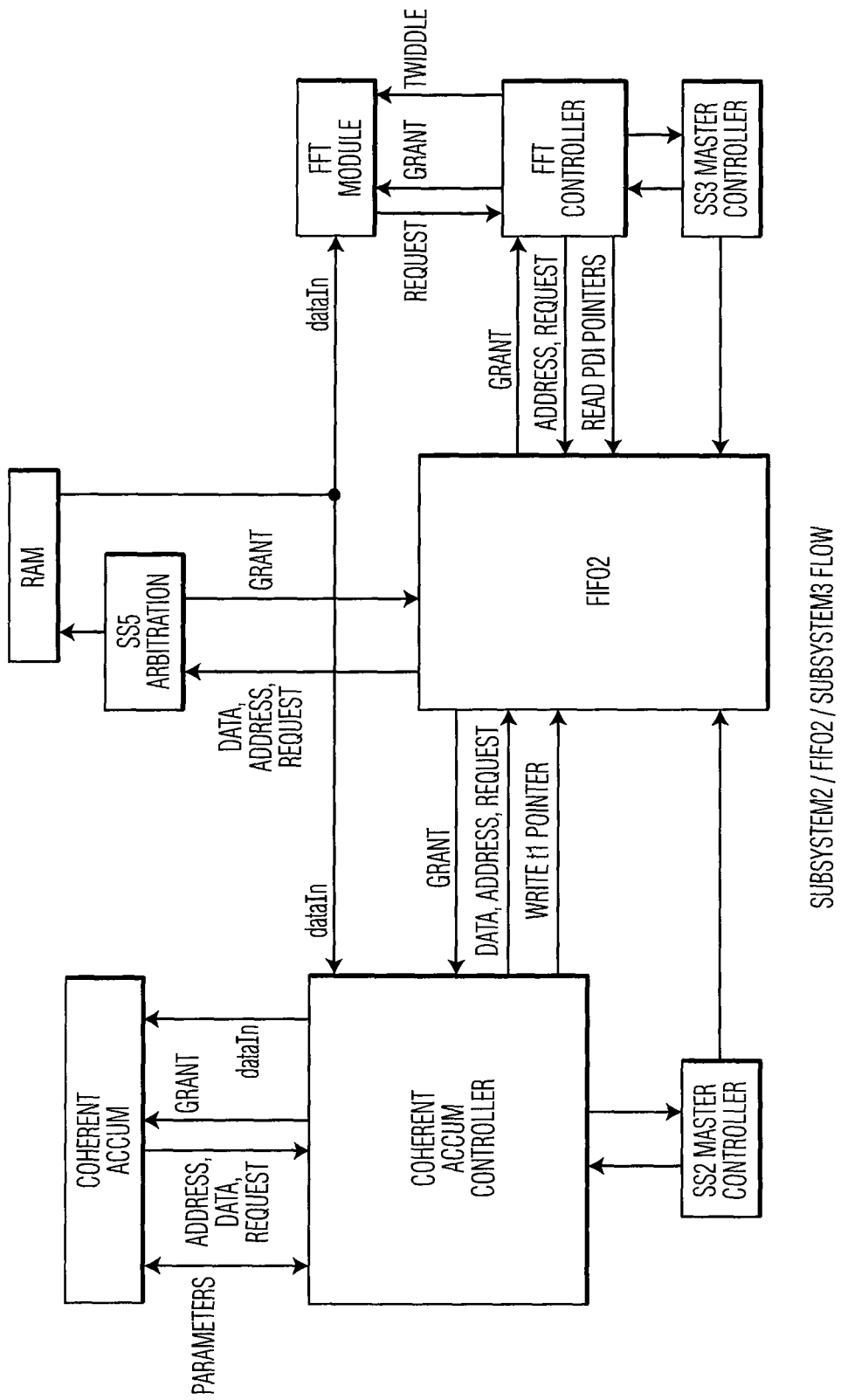
FIG. 23 is a block diagram of a subsystem 2-FIFO2-subsystem 3 flow in an embodiment.

FIG. 23 shows interaction between subsystem 2 and subsystem 3 through the FIFO2. Subsystem 5 is the memory arbiter. As discussed, the RAM is divided into the 4 memory blocks shown. Only one of the subsystems or one functionality in a subsystem may access the RAM at one time. This shows subsystem 2 producing coherent data and trying to write it to the Ram and subsystem 3 requesting data for processing. Subsystem 5 decides who gets access. The FIFO2 lets each subsystem know the status of their respective requests to access RAM.

Figure 24:
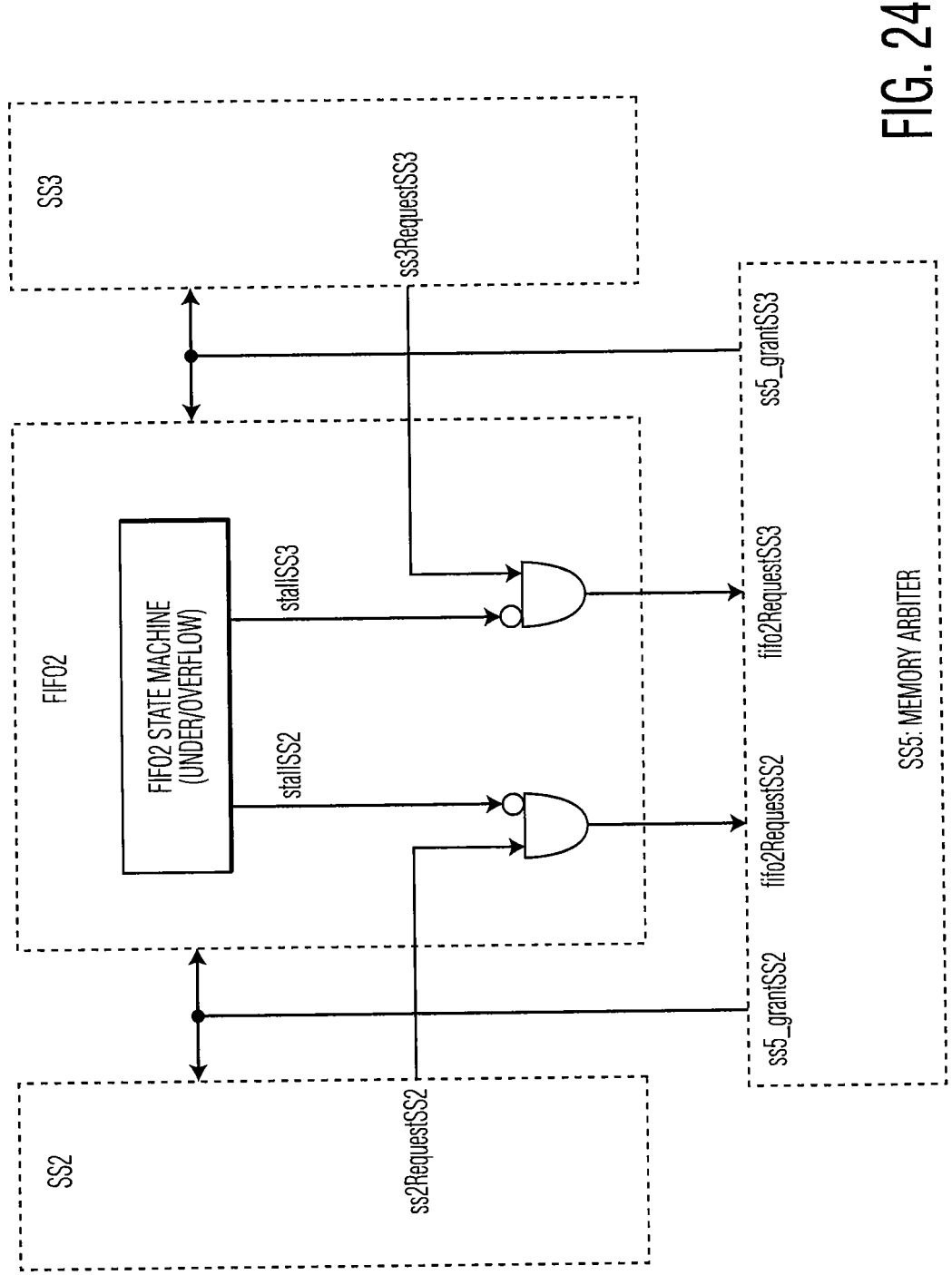
FIG. 24 is a block diagram of a subsystem 2-FIFO2-subsystem 3-subsystem 5 arrangement in an embodiment.

FIG. 24 is another diagram showing detail of subsystem 5 functionality.

Figure 25:
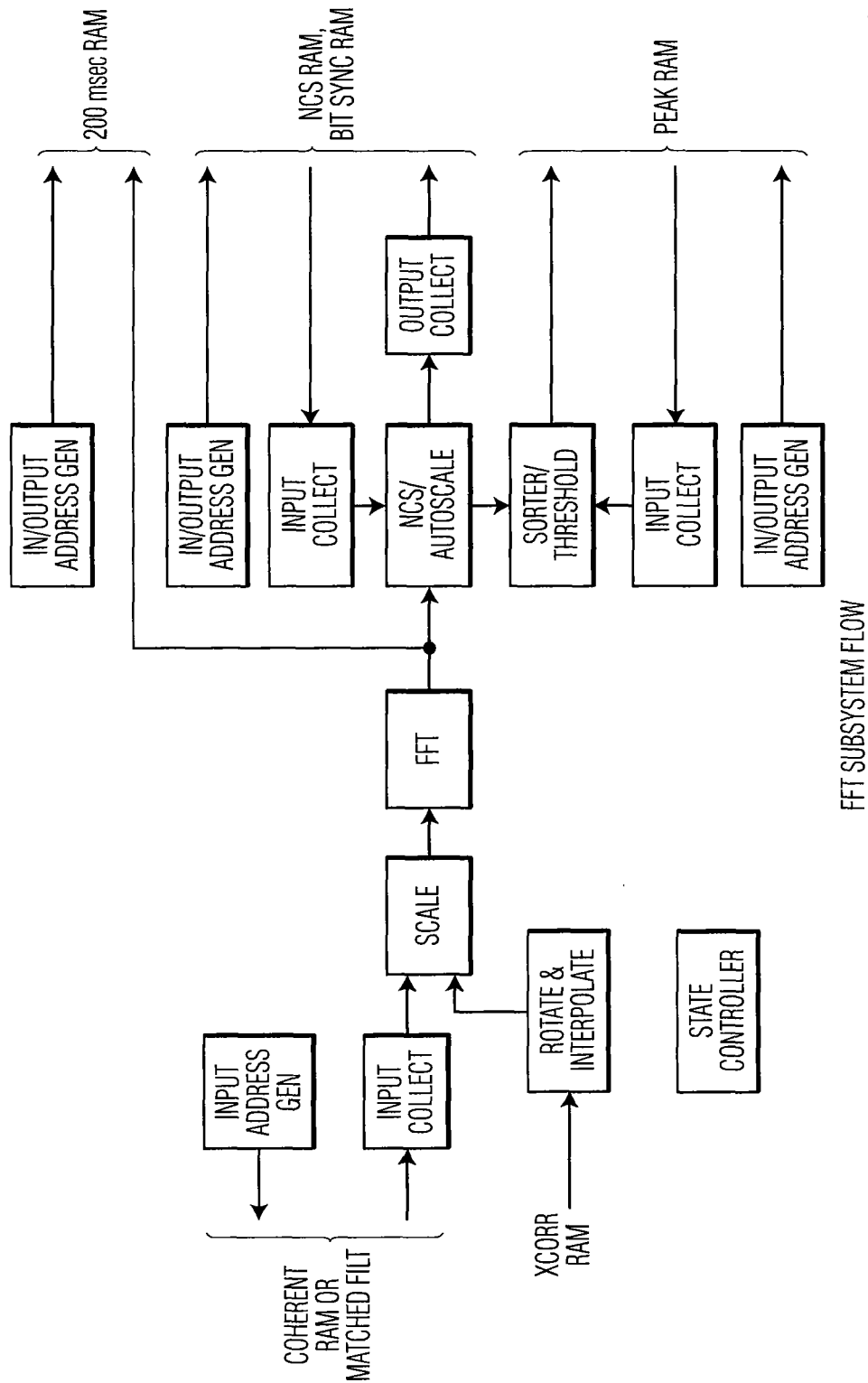
FIG. 25 is a block diagram showing various subsystem 4 modules in one embodiment.

FIG. 25 shows elements of the sequencer subsystem implemented in subsystem 3 in one embodiment.

Figure 26:
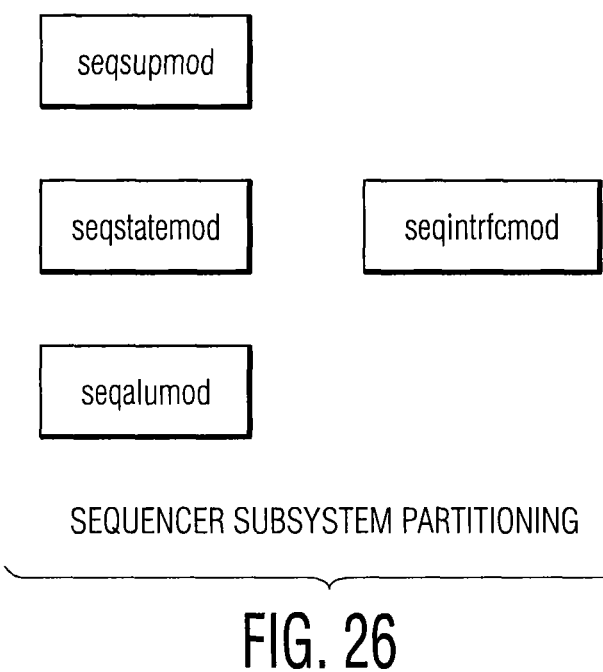
FIG. 26 is a block diagram illustrating aspects of a subsystem 4 sequencer module interface in one embodiment.

FIG. 26 is a block diagram of a sequencing module that is one implementation of the FIG. 22 flow chart. The sequencer module includes control elements and also includes registers, data storage, interface to memory etc. However, the sequencer module interface shown is basically flow control. The arithmetic and logic unit ("ALU") module provides specialized arithmetic capability for the HW tracking functionality. The backend controller knows where the NCS module is, and it controls the NCS module in a similar fashion to the FFT controller controlling of the FFT.

In addition, there is a HW tracker that has functionality that occurs on a PDI rate and functionality that occurs on a context rate (that is, before processing of a channel is complete). The sequencer controls the HW tracking loop functionality using the ALU as its number cruncher.

Figure 27:
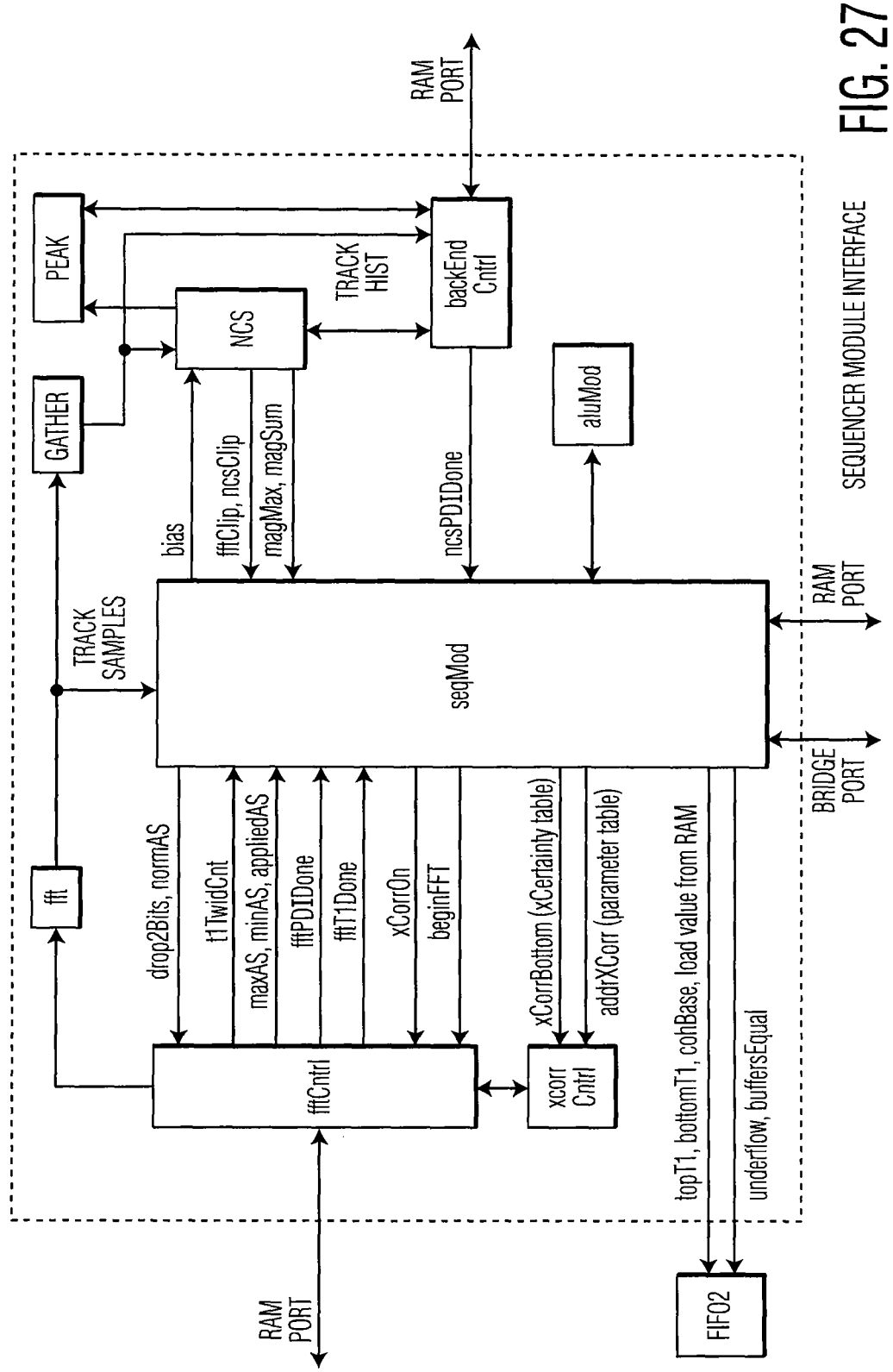
FIG. 27 is a block diagram illustrating a subsystem 4 sequencer flow according to one embodiment.

FIG. 27 is a block diagram of an embodiment in which the sequencer functionality is contained in a single module. This is an alternative embodiment to that previously described in which the sequencer functionality is shared between subsystem 2 and subsystem 3.

Figure 28:
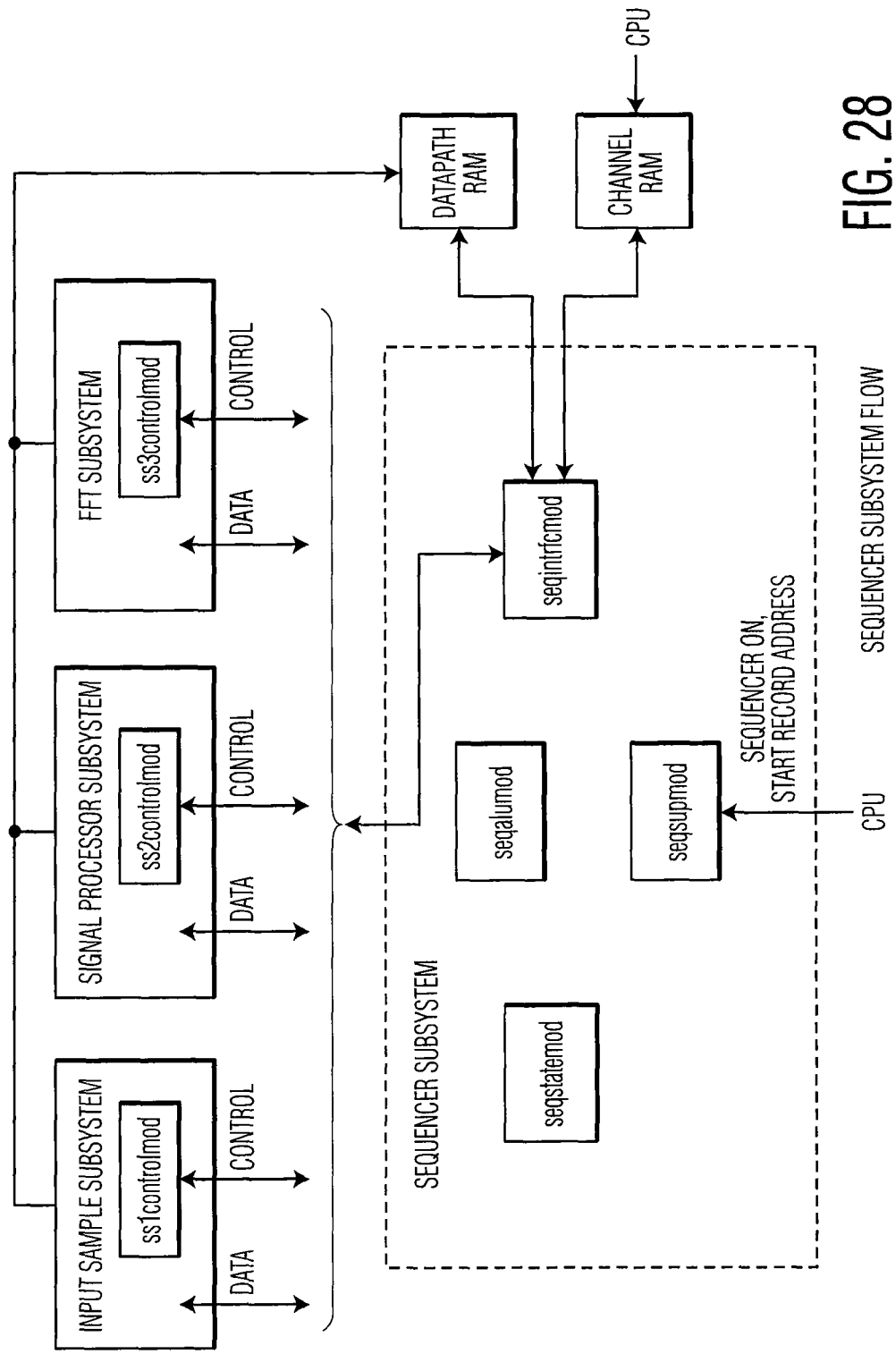
FIG. 28 is a block diagram illustrating a subsystem 4 sequencer state machine flow according to one embodiment.

FIG. 28 is a block diagram illustrating some of the functionality that the sequencer implements. The functionality includes data path control, hardware tracking loops, and report control. Report control controls the generation of various reports, such as a 100 ms report, a context report, a peak report, etc., for the use of software.

Figure 29:
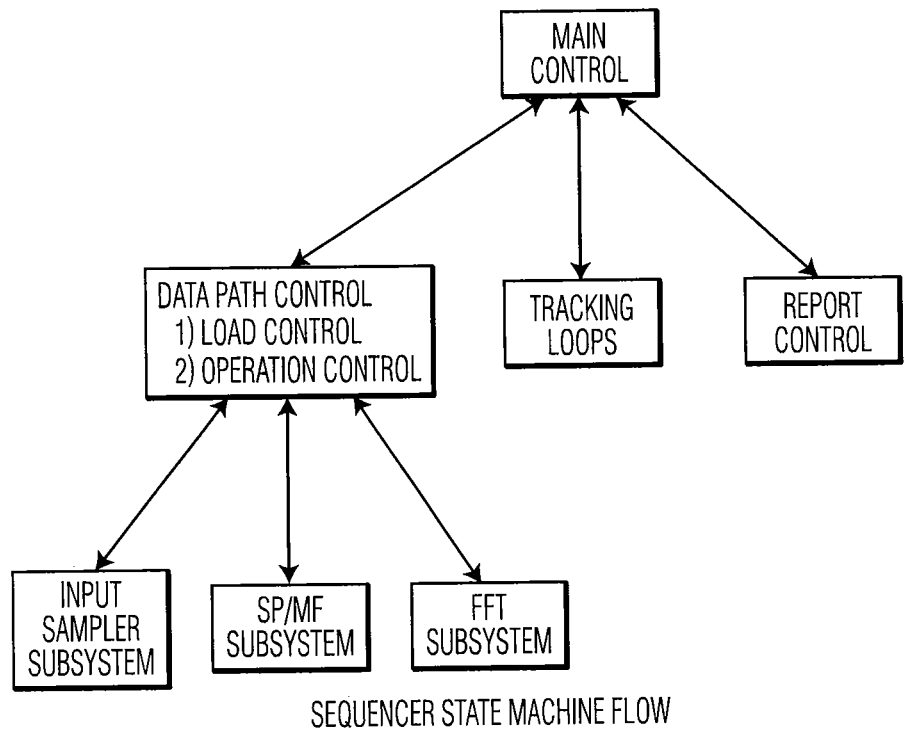
FIG. 29 is a block diagram showing various subsystem 5 modules in one embodiment.

FIG. 29 illustrates various RAM functionalities. In one embodiment, all of the RAM functionalities are included in one physical RAM. In other embodiments, the RAM functionalities are shared between different physical RAMs. A memory subsystem handles arbitration of requests for access to these RAM functionalities.

Figure 30:
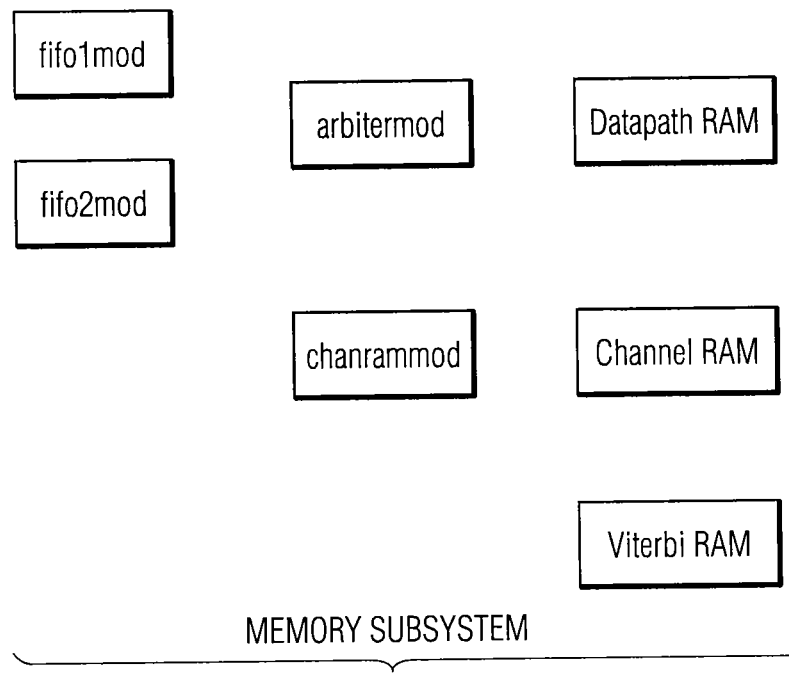
FIG. 30 is a block diagram illustrating aspects of a FIFO 1 structure in one embodiment.

FIG. 30 illustrates details of an implementation of the FIFO1. The line, block and wrap signals on the left are used by subsystem 2 when it is trying to write data into the RAM. On the right, the line, block and wrap signals are used by subsystem 3 when it is trying to read data out of the RAM.

Figure 31:
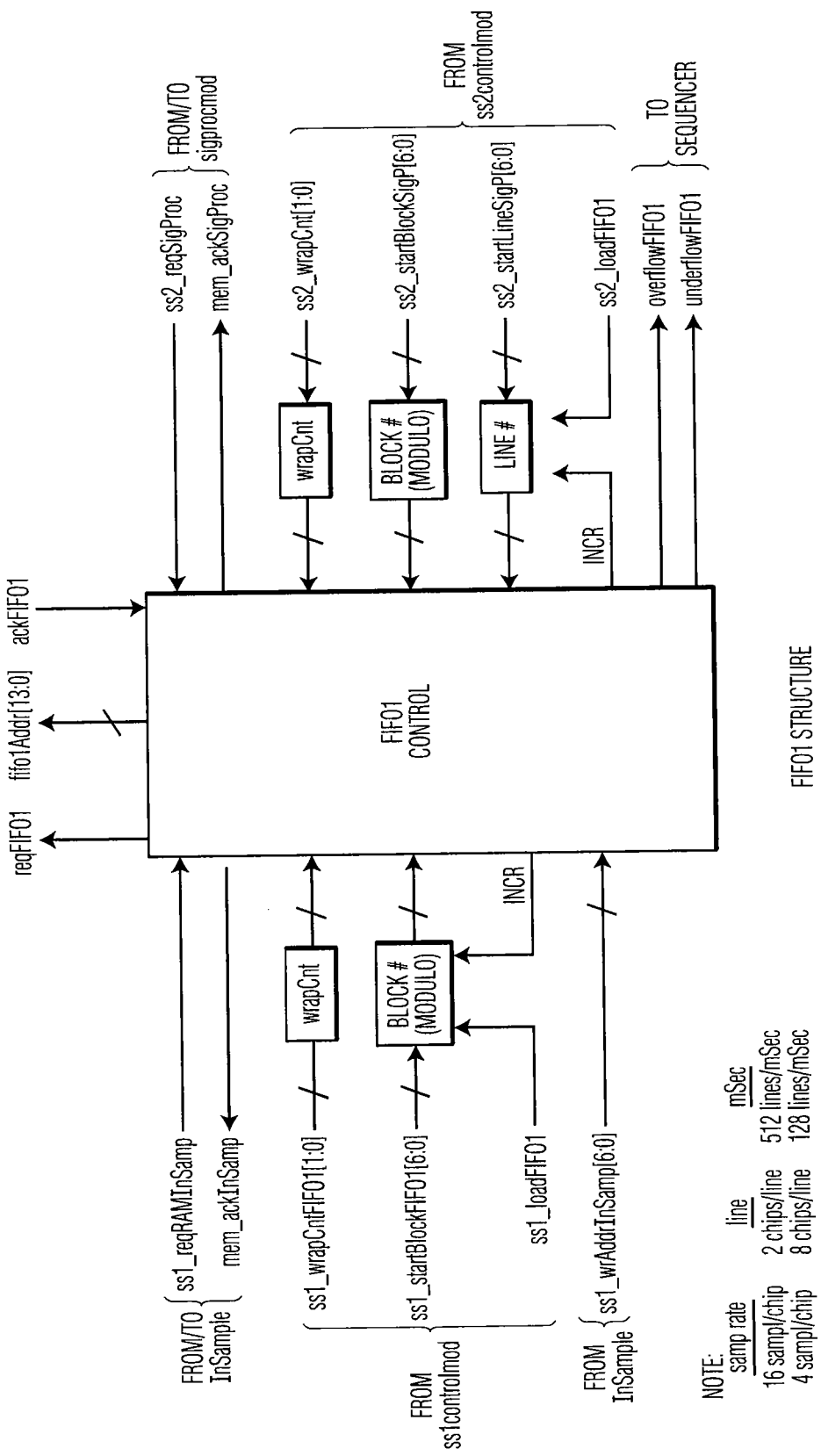
FIG. 31 is a block diagram illustrating a subsystem 5 memory data path flow according to one embodiment.

FIG. 31 is a block diagram of a memory data path flow that shows different types RAM and how different subsystems request to access it. Subsystem 1 is writing data into the input sample RAM (on the left), and subsystem 2 is reading data out under control of FIFO1. Similarly, FIFO2 controls access to the coherent RAM by subsystem 2 and subsystem 3 is subsystem 3. The TH RAM stores track history in the form of coherent data, as previously described. The bit synch RAM, in one embodiment, is a type of TH RAM for a particular channel in which there are multiple T1 offsets. Software uses the multiple T1 offsets to determine where a data bit edge is. During system operation, the data subsystems are trying to access these different RAMs. The sequencer is trying to access the channel RAM primarily, but it also tries to access the coherent RAM, for example to access pointers. Software also tries to access RAM. Notice the arrow from the software to the channel RAM. Software examines the NCS RAM, TH RAM and peak RAM. All of the RAM access is handled by subsystem 5 arbitration.

Figure 32:
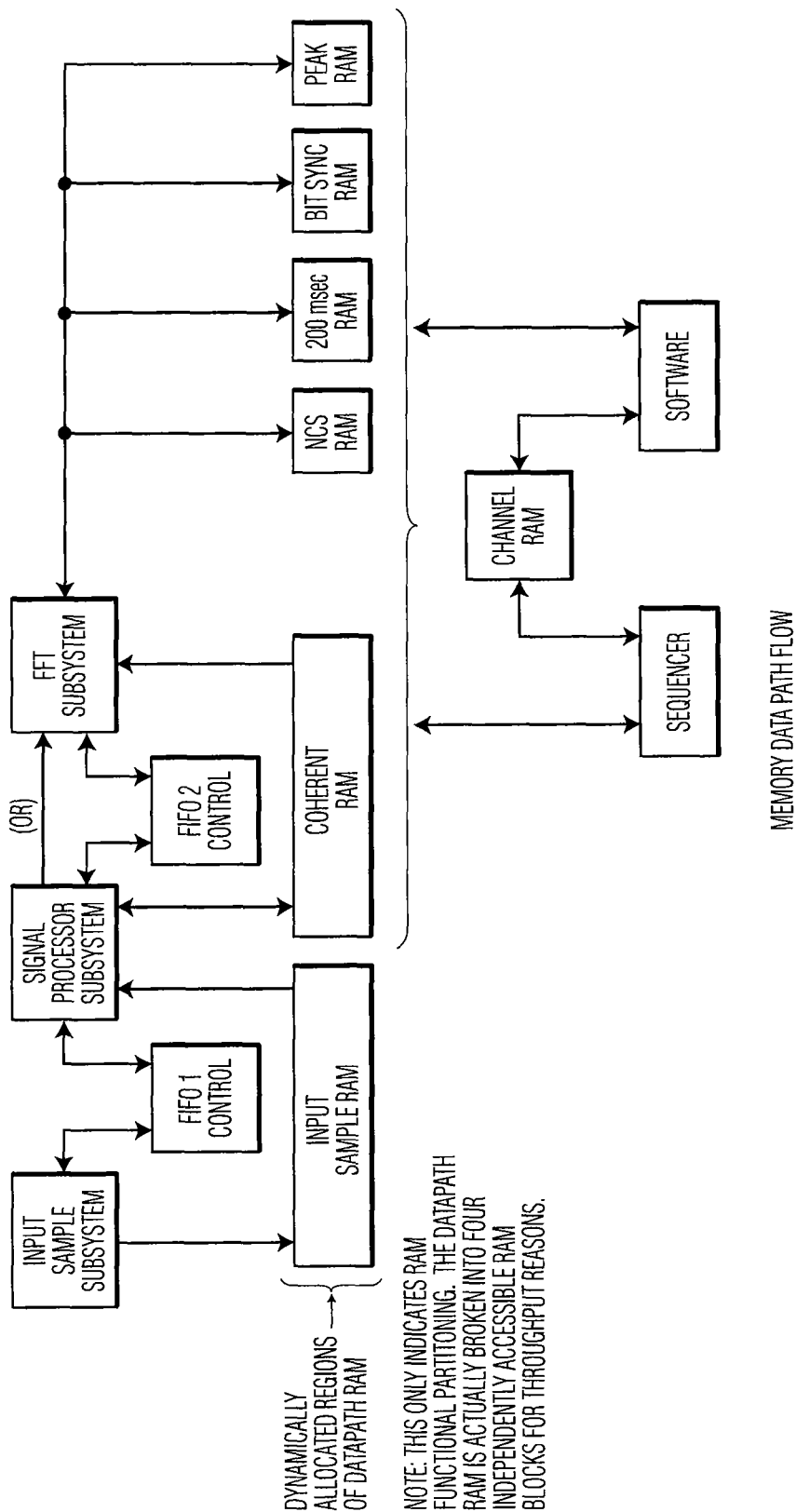
FIG. 32 is a block diagram illustrating a subsystem 5 arbitration priority scheme according to one embodiment.

FIG. 32 is a block diagram showing subsystem 5 and an example of arbitration priorities. One possible assignment of priorities is listed on the bottom left. Typically, subsystem 1 has very high priority because it is receiving data from satellite vehicles at an uncontrollable rate. A central processing unit ("CPU") typically has a high priority as well.

Figure 33:
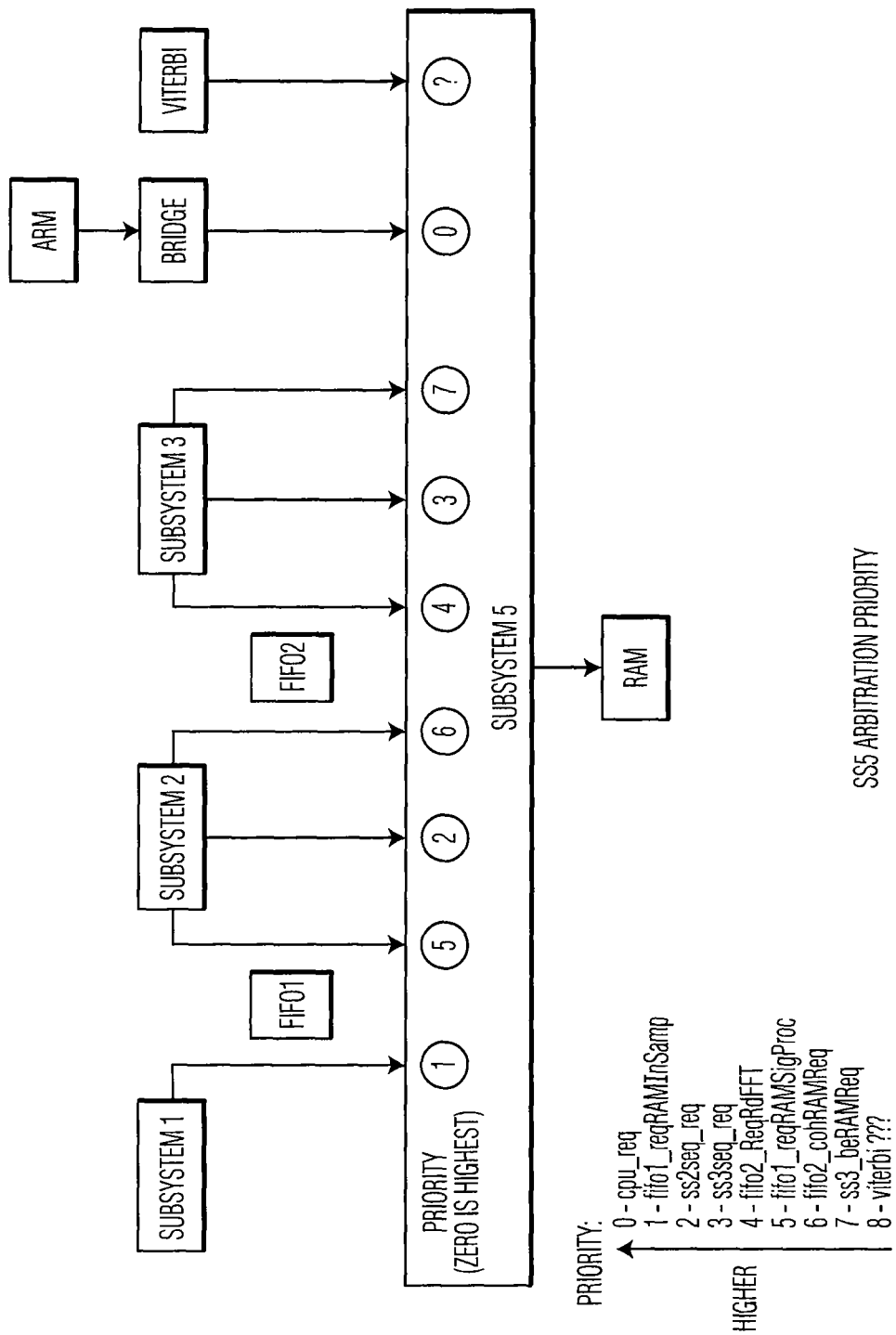
FIG. 33 is a block diagram illustrating aspects of a tracking mode (mode 3) process flow according to an embodiment.

FIG. 33 shows some of the processes that take place during system operation, particularly in mode 3, or tracking mode. For example, on the left of the diagram, there is a timing chain, and then the input storage that goes into the input RAM. Data should be written to particular locations in RAM. In one embodiment, there is a free-running, 32-bit counter in a timer module of subsystem 1. The counter is associated with user time. User time indicates a rate at which the samples coming from the RF are strobed. User time is associated with where data is stored in the input sample RAM. Subsystem 3 understands that the location of data in the input sample RAM is associated with time. Subsystem 3 pulls that data out into the matched filter. A signal processor (not shown) in front of the matched filter does decimation and rotation of the signal for the matched filter.

At the top left there is a dashed line showing user time to the left and process time to the right. Conceptually processes to the left are tightly related to the RF clock. Events must happen on user clock periods. To the right there is a signal processor clock that may have any practical frequency. The higher the signal processor clock frequency, the more data is processed per unit time.

Figure 34:
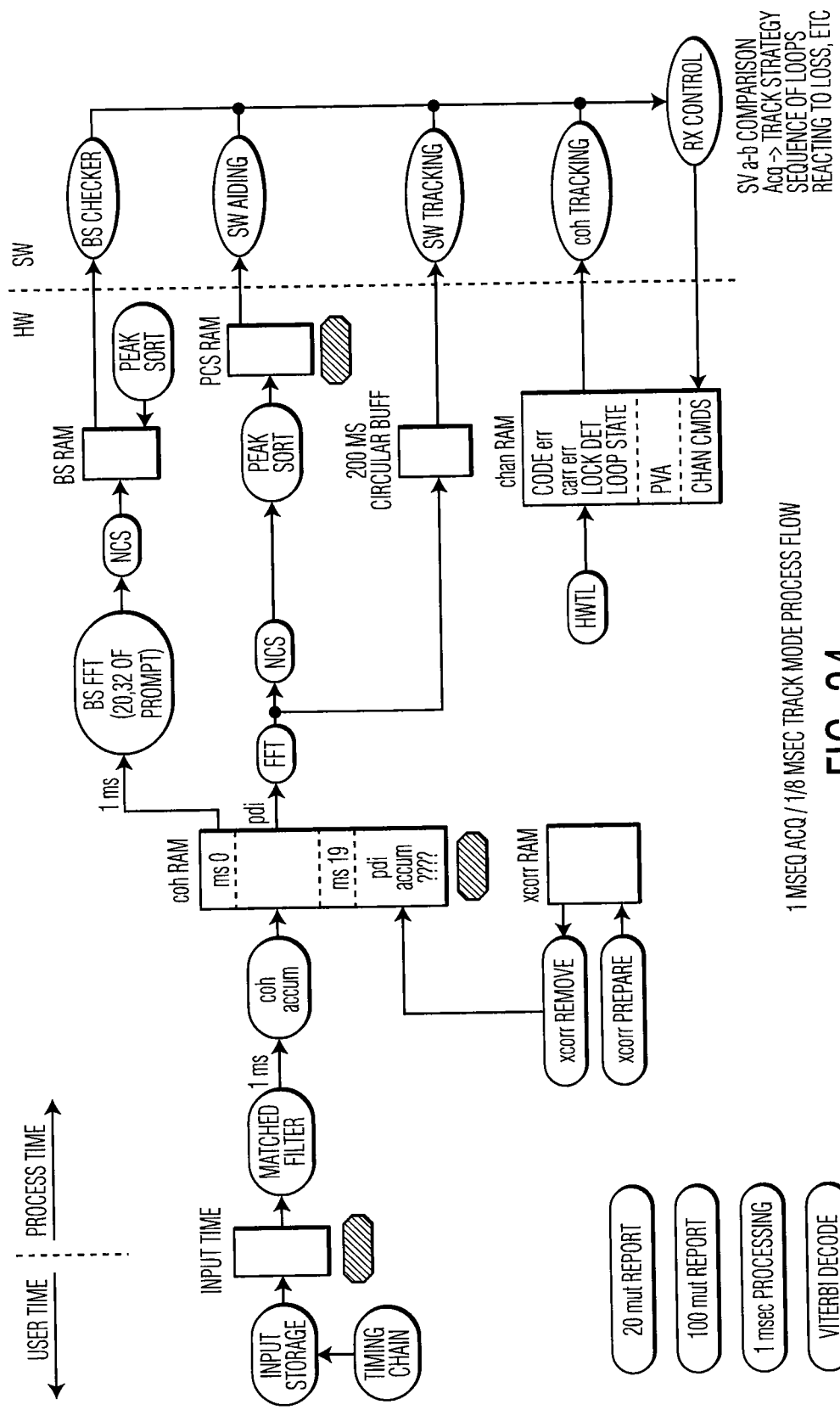
FIG. 34 is a block diagram illustrating aspects of a cold start mode (mode 1) process flow according to an embodiment.
Figure 35:
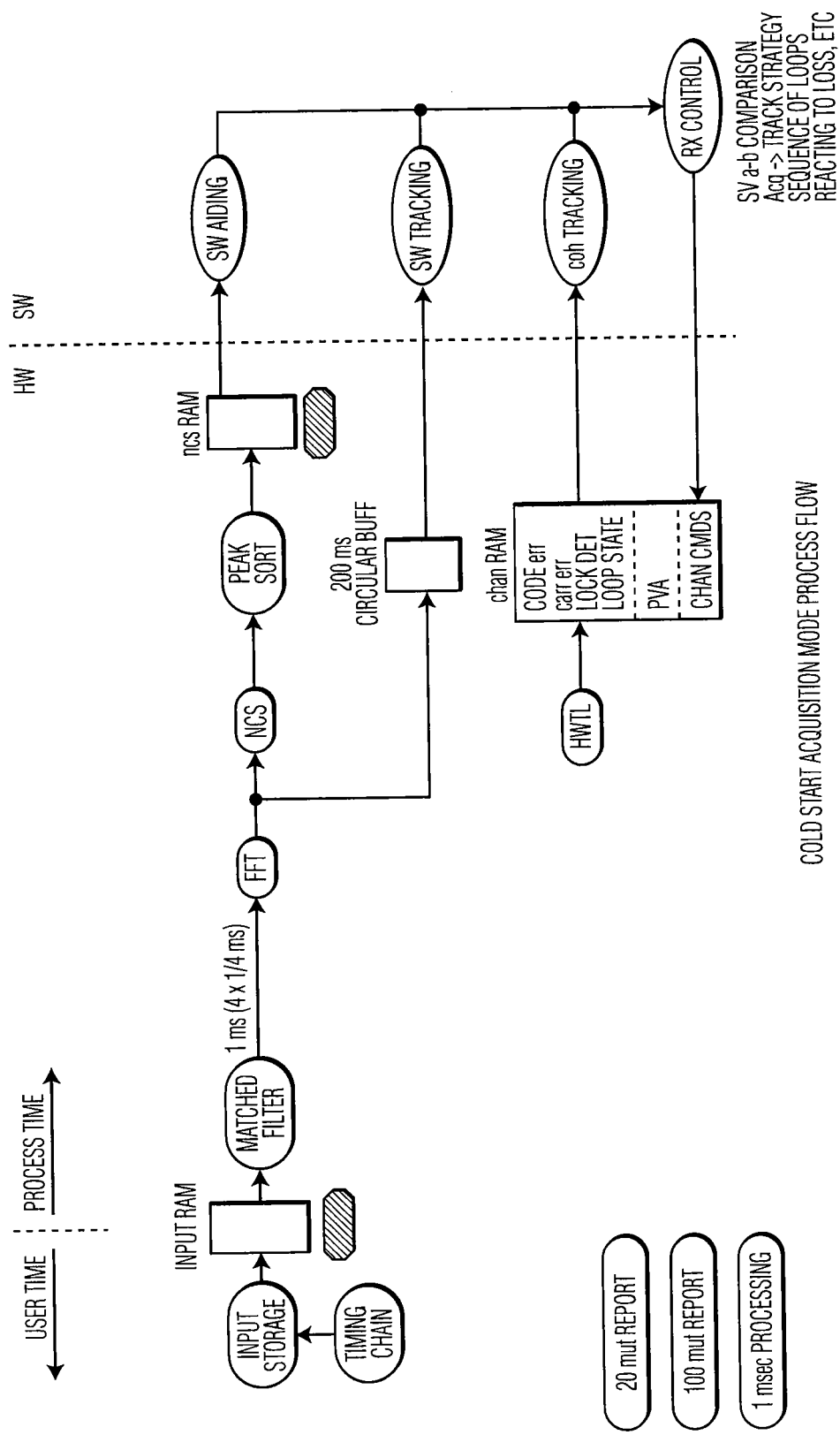
FIG. 35 is a block diagram illustrating a correlator data path according to an embodiment.
Figure 36:
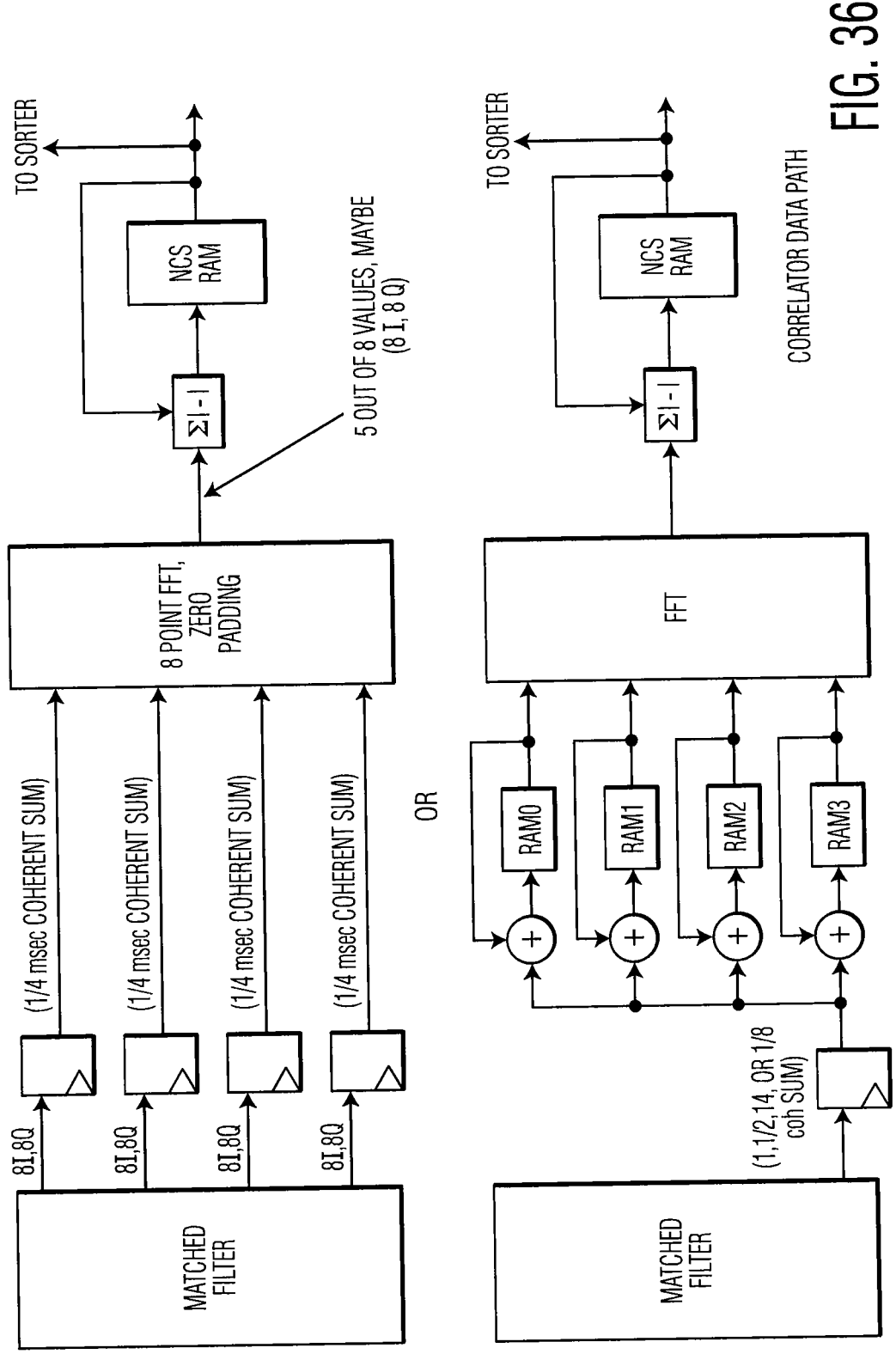
FIG. 36 is a block diagram illustrating aspects of coherent RAM data storage according to an embodiment.
Figure 37:
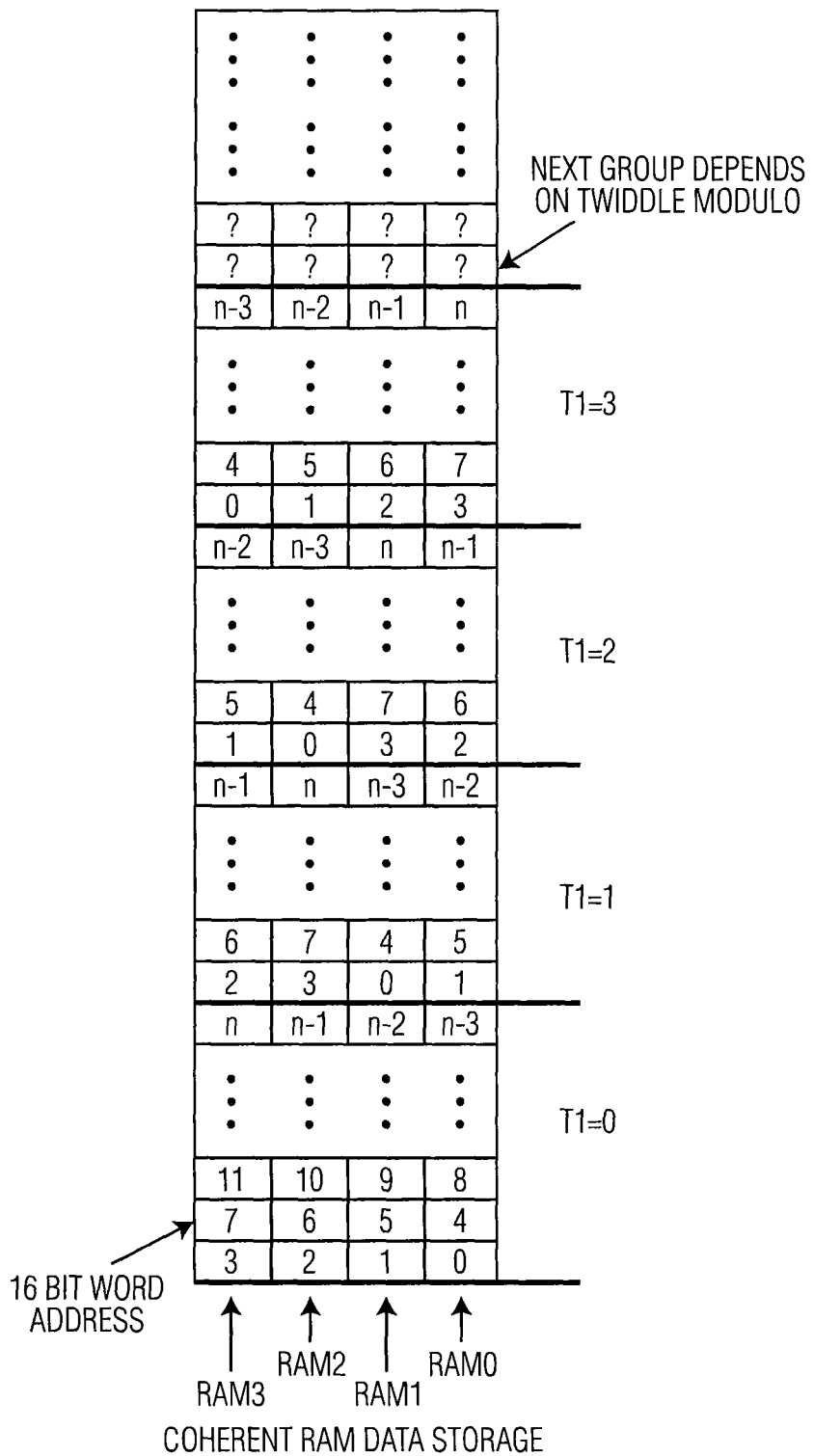
FIG. 37 is a block diagram illustrating aspects FFT access of coherent RAM according to an embodiment.
Figure 38:
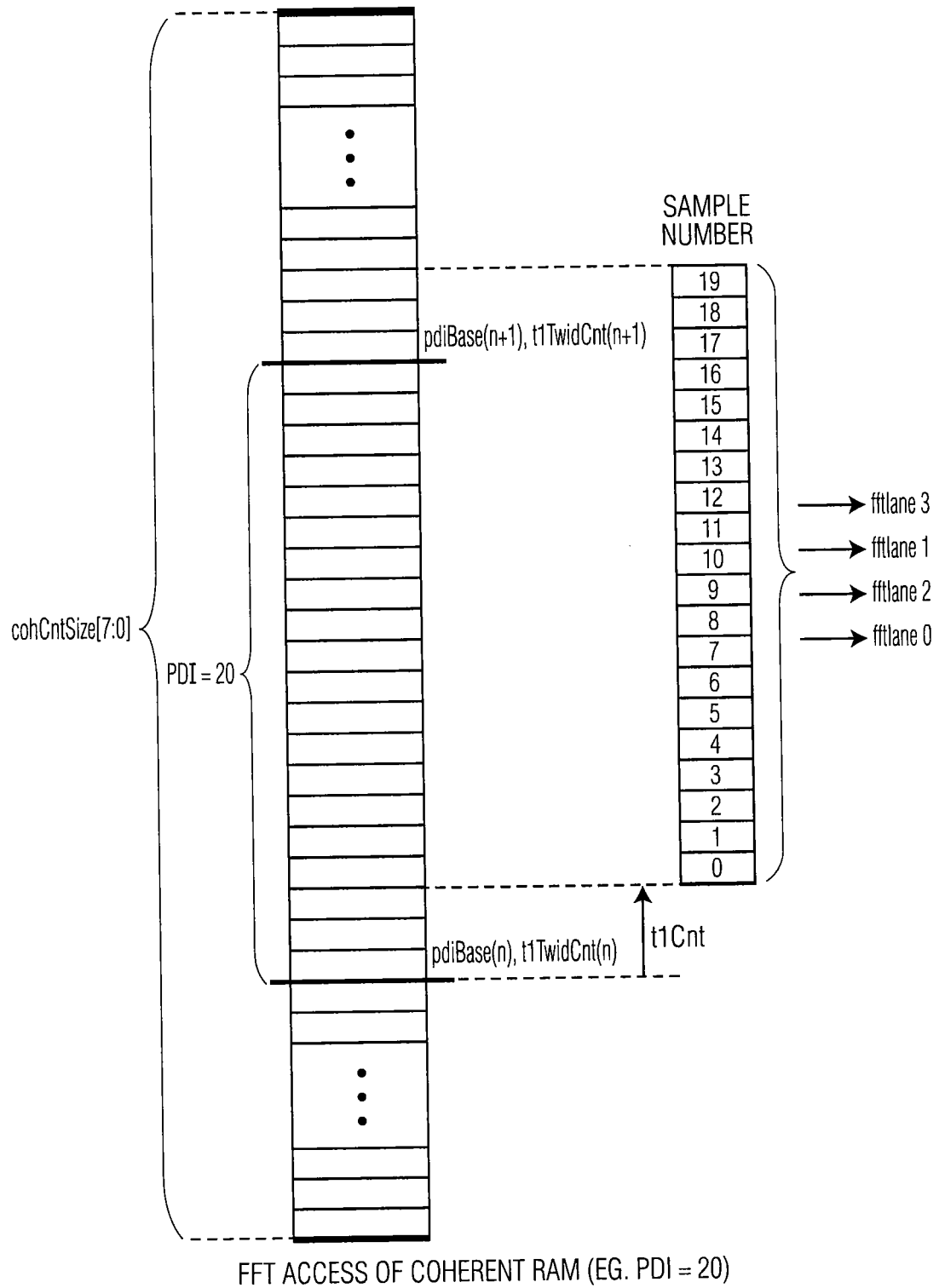
FIG. 38 is a block diagram illustrating the order of data needed by the FFT according to an embodiment.
Figure 41:
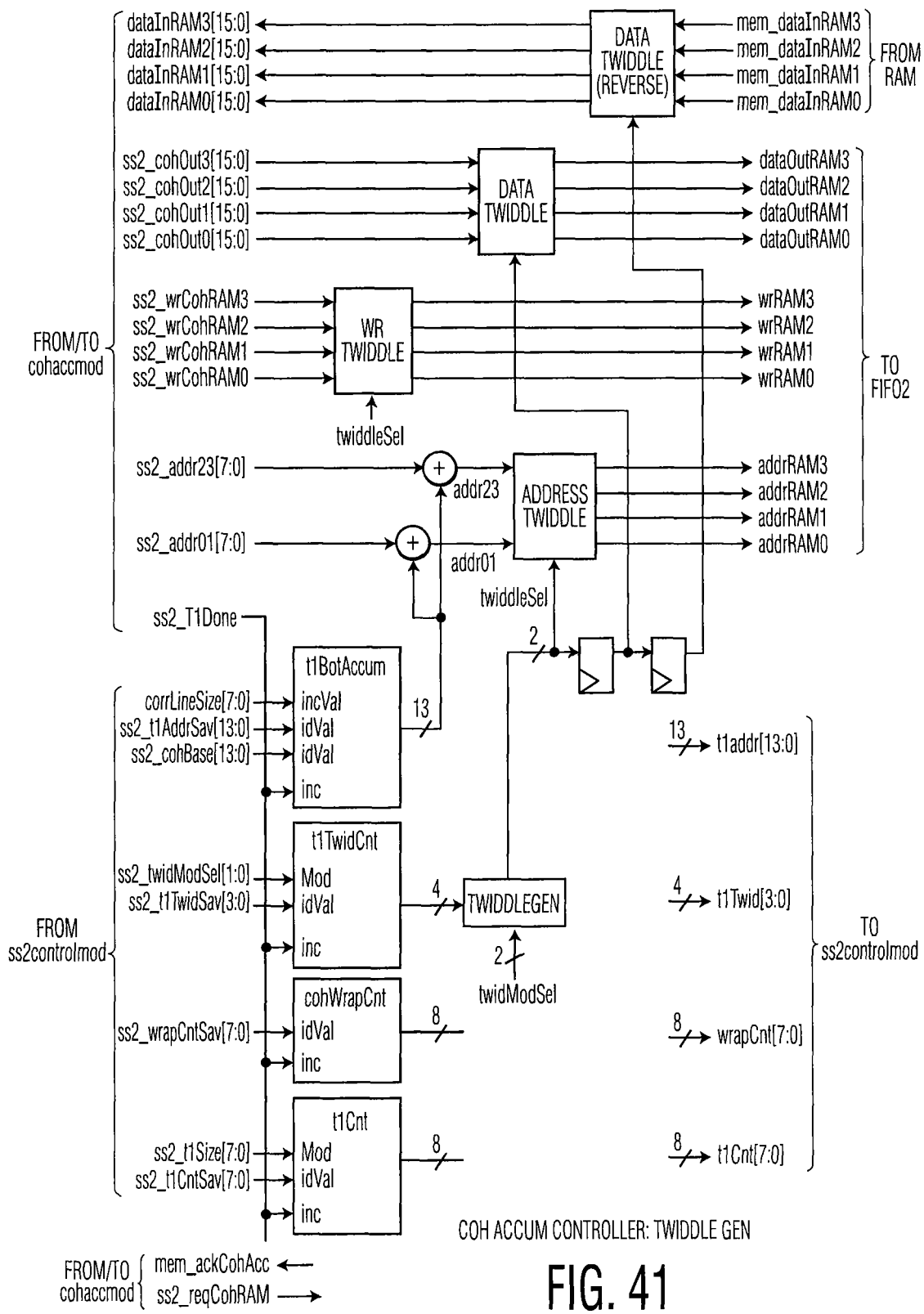
FIG. 41 is a block diagram illustrating a twiddle multiplexor implementation according to an embodiment.
Figure 42:
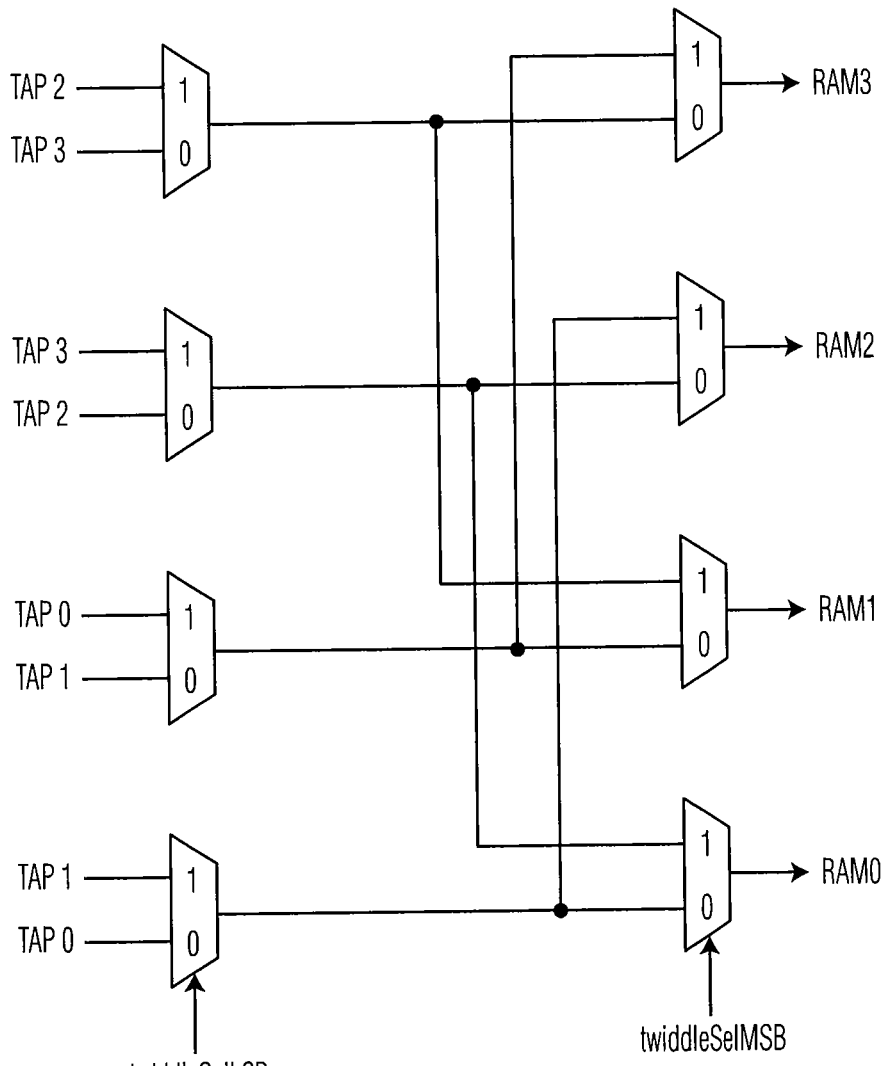
FIG. 42 is a block diagram illustrating FIFO output address generation according to an embodiment.
Figure 43:
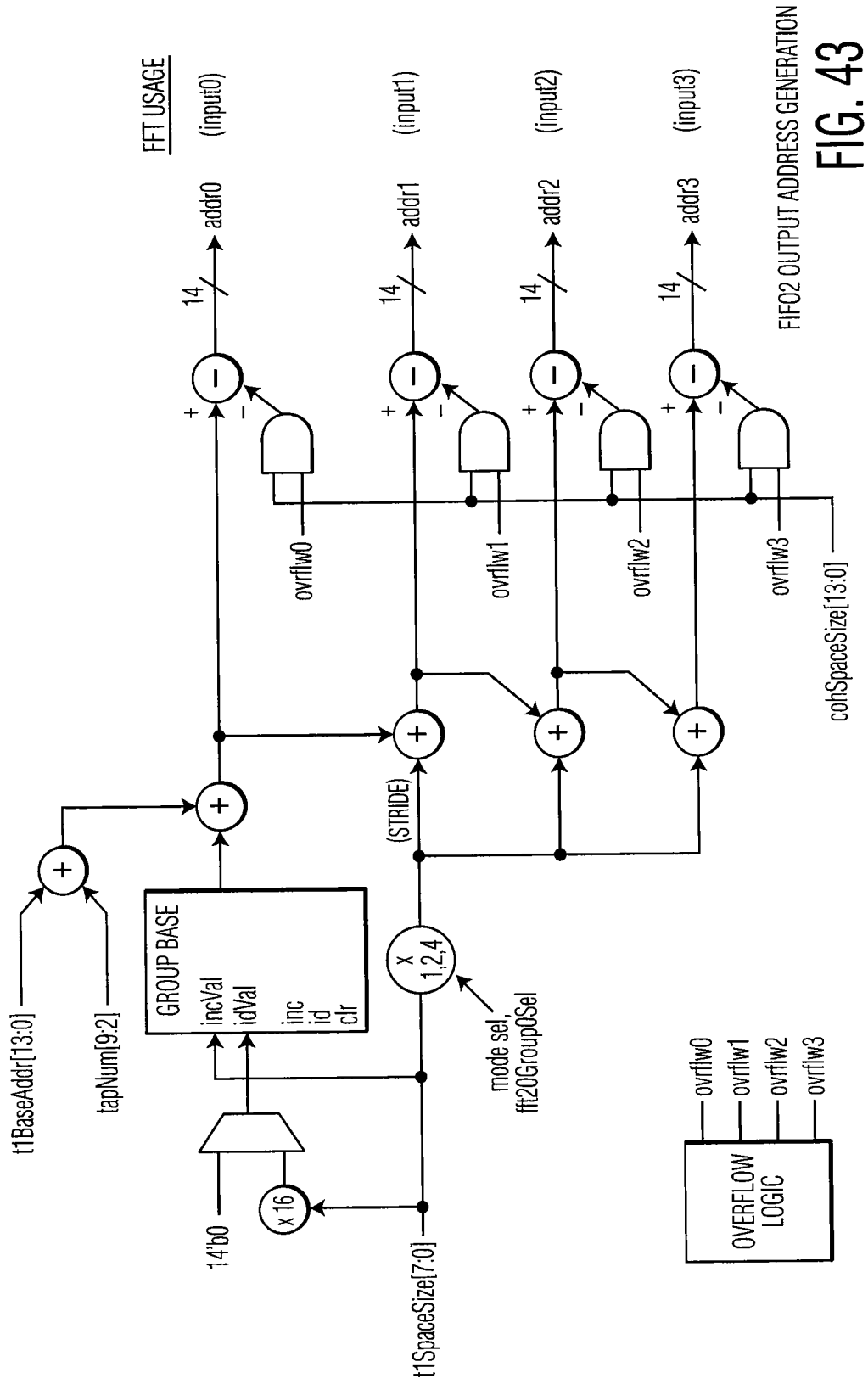
FIG. 43 is a block diagram illustrating aspects of FFT address twiddling according to an embodiment.

FIG. 34 shows some of the processes that take place during system operation, particularly in mode 1, or cold start mode. In mode 1, the coherent RAM is not shown in the path between subsystem 2 and subsystem 3. In mode 1, data goes straight from the matched filter into the FFT. The matched filter is said to be in a "locked" mode because matched filter and FFT are locked together. In this mode, the matched filter is in a fractional mode, and is divided into four sections.

In mode 1 a fractional matched filter is used differently than in other modes. For example, the matched filter is divided into four sections, each of which is a separate input into a 4-sample, 8-point FFT. So the FFT gets four inputs directly from the matched filter. Each of the points, or samples, is ¼ sec worth of coherent integrations. In an FFT, a shorter coherent integration time for each sample results in wider frequency or bin widths. If coherent accumulation occurs for longer period (meaning there are longer T1 periods), the frequency bins are narrower. Narrow frequency bins are desirable for tracking, but not desirable for a wide search.

General System Operation

In subsystem 1 there is a timing module, a decimation module that massages the signal from the RF, and an automatic gain control ("AGC") module that controls the RF signal coming in.

The decimated signal then goes though a FIFO-type control and is stored in a section of RAM. There are three types of RAM: input RAM; coherent RAM; and non-coherent RAM. These three types of RAM are physically implemented in one RAM that is dynamically allocated by regions. In one embodiment, the RAM is divided into four blocks, for purposes of the FFT and feeding of data to the FFT. A twiddle algorithm allows data to be stored in such a way that four pieces of data come out of the RAM at one time. A four-block RAM helps avoid data conflicts and facilitates throughput access to the RAMs.

The three data subsystems 1, 2, and 3 all request access to the four RAMs, and the different regions of the RAMs storing an input sample, a coherent accumulation, and a non-coherent accumulation.

When subsystem 1 is initiated, it stores decimated data into the input sample RAM. In one embodiment, there are two modes of storage. One mode is a one-shot mode in which there is a region of address space that is filled up in one shot. The rest of the subsystems then operate on the data. Another mode is a cyclic buffer mode that also fills a particular region. When the region is filled up, the write operation cycles back to beginning of the region and begins overwriting the data stored. For the cyclic buffer mode an unspecified number of channels time multiplex the use of subsystem 2 and subsystem 3 and they each cycle through and get their respective opportunities to process the data.

The operation of the system is fundamentally different in the three operational modes as will be explained further below. Some basic commonalties apply to all of the three operational modes, however. In general for example, input samples are being saved, correlations are being performed, and the spread spectrum is being moved, despreading for the matched filter ("matched filter"), and the carrier phase is being moved in the signal processor.

In one embodiment, length of the matched filter is 1024, which is significantly longer than a conventional matched filter, which may have a length of 11. The FFT performs as many as 32 point transforms and can be used any time for various different array size and shapes.

In a case where there is huge uncertainty, (e.g., not all satellites in view, etc), the spread spectrum processing may require a search of 1024 chip offsets in the time domain. A replica code is lined up with the receive signal in order to get a match and maximum output; when it is misaligned, there is reduced output. There will be a signal power peak when the correlation is aligned correctly. The matched filter keeps a copy of the special replica code in a register and slides the signal past it; and about once every ms a peak comes out. In an outdoor environment, a single pulse can almost be detected when there is a strong signal, but usually many must be averaged together. Many of those are summed, and for each offset there is an addition, a skip ahead one ms, and another addition. 1024 additions may be saved for each code offset.

In one embodiment, the useful window on the correlation when integrating for a full ms of code, is about + or −500 Hz (with some loss). Usually, integrations are placed about twice that close. Considering an oscillator that is not extremely accurate, e.g., that might have tens of KHz of error, the frequency is adjusted and the correlations repeated, perhaps as many as 200 times, in the frequency domain. So just to search one code when the oscillator is not calibrated may take 200K individual search bins, or 400K because the code may be spaced at two samples per chip. Thus, 200 frequencies multiplied by 2000 correlations results in 400K individual cells to be searched. These cells must be averaged together multiple times. This case is one example scenario of matched filter function, but is usually reserved for an outdoor environment where a strong signal can be expected.

General Memory and Arbitration Aspects

FIFO1 is an address generator. In the figures, FIFO1 is shown with multiple conceptual inputs, but in one embodiment the RAM that includes FIFO1 has one port. All the inputs to the RAM go through the arbiter. FIFO1 counts an address in a circular pattern to the right. FIFO1 is directed to start at an address and make a buffer of a certain length. The counter counts from the start address to the end and goes back to the start and begins overwriting the data. On the read side there is a similar address counter that gets reloaded for each signal or logical channel that is being created. So the FIFO is reloaded, some samples are played, and the FIFO is reloaded again more samples are played. Basically with a 50 MHz clock it is possible to replay a sample about 25 times in real time before it is used up, or overwritten. To keep up with the flow, approximately 24 channels can be allocated.

FIFO1 counts addresses; writes go in at a relatively slow rate, perhaps every 128 clock cycles or so, and another sample is dumped. FIFO1 is accessed in 63-bit lines. About every eighth microsecond another line of samples is collected and FIFO1 asks for a cycle of memory. FIFO1 goes through the arbiter, and because it is high priority, it usually gets the cycle of memory requested. There is only one higher priority—the microcontroller. FIFO1 writes the line and go on to collect another 32 samples.

Subsystem 2 does much the same thing. The sequencer puts the address of the sample it wants into the FIFO. Basically, the delay of each satellite being searched dictates the time at which the first sample was collected. There is a correlation between a counter that counts the samples coming in and the phase the system wants to start at. Logic in the FIFO turns the sample count into a memory address. The FIFO asks for a cycle to read and gets a line of 32 samples. This is repeated and the FIFO feeds the data into the matched filter.

Referring to FIG. 4, data comes into the input subsystem 1 at a relatively slow rate, a counter counts an address and a similar counter in subsystem 2 is counting an address in a loop. The input sample buffer may be one buffer that is reloaded 25 times, and the processing is timed so that the samples required to be processed are the earliest in time. After processing, some samples have already disappeared from the buffer and some new ones have been stored. The processing is timed to take about the same time it takes to make a first pass (e.g., 800 micro sec). The samples are all spread out in time and the buffer is constantly reloaded. The summation process reads the previous data out of RAM adds the new data to it and puts it back in RAM; this is a coherent accumulator block. For each sample produced it adds to the memory, and once the whole PDI is produced, the FFT block takes the first chip offset for each of these, processes it, take the magnitude (a real positive number) and add it to a bin for that offset. The PDI might be 7 ms, it might be 7 samples/each code offset, so memory will be arranged as 1024 for the first ms, 1024 for the second ms, etc.

The sequencer ports read memory as well. So there is a constant data pattern and various subsystems are making their requests for memory cycles. The arbiter takes the requests from the subsystems, decides which has highest priority, and grants memory cycles. In one embodiment, the priority is hard-wired, as shown in FIG. 32. The data path is switched to allow the appropriate data port to access the memory and the memory bus is switched. Then the arbiter moves on to next highest priority. In one embodiment, 6-8 ports being switched according to their priorities.

General Sequencing Aspects

The sequencer, in one embodiment, may be load data into a portion of memory allocated for storing the state of each of the channels. The sequencer's job, simply stated, is to take the data in memory, and run it in the hardware as long as it is supposed to run. Everything the sequencer needs to know is in approximately 256 bytes of memory. The sequencer traverses a list and loads and restores state as operations occur in the various subsystems. The sequencer must keep track of what data is being processed in which subsystem. Typically, the RAM has some addresses reserved for state. In general, however, here are no limitations on where to store data, or how much data to store, except data cannot overlap.

Periodically the state of a channel is saved as a report that enables recovery of the exact state of the channel. The reports contain the precise information about where the channel was. The reports are typically accurate to within nanoseconds or even picoseconds (in the case of carrier) to extract the coded carrier phase. This is a big, high-resolution number with an angle and a delay for each of the samples. The report is dumped out periodically, e.g., every 20 ms, which makes it possible to trace through what the hardware is actually doing. In concept, this is like a direct memory access ("DMA") engine, but includes logic to perform additional functions under external direction, for example, from a host processor.

The processor directs the sequencer to load the state of the system, including all the modes, the carrier code NCO phase from where the system left off last time, and to process samples of data. The sequencer is then directed to move on to the next channel. Various data may be generated by the sequencer such as error conditions and state information to identify but a few. There is a whole sequence of actions such as checking the channel is on, checking to see if any statuses are wrong (for example, such as would prevent the system from processing), trying to load the phase in and compares the phase to the state of the input FIFO. If the sample the sequencer wants is not in the buffer, it does not try to run. It looks at a margin from one sample to another, and determines whether margin is above a minimum. If the margin is not above the minimum, then it does not run. The sequencer does all that and then moves to the next channel or process. Sometimes the buffer is already overflowed and there is no chance of recovery, in which case the sequencer will shut that channel down without wasting further energy figuring out it is hopelessly lost. The sequencer sends an interrupt to the host processor so that problem can be fixed before the user notices.

The sequencing is dependent on how many ms are processed by particular subsystems, which is in turn based on data availability. Part of the information loaded by the sequencer is whether there are enough samples in a buffer to run a channel. Sometimes the sequencer is pointing at a shared buffer, sometimes at a dedicated buffer. The sequencer looks at how many samples it needs to make a particular kind of FFT vs. how many samples are in the buffer. The sequencer looks at whether the sequencer was requested to wait until there are enough samples in the buffer. For example, the processor may still be filling the buffer, so the system either needs to wait for the buffer to fill or just get out. If the sequencer waits, comes back and there are still not enough samples, it just skips. This kind of logic is going on in the sequencer: sorting data (what data goes with what channel), reloading all the addresses of the buffers; checking the states of the buffers; running when the system can run, skipping when the system cannot run; and staying in synch with the others subsystems. There are scenarios in which one subsystem is running channels ahead and another subsystem is actually processing delayed data because he has a heavy workload at some point in time. Later the other subsystem may have no work load and will catch up. Because the processing of one subsystem is more bursty, while the processing of another subsystem is more regular, the lagging subsystem can usually catch up. In other scenarios, a buffer is full and a subsystem seeking to put more data in the buffer must to stop. The subsystem may have to stop for such a long period that the next data it needs is lost already. This also generates an error condition which must be responded to.

There is messaging between the sequencer and the processor. In general, the processor is watching what is going on continuously by the status that is being dumped out and the data that is coming out.

The GPS system further includes a track history element that provides advantages in controlling the system based on historical performance. The track history element ("TH") is shown, for example, in FIGS. 4, 16, and 17. The TH data can be analyzed and used in many ways, such as calculating the carrier phase error and sending a correction. This is useful because as satellite move or the oscillator moves, adjustment, for example, to frequency, should be made.

In one embodiment, the TH is a buffer of coherent integration samples. The coherent integration samples are relatively long. The length of the integration samples, however, is limited. For long summations the carrier has to be perfect for long periods of time, which is virtually impossible. The length of the integrations can be as much as about 20 ms, which is the size of one of the data bits on the modulation, One of the uses of the TH is keeping a small window of about, 4 chips (where there are 4 samples/chip, or 16 samples every 20 ms) for observation. The TH may begin overwriting perhaps every 200 ms. The history in the window reveals what happened to the carrier phase and what happened to the data. The TH data can be "post processed" in more sophisticated ways than the real time data to provide useful information about system performance in the recent past.

Various Operational Modes

As previously described, the various subsystems may be configured differently in different operations modes. To reiterate, the operational modes include: mode 1, a "cold start" or "locked" mode; mode 2, a "coarse-aided acquisition" mode; and mode 3, "high-resolution" or "tracking" mode.

"Cold Start" Mode 1

Mode 1 is typically used when the GPS system is complexly "lost". For example, the GPS system will be lost if it has no information regarding time that could be used to predict where the satellites are, or it does not know its physical location well enough to have an idea where the satellites are. Mode 1 is thus a blind search. This involves going down entire list of satellites, processing 400K offsets one satellite at a time. There are 32 satellite codes. Sometimes the GPS system will know which 24 are possible (based on the portion of the sky that is visible), and sometimes it will not. The blind search involves millions of individual correlations times hundreds. In mode 1 it is not possible to save all the individual bins over time. A little slice of that data can be processed, however. In mode 1, a one-shot capture of the signal is saved in the input RAM, including perhaps as much as 100 ms of signal. A compressed mode (×4 compression) I used, so there is 100K bytes of data n 100 ms of signal. There is one 8K buffer on the output, and in that buffer this 100 ms signal is replayed. Effectively 1K correlations times 8 frequencies (FFT makes 8 frequencies for each of the 1K chip offsets and saves that in the RAM) are performed. The data in the buffer is processed and only strong signal peaks are stored. Then the process is repeated with a half chip offset. In mode 1, there are many bins of output, and a long sample helps find the weakest signal that needed to acquire. In one embodiment, mode 1 is limited to about 30 DbHz, which is standard threshold for outdoor environment. The search may be continued until a signal is found. The signal eventually found is used to set time and try to improve uncertainty for subsequent searches. In the initial search process about 25K correlations times eight, or about 200K correlations are performed. That is to say, effectively, about 200K one ms correlations per second are being performed. We will refer to this as 200K effective correlators.

Referring momentarily to FIG. 3, in mode 1, FIFO1 is configured to be relatively large. In mode 1, samples are fed directly into the FFT, as shown by the dashed line between subsystem 2 and subsystem 3. The FFT is essentially summing magnitudes into the output RAM and produces the 8 frequencies without going through FIFO2.

"Coarse-Aided Acquisition" Mode 2

A next mode, Coarse-Aided Acquisition mode, or mode 2, is a more sensitive case and can be used in a wide variety of scenarios. For example, if a user carries the GPS system around and enters a basement or underground garage, the GPS unit uses the previously known or last known data.

Mode 2 uses a modest size input sample, such as 10 ms or less. The input buffer is continuously filled (rather used as a snapshot buffer) and set up as a single shared coherent buffer that is on the order of 15-20 Kbytes, or enough to do one FFT. For example, the system might want to save seven ms of 1024 correlations in the buffer (2 bytes apiece) so the buffer would be about 14K. The 14 KB of samples are taken as individual code phases and passed into the FFT. There are seven time-delayed samples at a time going into the FFT. A sixteen-point transform is produces and several of the outputs, maybe seven or nine, are kept in a center frequency bin. In mode 2 there are multiple copies of the output buffer that fill most of the RAM. Remaining RAM is used for dedicated non-coherent summation buffers. For example, given 128K of RAM, 100K individual bins are possible in big arrays, each of the bins being a frequency or code offset. In mode 2 we are able to search only 100K correlators at one time given the example of 128K of memory, or about 40K correlator limited by 64K of memory. This means 40K or 100K correlator, effective real time, continuous processing. The result is a stream of seven ms samples sitting in a buffer. The stream is processed for even and odd half-chip offsets. There is a one-chip space in the correlator and the correlator can be replayed twice (in a full matched filter mode) to get a half chip offset. The number of frequencies is programmable. For example, perhaps seven or nine frequencies are generated, This results in relatively large arrays of nine frequencies by 1K chips and another array with a half chip shift. Moving to a new frequency or new satellite, the process is repeated until the memory is full.

In mode 2, location is known at least to the accuracy of a continent and the time is known to at least wristwatch accuracy. Usually some aiding information is required, because the signal strength is too weak to recover data sequence off the satellite. Aiding information may include a satellite list or the locations of satellite with respect to each other. If the oscillator used is a high quality oscillator, the requirement for aiding goes down. Of course, the uncertainty goes down when one or more pieces of information are available to certain accuracies.

In mode 2 the GPS system is configured to have relatively a small input, a coherent buffer is present, as much memory as possible is reserved for output, and processing occurs continuously. Switching between GPS signals, one of the buffers is filled, the whole list is processed, and by the time the sequencer comes back to the buffer seven ms of new samples are in the buffer. The new seven ms are added on top of the old seven ms, and this continues as long as the weak signal can be detected.

"High-Resolution" or "Tracking" Mode 3

A third mode, a "high-resolution" mode, or "tracking" mode will now be described. Mode 3 is appropriate for acquisition when very precise aiding is available. Mode 3 may also be used for tracking after acquisition. Mode 3 is also used when the GPS system is blocked for a very short period of time and needs only to reacquire. Typically, for mode 3 to be appropriate, the time should be known to within 100 ms or better and position should also be known to within 30 Km. From a signal processing standpoint, an advantage of mode 3 is that a very small space can be searched. Thus, the search can be very high resolution.

In mode 3, the GPS system is configured so that both a coherent RAM buffer and a non-coherent RAM buffer are dedicated per channel. A relatively short input RAM is used. In this case the length of the input RAM can be much shorter than the length of the PDI. For example, if the PDI is 20 ms, only 2 ms of dedicated buffer, which can be filled in ten iterations, is required. In general, however, less code offsets are searched in mode 3 relative to other modes.

In other modes, 4-1 data compression is typically used. In mode 3, data compression is not necessary and 4-bit processing may be used. Loss is reduced in comparison to other modes. For example, 1 Db of sensitivity is saved by high resolution processing, processing relatively few code offsets, and dedicating coherent and non-coherent buffers. Coherent buffers are saved over a full PDI. Then that PDI is processed to the FFT and added, and the same cycle is repeated through different channels in a circular fashion.

Because the GPS system has a very good idea where to start searching when it decides to use mode 3, the best signal, lowest loss processing can be performed. This includes using the longest coherent integration time the system can afford. Typically, for mode 3 the oscillator is known to 0.1 PPM or 0.2 PPM. In mode 3, updating of position is constantly occurring and uncertainty should be virtually zero. Nonetheless, the GPS system searches to determine whether multipath, auto-correlation, cross-correlation or false peaks are present which might cause false tracking. Once the GPS system is tracking, it typically enters mode 3, if it is not already in mode 3. The GPS system examines peaks, puts several points on the peak and determines whether the result looks like a good signal. As an example, the GPS system may get two signal copies, one direct and one bounced off a building. One of these signal could disappear and the GPS system may track the wrong signal.

An advantage of the present GPS system implementation is its ability to put a little window of approximately 10 chips around the output and observe the nearby environment to determine whether there is multipath or cross correlation nearby. In the event the real signal is lost, the GPS system does not become confused, and a possible re-acquisition process is avoided. The GPS system effectively tracks two different paths of one signal with two effective channels built from the different offsets are constantly being processed. In contrast, a conventional receiver opens a window around this peak, and observes three samples across the peak. The conventional system typically has one correlator as a spare, and it can periodically move that correlator around to look for extraneous signals. The conventional system, however, has no constant visibility. The disclosed GPS system, on the other hand, has the ability to keep the window always open and detect and recover immediately from false tracking.

Mode 3 is typically used as the last step of almost every acquisition. In some cases a few strong satellites are found, but not all of the satellites are found. Using the strong satellites a position is made, but it may not be the best position. Ideally the available satellites are spread out to minimize the margin of error created by parallax. Therefore, the system begins by finding a few satellites, and then minimizes the uncertainty. Mode 3 is entered to make the best measurements possible, make a best position, and then possibly find more satellites that were too weak to be found in the other modes.

If ephemeris is available for all of the satellites, the weaker satellites may be used for measurements as well. In mode 3, there is also the ability (not shown in the figures) to save processed samples before their magnitude and sum are taken. These are used for conventional tracking.

Choice of Mode

In one embodiment, the processor makes all the decisions at a high level about how the GPS system will operate. The processor's job is to start acquisitions by loading data into the RAM structure. The sequencer's job is to manage the flow of data through the GPS system and to cycle through the list, updating state all the while. As the state updates, the processor looks at it and makes the decision what to do next. The processor makes the complex calculations for navigation as well as calculating the values for frequency words.

The GPS system does try to use what it last knew. The ephemeris is only at best quality for about an hour. It can be used for about four hours, but degrades toward the end of that time. The almanac data is a month-long projection of where the satellites will be. If the GPS system is turned on occasionally, the almanac data may be useable for years, but the satellites move as time goes by. Navigation typically cannot be performed using only the almanacs.

The GPS system, under direction of the processor, bases its initial action upon start-up on what it knows, e.g., whether it was turned on an hour ago, whether it has ephemeris on any of the satellites, whether the system was sent a message about it location, etc. All of this information is funneled into a set of initial searches that are programmed into sequences and records.

An advantage of the GPS system is that, for an autonomous environment, and (given the example of 128K of available RAM) the system can perform tasks within a second that older systems required a minute to do. For example, if initially only the almanac data is available, the GPS system can be tracking in a second. If the ephemeris data is available, the GPS system can be navigating in a second with no prior knowledge about its location.

The processor, based on everything it knows, starts the sequence by typically doing a quick check "everywhere" for a strong signal. The presence of strong signals is noted because they could jam weaker ones. Then any additional known information is used to perform a more sensitive search to find other signals. In some embodiments, there is a limit for complete autonomy, e.g., 27 DbHz, to be able to recover the data sequence. The data sequence repeats every thirty seconds, so it takes eighteen seconds to load the block of data needed to perform navigation, but it comes every thirty seconds. The almanac repeats in the remaining twelve seconds. It takes about twelve and one half minutes to download the entire almanac. Preferably, there is a different source for the almanac, because the system has to be on a rather long time to collect, which has negative consequences for power consumption. Preferably, there is a different source for the ephemeris for similar reasons. However, an advantage of the GPS system is that the signal processing is so powerful that in a conventional environment it can acquire all of the satellites from almost nothing. Then another thirty seconds may be required to make a precise position. Preferably, the almanac and ephemeris data is kept as long as possible before it is collected again. For example, it is kept for one hour and then recollected if necessary. If any of the almanac or ephemeris data is still stored, it is reused to make position determination in less time, but eventually the data is recollected.

The decisions about how to operate the GPS system are all based on results of previous steps. For example, how many satellites were found, whether the data acquired can be used to find other satellites, etc. The GPS system may perform a different type of search. Typically, a whole sequence may be completed: a cold start first just to see if there are strong signals present; a coarse-aided search based on finding a few of those signals and getting a minimum position; and mode 3 in which only tracking is performed. Even though mode 3 is the most sensitive and lowest loss, and thus yields signals below the data threshold, it is used for tracking because it is the best, most effective tracking mode.

As the system moves, signals will get strong and weak. If a signal gets strong enough long enough, the ephemeris can be collected, and when it gets weak the ephemeris is used to keep tracking.

Alternative Embodiments

Many alternatives to the specific hardware and software designs shown in the figures and described herein are possible. For example, the RAM, in some systems, is a two-second snapshot, but it's so large at 2 MEG that it is usually off-chip. In an alternative embodiment, a memory interface is included in the GPS system to access an off-chip DRAM through an eight-bit memory. This maintains enough bandwidth for the signal processor. In another alternative embodiment, non-coherent sums could be stored external to the GPS system. In yet other implementations, other types of memory besides eight-bit memory may be used.

Elements of the control structure, in an alternative embodiment, are replaced with the digital signal processor ("DSP") and part of the processing. For example, a DSP with an FFT core or FFT acceleration could execute the control logic. With the possible exception of mode 1 where the cold start mode may require very high data rates, but the DSP could handle control functions. The DSP could also take the output of the FFT, rather than the correlator. In other words, the DSP would be in control of the FFT, but the FFT could do the memory fetches on its own, or take the direct path on its own. Also, the sequencing could be done by a DSP. The matched filter could use its internal register for much of its work. It is possible to divide the resources of the matched filter, based on the matched filter design shown. For example, in a full matched filter mode, all 1024 correlators are used for a single chip position. In another matched filter mode, the matched filter resources are divided into halves, quarters or eighths, and in each of the resulting matched filter segments a different fractional chip position (e.g., half-chip offsets, quarter-chip offsets, or eighth-chip offsets) is correlated.

In addition, the matched filter resources can be configured to create a high-resolution correlation. For example, if the matched filter is divided into two halves, an upper half can be used to correlate two MSBs, while a lower half is used to correlate two LSBs. The two results are then added to generate a higher resolution result. In another example, the matched filter is divided into quarters. The lower two quarters are used to correlate an MSB and an LSB of a high resolution half-chip spacing, and the upper two quarters are used to correlate the MSB and the LSB the other high-resolution half-chip spacing. The division of matched filter resources into parts and use of different parts is completely flexible.

The configuration of the matched filter is determined initially (at setup on a channel-by-channel basis) based on whether a high-resolution mode is desired and whether particular fractional code spacing is desired. The matched filter is configured to operate in a particular mode for each channel. The channels access the matched filter in a particular mode on a time multiplexed basis under the control of the sequencer.

The GPS system of an embodiment provides RF power control messaging, as well as related methods of providing RF power control messaging, over an interface between an RF processing section and a baseband processing section. The interface supports general purpose bi-directional message transmission between the RF processing section and the baseband processing section. The interface further supports transmission of SPS signal samples between the two processing sections without adding undue complexity to the interface.

In one implementation, the interface includes a message serial interface and a data serial interface. The data serial interface communicates SPS signal sample data from the RF section to the baseband section. The message serial interface communicates messages, including power control messages, between the RF section and the baseband section.

As noted above, a message serial interface communicates power control messages between the processing sections. The message serial interface may include a message-in signal line, a message-out signal line, and a message clock signal line. In some implementations, the message serial interface may also include a slave-select signal line. A power control message may include, for example, multiple power control bits. Each power control bit may specify a power state (e.g., powered-up or powered-down) for pre-determined circuitry in the RF section.

The complexity of the data serial interface may be reduced, for example, by using a single data bit signal line to serially carry signal samples from the RF section to the baseband section. The data serial interface may also include a data clock signal line that provides timing for the signal samples. In particular, as an example, the data clock signal line may carry a data clock (that includes rising edges and falling edges) nominally running at 16 fo, where fo=1.023 MHz, while the data bit signal line may carry a data signal comprising serially transmitted data bits. In one implementation, a first type of data bit is valid on the rising edge of the data clock and a second type of data bit is valid on the falling edge of the data clock. As an example, the first type of data bit may be a sign bit, while the second type of data bit may be a magnitude bit.

Figure 44:
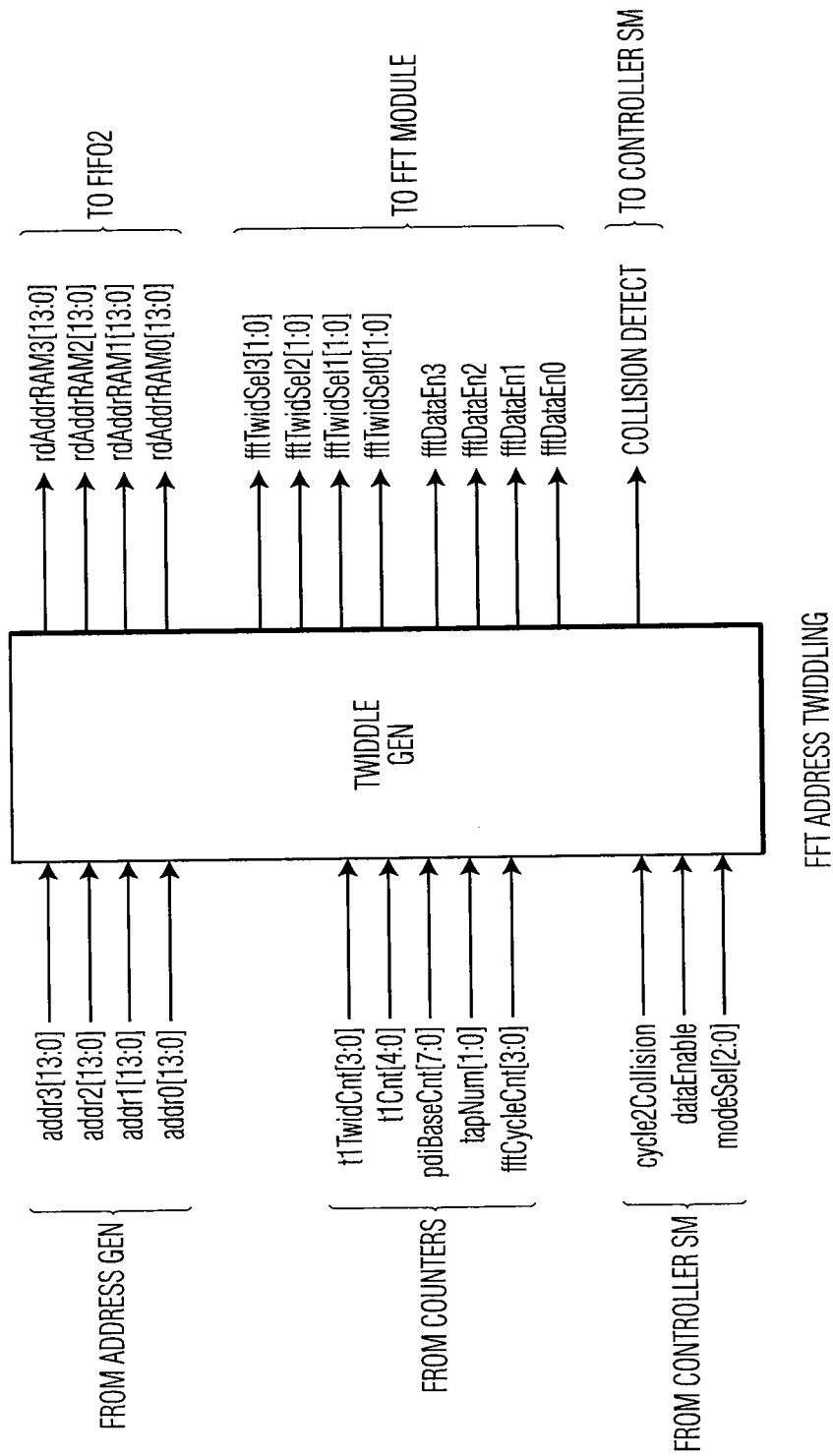
FIG. 44 illustrates a satellite positioning system receiver that includes an RF processing section coupled to a baseband processing section by an interface that includes a message serial interface and a data serial interface.

FIG. 44 shows a receiver 44-200 of a satellite positioning system. The receiver 44-200 includes an RF section 44-202 coupled to a baseband processing section 44-204 using an RF-to-baseband interface 44-206. The RF processing section 44-202 receives SPS signals, for example the 1575.42 MHz GPS signal, on the RF input 44-207.

The receiver section 44-200 may be generally regarded as including an RF front end 44-224 and a baseband back end 44-226. The RF front end 44-224 includes the RF processing section 44-202 and RF-to-baseband interface 44-206. The RF front-end 44-224 processes the SPS signals received on the RF input 44-207 through a sequence of downconversion, automatic gain control, and analog to digital conversion. The baseband back end 44-226 includes the baseband processing section 44-204 and RF-to-baseband interface 44-206. The baseband back end 44-226 processes (using a microcontroller core, CPU, or other control logic) the sampled data provided by the RF front end 44-224. The baseband back end 44-226 communicates the processed data to a digital device (e.g., a digital signal processor, general purpose microcontroller or CPU, or host PC) using one or more address, data, control, and clock signals that comprise the digital communication interface 44-222.

Either or both of the RF front end 44-224 and baseband back end 44-226 may be implemented as individual single integrated circuits, for example. Thus, the RF front end 44-224 may be a single package that includes the RF input 44-207 (e.g., a particular input pin on the package), RF processing section 44-202, and interface 44-206 (e.g., a set of interface pins as described in more detail below). Similarly, the baseband back end 44-226 may be a single package that includes the baseband processing section 44-204, interface 46-206, and digital interface 44-222. The processing performed by the RF processing section 44-204 and baseband processing section 44-204 may be that set forth in more detail in the SiRFStar® I, II, or III chipset data sheets, while the interface 44-206 is described in more detail below. The SiRFStar® chipsets are available from SiRF Technology, Inc. of San Jose Calif.

Although, as shown in FIG. 44, the functional division between the RF front end 44-224 and the baseband backend 44-226 lends itself to being divided into two separate integrated circuits, many other implementations are possible. As one example, numerous discrete logic and signal processing circuit blocks may implement the RF, baseband, and interface 44-206 functionality. As additional examples, any of the circuitry underlying the functionality of the RF front end 44-224 and the baseband back end 44-226 may be incorporated into a single package (e.g., that encloses multiple integrated circuit dies) or integrated circuit, multiple packages or integrated circuits, or distributed across one or more circuit boards. In these implementations, individual wires, circuit board traces, or VLSI metal or polysilicon layers carry the interface 44-206 signals between the RF processing circuitry and the baseband processing circuitry.

Furthermore, any of the circuitry underlying the functionality of the RF front end 44-224 and the baseband back end 44-226 may be incorporated, with additional functionality, into a single package or integrated circuit, multiple packages or integrated circuits, or distributed across one or more circuit boards. As examples, the RF and baseband circuitry may be integrated on a die with digital or analog processing circuitry for cellular telephony, PDA operation, or engine, instrument, or electronics controllers for automobiles. Thus, FIG. 44, and the examples given above are not limiting; rather, one of ordinary skill in the art will appreciate that the particular implementation, division of functionality, and packaging of the circuitry that implements the RF processing, baseband processing, and interface 44-206 may vary widely depending on the application at hand, engineering considerations, cost considerations, and the like.

The interface 44-206 includes a message serial interface 44-208 and a data serial interface 44-210. The message serial interface 44-208 provides for serial communication of general purpose messages bi-directionally between the RF section 44-202 and the baseband section 44-204. In contrast, the RF section 44-202 employs the data serial interface 44-210 to transmit SPS signal samples to the baseband section 44-204.

Figure 46:
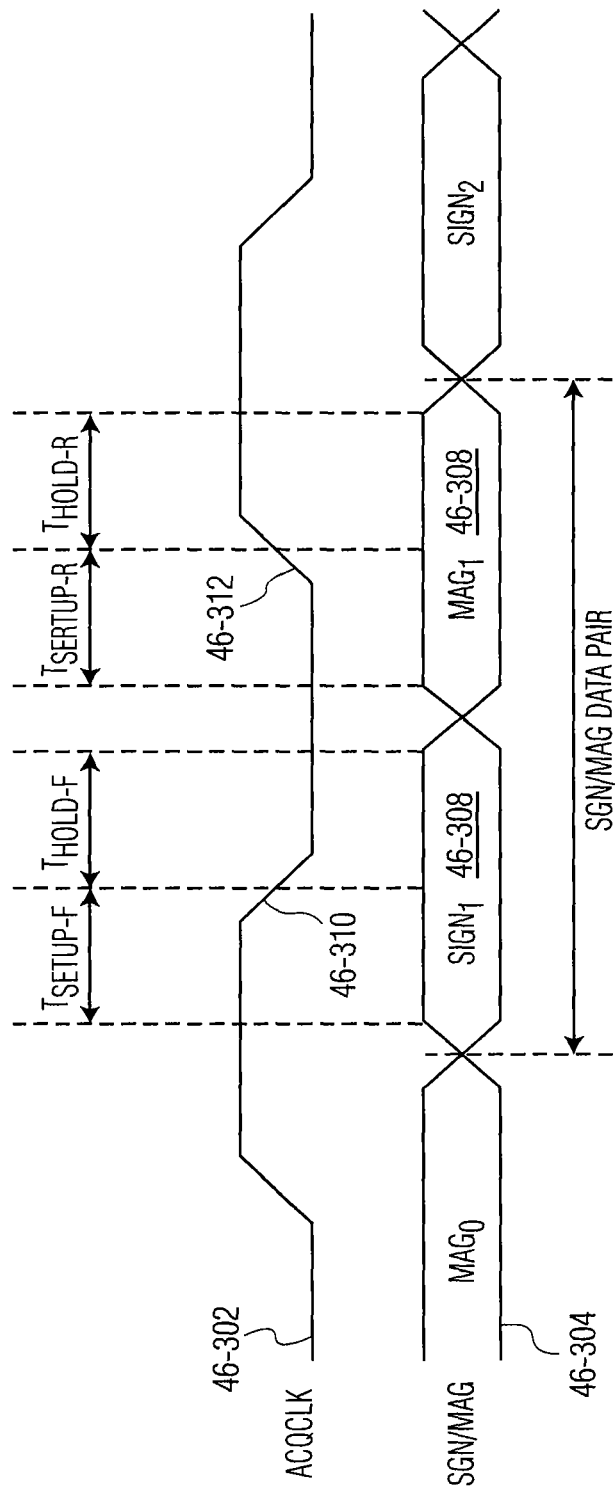
FIG. 46 illustrates a timing diagram that shows the relationship between a message clock and message data bits carried, respectively, on a message clock signal line and message data bit signal line that form part of the message serial interface.

As an initial matter, it is noted that in general, the interface 44-206 signals shown in FIG. 46 are CMOS compatible. In particular, the inputs, for logic one, are above 0.7*Vcc V, and, for logic zero, are below 0.3*Vcc V. Outputs, for logic one, are above Vcc−0.4 V, and, for logic zero, are below 0.4 V. The input/output pins generally operate in either the 2.5 V or 3.3 V voltage ranges, depending on the desired implementation. The real time clock (RTC) input/output pins may operate at 1.5 V, although they may be designed to tolerate 3.3 V levels if desired. Any of the signals, however, may be adapted to different voltage ratings or specifications depending on the desired implementation.

The message serial interface 44-208, as shown in FIG. 46, includes the message-in signal line (labeled MSG_DO/MI), a message-out signal line (labeled MSG_DI/MO), a message clock signal line (MSG_CLK/MK) and a slave-select signal line (labeled MSG_CEB/SS_N[0]). The labels on the message signal lines indicate the direction of data flow from the perspective of the RF section 44-202/baseband section 44-204. For example, the message-out signal line (MSG_DI/MO) carries message bits input to the RF section 44-202 and output by the baseband section 44-204.

The data serial interface 44-210 includes the data clock signal line (labeled ACQCLK) and the data bit signal line (labeled SGNMAG). The data serial interface 44-210 generally uses only a single data bit signal line to communicate, serially, data bits to the baseband section 44-204 (as discussed below in greater detail with regard to FIG. 47). Thus, the data serial interface 44-210 generally includes as few as two signal lines: one for a data clock and one for data bits. The data serial interface 44-210 is thus a low complexity solution for a SPS signal sample interface between the RF section 44-202 and the baseband section 44-204.

As shown in FIG. 46, the receiver section 44-200, on the RF processing side, also includes a real time clock (RTC) oscillator (OSC) and monitor section 44-212. A 32 KHz crystal (or other clock source) provides an input clock 44-214 for the RTC OSC section 44-212. The RTC OSC section 44-212 generates a clock output on the RTCLK/RIN signal line that the baseband section 44-204 uses to keep, as examples, GPS time or UTC time. The clock output is, for example, a 32,768 Hz 1.5 V CMOS output. The RTC OSC section 44-212 continues to run during power down modes to help the baseband section 44-204 maintain an accurate timebase.

However, monitoring circuitry (e.g., a rectifier coupled to the clock input and followed by a comparator) in the RTC OSC section 44-212 determines when the input clock 44-214 has consistently run (e.g., has stopped for no more than 10-30 clock cycles). If the clock has stopped for too long, then the RF section 44-202 sets a bit (e.g., sets a flip/flop output or sets a bit in a multi-bit status register) to indicate that the clock output has not been consistent (and, in some cases, that the baseband section 44-204 should search over the full range of the received SPS signal to determine the correct time).

The RF section 44-202 also accepts clocking input from either a crystal oscillator 44-216 or an external clock source 44-218 (e.g., a frequency reference provided in a wireless device). The clocking inputs 44-216 and 44-218 provide a clock source that a PLL divider chain in the RF section 44-202 uses to generate the ACQCLK signal. The clocking inputs 44-216 and 44-218 are collectively referred to below as the OSCCLK, while the PLL divider chain clock is referred to as the PLLCLK. The PLLCLK is typically set to generate a nominal frequency of 16 Fo (where Fo=1.023 MHz) on the data clock ACQCLK derived from the OSCCLK (or an internal reference).

At power-up, the OSCCLK (generally in the range of 5-27 MHz) is present on the ACQCLK output. A message (described below) commands the RF section 44-202 to switch ACQCLK from OSCCLK to the PLLCLK and from the PLLCLK to the OSCCLK. The ACQCLK signal may be a 2.5/3.3 V CMOS output with a duty cycle between 45% and 55% (except when switching clock sources, in which case ACQCLK may have an extended low cycle).

A power control signal (labeled PWRUP/RFPWRUP) may optionally be provided to control whether certain portions of the RF section 44-202 are powered-up. The power control signal may be connected, for example, to a voltage regulator enable pin in the RF section 44-202 to provide a coarse power-up/power-down control over the majority of the circuitry in the RF section 44-202. On the other hand, the RTC OSC section 44-212 is separately powered so that it can continue to provide a clock to the baseband section 44-204. The power control signal may be a 2.5/3.3 V CMOS signal. The baseband processing side includes an RTC logic section 44-220. The RTC logic section 44-220 accepts the input clock generated by the RTC OSC and monitor section 44-212 as an aide in determining the current time as well as SPS location solutions.

The RTC logic section 44-220 also outputs the reset signal GRFRST_N/RESET_N (asserted low). The reset signal may be used to reset the state of control registers in the RTC OSC section 44-212 and the RF section 44-202 at power-on. For example, when GRFRST_N is asserted, the digital control registers on the RF processing side will be reset to their default states. The default states of the control registers allow the OSCCLK circuits to operate and allow the ACQCLK output to be driven by OCSCLK (when PWRUP) is asserted. When GRFRST_N is not asserted, then the RF section 44-202 operates according to its internal logic states.

In one implementation, the message serial interface signals are 2.5/3.3V CMOS I/O signals. The MSG_CLK/MK, MSG_DI/MO, and MSG_CEB/SS_N[0] signals are inputs to the RF section 44-202. The MSG_DO/MI signal is an output from the RF section 44-202 with tri-state control. When the MSG_CEB/SS_N[0] is logic high, the MSG_DO/MI output is high impedance and may be driven by other devices that are also connected to the message serial interface 44-208. Thus, the MSG_CEB/SS_N[0] output from the baseband section 44-204 operates as a slave selection signal that allows the RF section 44-202 to drive data on the MSG_DO/MI signal line. When additional devices are attached to the message serial interface 44-208, the baseband section 44-204 may provide additional slave selection signal lines to determine which device is allowed to drive data on the MSG_DO/MI signal line.

The RF section 44-202 may also include one or more inputs for external analog sensors (not shown). Thus, a multi-channel analog to digital (A/D) converter in the RF section 44-202 may take measurements of analog input signals and communicate the results to the baseband section 44-204. The analog inputs may include, but not be limited to, temperature inputs, gyro turn rate inputs, wheel tick inputs, or a battery voltage inputs.

Table 1 summarizes the operating modes for the receiver section 44-200:

TABLE 1

| Mode | GRFRST_N | PWRUP | Operation |
| --- | --- | --- | --- |
| Sleep | 0 | 0 | RF section voltage regulator disabled; RTC OSC section isolated from RF section. |
| Start-up | 0 | 1 | RF section voltage regulator enabled; RTC OSC section isolated; registers reset; OSCCLK enabled; ACQCLK outputs OSCCLK. |
| NA | 1 | 0 | Not allowed. |
| Normal | 1 | 1 | RF section voltage regulator enabled; RTC OSC section communicates with RF section; messages control RF section operation. |

Figure 45:
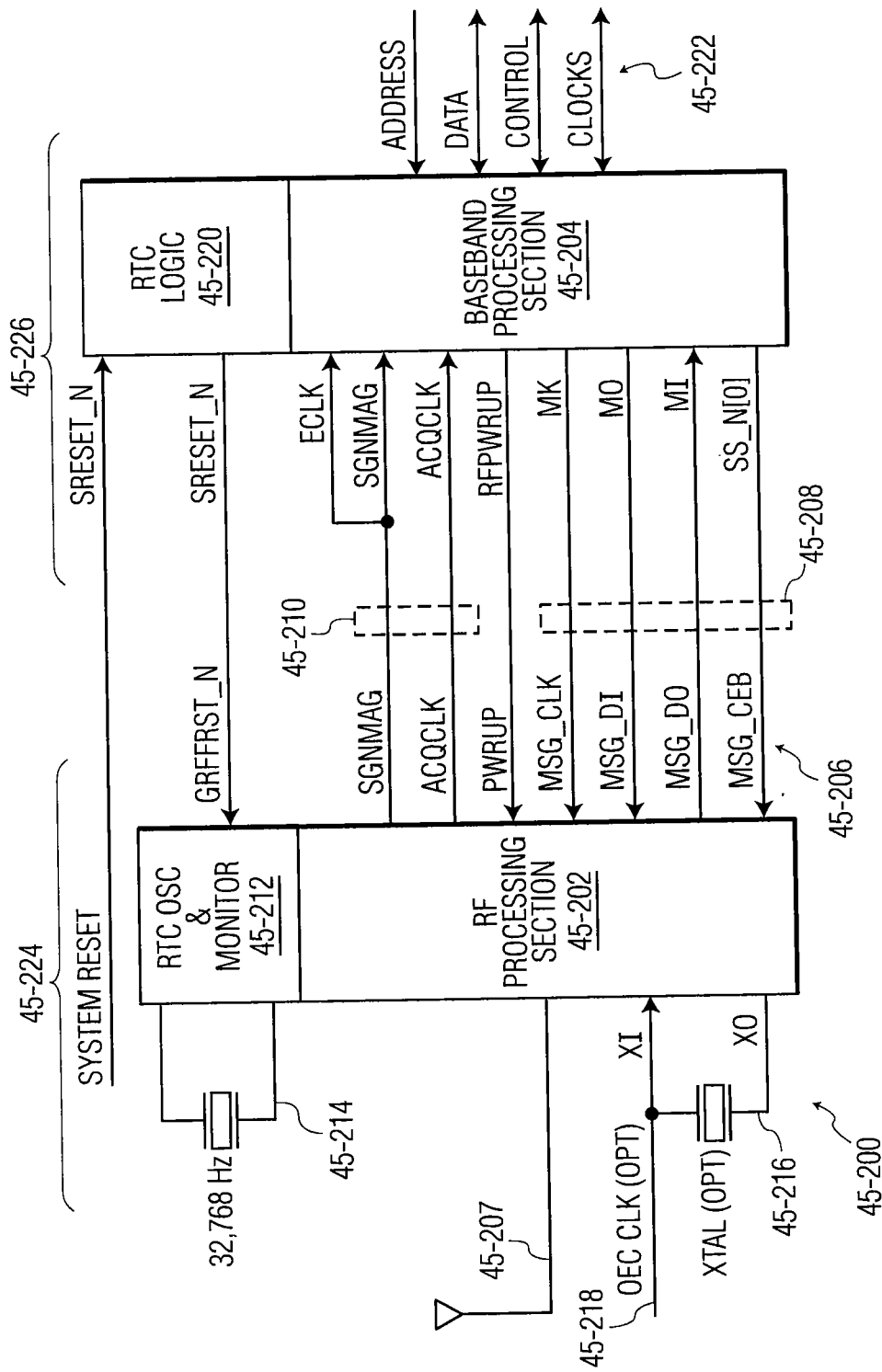
FIG. 45 illustrates a timing diagram that shows the relationship between a data clock and a data signal carried, respectively, on a data clock signal line and a data bit signal line that form the data serial interface.

Turning next to FIG. 45, that figure illustrates a timing diagram 45-300 that shows the relationship between a data clock 45-302 and a data signal 45-304. The data signal 45-304 provides SPS signal samples to the baseband section 44-204. The SPS signal samples are derived from an SPS input signal received by an antenna connected to the RF section 44-202. The ACQCLK signal line carries the data clock 45-302, while the SGNMAG signal line carries the data signal 45-304. The data signal 45-304, which may be, for example, a 2.5/3.3 V CMOS output, transmits both sign bit data 45-306 and magnitude bit data 45-308 on the SGNMAG signal line. In one implementation, the data signal 45-304 provides sign and magnitude bit information determined by an A/D converter in the RF section 44-202.

In other implementations, additional bits of information or quantization may be provided, in concert with a predetermined protocol or encoding technique applied to the data bits (e.g., a pseudorandom noise code) to allow the baseband section 44-204 to identify the data transmitted. Furthermore, the data signal 45-304 may transmit signal samples for different radio chains handled by the RF section 44-202. For example, when the RF section 44-202 is processing SPS data, the data signal 45-304 may bear the two bits per sample (sign and magnitude) data pairs noted above. In contrast, when the RF section 44-202 is processing a different RF signal (e.g., a Bluetooth signal), the data signal 45-304 may instead transmit more or less bits per sample (e.g., 4 or 6 bits) in accordance with the guidelines established for processing that RF signal. Similarly, the data clock 45-302 may vary in frequency and duty cycle to meet the processing guideline for the RF signal that the RF section 45-202 is currently processing.

Figure 47:
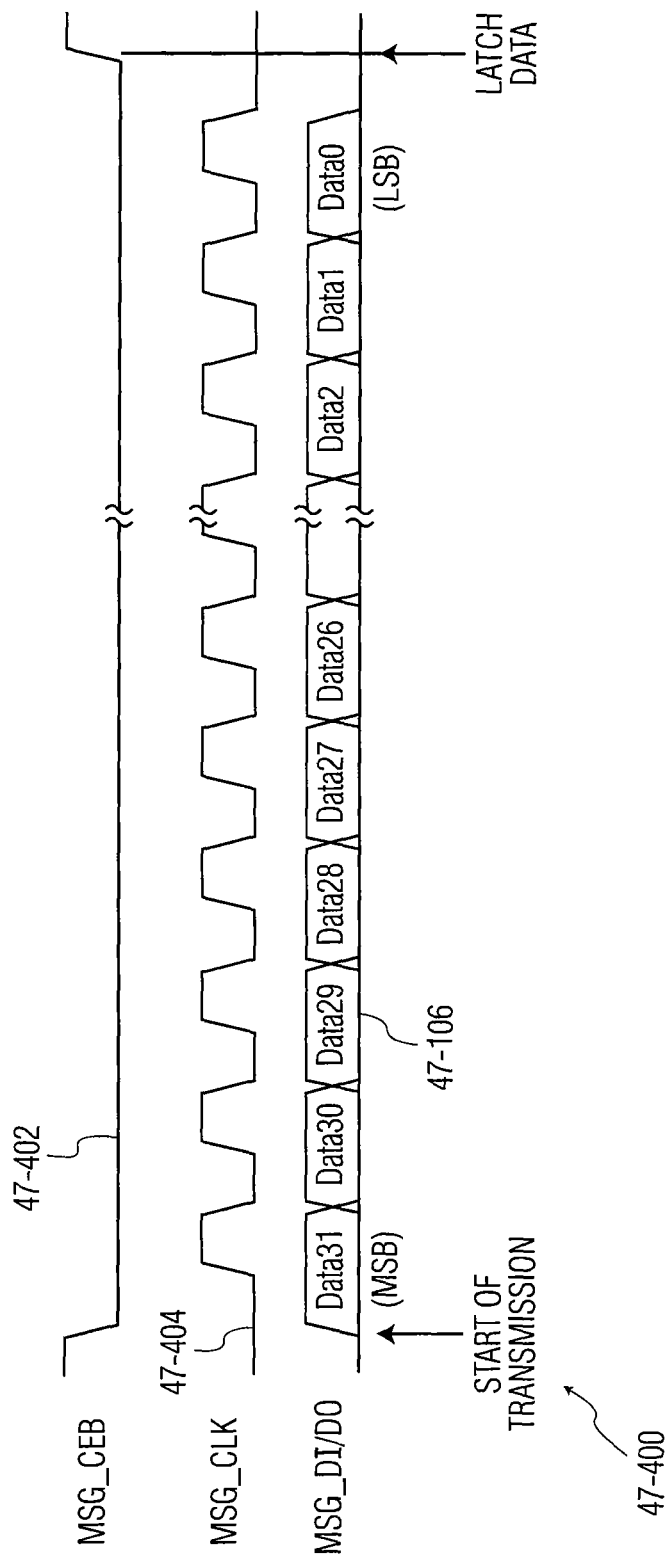
FIG. 47 shows a method for interfacing an RF processing section and a baseband processing section.

As shown in FIG. 45, the RF section 44-202 outputs the sign bit 45-306 when the data clock 45-302 is high and outputs the magnitude bit 45-308 when the data clock 45-302 is low. As shown in FIG. 47, the sign bit 45-306 is valid no less than $T_{SETUP-F}$ before the falling edge 45-310 of the data clock 45-302. Similarly, the magnitude bit 45-308 is valid no less than $T_{SETUP-R}$ before the rising edge 45-312 of the data clock 45-302.

The sign bit 45-306 remains valid no less than $T_{HOLD-F}$ after the falling edge 45-310 of the data clock 45-302. The magnitude bit 45-308 remains valid no less than $T_{HOLD-R}$ after the rising edge 45-312 of the data clock 45-302. The setup and hold times may vary from implementation to implementation. As one example, the setup and hold times may be approximately 5-10 ns.

The message serial interface 44-208 may be implemented in a wide variety of ways. In one implementation, the message serial interface 44-208 has the characteristics set forth below, although other implementations are also possible.

The message serial interface on the RF section 44-202 operates as a slave device to the baseband section 44-204 (or other master device that adheres to the characteristics set forth below). The inputs bits to the RF section 44-202 (on the MSG_DI line) are shifted into a 32 bit shift register in the RF section 44-202 under control of the MSG_CLK. In one implementation, up to 32 bits are sent in one message block and data is received and transmitted with the most significant bit first. Simultaneously, the MSG_DO output bits are shifted out of the other end of the same shift register. If output from the RF section 44-202 is not needed, then the MSG_DO output need not be connected. In one implementation, the MSG_CLK operates at up to 20 MHz and the message serial interface signals are, approximately, above 0.8*VCC V for logic 1 and below 0.2*VCC V for logic 0.

The slave select signal line (MSG_CEB) is active low for serial data transmission. The MSG_DI and MSG_CLK may therefore be ignored as long as MSG_CEB has been high for a pre-selected period of time (e.g., 5 ns). Data is sampled on the rising edge of MSG_CLK. In one implementation, a transition on MSG_DI or MSG_DO occurs at least 5 ns after the rising edge of MSG_CLK and stabilizes at least 5 ns before the next rising edge of MSG_CLK. The data is shifted on the falling edge of MSG_CLK. Continuing the example, the MSG_CEB signal may be active (logic 0) at least 10 ns before the rising edge of the first MSG_CLK and may remain active (logic 0) at least 10 ns after the last falling edge of MSG_CLK. The time interval in both cases may be, for example, one half of one clock cycle. The MSG_CEB signal may then be held inactive (logic 1) for at least 30 ns to provide time for the RF section 44-202 to latch the data.

If the MSG_CEB signal transitions high before all data in a message block have been sent, the data is discarded and not applied to RF section 44-202 registers. Unused bits in a message block are set to zero. However, a fast write mode is provided to allow for a shortened, one byte message. The fast write mode is assumed until more than 8 bits have been received. When more than 8 bits have been received, the RF section 44-202 expects to receive a full 32 bits for a valid message.

The RF section 44-202 outputs data (on MSG_DO) to the baseband section 44-204 in response to a message received from the baseband section 44-204 that requests the data. The baseband section 44-204 then sends a subsequent message to shift out the requested data in the RF section 44-202 shift register from the shift register. The subsequent message may be an independent operational message or it may be a dummy message sent for the sole purpose of shifting out the desired data.

FIG. 46 illustrates a timing diagram 46-400 that shows the relationship between the slave select signal (MSG_CEB) 46-402, the message clock signal (MSG_CLK) 46-404, and the message data bit signals (MSG_DO and MSG DI) 45-306. Data transmission starts when the slave select signal 46-402 falls. The transmitted data are latched when the slave select signal 46-402 rises.

As shown in FIG. 46, the message-out signal line (MSG_DI/MO) and message-in signal line (MSG_DO/MI) each carry a serial bit stream. The serial bit stream on the message-out signal line represents a message selected from a group of predefined RF section messages that are transmitted from the baseband section 44-204 to the RF section 44-202. Similarly, the serial bit stream on the message-in signal line represents a message selected from a group of predefined baseband section messages that are transmitted from the RF section 44-202 to the baseband section 44-204.

The messages are not limited to any particular purpose or format. As explained in more detail below, the messages may include, but not be limited to, RF section power control messages, RF section test messages, clock status messages, analog measurement messages, channel conversion count messages, and the like.

In one implementation, there are four types of message blocks defined. Data [1:0] (in a 32-bit or 8-bit sequence) are address bits that define the four messages as shown in Table 2 below. Each message type is able to support both a fast write mode and a full write mode and spare capacity has been defined for both modes.

TABLE 2

Message Blocks

| Data [1:0] | Message Type | Message Name |
|---|---|---|
| 00 | 0 | AGC (Fast Write) and Synthesizer |
| 01 | 1 | Power Control (Fast Write) and Synthesizer |
| 10 | 2 | Output Message Types |
| 11 | 3 | Input Message Type Expansion |

Exemplary contents of each message are shown in detail in Tables 3 through 8. Table 3 shows AGC and synthesizer control messages, Table 4 shows power control and synthesizer control messages, and Table 5 shows output request types for a selected message type. Table 6 shows output message types and Tables 7-8 show input message types. The columns define the contents as follows. The first column, labeled Bits, represents the message data bits, with bit 0 indicating the last bit transmitted. The second column, labeled Field Name, identifies the name of the field in the message. The third column, labeled Length, is the length of the field. The forth column, labeled Default, indicates the contents of the default parameter in the RF section 44-202 when power is first applied. The fifth column, labeled Contents, describes the allowed contents of the field. The sixth column, labeled Function, indicates what the field accomplishes. The seventh column, labeled_Pwr, indicates which power domain control bit shown in Table 4, if any, is used to drive these field outputs to zero on the interface to the RF section 44-202.

Message type 2 provides for implementing output requests using a field that specifies up to 32 types of output requests. Message type 3 provides for expanding the input message types (or addresses) from 4 to 36. References below to the "synthesizer" are references to the PLL synthesizer clock generation circuitry in the RF section 44-202. The PLL synthesizer is configurable, for example, by setting clock divider values to generate the PLLCLK from a number of different input reference frequencies.

TABLE 3

Message Type 0: AGC and Synthesizer Control (Address [1:0] = 0)

| Bits | Field Name | Length | Default | Contents | Function | _Pwr |
|---|---|---|---|---|---|---|
| 31:28 | Spare0 [3:0] | 4 | 0 | 0 | Spare | |
| 27:8 | NUM [19:0] | 20 | TBD | 0x00000-0xFFFFF | Specifies the numerator of the fractional part of the loop divider in the PLL clock generation section of the RF section 202. | Synth |
| 7:2 | AGC [5:0] | 6 | 0 | 0x00-0x3F | Controls AGC gain in the RF section 44-202 | Rx |
| 1:0 | Address [1:0] | 2 | 0 | 0 | Defines message type | |

TABLE 4

Message Type 1: Power Control and Synthesizer Control (Address [1:0] = 1)

| Bits | Field Name | Length | Default | Contents | Function | _Pwr |
|---|---|---|---|---|---|---|
| 31:28 | Spare1 [3:0] | 4 | 0 | 0 | Spare | |
| 27 | InvertFePwr | 1 | 0 | 0: Fe_Pwr = Rx_Pwr<br>1: Fe_Pwr = ~Rx_Pwr | Partition the reception chain in the RF section 44-202 for testing purposes | |
| 26 | WideBwFilter | 1 | 1 | 0 = Narrow BW<br>1 = Wide BW | Select the filter used in the RF section 44-202. | Rx |
| 25:18 | ND [7:0] | 8 | — | 0x00-0xFF | Specifies the integer part of a synthesizer loop divider parameter in the PLL clock generation section | Synth |
| 17:15 | RDIV [2:0] | 3 | — | 0x0-0x7 | Specifies a synthesizer reference divider value in the PLL clock generation section | Synth |

TABLE 4-continued

Message Type 1: Power Control and Synthesizer Control (Address [1:0] = 1)

| Bits | Field Name | Length | Default | Contents | Function | _Pwr |
|---|---|---|---|---|---|---|
| 14:11 | CP [3:0] | 4 | — | — | Specifies the synthesizer charge pump output and test modes | PLL |
| 10 | PD_POL | 1 | — | 1 = positive, 0 = negative | Specifies the phase detector | PLL |
| 9 | DvSel | 1 | 1 | 0 = Fractional 1 = Integer | Specifies the divider for PLL feedback | PLL |
| 8 | SDO | 1 | 1 | 0 = Third Order SD 1 = First Order SD | Chooses Sigma Delta Order | Synth |
| 7 | Rx_Pwr | 1 | 0 | 1 = on, 0 = off | Controls front end power for $2^{nd}$ low noise amplifier through A/D converter | |
| 6 | AcqClk_Sel | 1 | 0 | 1 = PLL, 0 = Osc | Controls glitch-free switch that selects OSCCLK or PLLCLK for ACQCLK | |
| 5 | Synth_Pwr | 1 | 0 | 1 = on, 0 = off | Controls power to fractional N synthesizer | |
| 4 | PLL_Pwr | 1 | 0 | 1 = on, 0 = off | Controls power for PLL and divider chain | |
| 3 | LNA1_Pwr | 1 | 0 | 1 = on, 0 = off | Controls power for first (optional) LNA | |
| 2 | Osc_Pwr | 1 | 1 | 1 = on, 0 = off | Controls power for oscillator, ACQCLK-select mux and ACQCLK driver | |
| 1:0 | Address [1:0] | 2 | 1 | 1 | Defines message type | |

TABLE 5

Message Type 2: Output Request Types 0 to 31 (Address [1:0] = 2)

| Bits | Field Name | Length | Default | Contents | Function |
|---|---|---|---|---|---|
| 31:8 | Spare2 [28:5] | 24 | 0 | 0 | Spare |
| 7:3 | Spare2 [4:0] or Out_Dat [4:0] | 5 | 0 | 0-31 | Spare (Fast Write), if Out_Req = 0 Output data type, if Out_Req = 1 |
| 2 | Out_Req | 1 | 0 | 0 = data 1 = output | When = 0, data follows When = 1, output data to load follows |
| 1:0 | Address [1:0] | 2 | 2 | 2 | Defines message type. |

Output message types are shown in Table 6. Spare messages have been defined for expansion or use in testing the RF section 44-202. Since this data is input to the message interface from the RF section 44-202, these fields are given names denoting input, such as spareInA. When the data is shifted out, it is positioned in the output data stream using the index values given. For example, spareInA [23:0] would be located in the final 24 bits shifted out in the 32 bit output field, so that eight leading zeros would be followed by spareInA [23] through spareInA [0] according to the convention of shifting out the most significant bit first.

Out_Dat [4:0]=4-8 specify 20-bit measurements taken by a dual slope A/D converter in the RF section 44-202. As noted above, the A/D converter may have multiple channels connected to one or more analog measurement devices. As used below, Out_Dat [4:0]=9 specifies the valid clock bit maintained by the RTC OSC section 44-212 and described above.

TABLE 6

Output Messages Defined Using Message Type 2
(Address [1:0] = 2 and Out_Req = 1)

| Out_Dat [4:0] | Message Bits | Contents |
|---|---|---|
| 0 | 31:24 | 0 |
|   | 23:0 | SpareInA [23:0] |
| 1 | 31:24 | 0 |
|   | 23:0 | SpareInB [23:0] |
| 2 | 31:24 | 0 |
|   | 23:0 | SpareInC [23:0] |
| 3 | 31:24 | 0 |
|   | 23:0 | SpareInD [23:0] |
| 4 |  | DS_ADC_CH_0 |
|   | 31:30 | LAST_CH [1:0] |
|   | 29:20 | Spare [9:0] |
|   | 19:0 | DATA0 [19:0] |
| 5 |  | DS_ADC_CH_1 |
|   | 31:30 | LAST_CH [1:0] |
|   | 29:20 | Spare [9:0] |
|   | 19:0 | DATA1 [19:0] |
| 6 |  | DS_ADC_CH_2 |
|   | 31:30 | LAST_CH [1:0] |
|   | 29:20 | Spare [9:0] |
|   | 19:0 | DATA2 [19:0] |
| 7 |  | DS_ADC_CH_3 |
|   | 31:30 | LAST_CH [1:0] |
|   | 29:20 | Spare [9:0] |
|   | 19:0 | DATA3 [19:0] |
| 8 |  | DS_ADC_CNT |
|   | 31:30 | LAST_CH [1:0] |
|   | 29:20 | Spare [9:0] |
|   | 19:0 | COUNT [19:0] |
| 9 |  | RTC_STA |
|   | 31:1 | Spare [30:0] |
|   | 0 | 0 = RTC Not Valid (default) |
|   |   | 1 = RTC Valid |
| 29 | 31:26 | 0 |
|   | 25:0 | Power Control Message Register [24:0] |
| 30 | 31:0 | Message Input Shift Register |
| 31 | 31:16 | 0 |
|   | 15:0 | Chip Version [15:0] |

TABLE 7

Message Type 3: Expanded Input Message Types
(Address [1:0] = 3)

| Bits | Field Name | Length | Default | Contents | Function |
|---|---|---|---|---|---|
| 31:8 | Spare3 [28:5] | 24 | 0 | 0 | Spare |
| 7:3 | Spare3 [4:0] or Address [6:2] | 5 | 0 | 0-31 | Spare (Fast Write), if Addr_Exp = 0 Address expansion, if Addr_Exp = 1 |

TABLE 7-continued

Message Type 3: Expanded Input Message Types
(Address [1:0] = 3)

| Bits | Field Name | Length | Default | Contents | Function |
|---|---|---|---|---|---|
| 2 | Addr_Exp | 1 | 0 | 0 = data 1 = address | When = 0, data follows When = 1, address follows |
| 1:0 | Address [1:0] | 2 | 3 | 3 | Defines message type. |

Spare messages (useful for test or expansion purposes) are shown in Table 8. Because these data represent control bits output by the message interface to the RF section 44-202, the data fields have been named to denote outputs, for example SpareOutA.

A test message has also been define for the SGNMAG output signal line. When TestSignMag [8]=one, the test mode is entered. When the bit is a zero, test mode is turned off. In test mode, the pattern specified in TestSignMag [7:0 ] is output, as long as ACQCLK is running, beginning with TestSignMag [7] while ACQCLK is high.

TABLE 8

Input Messages using Message Type 3
(Address [1:0] = 3 and Addr_Exp = 1)

| Address [6:2] | Msg Bits | GRFRST_N | Contents |
|---|---|---|---|
| 0 | 31:8 | 0 | SpareOutA [23:0] |
| 1 | 31:8 | 0 | SpareOutB [23:0] |
| 2 | 31:8 | 0 | SpareOutC [23:0] |
| 3 | 31:8 | 0 | SpareOutD [23:0] |
| 4 | 16:8 | 0 | TestSignMag [8:0] |
| 5 |  |  | DS_ADC_PER |
|   | 31:12 | 0 | PERIOD [19:0] |
|   | 11 | 0 | CLK_SEL |
|   | 10 | 0 | CLK_ENB |
|   | 9:8 | 0 | Spare [1:0] |
| 6 |  |  | DS_ADC_SH |
|   | 31:12 | 0 | SHIFT [19:0] |
|   | 11:8 | 0 | Spare [3:0] |
| 7 |  |  | DS_ADC_PH |
|   | 31:12 | 0 | PH_ONE [19:0] |
|   | 11:8 | 0 | Spare [3:0] |
| 8 |  |  | DS_ADC_SEQ |
|   | 31:12 | 0 | CH_SEQ [23:0] |
|   | 11:8 | 0 | Spare [3:0] |
| 9 |  |  | RTC_CTL |
|   | 31:10 | 0 | Spare [21:0] |
|   | 9 | 0 | 1: Set RTC Status 0: No action (default) |
|   | 8 | 0 | 1: Read RTC Status 0: No action (default) |
| 10 |  |  | SGNMAG_SIG |
|   | 31:1 | 0 | Spare [30:0] |
|   | 0 | 0 | 0: SGNMAG (default) 1: OSCCLK |

Address [6:2]=5-8 specify parameters for the dual slop A/D converter in the RF section 44-202. The DS_ADC_PER message sets the 20-bit conversion period, the duration of an entire A/D conversion cycle (PERIOD), selects one of the input clocks (e.g., OSCCLK or PLLCLK) provided to the A/D converter (CLK_SEL), and enables or disables the clock (CLK_ENB). The DS_ADC_SH message provides a 20-bit shift period (SHIFT) that the A/D converter control circuitry uses as a count down value before initiating conversion in order to change the phase of the A/D conversion cycles relative to any given time base. The DS_ADC_PH specifies a 20-bit phase one conversion period (e.g., the duration of the integration period) for the dual slop A/D converter.

The DS_ADC_SEQ message specifies 24 bits that control the order in which the A/D converter performs a conversion on each of four input channels. More specifically, the 24 bits are partitioned into 12 pairs of bits; each pair specifies the next input channel to the analog multiplexer before the A/D converter. The pairs of bits thus control which channel is next digitized by the A/D converter and the four input channels may thereby be sampled at different rates.

Continuing with regard to Table 8, Address [6:2]=9 specifies that the clock status bit in the RTC OSC section 44-212 will be set to indicate a good clock, or (if bit 8 is a one) that the baseband section 44-204 is requesting the value of the clock status bit to be output by the RF section 44-202. Address [6:2]=10 controls (e.g., via a multiplexer) the signal that the RF section 44-202 provides on the SGNMAG signal line. The default is the sign bit and magnitude bit information, while the alternative is the OSCCLK signal.

Bits 2-7 in the message format shown in Table 4 are power control bits. Those bits control whether particular hardware elements in the RF section 44-202 are powered-up or powered-down. The bits may be transferred from the shift register in the RF section 44-202 and applied to power control circuits that apply or remove power from specific hardware elements. For example, bit 5, the PLL_Pwr bit, controls power for a phase locked loop (PLL) circuit and frequency divider in the RF section 44-202. When the RF section 44-202 receives a message that has bit 5 cleared, the RF section 44-202 may remove power from the PLL and divider circuitry by opening a switch through which power flows, driving a power regulator control pin, or through another mechanism. Similarly, when the RF section 44-202 receives a message that has bit 5 set, the RF section 44-202 may apply power to the PLL and divider circuitry by closing the switch, enabling the power regulator, or the like.

While the message format provides five power control bits for (2, 3, 4, 5, and 7), more or fewer power control bits may be provided depending on the implementation. Each bit specifies a power control state (e.g., power-up or power-down) for one or more sections of pre-selected circuitry in the RF section 44-202. Furthermore, in other implementations, multiple bits may be employed to specify a power state that includes multiple levels of power control. Thus, for example, two bits may be employed to specify one of four different power states for a particular set of circuitry in the RF section 44-202.

While Tables 2-8 provide one example of message formats, many other implementations are also possible. Shown below in Tables 9-11 is another exemplary format that employs 54-bit messages without using a 2-bit message block definition.

TABLE 9

Message Structure

| Bit # <0:55> | Field Name | Length (bits) | Contents | Function | Default |
|---|---|---|---|---|---|
| 55 | Tst_Ref_Div | 1 | 0 = normal operation<br>1 = connect reference divider output to test output pin (e.g., scan data output). | Reference divider scan test | 0 |
| 54 | ID_Read | 1 | 0 = normal operation<br>1 = revision number output to test output pin (e.g., scan data output). | Chip ID read function | 0 |
| 53 | IF_TestMux | 1 | 0 = AGC Test Point<br>1 = Mixer Test Point | Selects either AGC Test Point or Mixer Test Point to TP_IF pin if Mode is set to 11 (IF Test Point Enable). | 0 |
| 52-29 | NUM[23:0] | 24 | x000000 to xFFFFFF | Numerator of the fractional part of the loop divisor | X898232 |
| 28-21 | ND[7:0] | 8 | x00 to xFF | Synthesizer integer part of loop divider | x5A |
| 20-18 | SPARE | 3 | (default) | Not Used | x0 |
| 17-14 | CP[3:0] | 4 | See Table 11 | Synthesizer Charge pump output current, and test modes | 1011 |
| 13 | PD_POL | 1 | 1 = positive<br>0 = negative | Phase detector polarity | 1 |
| 12-11 | ACC[1:0] | 2 | 00 = 3 Fractional Accumulators<br>01 = 2 Fractional Accumulators<br>10 = Integer Divider, 0 Accumulators<br>11 = Integer Divider. 0 Accumulators | | 00 |

TABLE 9-continued

Message Structure

| Bit # <0:55> | Field Name | Length (bits) | Contents | Function | Default |
|---|---|---|---|---|---|
| 10 | SPARE | 1 | Pad with zeros | Not Used | 1 |
| 9 | CMOS_PECLB | 1 | 1 = CMOS output buffer selected<br>0 = PECL output buffer selected | Selects the CMOS or PECL output buffer. | 0 |
| 8 | DIV32_EN | 1 | 1 = enable<br>0 = disable | Divide by 32 enable | 1 |

TABLE 10

FAST Mode Bits - Power Control

| Bit # <0:55> | Field Name | Length (bits) | Contents | Function | Default |
|---|---|---|---|---|---|
| 7 | Ref_Osc_EN | 1 | 1 = enable<br>0 = disable | Power control for the clock oscillator and buffer section in the RF section 44-202 | 1 |
| 6 | RX_Chain_EN | 1 | 1 = enable<br>0 = disable | Power control for the radio frequency amplifier (RFA), Mixer, AGC amp, and ADC in the RF section 202, Enables ACQCLK, SIGN, and MAG outputs. | 1 |
| 5 | LNA_EN | 1 | 1 = enable<br>0 = disable | Power control for the LNA Amplifier circuit in the RF section 44-202. | 1 |
| 4 | CLKGPS_BN | 1 | 1 = enable<br>0 = disable | Power control for the CLKGPS, and PECL reference if PECL is selected. | 1 |
| 3 | Synth_EN | 1 | 1 = enable<br>0 = disable | Power control for the Charge Pump, Phase Detector, Prescaler, and Logic in the RF section 44-202. | 1 |
| 2 | VCO_EN | 1 | 1 = enable<br>0 = disable | Power control for the VCO circuit in the RF section 44-202. | 1 |
| 1-0 | Mode[1:0] | 2 | 00 = GPS Clock Only Mode<br>01 = Normal Operating Mode<br>10 = Standby Mode (Sleep)<br>11 = IF Test Point Enable | Sets up the operating mode of the RF section 44-202. | 00 |

TABLE 11

Charge Pump Programming Fields

| cp<3> | cp<2> | cp<1> | cp<0> | |
|---|---|---|---|---|
| 1 | 0 | 0 | 0 | 50 uA, Normal operation of charge pump |
| 1 | 0 | 0 | 1 | 100 uA, Normal operation of charge pump |
| 1 | 0 | 1 | 0 | 300 uA, Normal operation of charge pump |
| 1 | 0 | 1 | 1 | 500 uA, Normal operation of charge pump |
| 1 | 1 | 0 | 0 | 700 uA, Normal operation of charge pump |
| 1 | 1 | 0 | 1 | 900 uA, Normal operation of charge pump |
| 0 | 0 | 1 | 1 | Test mode: all charge pump outputs source current |
| 0 | 0 | 0 | 1 | Test mode: all charge pump outputs sink current |
| 0 | 1 | 1 | 1 | Test mode: all charge pump outputs source and sink current simultaneously. |

Tables 9-11 show an implementation in which the last eight bits of the message are power control bits. Thus, power control may be communicated through a fast message as set forth previously. As noted above, the power control bits determine whether particular hardware elements in the RF section 44-202 are powered-up or powered-down. The power control bits are not limited to controlling the hardware blocks described in Table 10 (or Table 4). Instead, depending on the implementation, the power control bits may be established in the message to control power to any desired hardware circuitry that will be incorporated into the RF section 44-202.

The baseband section 44-204 may thereby establish a detailed control over the power consumed by the RF section 44-202. In other words, the baseband section 44-204 may determine, at any given time, those hardware blocks in the RF section 44-202 that will operate, and those that will be powered down. As a result, the RF section 44-202 will consume less average power than an RF section in which all the hardware blocks operate continuously. Such power control is very useful in battery operated devices, or in any other SPS enabled device with a limited power supply.

FIG. 47 is a flow diagram 47-500 for a method for interfacing the RF section 44-202 and the baseband section 44-204. In particular, with regard to the serial transmission of SPS signal samples to the baseband section 44-204, the RF section 44-202 places a sign bit 45-306 on the SGNMAG signal line (step 47-502), then provides a falling edge 45-310 on the ACQCLK line (step 47-504). Subsequently, the RF section 44-202 places a magnitude bit 45-308 on the SGNMAG signal line (step 47-506), then provides a rising edge 45-312 on the ACQCLK line (step 47-508). This sequence repeats for each sign bit and magnitude bit sample pair transmitted to the baseband section 44-204. SPS signal data is thereby serially transferred to the baseband section 44-204.

With regard to message transmission between the RF section 44-202 and the baseband section 44-204, the master device (typically the baseband section 44-204) determines whether it needs to send or receive data over the message serial interface 44-208 (step 47-510). If so, the baseband section 44-204 determines if the message is a fast write message (step 47-512). If the message is a fast write message, then the baseband section 44-204 (if it is transmitting data) or the RF section 44-202 (if it is transmitting data) serially places 8 data bits on the appropriate serial message data line. Each data bit is shifted in by a message clock 46-404 transition for each data bit (step 47-514). Otherwise, the baseband section 44-204 or the RF section 44-202 serially places all the data bits (e.g., 32 or 56 data bits) on the appropriate serial message line, with each data bit accompanied by a message clock 404 transition (step 47-516).

The slave select signal line may be used to transfer timing between the baseband section 44-204 and the RF section 44-202. In particular, the COUNT[19:0] output (see Table 6, Out_Dat=8) represents the value of a counter present in the RF section 44-202 that reveals the sampling phase of the dual slope A/D converter in the RF section 44-202. The slave select signal line is connected to circuitry in the RF section 44-202 that latches DSP timing. Thus, the COUNT value is the value in the counter at the time the slave select signal causes the message that requests the COUNT output to latch the COUNT value into the shift register for transmission. In the baseband section 44-204, the slave select signal latches a counter (or another representation of time) when the slave selected signal is de-asserted (which is also when the RF section 44-202 latches COUNT).

The A/D sample timing may thereby be related to the baseband section 44-204 timing. The SHIFT[19:0] input (see Table 8, Address=6) is used to shift the A/D timing to a desired offset from the baseband section 44-204 timing. As a result, the baseband section 44-204 may change the timing of the RF section 44-202 circuitry without additional interface lines.

Thus, systems and methods consistent with the invention provide power control messaging (and methods of operating or providing interfaces) between an RF processing section 44-202 and a baseband processing section 44-204. The messaging may be employed for many different purposes, and is particularly useful as part of general power control in an SPS device to reduce average power consumption and extend power supply life.

Typically, powering down as much of the RF section 44-202 as possible except when taking SPS signal samples helps reduce average power consumption. Taking the samples may in some instances occupy a time span as short as 10-20 ms in strong signal environments outdoors, or 48-100 ms in less favorable conditions outdoors. Indoors, the RF section 44-202 may operate for a time span on the order of a few seconds to obtain SPS signal samples, particularly for when the signal is weak. Note also that powering down the RF oscillator 44-212 when the baseband section 44-204 enters its own power down mode may also reduce power consumption.

More specifically, an exemplary operational sequence, including power control may proceed as shown below in Table 12:

TABLE 12

| Operational Step | Description |
| --- | --- |
| Initial Powerup | An alarm, timer, or wakeup circuit connected to or incorporated into the RF section 44-202 or baseband section 44-204 turns on a power supply connected to the RF section 44-202 and the baseband section 44-204. |
| Baseband Start | The RF oscillator 44-212 powers up and provides a clock signal to the baseband section 44-204. The baseband section 44-204 boots up using the clock signal. |
| Baseband Initialization | The baseband section 44-204 performs housekeeping tasks, Input/Output initialization, or other processing in preparation for RF section 44-202 startup. |
| RF Synthesizer Startup | The baseband section 44-204 powers up the RF clock synthesizer in the RF section 44-202 and waits a pre-determined time for the RF clock synthesizer to stabilize. |
| RF Circuitry Startup | The baseband section 44-204 turns on power to the LNA, AGC, A/D, and other selected circuitry in the RF section 44-202 and waits a pre-determined time for those sections to stabilize. |

TABLE 12-continued

| Operational Step | Description |
| --- | --- |
| Sampling | The baseband section 44-204 starts taking data samples from the RF section 44-202. |
| Storage | In some modes of operation, the baseband section 44-204 directs storage of a block of data samples obtained from the RF section 44-202. |
| RF Circuitry Shutdown | The baseband section 44-204 turns off the LNA, AGC, A/D and RF clock synthesizer circuitry in the RF section 46-202. |
| GPS Measurement | The baseband section 44-204 directs processing of the stored data samples in order to extract GPS measurements from the data samples. |
| Location Update | The baseband section 44-204 determines a position update and delivers the update to a recipient over an Input/Output interface. |
| Wakeup Programming | The baseband section 44-204 programs the timer, alarm, or wakeup circuit for the next wake up alarm and begins shutdown. |
| Shutdown | The baseband section 46-204 initiates shutdown, gates off clocks, and powers down the RF section 44-202 and the baseband section 44-204 (except for the wakeup alarm circuitry). |

Transparent memory sharing is provided herein in which components of an electronic system, for example the GPS system, dynamically reallocate one or more memory areas for sharing among components of the system. Prespecified memory blocks of the memory areas are dynamically reallocated among components of the system using one or more reallocation methods in response to the changing memory requirements of the components. The memory reallocation/sharing is transparent to software of the host system. As an example, groups of memory locations or addresses, also referred to as memory blocks, can be shared by a first processor and a second processor. The first processor includes, for example, a central processor or microprocessor configured to access a first memory area, while the second processor might include a digital signal processor (DSP) configured to access a second memory area. The memory sharing provides the processor direct access, indirect access, and combination direct/indirect access to the second memory area, as described below.

Figure 48:
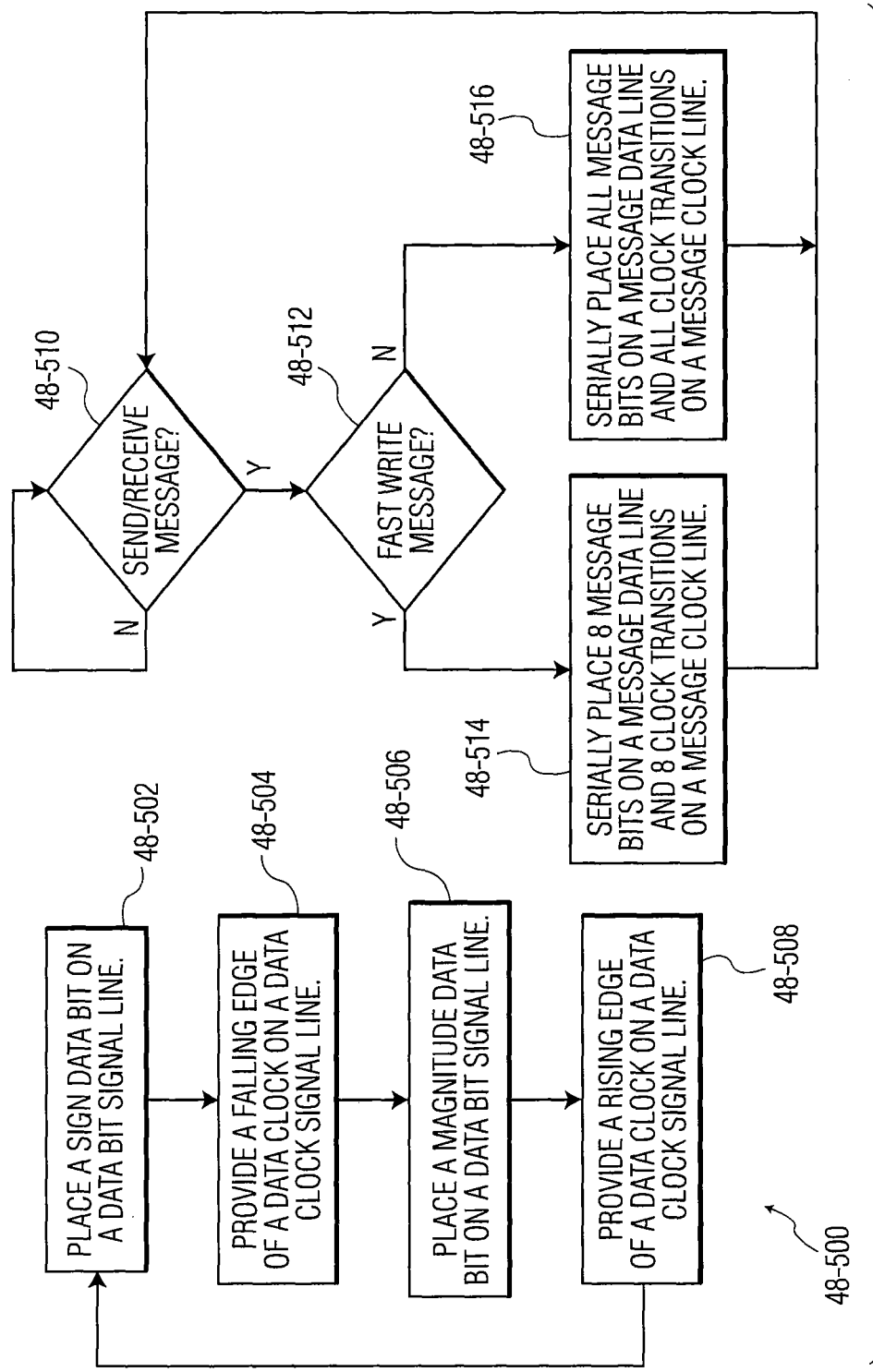
FIG. 48 is a block diagram of an electronic system supporting core memory partitioning and sharing among components including multiple processors, under an embodiment.

FIG. 48 is a block diagram showing core memory reallocation for sharing among components of an electronic system 48-100, under an embodiment. Generally, the electronic system 48-100 includes a first processor 48-112 and a first memory area 48-114 coupled to a first bus 48-102, as an example. In operation the first processor 48-112 accesses the first memory area 48-114 via the first bus 48-102 in order to write processor data to and read from the first memory area 48-114.

A second processor 48-122 is coupled to the first bus 48-102 through a combination of a second bus 48-104 and a bridge unit 48-132. The second processor is also coupled to a second memory area 48-124. In operation the second processor 48-122 directly accesses the second memory area 48-124 in order to write data of the second processor to and read from the second memory area 48-124.

The core memory sharing described herein allows the first processor 48-112 to dynamically reallocate some block of the second memory area 48-124 for use in storing data of the first processor 48-112 using any of a number of memory reallocation methods. One method of memory reallocation referred to herein as mapping reallocation maps prespecified memory locations 48-124a of the second memory area 48-124 through the bridge unit 48-132 for access by the first processor via the second bus 48-104 and the second processor 48-122. Another method of memory reallocation referred to herein as switching reallocation provides the first processor 48-112 with direct access of prespecified memory locations 48-124a of the second memory area 48-124 via the first bus 48-102. An additional method of memory reallocation simultaneously supports mapping and switching reallocation of memory locations of the second memory area 48-124. These memory reallocation methods and their corresponding system configurations are described further below.

The processors 48-112 and 48-122 include any collection of computing components and devices operating together, as is known in the art. The processors 48-112 and 48-122 can also be components or subsystems within a larger computer system or network. The processors 48-112 and 48-122 can also be coupled among any number of components (not shown) known in the art, for example other buses, controllers, memory devices, and data input/output (I/O) devices, in any number of combinations.

Likewise, the first 48-114 and second 48-124 memory areas include any collection of memory devices or portions of memory devices operating together in collocated and/or distributed fashion, as is known in the art. The memory areas 48-114 and 48-124 can also be components or subsystems within a larger computer system or network memory. The memory areas 48-114 and 48-124 can also be coupled among any number of components (not shown) known in the art, for example other buses, controllers, memory devices, and data input/output (I/O) devices, in any number of combinations.

The buses 48-102 and 48-104 can include any medium by which files are communicated or transferred between the processing systems or components of processing systems. Therefore, the paths represented by the buses 48-102 and 48-104 include wireless connections, wired and/or trace connections, and hybrid wireless/wired connections. The paths also include couplings or connections to other systems as well as networks including local area networks (LANs), metropolitan area networks (MANs), wide area networks (WANs), proprietary networks, and interoffice or backend networks.

Further to the electronic system 48-100 is a system configuration in which the first processor 48-112 includes a central processing unit (CPU) or processor like, for example, an ARM microprocessor, alternatively referred to herein as an ARM or a microprocessor. Additionally, the second processor 48-122 includes a digital signal processor (DSP), but is not so limited. The first 48-114 and second 48-124 memory areas of this example include areas or memory locations of random access memory (RAM), but can include areas of numerous other types of memory/memory devices known in the art. While the first and second memory areas are shown herein as two separate areas or two separate devices, alternative embodiments of the memory sharing described herein can include any number of memory locations distributed among any number/combination of memory devices. A description follows of core memory sharing among the processor and the DSP of this system configuration.

Figure 49:
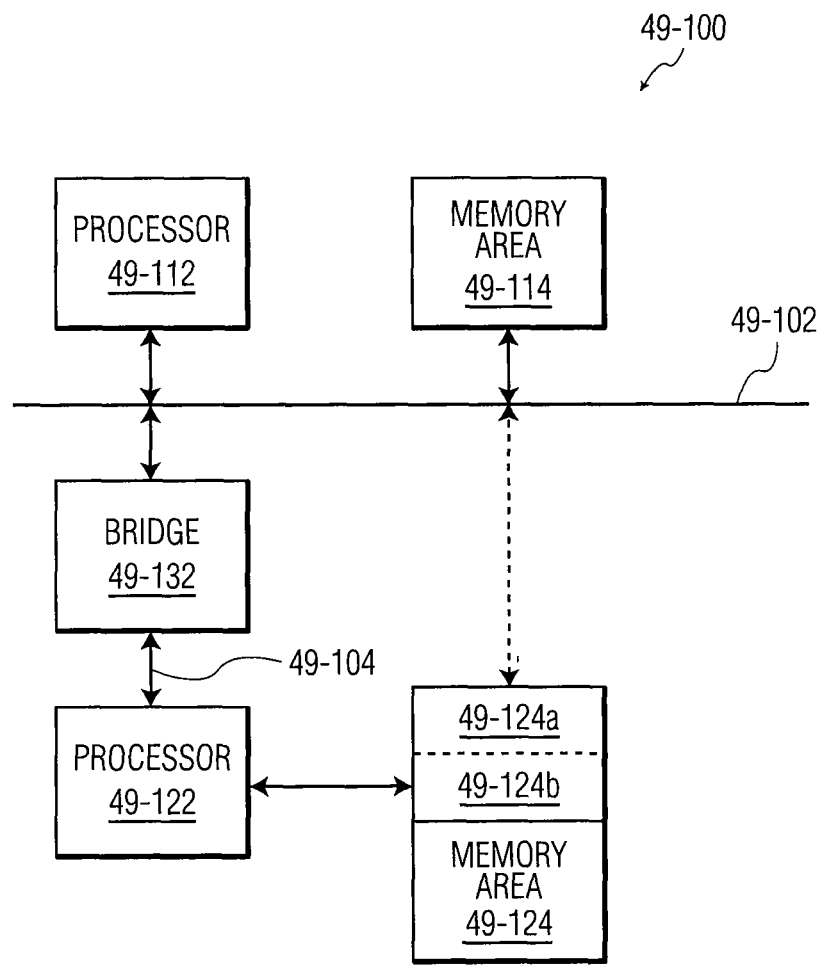
FIG. 49 is a block diagram of an electronic system configuration having memory areas dedicated to each of a central processor and a digital signal processor (DSP), under an embodiment.

FIG. 49 is a block diagram of an electronic system 49-200 having memory areas 49-214 and 49-224 dedicated to each of a processor 49-212 and a DSP 49-222, respectively. The processor of an embodiment is an ARM processor 49-212, but the embodiment is not so limited as any type of processor 49-212 can be used in the system 49-200. A first data bus 49-202 couples the processor 49-212 to a memory area 49-214 via a memory controller OnRAM 49-250. The memory area 49-214 is referred to herein as processor memory 49-214 or, alternatively, ARM random access memory (RAM) 49-214. The first data bus 49-202, also referred to herein as the processor bus 49-202, supports the transfer of information or data among devices coupled to the processor bus 49-202 in a single clock cycle, but is not so limited.

The processor bus 49-202 further couples the processor 49-212 to the DSP 49-222 via a bridge unit SBU2MOD 49-232 and a second data bus 49-204. The bridge unit SBU2MOD 49-232 is referred to herein as a DSP bridge 49-232. The second data bus 49-204 is also referred to herein as the DSP bus 49-204. The DSP 49-222 is coupled to a memory area 49-224, referred to herein as DSP memory 49-224. The processor memory 49-214 and the DSP memory 49-224 of an embodiment are RAM devices, but are not so limited. Alternative embodiments can include any type of memory device and/or any combination of memory devices/types.

The DSP 49-222 and the DSP memory 49-224 are clocked at a speed (in a DSP clock domain) that differs from that of the processor 49-212 and the devices coupled to the processor bus 49-202 (in a processor clock domain). In an embodiment, the clock speed/domain of the DSP 49-222 and the DSP memory 49-224 is slower than that of the processor 49-212, but is not so limited. Consequently, data transfer from the DSP bridge 49-232 across the DSP bus 49-204 is slower relative to the data transfer across the processor bus 49-202. Further, the DSP bridge 49-232 of an embodiment is an asynchronous bridge because of the difference in clock speeds among components coupled to the processor bus 49-202 and components coupled to the DSP bus 49-204, but is not so limited.

Various alternative embodiments can clock the components of the system 49-200 using any number/combination of clock speeds; for example, one embodiment may clock the processor 49-212, the DSP 49-222, and DSP memory 49-224 at approximately equal speeds, while another embodiment may clock the processor 49-212 at a slower speed than the DSP 49-222 and/or the DSP memory 49-224.

The system 49-200 further includes at least one memory configuration register RAM Share 49-252 coupled to the processor bus 49-202. The memory configuration register 49-252, also referred to herein as a configuration register 49-252, couples to the processor bus 49-202 via a second bridge unit SBUMOD 49-234 and stores information for use by at least one of the processor 49-212, a decoder 49-242, and the DSP bridge 49-232 in controlling or managing the configuration of the DSP memory 224 as described below.

The decoder 49-242 is coupled among the processor bus 49-202, the DSP bridge 49-232, and the memory controller 49-250, but is not so limited. The decoder 49-242 receives addresses associated with data on the processor bus 49-202 and, in response, controls or manages the writing of data to and reading of data from the appropriate memory area in accordance with information of the memory configuration register 49-252. The decoder 49-242 controls the reading/writing of data to the processor memory 49-214 via control line 49-243 coupled between the decoder 49-242 and the memory controller 49-250. The decoder 49-242 controls the reading/writing of data to the DSP memory 49-224 via control line 49-244 and control line 49-245 coupled between the decoder 49-242 and the DSP bridge 49-232 as appropriate to the configuration of the DSP memory 49-224.

The DSP memory sharing of this system 49-200 generally allows the processor 49-212 to either directly access (in the processor clock domain) the DSP memory 49-224 on the processor bus 49-202 and/or indirectly access the DSP memory 49-224 (in the DSP clock domain) on the DSP bus 49-204. The direct access is accomplished by switching the upper 32-kbytes of DSP memory 49-224 from the DSP clock domain to the processor clock domain. The indirect access is accomplished by mapping blocks from the upper portion of the DSP memory 49-224 through the DSP bridge 49-232.

The DSP bridge 49-232 arbitrates between processor soft mapping access and DSP core access to the DSP memory. Further, the DSP bridge 49-232 supports indirect access to the DSP memory by the processor at address 0xC000_0000 (no soft mapping of processor addresses). The DSP bridge 49-232 also supports indirect access by the processor of the upper 64 kbytes of the DSP memory in the address range 0x6001_0000 to 0x6001_FFFF through soft mapping. Additionally, the DSP bridge 49-232 detects DSP memory read or write access violations based on DSP memory sharing control bits, generates violation status bits as appropriate, and generates processor abort cycles if enabled to do so during read or write access violations.

The configuration information of the memory configuration register 49-252 includes information of prespecified memory sharing configurations, but is not so limited. The processor 49-212, running under software control, selects a memory configuration appropriate to a state of the system 49-200 and sets bits of at least one register of the memory configuration register 49-252 in accordance with the selected memory configuration. In an embodiment, the configuration information corresponds to state information of the host electronic system so that the memory can be reallocated and shared according to different operating states of the host system when the different operating states have different memory requirements. Therefore, reallocation of the memory areas among components of the host system occurs in response to changes in operating states of the host system.

As an example of an apparatus and/or system using the memory sharing described above, the host systems can be systems that include one or more processors in need of efficient memory management. Examples of such devices/systems includes but is not limited to portable communication devices, portable position tracking devices, cellular telephones, cellular telephones coupled to and/or integrated with position tracking devices, mobile electronic devices, mobile communication devices, personal digital assistants, and other processor-based devices.

Consider as a specific example a mobile communication device like a cellular telephone that includes a positioning system like a Global Positioning System (GPS) receiver. In this type of system, the processor 49-212 described above corresponds to the central processing unit (CPU) of the communication device while the DSP 49-222 corresponds to a signal processor dedicated to processing GPS signals and receiver information. A GPS receiver has multiple modes of operation (e.g., cold start, warm start, hot start, etc.), all of which can have vastly different memory requirements. The memory reallocation and sharing of an embodiment allows for efficient use of the limited memory of such a portable device by allowing at least one area of device memory to be reallocated among the CPU and the DSP as appropriate to the operating state of the host device. The memory reallocation is transparent to the operating system software of the host device so that the operating system software sees a CPU memory map and a DSP memory map as configured by the memory configuration register 49-252 in response to the state of the host device.

Figure 50:
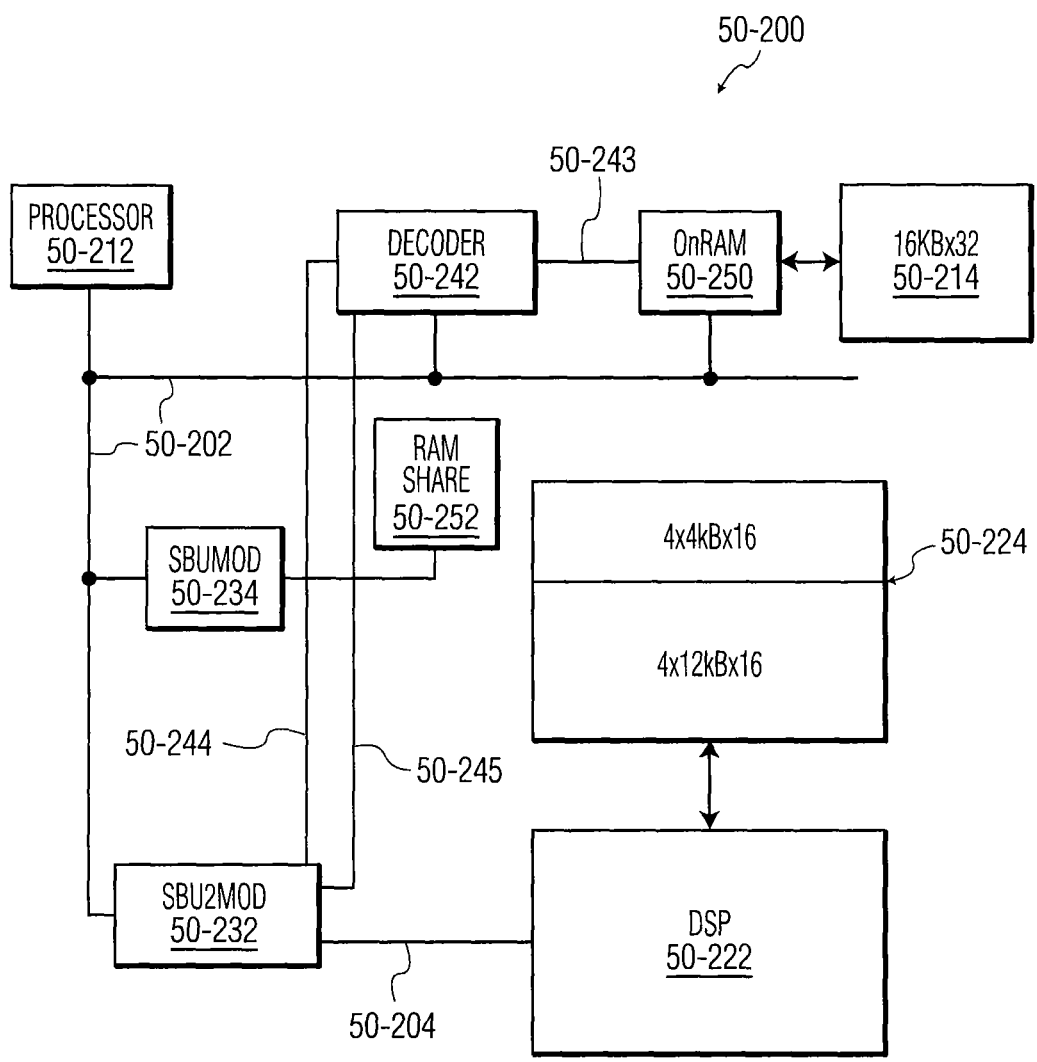
FIG. 50 is a block diagram of a core memory configuration following start/boot-up of the host electronic system, under an embodiment.

FIG. 50 is a block diagram 50-300 of a memory configuration following start/boot-up of the electronic system 49-200. At system start, also referred to as boot-up, the processor memory 49-214 includes 64 kilobytes (kbytes) of memory (as configured by a processor memory map) while the DSP memory 49-224 includes 128 kbytes of memory (as configured by a DSP memory map). The processor 49-212 sees the processor memory 49-214 at a base address of 0x6000_0000, but alternative embodiments can assign any base address to the processor memory 49-214 as appropriate to the memory type. Likewise, the DSP 49-222 sees the DSP memory 49-224 at a base address of 0xC020_0000, but alternative embodiments can assign any base address to the DSP memory 49-224 as appropriate to the memory type.

As described herein, the memory sharing of an embodiment supports the processor 49-212 reading to and writing from the DSP memory 49-224. Consequently, the processor 49-212 can see the DSP memory 49-224 through the DSP bridge 49-232 at system boot-up. The processor sees the DSP memory 49-224 at a base address of 0xC020_0000, for example, but alternative embodiments can use any base address for the DSP memory 49-224.

The memory of an embodiment includes memory protection features to alert the host system when the processor 49-212 and/or the DSP 49-222 attempt to access memory locations of their respective memories that are beyond address boundaries corresponding to a particular memory configuration. The memory protection features include, but are not limited to, interrupt generation using an interrupt address boundary Int 50-360 and abort generation using an abort address boundary A 50-362. The memory protection features are described below with reference to the memory reallocation examples.

In operation when the processor 49-212 requires additional memory for storage of processor data, the processor 49-212 can reallocate at least one area or set of memory locations of the DSP memory 49-224 for use in storing processor data. Generally, two methods of reallocating the DSP memory 49-224 are available. A first reallocation method uses at least one memory map to map prespecified addresses from the DSP memory address space to the processor memory address space through the DSP bridge 49-232. This first reallocation method is referred to herein as the mapping reallocation method. The mapping of memory through the DSP bridge 49-232 supports the incremental reallocation of as many as eight blocks of memory, where each block includes up to approximately 8 kbytes, but the embodiment is not so limited. Access to the reallocated memory by the processor 49-212 is made via the DSP bridge 49-232, the DSP bus 49-204, and components (not shown) of the DSP 49-222.

A second reallocation method switches prespecified memory addresses from the DSP memory address space of the DSP bus 49-204 to the processor bus 49-202. This second reallocation method is referred to herein as the switching reallocation method. The switching reallocation method also uses memory mapping to place reallocated memory into contiguous processor memory address space. However, as described further below, this mapping is performed via a memory interface (described below with reference to FIGS. 55 and 57) coupled directly to the processor bus 49-202, thereby supporting relatively faster access to the reallocated memory than the mapping reallocation method. The switching reallocation method supports the reallocation of a block of memory, where the block includes up to approximately 32 kbytes, but the embodiment is not so limited.

Additional reallocation methods and configurations can be realized from combinations of the mapping and switching reallocation methods using the descriptions provided herein. An example is described below of a system configuration that uses both the mapping and switching reallocation methods, but the alternative embodiments are not limited to this configuration.

Figure 51:
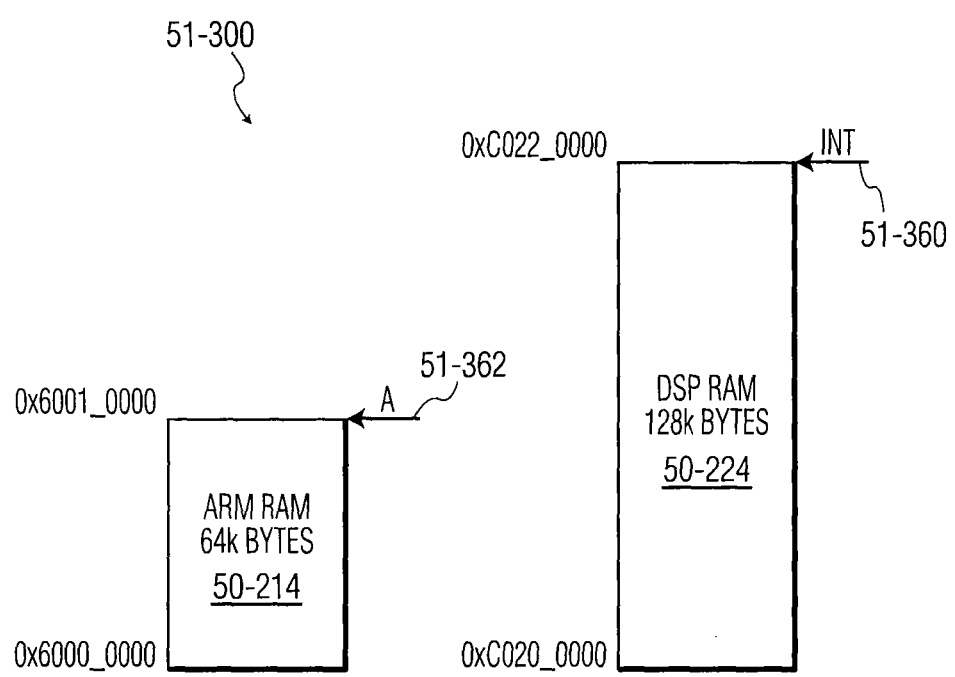
FIG. 51 is a block diagram of an electronic system including a memory that is partitioned for sharing between the central processor and the DSP, under an embodiment.

As described above, the core memory sharing of an embodiment allows the processor 49-212 to dynamically reallocate or reconfigure some portion of the DSP memory 49-224 for use in storing data of the processor 49-212 using mapping reallocation. The mapping reallocation includes a system configuration in which prespecified memory locations of the DSP memory 49-224 are mapped through the DSP bridge 49-232 for access by the processor 49-212 via the DSP bus 49-204 and the DSP 49-222. FIG. 51 is a block diagram of an electronic system configuration 51-400 that reallocates some portion of the DSP memory 51-424b for use by the processor 49-212 via the DSP bridge 49-232 and DSP bus 49-204, under the embodiment of FIG. 51.

Figure 52:
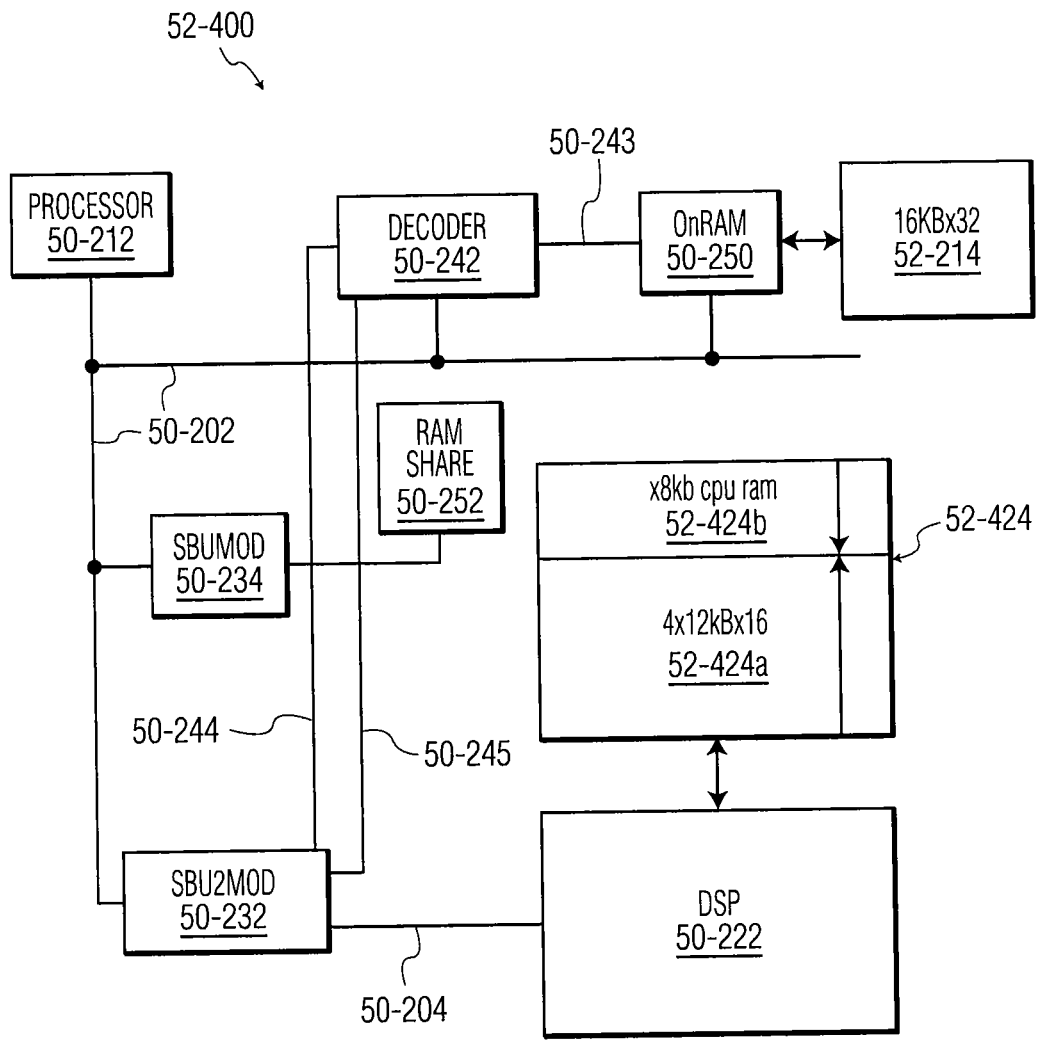
FIG. 52 is a block diagram of a memory configuration in which a first block of DSP memory is reallocated from the DSP address space to the processor address space using mapping reallocation, under an embodiment.
Figure 53A:
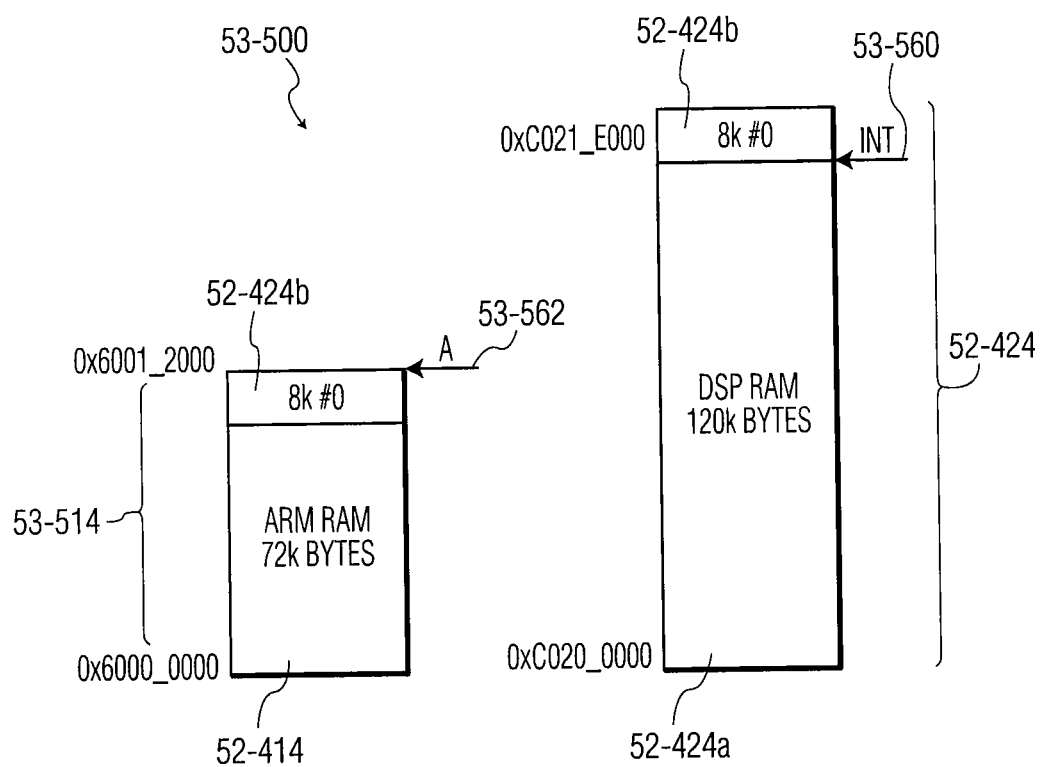
FIG. 53A is a block diagram of a memory configuration in which a number n of memory blocks of DSP memory are reallocated from the DSP address space to the processor address space using mapping reallocation, under an embodiment.

Generally, the system 51-400 uses at least one memory map to map prespecified addresses or blocks 51-424b from the DSP memory address space 51-424 to the processor memory address space 51-414 through the DSP bridge 49-232. The reallocation of the DSP memory 51-424b is performed in response to information of the configuration register 49-252, as described below. The reallocation of an embodiment supports the incremental reallocation of as many as eight blocks of memory, where each block includes up to approximately 8 kbytes of memory, but the embodiment is not so limited. FIG. 52A is a block diagram 52-500 of memory reallocation in which a block of DSP memory 51-424b is reallocated from the DSP address space 51-424 to the processor address space 51-414 through the bridge unit, under the embodiment of FIG. 51. FIG. 53A is a block diagram 53-600 of memory reallocation in which a block of DSP memory 51-424b that includes a number n (where n equals eight in this example) of memory blocks is reallocated from the DSP address space 51-424 to the processor address space 51-414 through the bridge unit, under the embodiment of FIG. 51.

Figure 54A:
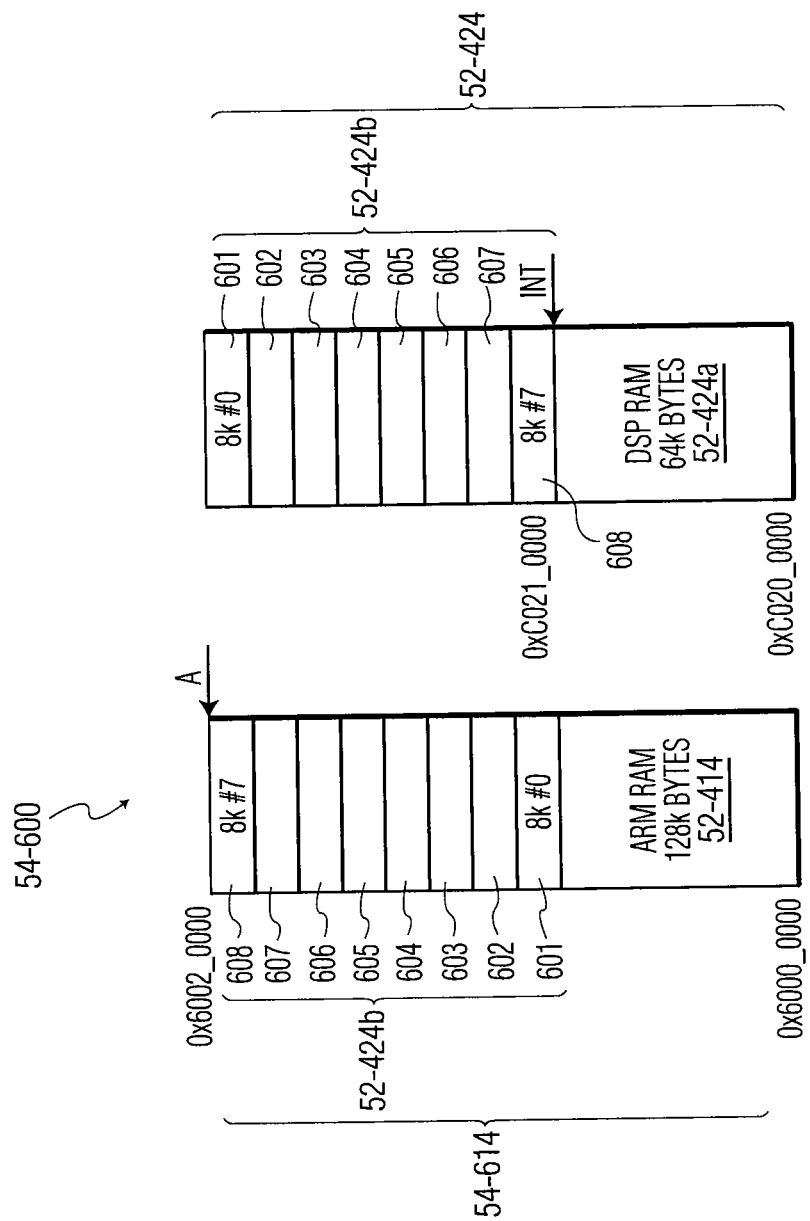
FIG. 54 is a block diagram of a memory area following partitioning and reallocation along with the associated memory loading orders, under an embodiment.

With reference to FIG. 52A, this mapping example shows the reallocation of an 8-kbyte memory block 51-424b from the DSP memory 51-424 to the processor memory 51-414. The starting memory configuration of this example, with reference to FIG. 50, includes 128 kbytes of DSP memory 51-424 and 64 kbytes of processor memory 51-414, but memory of any configuration can be reallocated as described herein. Upon reallocation, a memory block 51-424b (8 kbytes) is removed from the top of DSP memory 51-424, so that the DSP now sees a contiguous block of memory 51-424a that is approximately 120 kbytes in size (128 kbytes−8 kbytes=120 kbytes). The reallocated memory block 51-424b is added to the core processor memory 51-414, and the processor now sees a contiguous block of memory 52-514 that is approximately 72 kbytes in size (64 kbytes+8 kbytes=72 kbytes). FIG. 52B shows a memory configuration (memory map) following reallocation of the 8-kbyte block of DSP memory from the DSP address space 51-424 to the processor address space 51-414, under the embodiment of FIG. 54A. While the embodiment described reallocates 8-kbyte memory blocks, alternative embodiments can reallocate memory blocks of different sizes or combinations of memory blocks having different sizes.

The memory of an embodiment includes memory protection features to alert the host system when the processor and/or the DSP attempt to access memory locations of their respective memories that are beyond address boundaries corresponding to a particular memory configuration. The memory protection features include aborts and interrupt flags, but are not so limited. Consequently, the address boundaries for the memory protection features are adjusted during the memory reallocation, As an example, the system of an embodiment generates an interrupt flag if the DSP accesses memory locations beyond a prespecified interrupt address boundary or limit that corresponds to the current memory configuration. Thus, the system adjusts the interrupt address boundary as appropriate during the memory reallocation. Returning to the example described above with reference to FIG. 52, the interrupt address boundary Int 52-560 is adjusted to an incrementally lower address in the DSP memory 51-424 to reflect removal of the memory block 51-424b from the DSP memory 51-424. Alternative embodiments can adjust the interrupt address boundary to an incrementally higher address in the DSP memory 51-424 or as otherwise appropriate to the memory addressing scheme.

As another example, the system of an embodiment generates an abort if the processor accesses memory locations beyond a prespecified abort address boundary that corresponds to the current memory configuration. Thus, the system adjusts the abort address boundary as appropriate during the memory reallocation. Returning to the example described above with reference to FIG. 52, the abort address boundary A 52-562 is adjusted to an incrementally higher address in the processor memory 52-514 to reflect the addition of the memory block 51-424b to the core processor memory 51-414. Alternative embodiments can adjust the abort address boundary to an incrementally lower address in the memory or as otherwise appropriate to the memory addressing scheme.

Figure 53B:
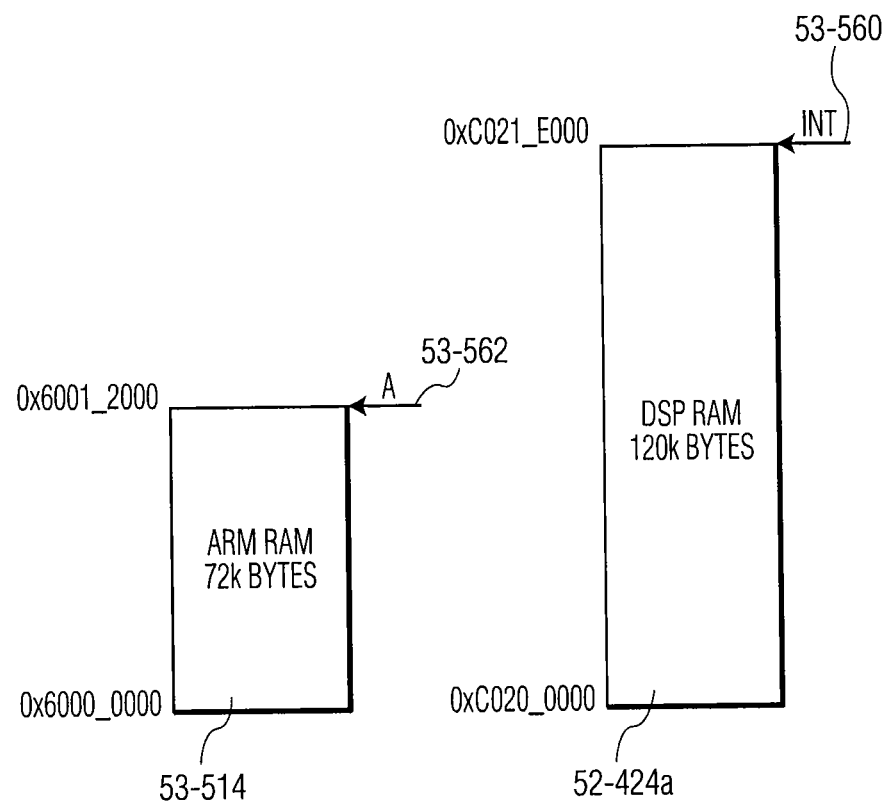
FIG. 53B shows a memory configuration (memory map) following reallocation of a 63-kbyte block of DSP memory from the DSP address space to the processor address space, under an embodiment.

Continuing with memory reallocation examples, and with reference to FIG. 53A, an alternative embodiment of memory reallocation reallocates a memory block 51-424b that includes eight 8-kbyte memory blocks 53-601 to 53-608 (64 kbytes). The starting memory configuration of this example, with reference to FIG. 50, includes 128 kbytes of DSP memory 51-424 and 64 kbytes of processor memory 51-414, but memory of any configuration can be reallocated as described herein. The memory block 51-424b is removed from the top of the DSP memory 51-424 and reallocated to the core processor memory 51-414, so that the DSP now sees a contiguous block of memory 51-424a that is approximately 64 kbytes in size (128 kbytes−64 kbytes=64 kbytes). The reallocated memory block 51-424b is added to the core processor memory 51-414, and the processor now sees a contiguous block of memory 53-614 that is approximately 128 kbytes in size (64 kbytes+64 kbytes=128 kbytes). The interrupt and abort address boundaries are adjusted as appropriate to the memory addressing scheme as described above. FIG. 53B shows a memory configuration (memory map) following reallocation of the 63-kbyte block of DSP memory from the DSP address space 51-424 to the processor address space 51-414, under the embodiment of FIG. 53A. While the embodiment described reallocates a total of eight 8-kbyte memory blocks, alternative embodiments can reallocate different numbers of memory blocks where the memory blocks have the same and/or different sizes.

The memory blocks of an embodiment are mapped in order so that memory removed from the top of DSP memory 51-424 is added to the top of core processor memory 51-414. Therefore, the DSP memory address space is reduced from top to bottom, while the address space of the processor memory grows from bottom to top. Alternative embodiments, however, can use alternative mapping schemes as known in the art.

The memory reallocation supports access to the reallocated portions of the DSP memory 51-424b by the processor 49-212 via the DSP bridge 49-232, the DSP bus 49-204, and the DSP 49-222. Information of the processor 49-212 is routed to the reallocated DSP memory 51-424b under control of the decoder 49-242. Referring again to FIG. 51, the decoder 49-242 receives information from the processor via the processor bus 49-202. The received information includes for example instructions and/or data along with associated memory addresses. The decoder uses the first four bits of the address to determine whether the associated information on the processor bus 49-202 is GPS data or processor data.

Figure 54B:
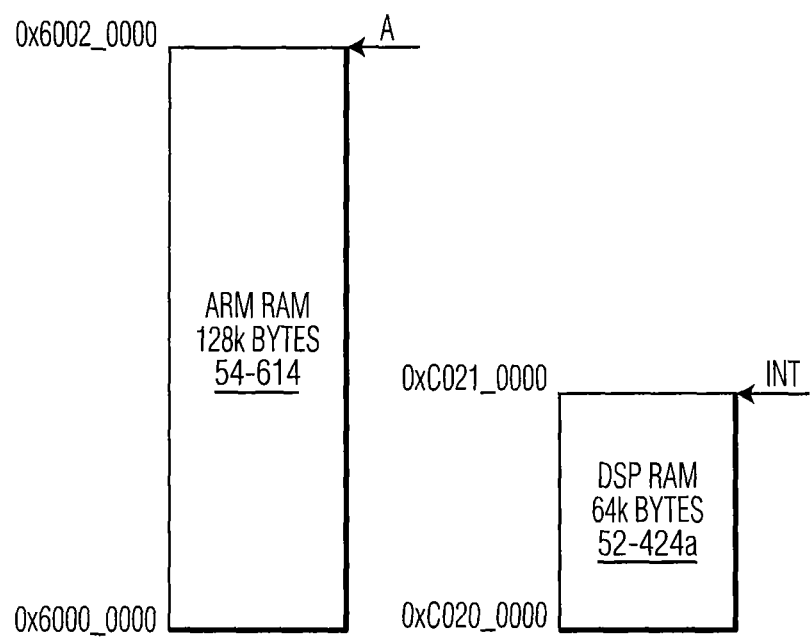

When the decoder 49-242 determines the information (data) on the bus 49-202 is GPS data, the decoder 49-242 selects the DSP bridge 49-232 (using control line 49-244) to read/receive the GPS data. Upon being selected by the decoder 49-242 via control line 49-244, some combination of components (not shown) of the DSP bridge 49-232 and the DSP 49-222 route the GPS data from the processor bus 49-202 to the appropriate memory locations of the DSP memory. FIG. 54 is a block diagram of the DSP memory following memory reallocation along with the associated memory loading orders 54-702 and 54-704, under the embodiment of FIG. 51. The GPS data of an embodiment is written to the DSP memory 51-424a in accordance with the UPS data loading order 54-702.

When the decoder 49-242 determines that received information (data) is processor data, the decoder 49-242 selects either the memory controller 49-250 or the DSP bridge 49-232 to read/receive the processor data via control line 49-243 or control line 49-245, respectively, in accordance with an address decoding scheme as follows. When the address falls between 6000_0000 and 6001_0000, the decoder 49-242 selects the processor memory 51-414 (using control line 49-243) to receive the associated information over the processor bus 49-202 and the memory controller 49-250. When the address falls between 6001_0000 and 6002_0000, the decoder 49-242 selects the reallocated block 51-424b of the DSP memory (using control line 49-245) to receive the associated information via the DSP bus 49-204 and some combination of components (not shown) of the DSP bridge 49-232 and the DSP 49-222. Various alternative embodiments can use any number of signaling lines/techniques to select the DSP bridge 49-232 and/or the memory controller 49-250 instead of the control lines 49-244 and 49-245.

When the decoder 49-242 selects the reallocated block 51-424b of the DSP memory to receive the associated information (processor data) on the processor bus 49-202, the decoder 49-242 selects the DSP bridge 49-232 using control line 49-245 to read/receive the processor data. Upon being selected by the decoder 49-242, the DSP bridge 49-232 processes and routes the processor data from the processor bus 49-202 to the appropriate memory locations of the reallocated DSP memory 51-424*b*. Processing of the data by the DSP bridge 49-232 includes, for example, inverting the address of the data, but the embodiment is not so limited. Referring again to FIG. 54, the processor data of an embodiment is written to the reallocated GPS memory 5'-424*b* in accordance with the SW access loading order 54-704.

As described above, the core memory sharing of an embodiment also includes switching reallocation. Switching reallocation switches prespecified memory addresses from the DSP memory address space of the DSP bus 49-204 to the processor bus 49-202. This reallocation method also uses memory mapping to place reallocated memory into contiguous processor memory address space. However, this mapping is through a memory interface that provides faster access to the reallocated memory relative to mapping through the DSP bridge 49-232 described above.

Figure 55:
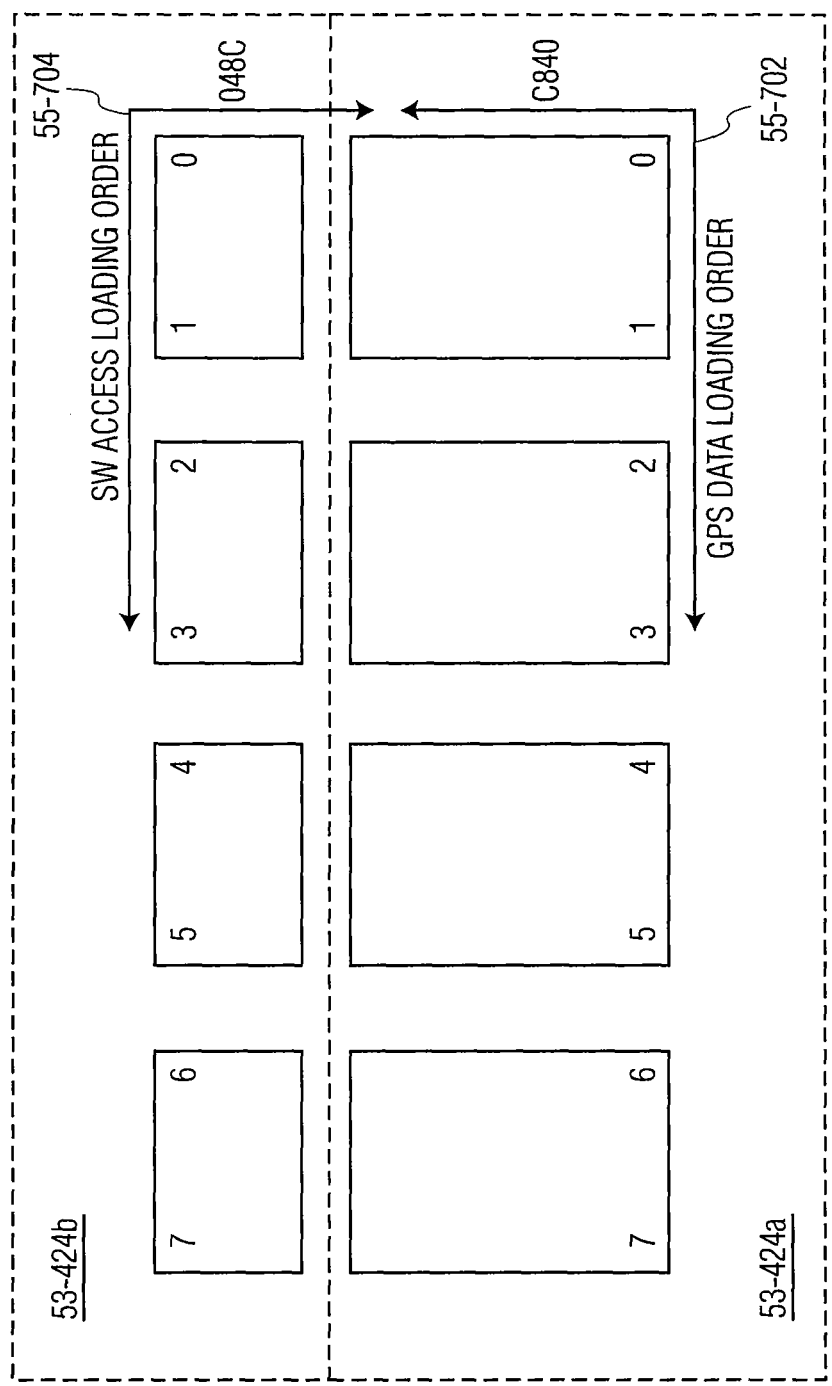
FIG. 55 is a block diagram of an electronic system configuration that reallocates some portion of memory associated with the DSP for use by the processor via switching reallocation, under and an embodiment.

FIG. 55 is a block diagram of an electronic system configuration 55-800 that reallocates some portion of DSP memory 55-824 for use by the processor 49-212 using switching reallocation via a memory interface 55-802 and the processor bus 49-202, under an embodiment of FIG. 51. The system configuration 55-800 includes a memory interface 55-802 coupled to the processor bus 49-202. The memory interface 55-802 hosts at least one memory map (not shown), but is not so limited. Components of the memory interface 55-802 switch prespecified addresses or blocks 55-824*b* from the DSP memory address space 55-824 to the processor memory address space 55-814 through use of the memory map. The reallocation of the DSP memory 55-824*b* is performed in response to information of the configuration register 49-252, as described below. The reallocated memory 55-824*b* is accessed directly by the processor via the processor bus 49-202 and the memory interface 55-802 in a relatively small number of clock cycles compared to access via the DSP bus 49-204 and the DSP 49-222.

Figure 56:
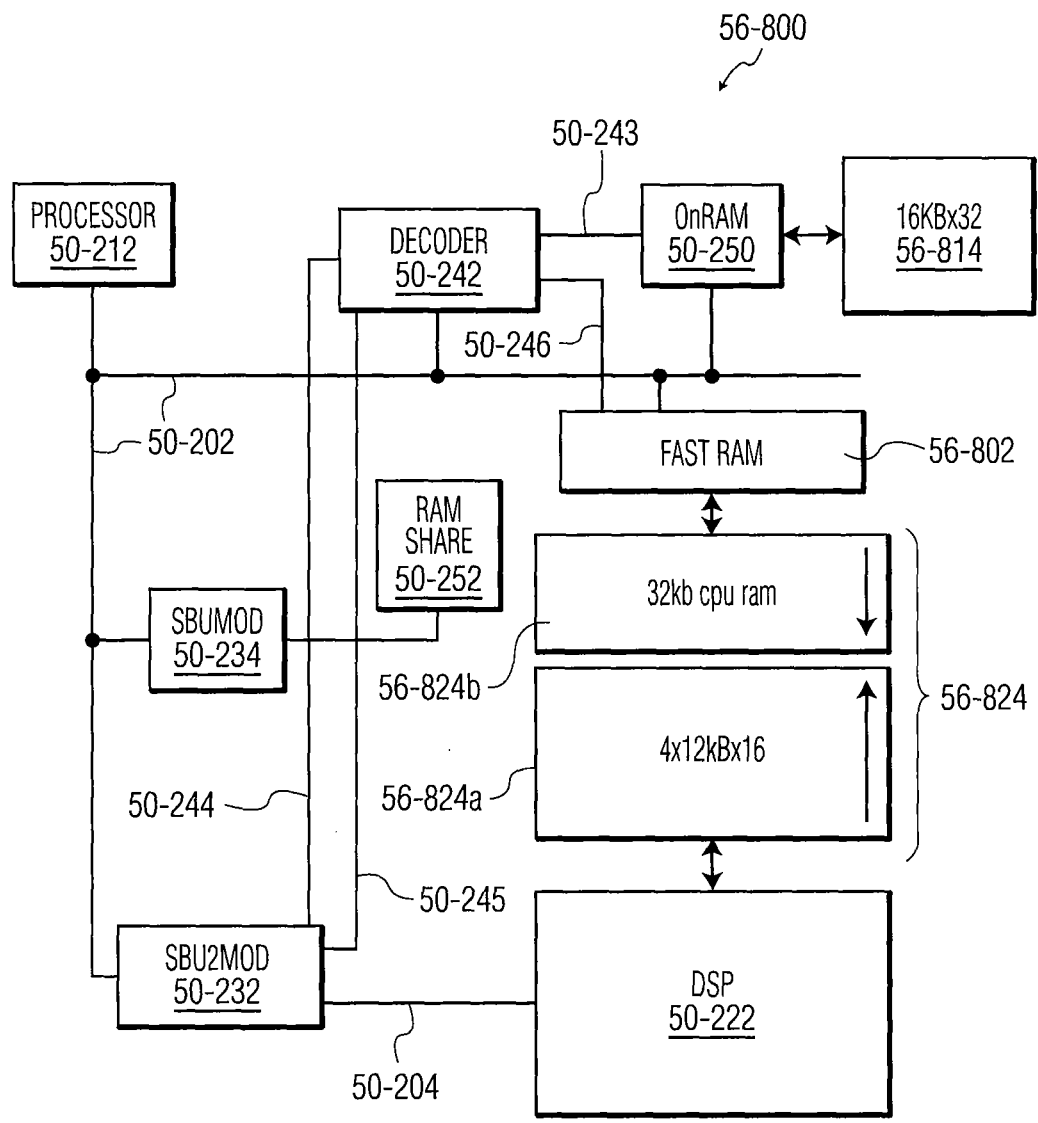
FIG. 56 is a block diagram of a memory configuration in which a block of DSP memory is reallocated form the DSP address space to the processor address space through the memory interface, under and embodiment.

The reallocation of an embodiment supports the reallocation of a block of DSP memory 55-824*b*, where the DSP memory block 55-824*b* includes up to approximately 32 kbytes of memory, but the embodiment is not so limited. Alternative embodiments can reallocate any number of blocks having any number/combination of memory locations. FIG. 56A is a block diagram 56-900 of a memory configuration in which a block of DSP memory 55-824*b* is reallocated from the DSP address space 55-824 to the processor address space 55-814 through the memory interface, under the embodiment of FIG. 55.

With reference to FIG. 56A, the following mapping example demonstrates the reallocation of a 32-kbyte memory block 55-824*b*. The starting memory configuration of this example, with reference to FIG. 50, includes 128 kbytes of DSP memory 55-824 and 64 kbytes of processor memory 55-814, but memory of any configuration can be reallocated as described herein. Upon reallocation, the memory block 55-824*b* is removed from the top of the DSP memory 55-824, so that the DSP now sees a contiguous block of memory 55-824*a* that is approximately 96 kbytes in size (128 kbytes–32 kbytes=96 kbytes). The reallocated memory block 55-824*b* is added to the core processor memory 55-814, and the processor now sees a contiguous block of memory 56-914 that is approximately 96 kbytes in size (64 kbytes+32 kbytes=96 kbytes). FIG. 56B shows a memory configuration (memory map) following reallocation of the 32-kbyte block of DSP memory from the DSP address space 55-824 to the processor address space 55-814, under the embodiment of FIG. 56A. While the embodiment described reallocates a 32-kbyte memory block, alternative embodiments can reallocate one or more memory blocks of different sizes and/or combinations of memory blocks having different sizes.

The memory of an embodiment includes memory protection features to alert the host system when the processor and/or the DSP attempt to access memory locations of their respective memories that are beyond address boundaries corresponding to a particular memory configuration. The memory protection features include aborts and interrupt flags, but are not so limited. Consequently, the address boundaries for the memory protection features are adjusted during the memory reallocation. As described above with reference to FIGS. 52 and 53, the interrupt address boundary Int 56-960 is adjusted to an incrementally lower address in the DSP memory 55-824 to reflect removal of the memory block 55-824*b* from the DSP memory 55-824. Alternative embodiments can adjust the interrupt address boundary 56-960 to an incrementally higher address in the memory or as otherwise appropriate to the memory addressing scheme. Likewise, the abort address boundary A 56-962 is adjusted to an incrementally higher address in the processor memory 56-914 to reflect the addition of the memory block 55-824*b* to the core processor memory 55-814. Alternative embodiments can adjust the abort address boundary 56-962 to an incrementally lower address in the memory or as otherwise appropriate to the memory addressing scheme.

Figure 57A:
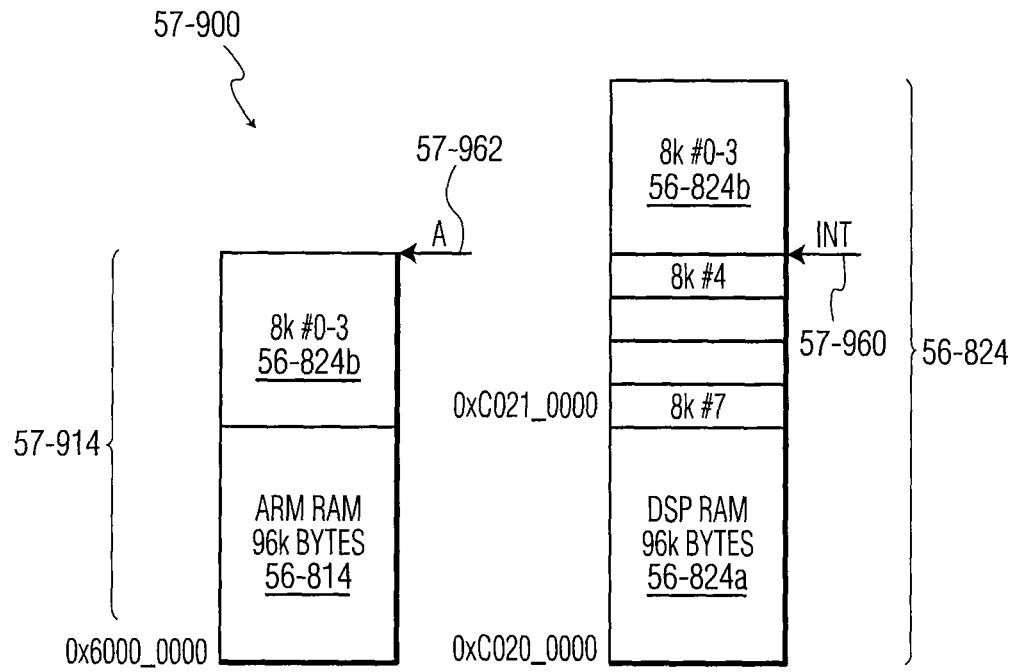
FIG. 57 is a block diagram of an example system configuration that reallocates a group or block of memory addresses using switching reallocation and another group of memory addresses using mapping reallocation, under an embodiment.
Figure 57B:
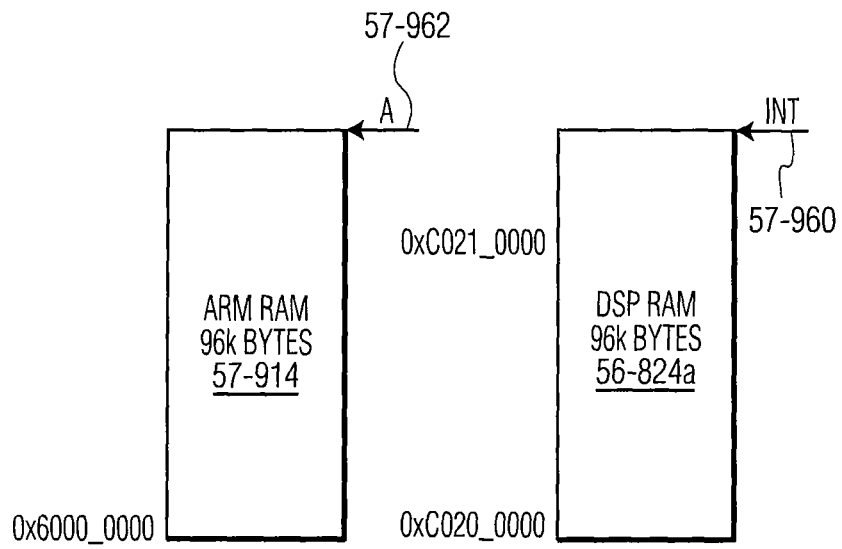

Numerous additional reallocation methods and configurations can be realized from combinations of the switching and/or mapping reallocation methods described above. For example, system configurations can reallocate memory using both switching and mapping reallocation in combination. FIG. 57 is a block diagram of an example system configuration 57-1000 that reallocates a group of DSP memory addresses 57-1024*c* using switching reallocation and another group of DSP memory addresses 57-1024*b* using mapping reallocation, under the embodiments of FIGS. 49, 51, and 55. Components of the system 57-1000 reallocate a first portion 57-1024*c* of DSP memory for use by the processor 49-212 via a memory interface 57-1002 and the processor bus 49-202, and reallocate a second portion 57-1024*b* of DSP memory for use by the processor 49-212 via the DSP bridge 49-232 and DSP bus 49-204, but are not so limited.

Referring first to the switching reallocation of the first block 57-1024*c* of DSP memory, the system configuration 57-1000 includes a memory interface 57-1002 coupled to the processor bus 49-202. The memory interface 57-1002 hosts at least one memory map (not shown), but is not so limited. Components of the memory interface 57-1002 switch prespecified addresses or blocks 57-1024*c* from the DSP memory 57-1024 to the core processor memory 57-1014 through use of the memory map. The reallocation of the first block 57-1024*c* of DSP memory supports the reallocation of as many as four blocks of memory, where each block includes up to approximately 8 kbytes of memory, but the embodiment is not so limited. The switching reallocation of the DSP memory 57-1024*c* is performed in response to information of the configuration register 49-252, as described below. The reallocated memory 57-1024*c* is accessed directly by the processor 49-212 via the processor bus 49-202 and the memory interface 57-1002.

Turning next to the mapping reallocation of the second block 57-1024*b* of DSP memory, the system configuration 57-1000 uses at least one memory map to map prespecified addresses or blocks 57-1024*b* from the DSP memory 57-1024 to the core processor memory 57-1014 through the DSP bridge 49-232. The reallocation of the DSP memory 57-1024*b* is performed in response to information of the configuration register 49-252, as described below. The reallocation of the second block 57-1024b of DSP memory, when done in combination with the switching reallocation of the first block 57-1024c supports the incremental reallocation of as many as four blocks of memory, where each block includes up to approximately 8 kbytes of memory, but the embodiment is not so limited.

Figure 58:
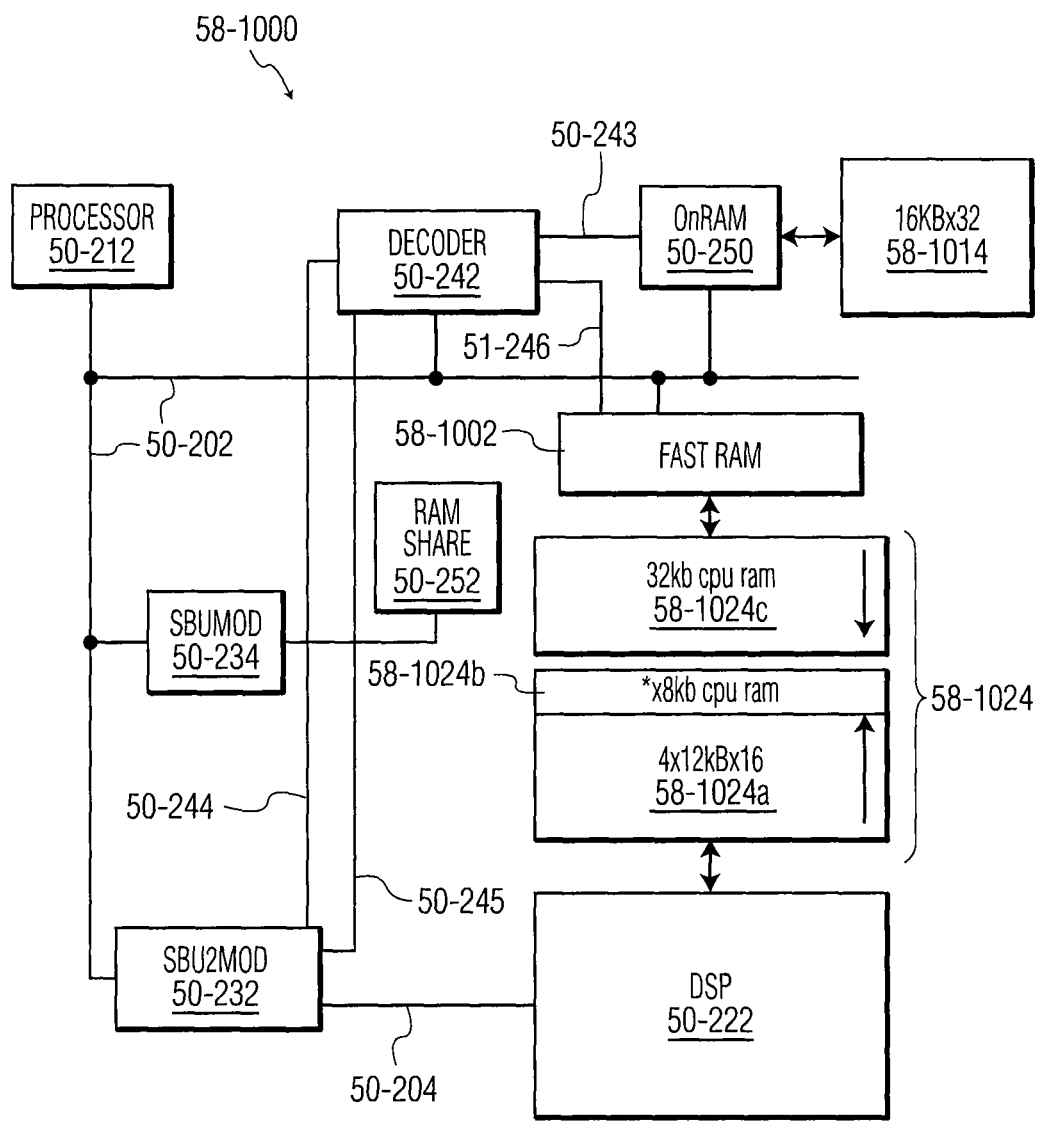
FIG. 58 is a block diagram of a memory configuration in which blocks of DSP memory are reallocated from the DSP address space to the processor address space using both switching and mapping reallocation, under an embodiment.
Figure 59A:
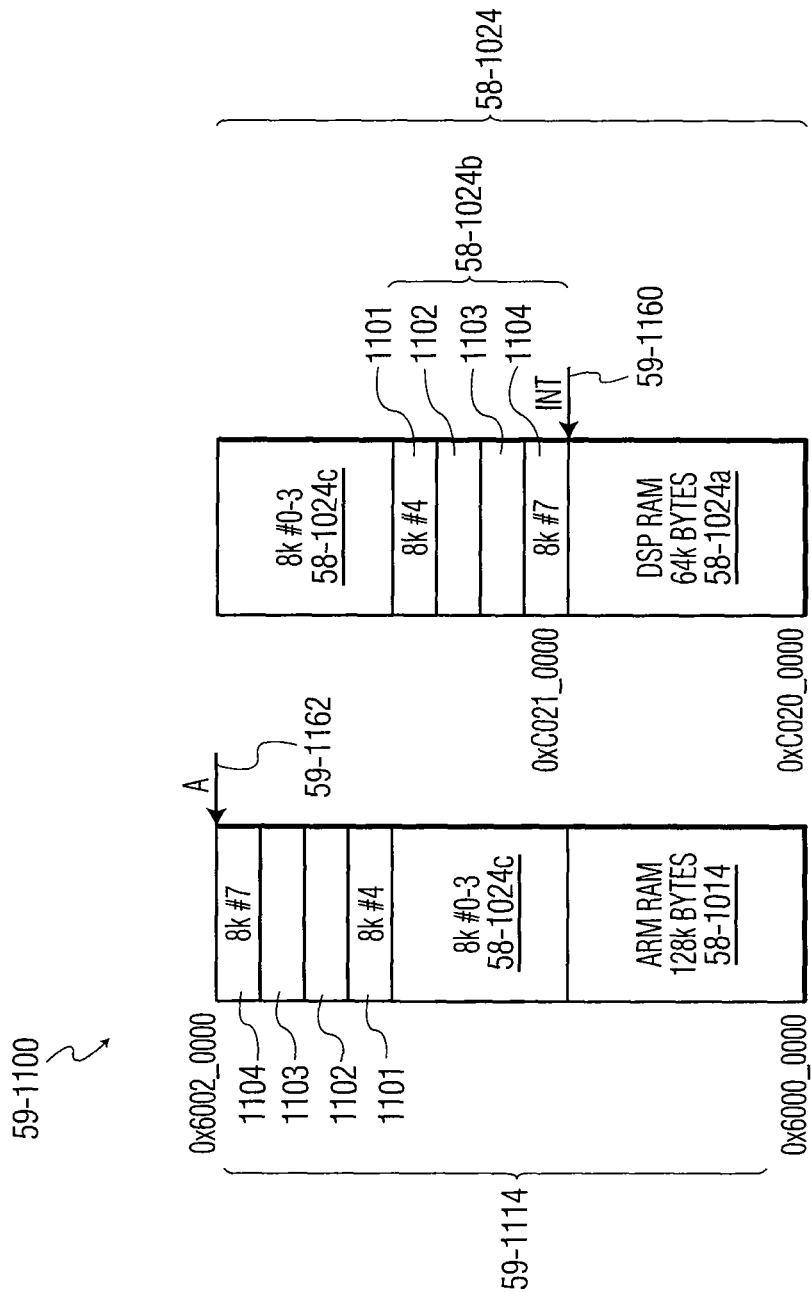
FIG. 59 is a block diagram of a memory area following partitioning and reallocation along with the associated memory loading orders, under an embodiment.
Figure 59B:
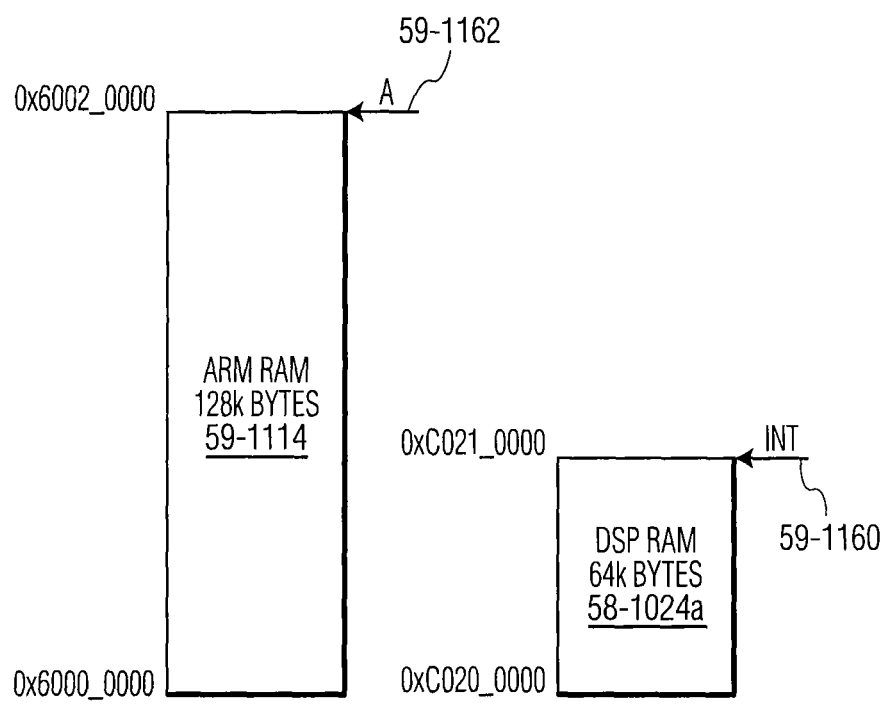

FIG. 58A is a block diagram 58-1100 of a memory configuration in which blocks of DSP memory 57-1024c and 57-1024b are reallocated from the DSP address space 57-1024 to the core processor address space 57-1014 through the memory interface 57-1002 and the DSP bridge 49-232, respectively, under the embodiment of FIG. 59. The starting memory configuration of this example, with reference to FIG. 50, includes 128 kbytes of DSP memory 57-1024 and 64 kbytes of processor memory 57-1014, but memory of any configuration can be reallocated as described herein.

Reallocation of the first portion 57-1024c of DSP memory for use by the processor 49-212 via a memory interface 57-1002 and the processor bus 49-202 includes reallocating a 32-kbyte memory block 57-1024c. Upon reallocation, the memory block 57-1024c is removed from the top of the DSP memory 57-1024 using memory mapping through components of the memory interface, as described above.

Likewise, reallocation of the second block 57-1024b of DSP memory for use by the processor 49-212 via DSP bridge 49-232 includes reallocating four 8-kbyte memory blocks 58-1101 to 58-1104 (collectively 57-1024b). Upon reallocation, the memory block 57-1024b is removed from the DSP memory 57-1024 using memory mapping through components of the DSP bridge 49-232 and DSP 49-222, as described above.

Upon reallocation of the first 57-1024c and second 57-1024b blocks of DSP memory, the memory block 57-1024c (32 kbytes) is first removed from the top of core DSP memory 57-1024 and added to the top of the core processor memory 57-1014. The memory block 57-1024b (8 ktyes×4 blocks=32 kbytes) is next removed from the top of the remaining core DSP memory 57-1024 and added to the top of memory block 57-1024c. Following these two reallocation operations, the DSP 49-222 now sees a contiguous block of memory 57-1024a that is approximately 64 kbytes in size (128 kbytes−32 kbytes−32 kbytes=64 kbytes). The processor now sees a contiguous block of memory 58-1114 that is approximately 128 kbytes in size (64 kbytes+32 kbytes+32 kbytes=128 kbytes) as a result of the additions of reallocated memory blocks 57-1024c and 57-1024b to the core processor memory 57-1014. FIG. 58B shows a memory configuration (memory map) following reallocation of the first and second blocks of DSP memory from the DSP address space 57-1024 to the processor address space 57-1014, under the embodiment of FIG. 58A. Alternative embodiments can reallocate memory blocks of different sizes or combinations of memory blocks having different sizes.

Note that when reallocating DSP memory, switching the first portion 57-1024c of DSP memory takes priority over mapping the second portion 57-1024b of DSP memory, but the embodiment is not so limited. Consequently, when using the switching and mapping methods in combination, two situations can arise: the processor 49-212 maps one or more of the memory blocks 58-1101 to 58-1104 and subsequently switches one or more of the memory blocks 58-1101 to 58-1104; the processor 49-212 switches one or more of the memory blocks 58-1101 to 58-1104 and subsequently maps one or more of the memory blocks 58-1101 to 58-1104. Regardless of which of these two situations arise, existing data ordering is preserved when going between the mapping and the switching reallocation methods. Also, if the processor previously mapped one or more of the blocks 58-1101 to 58-1104 of the first portion 57-1024c of DSP memory to the core processor memory 57-1014 through the DSP bridge 49-232, any data stored in these blocks 58-1101 to 58-1104 remains intact at the same addresses when the block is later mapped to the core processor memory 57-1014 through the memory interface.

As described above with reference to FIGS. 52, 53, and 56, the interrupt address boundary Int 58-1160 is incrementally adjusted to a lower address in the DSP 57-1024 memory to reflect removal of memory blocks 57-1024c and 57-1024b from the DSP memory 57-1024. Alternative embodiments can incrementally adjust the interrupt address boundary 58-1160 to a higher address in the memory or as otherwise appropriate to the memory addressing scheme. Likewise, the abort address boundary A 58-1162 is incrementally adjusted to a higher address in the memory to reflect the addition of memory blocks 57-1024c and 57-1024b to the core processor memory 57-1014. Alternative embodiments can incrementally adjust the abort address boundary 58-1162 to a lower address in the memory or as otherwise appropriate to the memory addressing scheme.

The system configuration 57-1000 that combines memory switching and memory mapping reallocation supports access to the switched portions 57-1024c of the DSP memory by the processor 49-212 via the processor bus 49-202 and the memory interface 57-1002, while supporting access to the mapped portions 57-1024b of the DSP memory via the DSP bridge 49-232, the DSP bus 49-204, and the DSP 49-222. Information (data) of the processor 49-212 is routed to the appropriate memory locations under control of the decoder 49-242. Referring again to FIG. 57, the decoder 49-242 receives information (data) from the processor 49-212 via the processor bus 49-202. The received information includes for example data and/or instructions along with associated memory addresses. The decoder 49-242 uses the first four bits of the address to determine whether the associated information is GPS data or processor data.

When the decoder 49-242 determines the information (data) is GPS data, the decoder 49-242 selects the DSP bridge 49-232 (using control line 49-244) to read/receive the GPS data. Upon being selected by the decoder 49-242 via control line 49-244, some combination of components (not shown) of the DSP bridge 49-232 and the DSP 49-222 route the GPS data from the processor bus 49-202 to the appropriate memory locations 57-1024a of the DSP memory. FIG. 59 is a block diagram of the DSP memory following memory reallocation along with the associated memory loading orders 59-1202 and 59-1204, under the embodiment of FIG. 57. The GPS data of an embodiment is written to the GPS memory 57-1024a in accordance with the GPS data loading order 59-1202.

When the decoder 49-242 determines that received information (data) is processor data, the decoder 49-242 selects one of the memory controller 49-250, the DSP bridge 49-232, or the memory interface 57-1002 to read/receive the processor data via control line 49-243, control line 49-245, or control line 49-246, respectively, in accordance with an address decoding scheme as follows. When the address falls between 6000_0000 and 6001_8000 and the memory configuration includes switched memory 57-1024c, the decoder selects the switched memory 57-1024c (using control line 49-246) to receive the associated information over the processor bus 49-202 and the memory interface 57-1002. When the address falls between 6001_8000 and 6002_0000 and the memory configuration includes switched memory 57-1024c, the decoder selects the mapped block 57-1024*b* of the DSP memory 57-1024 (using control line 49-245) to receive the associated information via the DSP bus 49-204 and some combination of components (not shown) of the DSP bridge 49-232 and the DSP 49-222. Various alternative embodiments can use any number/type/combination of signaling schemes to select the device to read/receive the processor data instead of the control lines 49-243 to 49-246.

When the decoder 49-242 selects the mapped block 57-1024*b* of the DSP memory to receive the associated information on the processor bus 49-202, the decoder 49-242 selects the DSP bridge 49-232 using control line 49-245 to read/receive the processor data. Upon being selected by the decoder 49-242, the DSP bridge 49-232 processes and routes the processor data from the processor bus 49-202 to the appropriate memory locations of the reallocated DSP memory 58-1124*b*. Processing of the data by the DSP bridge 49-232 includes, for example, inverting the address of the data, but the embodiment is not so limited. Referring again to FIG. 59, the processor data of an embodiment is written to the reallocated GPS memory 57-1024*b* in accordance with the SW access loading order 59-1204.

Figure 60:
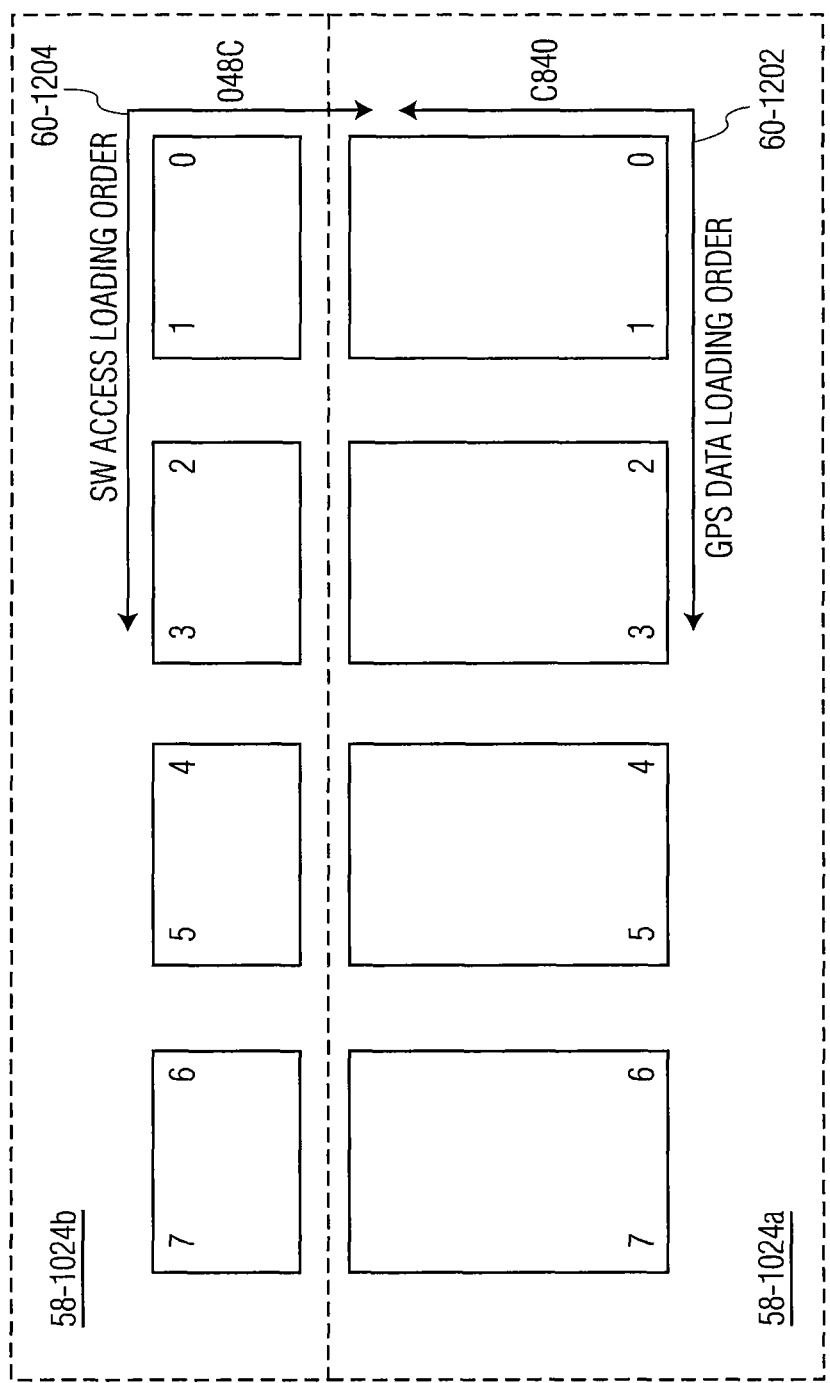
FIG. 60 is a block diagram of a system configuration that reallocates a group of memory addresses according to an embodiment shown in FIG. 57.

As described above, the memory of an embodiment includes memory protection features to alert the host system when the processor 49-212 and/or the DSP 49-222 attempt to access memory locations of their respective memories that are beyond address boundaries corresponding to a particular memory configuration. These memory protection features include aborts and interrupt flags, for example. FIG. 60 is a block diagram of a system configuration 60-1300 that reallocates a group of memory addresses using switching reallocation and another group of memory addresses using mapping reallocation, under an alternative embodiment of FIG. 57. This system 60-1300 further includes a SW monitor 60-1302 coupled to the DSP bridge 49-232, but is not so limited. The SW monitor 60-1302 generates an abort 60-1304 if the processor 49-212 accesses memory locations beyond a prespecified abort address boundary associated with the memory configuration, as described above. The system 60-1300 adjusts at least one abort address boundary as appropriate to the memory configuration.

The system 60-1300 also includes a DSP monitor 60-1304 coupled to at least one of the DSP 49-222 and the DSP memory 57-1024. The DSP monitor 60-1304 of an embodiment generates an interrupt 60-1314 if the DSP 49-222 accesses memory locations beyond a prespecified interrupt address boundary or limit associated with the memory configuration, as described above. The system 60-1300 adjusts at least one interrupt address boundary as appropriate to the memory configuration.

Figure 61:
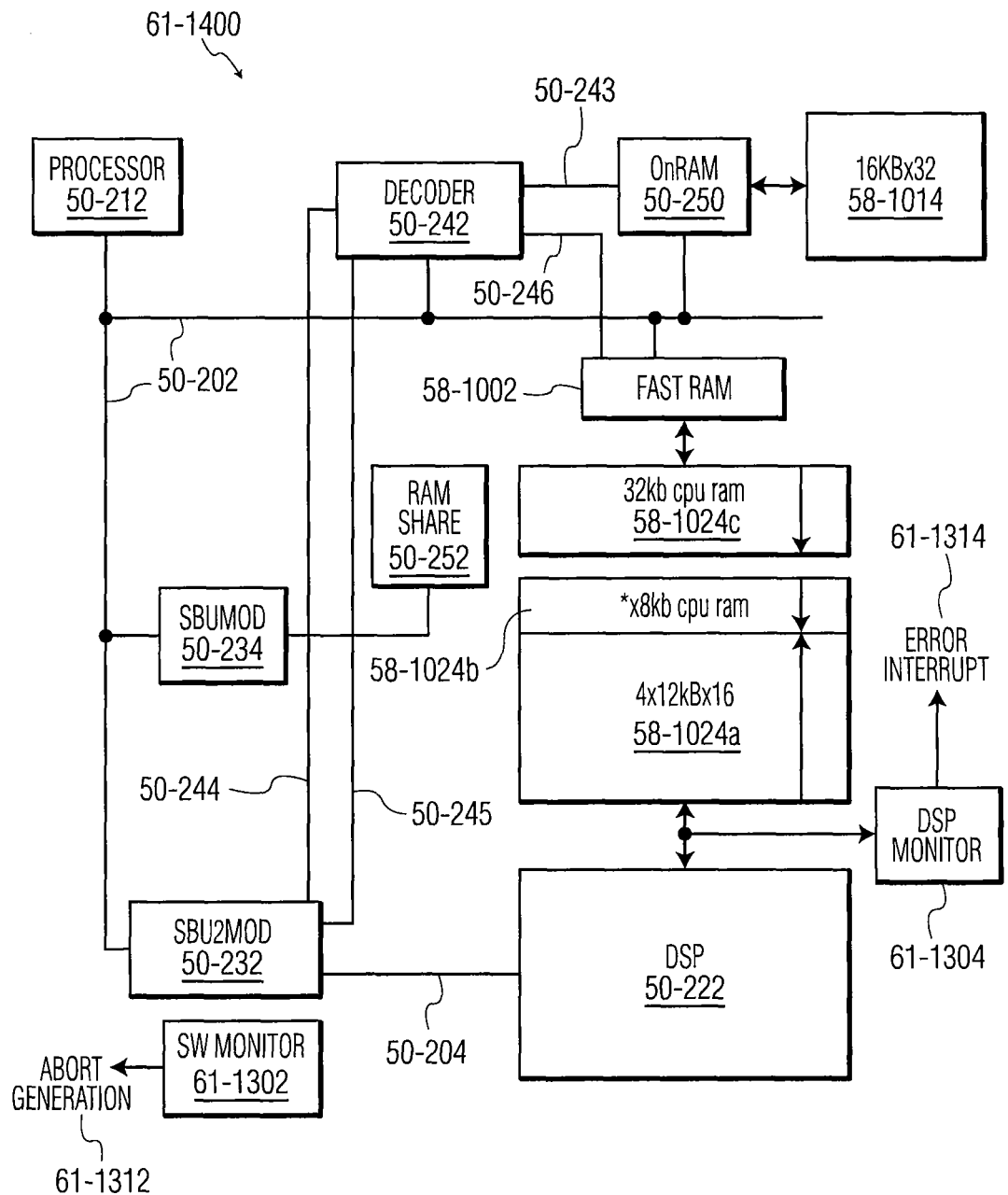
FIG. 61 is a block diagram of a system configuration that reallocates a group of memory addresses using switching reallocation and another group of memory addresses using mapping reallocation, under an alternative embodiment.
Figure 62:
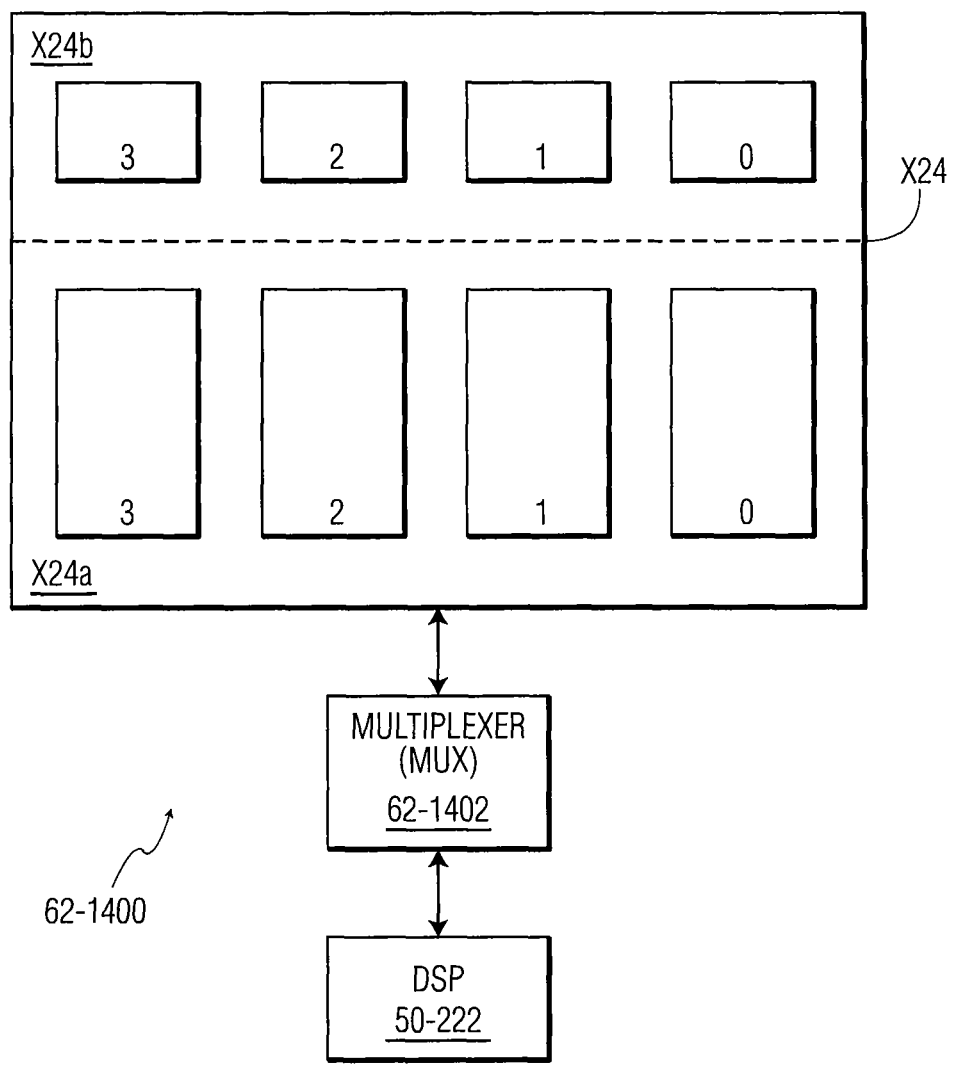
FIG. 62 is a block diagram of an electronic system including a reallocated memory and a multiplexer, under an embodiment.

The system configurations described above with reference to FIGS. 49, 51, 55, and 57 can also include a multiplexer for use in accessing the DSP memory. As an example, FIG. 61 is a block diagram of an electronic system 61-1400 including a reallocated memory X24 and a multiplexer 61-1402, under any of the embodiments of FIGS. 51, 53, 57, and 59. The multiplexer 61-1402 is coupled to the memory X24 (where "X" represents the number of the corresponding figure/system: FIG. 49, "memory 49-224"; FIG. 51, "memory 51-424"; FIG. 55, "memory 55-824"; FIG. 57, "memory 57-1024") and the DSP 49-222, but is not so limited. The memory X24 includes DSP memory X24*a*, and reallocated memory block X24*b*. The reallocated memory block X24*b* is reallocated for use by the processor 49-212, (FIGS. 51, 53, 57, and 59) as described above.

During write operations to the memory X24, the DSP 49-222 transfers information to the multiplexer 61-1402 including address and memory chip select information (0, 1, 2, or 3). Alternative embodiments can provide additional information to the multiplexer 61-1402. Using the address and chip selected information; the multiplexer 61-1402 selects memory locations of one of memory block X24*a* or X24*b* for the write operation.

During memory read operations, the DSP 49-222 provides information to the multiplexer 61-1402 that includes but is not limited to address information. In response, the multiplexer 61-1402 receives data from memory locations of each of memory blocks X24*a* and X24*b* corresponding to the address information. The multiplexer uses the address information to select either the information read from memory block X24*a* or the information read from memory block X24*b*, and provides the selected information to the DSP 49-222.

Access to all processor memory and DSP memory described above allows byte, half-word, and word access with byte line write controls. This attribute holds both for switched memory and for memory mapped through the bridge unit. Byte ordering for the DSP memory is the same for either the DSP base-address, or the mapped or switched blocks that use the processor base-address.

The memory sharing/reallocation described above can involve a number of components or modules of the host electronic system. The systems described above with reference to FIGS. 47-62 include at least one memory configuration register 49-252 coupled to the processor bus 49-202. The memory configuration register 49-252 couples to the processor bus 49-202 via a bridge unit 49-234 and includes registers that store information for use by at least one of the processor 49-212, a decoder 49-242, a memory interface (FIG. 57, 55-802; FIG. 59, 57-1002), a DSP bridge 49-232, and a multiplexer (FIGS. 64; 61-1402) in controlling or managing the memory configuration. The memory configuration register 49-252, either alone and/or in combination with other components of the host electronic system, generally includes one or more registers/register fields described below.

The configuration register 49-252 of an embodiment includes a first set of register fields to support mapping reallocation, as described above. This set of register fields map memory blocks from the DSP address space to the processor address space. The memory blocks include up to eight 8-kbyte blocks, but alternative embodiments can include any number of blocks having any combination of sizes. The blocks are mapped in order from the top of the DSP memory. The first set of register fields of an embodiment includes one or more register fields.

The configuration register 49-252 of an embodiment includes a second set of register fields to support switching reallocation, as described above. This second set of register fields support switching the top 32 kbytes of DSP memory from the DSP bus to the processor bus, wherein the 32-kbyte block includes four 8-kbyte blocks. If one or more of the corresponding four 8-kbyte blocks of memory were previously or are subsequently reallocated using mapping reallocation, the switch control takes precedence. Data contents of the first four mapped 8 kbyte blocks and the single switched 32-kbyte block are at identical offsets and byte ordering with either reallocation method. The second set of register fields of an embodiment includes one or more register fields.

The configuration register 49-252 of an embodiment includes a third set of register fields to support enabling or disabling abort generation for DSP memory read and/or write access violations. Generation of these aborts can also be independently enabled or disabled for read and write accesses. Regarding interrupts, the system of an embodiment includes a fourth set of register fields to support saving of an address that causes the initial DSP memory violation and subsequent interrupt. Each of the third and fourth set of register fields of an embodiment includes one or more register fields.

Figure 63:
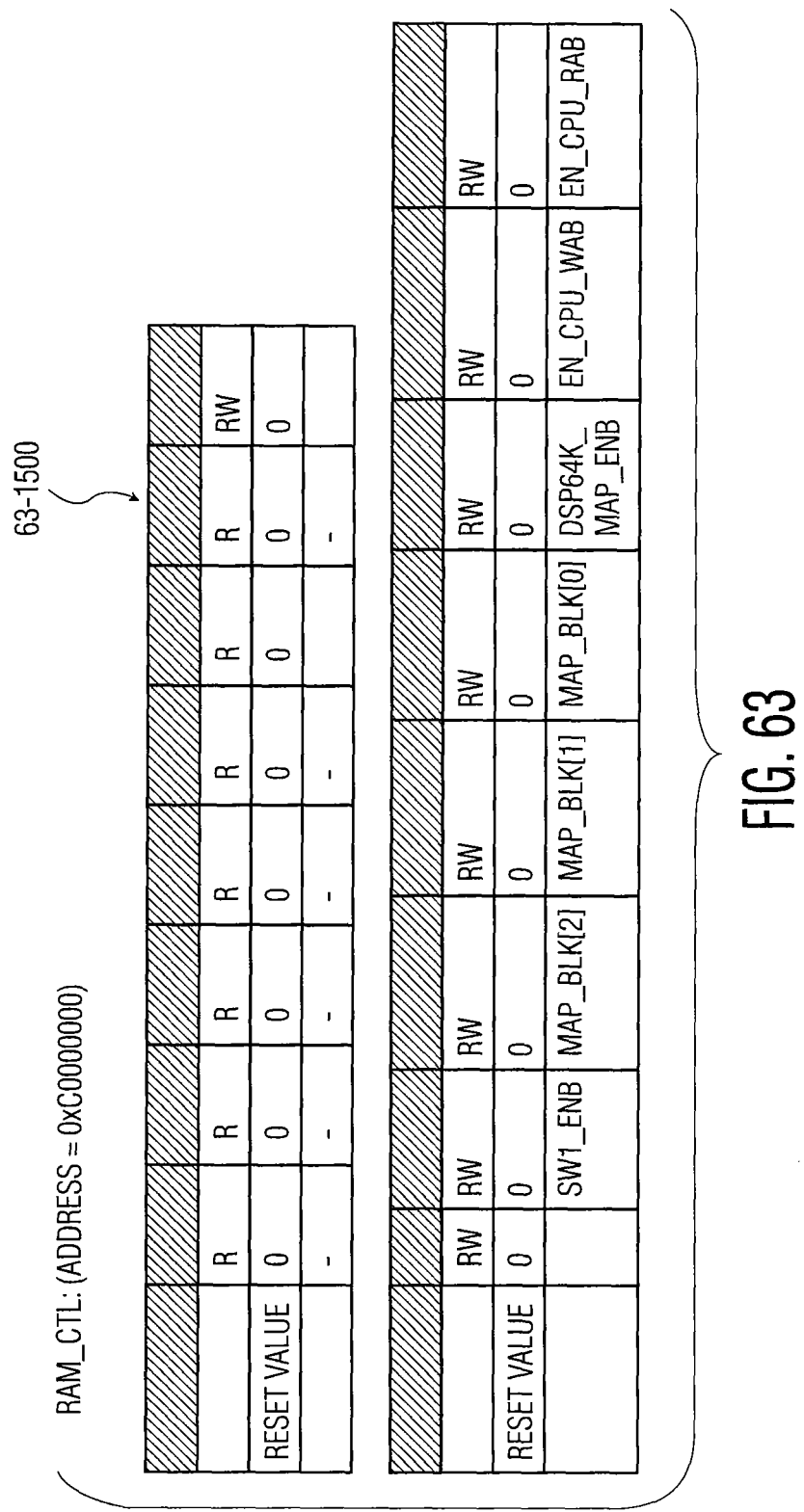
FIG. 63 is a block diagram of a control register that supports memory sharing, under an embodiment.

FIG. 63 is a block diagram of a control register 63-1500 for memory sharing, under an embodiment. The configuration register 49-252 includes the control register 63-1500, but alternative embodiments can include the control register 63-1500 in other components and/or combinations of components of the host system. A description of the function of the bits 0-15 of this register is as follows:

Bit(s) Function

15:7 Reserved

6 DSP32K_SWI_ENB: Logic 1=enable processor direct access of the upper 32 kbytes of DSP memory through the processor bus.

5:3 MAP_BLK[2:0]: 000-111 selects from one to eight 8-kbyte blocks of the upper 64 kbytes of DSP memory for processor soft mapping access when DSP64K_MAP_ENB=1. These bits set the processor soft MAP address boundary as follows:

000: ≥0x6001_0000<0x6001_2000 or >0xC021_E000<0xC022_0000

001: ≥0x6001_0000<0x6001_4000 or >0xC021_C000<0xC022_0000

010: ≥0x6001_0000<0x6001_6000 or >0xC021_A000<0xC022_0000

011: ≥0x6001_0000<0x6001_8000 or >0xC021_8000<0xC022_0000

100: ≥0x6001_0000<0x6001_A000 or >0xC021_6000<0(0220000

101: ≥0x6001_0000<0x6001_C000 or >0xC021_4000<0xC022_0000

110: ≥0x6001_0000<0x6001_E000 or >0xC021_2000<0xC022_0000

111: ≥0x6001_0000<0x6002_0000 or >0xC021_0000<0xC022 0000.

2 DSP64K_MAP_ENB: Logic 1=enable processor soft mapping from one to eight 8-kbyte blocks of the upper 64 kbytes of DSP memory at addresses at or greater than 0x6001_0000 and less than 0x6002_0000 through the DSP bus bridge.

1 EN_CPU_WAB: Logic 1=enable abort on processor write violation.

0 EN_CPU_RAB: Logic 1=enable abort on processor read violation.

A more detailed explanation of control bits of the control register 63-1500 follows. The EN_CPU_RAB bit enables the processor 49-212 to abort the access if it attempts to read from DSP memory in an address range that is not allowed because it is mapped for processor use or not physically present on the bus being accessed. For example, if SWI_ENB=0 and MAP_ENB=1 and the processor 49-212 tries to read from the address range 0x6001_C000 to 0x6001_FFFF, an abort is generated. Similarly, if SWI_ENB=1 and the processor 49-212 tries to read from the range 0xC021_E000 to 0xC021_FFFF, an abort is generated. Note, however, that if SWI_ENB=0 and MAP_ENB=1 and MAP_BLK is greater than/equal to 000, the processor 49-212 may read from block 0 through the DSP bridge 49-232 at both address ranges 0x6001_0000 to 0x6001_1FFF and 0xC021_E000 to 0xC021_FFFF.

The EN_CPU_WAB bit enables the processor 49-212 to abort the access if it attempts to write to DSP memory in an address range that is not allowed because the particular address range is mapped for processor use or not physically present on the bus being accessed. For example, if SWI_ENB=0 and MAP_ENB=1 and the processor 49-212 tries to write to the address range 0x6001_C000 to 0x6001_FFFF, an abort is generated. Similarly, if SWI_ENB=1 and the processor 49-212 tries to write to an address in the range 0xC021_E000 to 0xC021_FFFF, an abort is generated because the block is not present on the DSP bus. Note, however, that if SWI_ENB=0 and MAP_ENB=1 and MAP_BLK is greater than/equal to 000, the processor 49-212 may write to block 0 through the DSP bridge 49-232 at both address ranges 0x6001_0000 to 0x6001_1FFF and 0xC021_E000 to 0xC021_FFFF.

The DSP64K_MAP_ENB bit enables MAP_BLK [2:0] to control the address mapping of eight 8-kbyte blocks from the DSP address range to the address range directly above the on-chip processor memory. When this bit is disabled (set to logic "0"), the mapping bits MAP_BLK [2:0] have no effect.

The MAP_BLK [2:0] bit controls the mapping of eight 8-kbyte blocks from the DSP address range to the address range directly above the on-chip processor memory. The bytes are mapped beginning with block zero and ending with the block specified by MAP_BLK [2:0], but are not so limited. Block 0 is at the high end of the DSP address range and is mapped to the low end of the mapped range above the processor memory. This reverse stacking is done so that the remaining DSP memory is a contiguous address range as upper blocks are removed, and the added processor memory grows upward with each added block so as to appear as a contiguous address range.

The DSP32K_SWI_ENB bit switches memory blocks 0 to 3 from the DSP bus to the processor bus. The four blocks are stacked in reverse order in the processor address range, beginning with block 0 being mapped just above the top of on-chip processor memory. This same mapping is used when MAP_BLK [2:0] maps the blocks via the DSP bridge 49-232.

Figure 64:
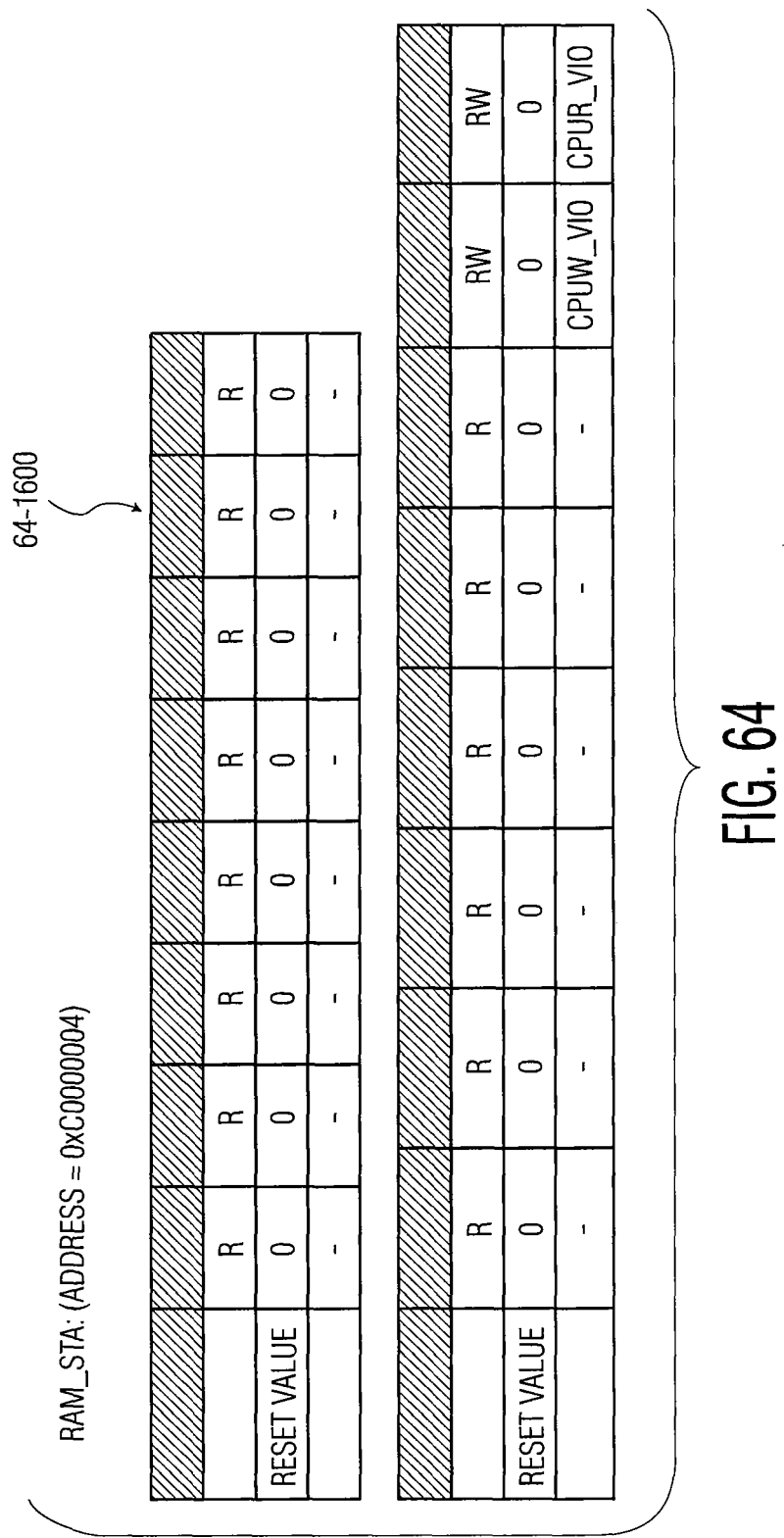
FIG. 64 is a block diagram of a status register that supports memory sharing, under an embodiment.

FIG. 64 is a block diagram of a status register 64-1600 for memory sharing, under an embodiment. The configuration register 49-252 includes the status register 64-1600, but alternative embodiments can include the status register 64-1600 in other components and/or combinations of components of the host system. A description of the function of the bits 0-15 of this register is as follows:

Bit(s) Function

15:2 Reserved

1 CPUW_VIO: during read operations, a logic 1=processor write-violation; during write operations, writing a logic 1 clears the bit.

0 CPUR_VIO: during read operations, a logic 1=processor read-violation; during write operations, writing a logic 1 clears the bit.

A more detailed explanation of each control bit of the status register 64-1600 follows. The CPUR_VIO bit is set when processor read-violations occur. This bit is set independently of the state of EN_CPU_RAB. The CPUR_VIO bit is cleared when the processor writes back a logic "1".

The CPUW_VIO bit is set when processor write-violations occurs. This bit is set independently of the state of EN_CPU_WAB. The CPUW_VIO bit is cleared when the processor writes back a logic "1".

Figure 65:
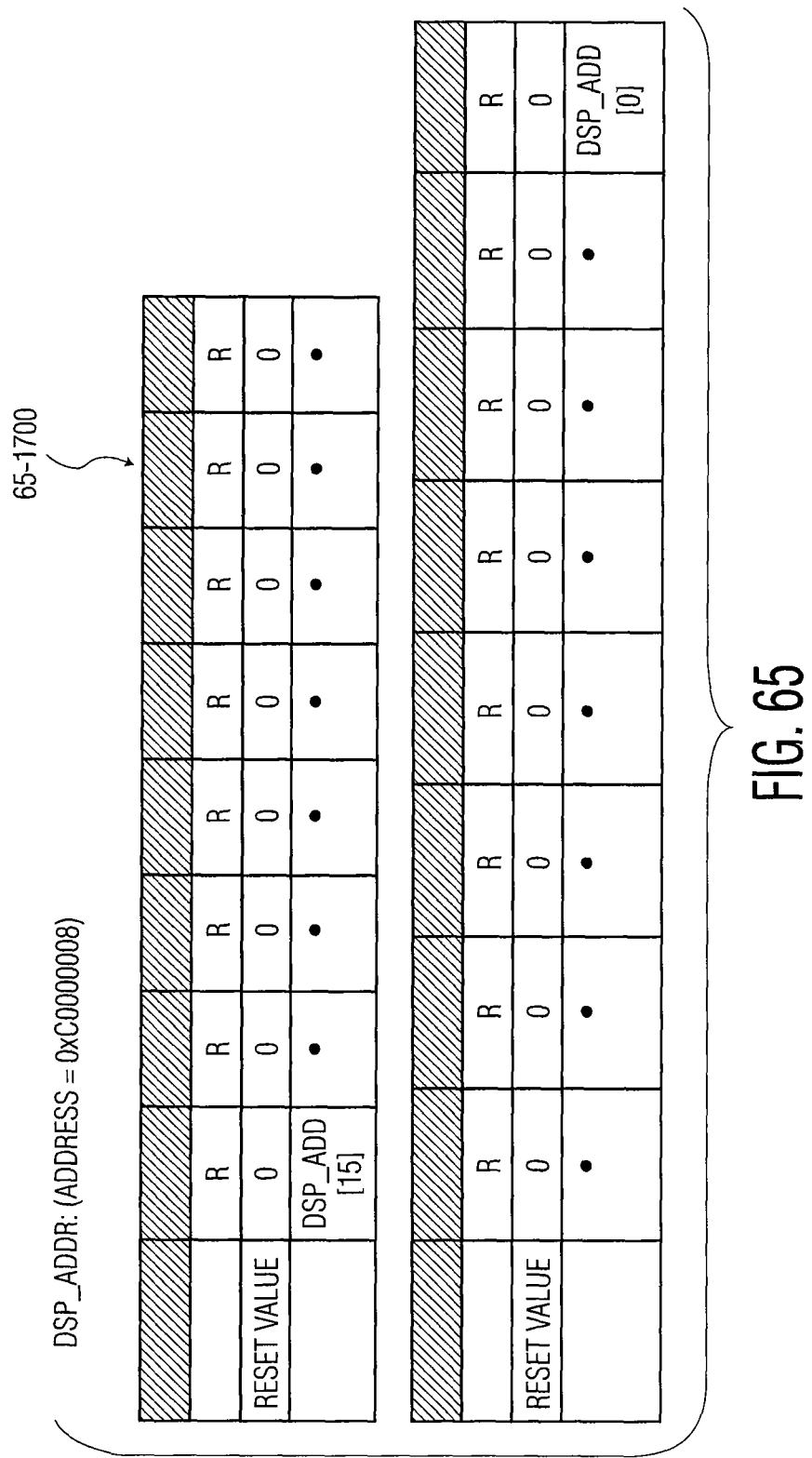
FIG. 65 is a block diagram of a read/write violation address register that supports memory sharing, under an embodiment.

FIG. 65 is a block diagram of a read/write violation address register 65-1700 for memory sharing, under an embodiment. The configuration register 49-252 includes the violation address register 65-1700, but alternative embodiments can include the violation address register 65-1700 in other components and/or combinations of components of the host system. A description of the function of the bits 0-15 of this register is as follows:

Bit(s) Function

15:0 DSP address first causing DSPW_INT or DSPR_INT pulse.

FIGS. 66A and 66B form an address map 66-1800 for memory sharing, under an embodiment. The configuration register 49-252 includes the address map 66-1800, but alternative embodiments can include the address map 66-1800 in other components and/or combinations of components of the host system. Some examples are presented below of the address mapping for memory sharing, but the embodiment is not limited to these examples.

In a first example, Block=7, DSP32K_SWI_ENB=X, DSP64K_MAP_ENB=0, MAP_BLK [2:0]=XXX. The DSP 49-222 accesses the block in its DSP address range 0x0001_0000 to 0x0001_FFFF. The processor 49-212 accesses the block at the DSP bridge address of 0xC021_0000 to 0xC021_1FFF. The processor 49-212 can not access this block on the processor bus 49-202.

In a second example, Block=7, DSP32K_SWIENB=X, DSP64K_MAP_ENB=1, MAP_BLK [2:0]=110. The DSP 49-222 accesses the block in its DSP address range 0x0001_0000 to 0x0001_FFFF. The processor 49-212 accesses the block at its DSP bridge address of 0xC021_0000 to 0xC021_FFFF or the soft map address 0x6001_0000 to 0x6001_5FFF. The processor 49-212 can not access this block on the processor bus 49-202.

In a third example, Block=7, DSP32KSWI_ENB=X, DSP64K_MAP_ENB=1, MAP_BLK [2:0]=111. The DSP 49-222 is not programmed to access the block in the general DSP address range 0x0001_0000 to 0x0001_EFFE. The processor 49-212 accesses the block at its mapped DSP bridge address of 0x6001_0000 to 0x6001_7FFE. The processor 49-212 does not access this block on the processor bus 49-202. If the DSP 49-222 tries to access this block in its general DSP bus address range, DSP read or write interrupts are generated as appropriate.

The GPS system of an embodiment includes at least one system and method for dynamic memory allocation and sharing, but is not so limited. Embodiments include allocating random access memory (RAM) to various regions that have varying sizes, are accessed by particular subsystems, and store particular types of data. The RAM allocation varies with operational modes of a data processing system, such as a signal processing system. Once the available memory is allocated, the different regions are shared by different subsystems that may be operating in different modes concurrently.

Various embodiments are illustrated in a signal processing system, in particular a global positioning system (GPS). The embodiments are not limited to such a system, and are useful in any electronic system in which memory is a limited resource that must be allocated and reallocated on an ongoing basis to multiple subsystems. Illustrative examples of embodiments include a signal processing core that processes radio frequency (RF) signals received from satellite vehicles (SVs) in separate channels. The signal processing core operates in several different modes depending on multiple factors, such as how much information the GPS system initially has regarding visible satellites. Available memory is advantageously allocated for most efficient use in a particular operational mode. In addition, available memory is advantageously allocated on a channel-by-channel basis. The term channel is used to indicate a particular usage of hardware resources. A channel can correspond to one or more received signals from one or more particular satellites. Different channels are allocated available memory for use in different modes concurrently. The word channel as used herein can also indicate any discrete signal or data stream that provides a discrete signal to be processed by a signal processing system.

The embodiments described include methods for multi-channel signal processing, including continuously receiving multiple channels, processing the multiple channels in a signal processing component on a time-multiplexed basis, and configuring the signal processing component for one of a plurality of operational modes, including allocating a memory into areas for storage of types of data. Certain areas are accessed by certain signal processing subsystems in certain manners, and the signal processing component is configured to operate in different modes concurrently for different channels. The signal processing component is continuously reconfigured based on evaluation of output of the signal processing component. The memory is further allocated to include a channel region in which data words are stored by software. A processor or controller executes the software. The controlling processor and the software can reside anywhere. The data words include all of the information necessary to configure the signal processing subsystem, including the memory. The data words are read by various subsystems and are also updated by various subsystems, for example by storing address pointers that indicate where a particular subsystem has accessed a memory region, and by storing status information.

Thus, memory swapping and memory sharing may occur. Memory swapping enabled the core processing to use monolithic blocks of memory and partition the blocks for different buffer sizes. The different blocks may be relocated within the memory based on the mode of operation. Outside of the core processing, rules may be setup to control how memory is access occurs. The processor or controller may have a high priority to access and configure the memory. Blocks of memory may be disconnected and memory management processes may restrict another block.

Figure 67:
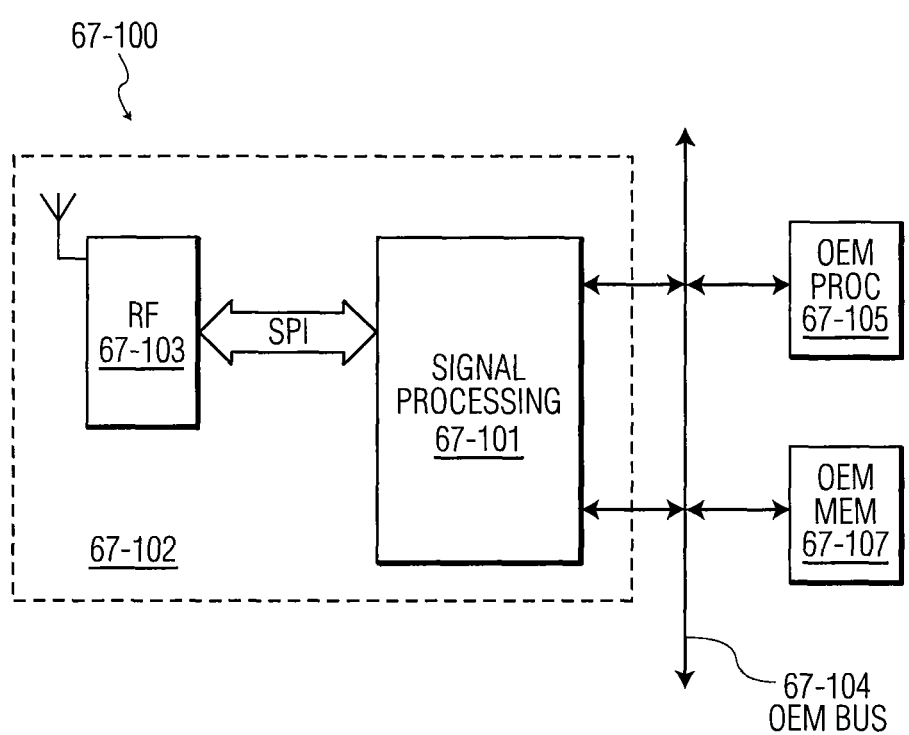
FIG. 67 is a block diagram of an embodiment of a system including a signal processing system.

FIG. 67 is a block diagram of an embodiment of a system 67-100, including a signal processing system 67-102. The signal processing system 67-102 includes radio frequency ("RF") components and digital signal processing components. An RF component 67-103 receives RF signals, in one embodiment from GPS satellites, or satellite vehicles (SVs). The RF signals are digitized and transmitted to a digital signal processing component 67-101. In one embodiment, the RF component 67-103 and the digital signal processing component 67-101 communicate via a serial peripheral interface (SPI). The digital signal processing component 67-101 processes the RF signals, as will be described further below, and transmits processed data to an OEM processor 67-105 via an OEM bus 67-104. The digital signal processing component 67-101 also communicates with an OEM memory 67-107. As described further below, the digital signal processing component 67-101 includes memory for signal processing functions. Embodiments of the invention are particularly advantageous in systems that have a limited amount of memory, including memory on the digital signal processing component 67-101 and the OEM memory 67-107. Typically, memory is limited in systems, but this is particularly true of systems in handheld or mobile devices.

Optionally, the OEM memory 67-107 is not required to be accessed by the digital signal processing component 67-101. Other possible arrangements include all of the RF component 67-103 functionality and the digital signal processing component 67-101 functionality located on one component, or chip, including all of the required memory and processing power to perform signal processing functions. The system 67-100 is capable of operating effectively without GPS aiding information, or alternatively, it may operate with GPS aiding information from a variety of sources.

Figure 68:
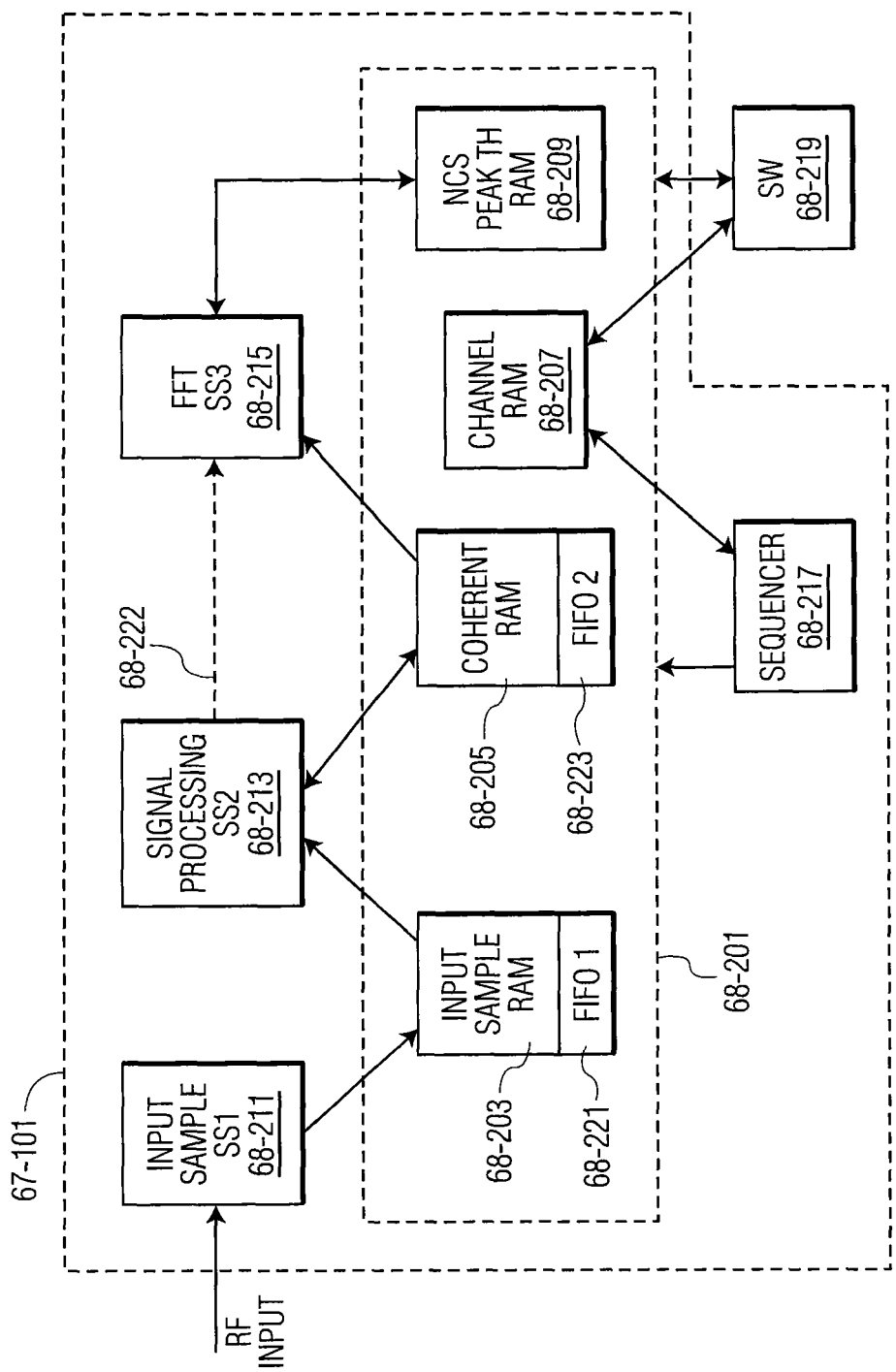
FIG. 68 is a block diagram showing subsystems of one embodiment of a signal processing component.

FIG. 68 is a block diagram showing subsystems of one embodiment of a digital signal processing component 67-101, including an input sample subsystem (SS1) 68-211, a signal processing subsystem (SS2) 68-213, and a fast fourier transform (FFT) subsystem (SS3) 68-215. The digital signal processing component 67-101 further includes a memory subsystem 68-201, which in one embodiment includes random access memory (RAM) that is dynamically allocated and shared between various subsystems as described further below. The memory subsystem 68-201 can be a single memory component or device, or multiple memory components. The memory subsystem 68-201 includes an input sample RAM 68-203, a coherent data RAM 68-205, a backend storage RAM 68-209 and a channel RAM 68-207. The memory subsystem 68-201 is dynamically allocated such that the input sample RAM 68-203, the coherent RAM 68-205, the channel RAM 68-207, and the backend storage RAM 68-209 each have varying sizes in various operational modes. In addition, the input sample RAM 68-203, the coherent RAM 68-205, and the backend storage RAM 68-209 are each accessed by different channels in different modes, and shared among different subsystems concurrently.

Figure 70:
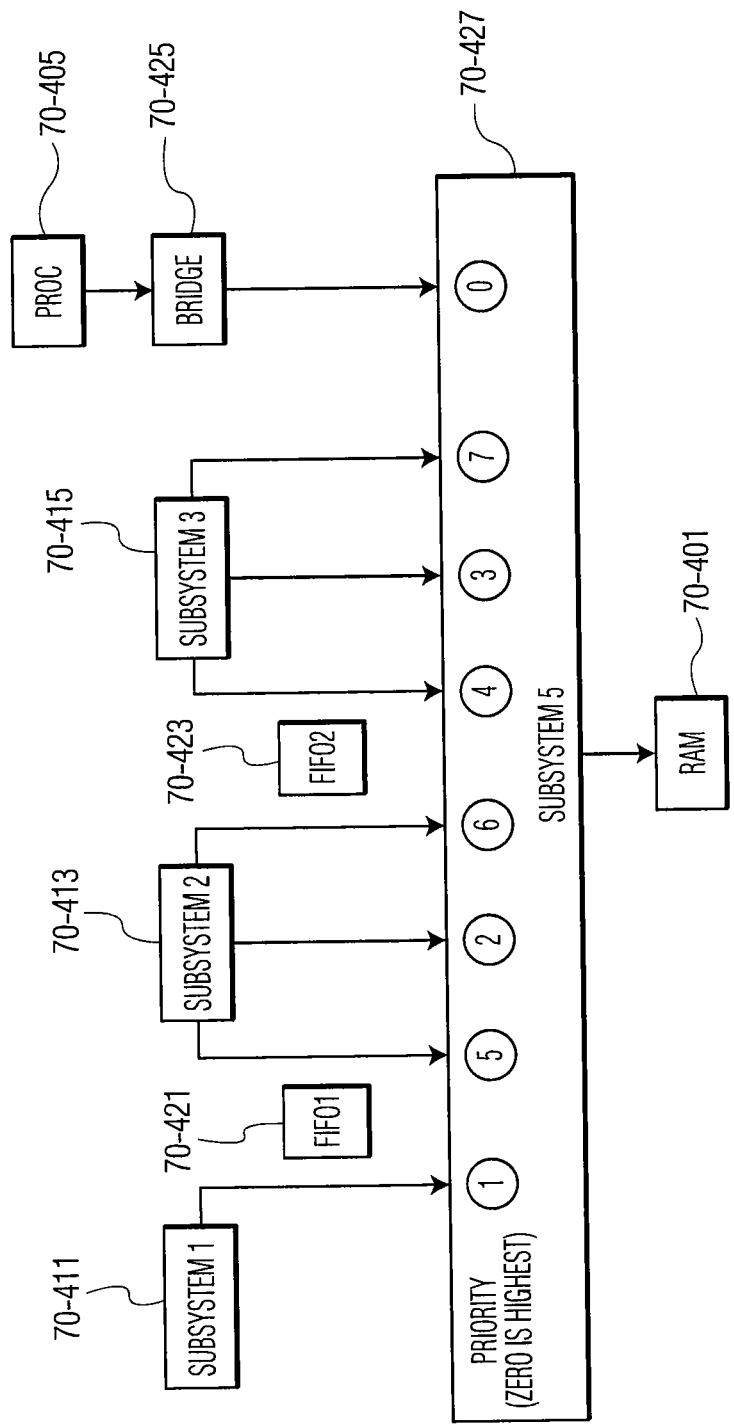
FIG. 70 is a block diagram showing an arbitration unit and illustrating an embodiment in which priorities as assigned to different entities to access a RAM.

Input sample RAM 68-203 is controlled by a control structure 68-221 called FIFO1 control structure, or FIFO1 68-221. Coherent RAM 68-205 is similarly controlled by a control structure 68-223 called FIFO2 control structure, or FIFO2 68-223. As explained further below, the FIFO1 68-221 controls access to the input sample RAM 68-203, and the FIFO2 68-223 controls access to the coherent RAM 68-205. The term FIFO, as used herein, implies the first-in-first-out nature of access to the input sample RAM 68-203 and the coherent RAM 68-205 in an embodiment. In other embodiments, the control structure and access to the input sample RAM can have any other character, including for example, last-in-first-out. In FIG. 70, the FIFO1 68-221 is shown collocated with the input sample RAM 68-203, and the FIFO2 68-223 is shown collocated with the coherent RAM 68-205. Typically, the FIFO1 68-221 and the FIFO2 68-223 are not collocated with their respective RAM areas, but are shown as such for illustration in FIG. 70.

The digital signal processing component 67-101 further includes a sequencer 68-217, which controls the sequencing of signal processing operations in the digital signal processing component 67-101. The sequencer 68-217 is shown as a separate component, but can be collocated with other components. For example, in embodiments described below, the sequencer 68-217 functionality resides partially on the signal processing subsystem 68-213 and partially on the FFT subsystem 68-215. A software component 68-219, hereinafter referred to as SW 68-219, controls the sequencer 68-217, and therefore the signal processing operations in the digital signal processing component 67-101, by storing words in the channel RAM 68-207. In one embodiment, the SW 68-219 is resident on the OEM processor 67-105 and/or the OEM memory 67-107, but this is not a requirement.

The digital signal processing component 67-101 receives digitized RF data samples from the RF component 67-103. The data samples are samples of data streams from SVs, each of which transmits a unique pseudorandom noise (PRN) code in a known manner. Broadly speaking, the digital signal processing component 67-101 processes the data samples to determine which satellite transmitted them, and also to extract information, such as ephemeris and almanac information, from the samples. As is known in the art, when the absolute location of four SVs, and their relative distances from a receiver, are known by the receiver, the location of the receiver can be known. The digital signal processing component 67-101 processes data samples in one of four modes depending on how much current location information is known.

The input sample subsystem 68-211 receives the input RF data samples at a rate determined by the sender. Under the control of the FIFO1, the input sample subsystem 68-211 stores the data samples in the input sample RAM 68-203 in a manner that is dependent on the operational mode of the digital signal processing component 67-101. The size of the input sample RAM 68-203 is also determined by the operational mode of the digital signal processing component 67-101. Under the control of the FIFO1, the signal processing subsystem 68-213 takes RF input samples from the RAM 68-203 to operate on. The operations performed on the RF signal samples can vary depending on the signal processing mode. For example, the signal processing subsystem 68-213 may or may not perform a decimation operation on the signal samples. The signal processing subsystem 68-213, using a matched filter in one embodiment, coherently accumulates data samples in the coherent RAM 68-205. Coherent accumulation is effectively accumulating I (in phase) and Q (quadrature) data for a specified period. The coherently accumulated data samples are taken from the coherent RAM 68-205 by the FFT subsystem 68-215 for FFT processing. The size of the coherent RAM 68-205 is also determined by the operational mode of the digital signal processing component 67-101.

In one situation, little or no information is known about the location of the receiver. In this situation, there is little or no information regarding which SVs are visible to the receiver, and the available time information is inaccurate. In this situation, the digital signal processing component 67-101 processes data samples in a "cold start" mode. In the cold start mode, as much data is processed as quickly as possible with a low degree of sensitivity, or resolution. This is because the search space for the SV signals is very large; there is no current data to focus the initial acquisition phase. In cold start mode, no coherent accumulation occurs, and data samples are sent straight to the FFT subsystem 68-215 from the signal processing subsystem 68-213 via a path 68-222.

In modes other than cold start mode, the FFT subsystem 68-215 takes a certain number of data samples out of the coherent RAM and performs FFT operations on them. In cold start mode, the FFT subsystem 68-215 operates on the coherent data samples straight from the SS2 68-213. The SS3 68-215 generates a number of frequencies as dictated by the particular processing mode. As an example, for an 8 sample, 16 point FFT, the FFT generates 16 frequencies. Not all of the 16 frequencies may be of interest. For example, the outer frequencies may not be useful. The number of frequencies is programmable. Desired frequencies are selected, packed in a more compact form, and stored in a noncoherent summation (NCS) region of the backend storage RAM 68-209, which accumulates noncoherent data, that is, the magnitudes derived from the I and Q data. As further described below, the backend storage RAM 68-209 is also used for storing peak values, or peaks. In one embodiment, the eight largest values are stored, as well as information regarding where they occurred in the data stream, e.g., at what code offset and at what frequency offset. The track history (TH) information is selected coherent data that is stored for examination by the SW 68-219. In one embodiment, the TH information is the output of a gather module (not shown). The gather module selects among the frequency outputs of the FFT subsystem

68-215, discarding unwanted frequencies. The gather module maintains data in a coherent form. The SW 68-219 can make decisions regarding the configuration of the signal processing component 67-101 by examining the TH information. The size of the backend storage RAM 68-209 is also determined by the operational mode of the signal processing component 67-101.

Various terms are used herein to describe processing epochs, including T1, PDI, and context. A T1 is a time period, in milliseconds, specified for coherent accumulation in the coherent accumulator for a channel. The length of a T1 is programmable and varies with the operational mode. For example, in some modes, it is desirable to accumulate for a longer period to look for a weaker signal. The signal processing subsystem 68-213 thus coherently accumulates on a T1 basis.

A PDI is a programmable number of T1s. The number of T1s that is fed into the FFT subsystem 68-215 at one time constitute a PDI. The number of T1s in a PDI is determined by how the FFT subsystem 68-215 is configured to process data in a particular mode. As stated above, the signal processing subsystem 68-213 coherently accumulates on a T1 basis. However, the FFT subsystem 68-215 operates on data on a PDI basis. Therefore, the FFT subsystem 68-215 only pulls data from the coherent RAM 68-205 when a complete PDI is available. For example, if the FFT subsystem 68-215 is configured as a 5-sample, 16 point, zero-padded FFT, the FFT subsystem 68-215 waits for 5 samples or 5 T1s to be complete and stored in the coherent RAM 68-205 before it begins pulling data out of the coherent RAM 68-205.

The use of the various subsystems is time-multiplexed between different channels. Context is a term used herein to denote the use of a particular subsystem for processing a particular channel. For example, for a particular channel, a context begins when the channel enters the signal processing subsystem 68-213, and the context ends when that channel leaves the signal processing subsystem 68-213. This implies that the signal processing subsystem 68-213 will run for a programmed number of milliseconds, consuming data from the input sample RAM 68-203, and then stop, which ends the context. A channel has a similar context with respect to the FFT subsystem 68-215.

As stated above, the SW 68-219 stores words in the channel RAM 68-207 that control the operation of the signal processing component 67-101. The stored words make up channel records. In one embodiment, the channel records are each 128 lines containing various types of data, but basically containing all of the channel specific data that the signal processing component is to use. The channel record includes programming information from the SW 68-219, load type information, size parameters, the size allocations for the input sample RAM 68-203, the coherent RAM 68-205, the backend storage RAM 68-209, and other areas of the RAM 68-201 for that particular channel. It includes code phase, carrier phase, carrier frequency, acceleration, and all other processing parameters for a single channel. The channel RAM 68-207 also contains a scratchpad area that stores "scratchpad" information for a channel. Scratchpad data is written by one channel in any available part of the scratchpad area, and later overwritten when another channel (which may be the same channel) writes into the scratchpad area. Scratchpad information includes a channel's counters from one context to the next. The use of the signal processing subsystem 68-213 and the FFT subsystem 68-215 is time multiplexed between different channels, so each channel must save its state.

The channel RAM 68-207 is initialized by the SW 68-219, but it is then updated by the signal processing subsystem 68-213, the FFT subsystem 68-215, and occasionally by the SW 68-219. For example there is a semaphore word in the channel RAM 68-207 that is used for communication between the signal processing subsystem 68-213, the FFT subsystem 68-215, and the SW 68-219. The semaphore word is a mechanism for synchronizing communication between the signal processing subsystem 68-213, the FFT subsystem 68-215, and the SW 68-219, which operate in a semi-asynchronous manner.

The channel records are essentially linked lists that include pointers to locations in the various RAMs, including the input sample RAM 68-203, the coherent RAM 68-205, and the backend storage RAM 68-209. The channel records thus store the configuration of the dynamically allocated RAM 68-201 for a context. The first channel record entry is a pointer to the next channel record. When a context begins, the channel RAM is accessed to determine an operating mode and the RAM allocation for the context. When the context is about to complete, updated channel information is stored in the channel record and the processing continues with the contents of the next channel record that is pointed to by the entry in the current channel record. The channel record also includes current counts and states, code phase information, and time alignments relative to the input data samples.

When a channel is initiated, a sequencer 313$a$ (shown in FIG. 71 and described below) of the signal processing subsystem 68-213 accesses the channel RAM 68-207 and pulls in channel parameters required for the signal processing subsystem 68-213 to process that particular channel. The sequencer 313$a$ also programs various signal processing elements (not shown) of the signal processing subsystem 68-213, such as a matched filter, and a coherent accumulator, with parameters as needed to process that channel. The parameters, for example, determine the number of milliseconds for which the matched filter is to perform processing. When the matched filter is finished processing, the matched filter signals the sequencer 313$a$ that it is finished, and the sequencer 313$a$ moves on to the next channel.

The channel RAM 68-207 includes a linked list that stores the location of the channel RAM for the next channel, and so on.

Figure 69:
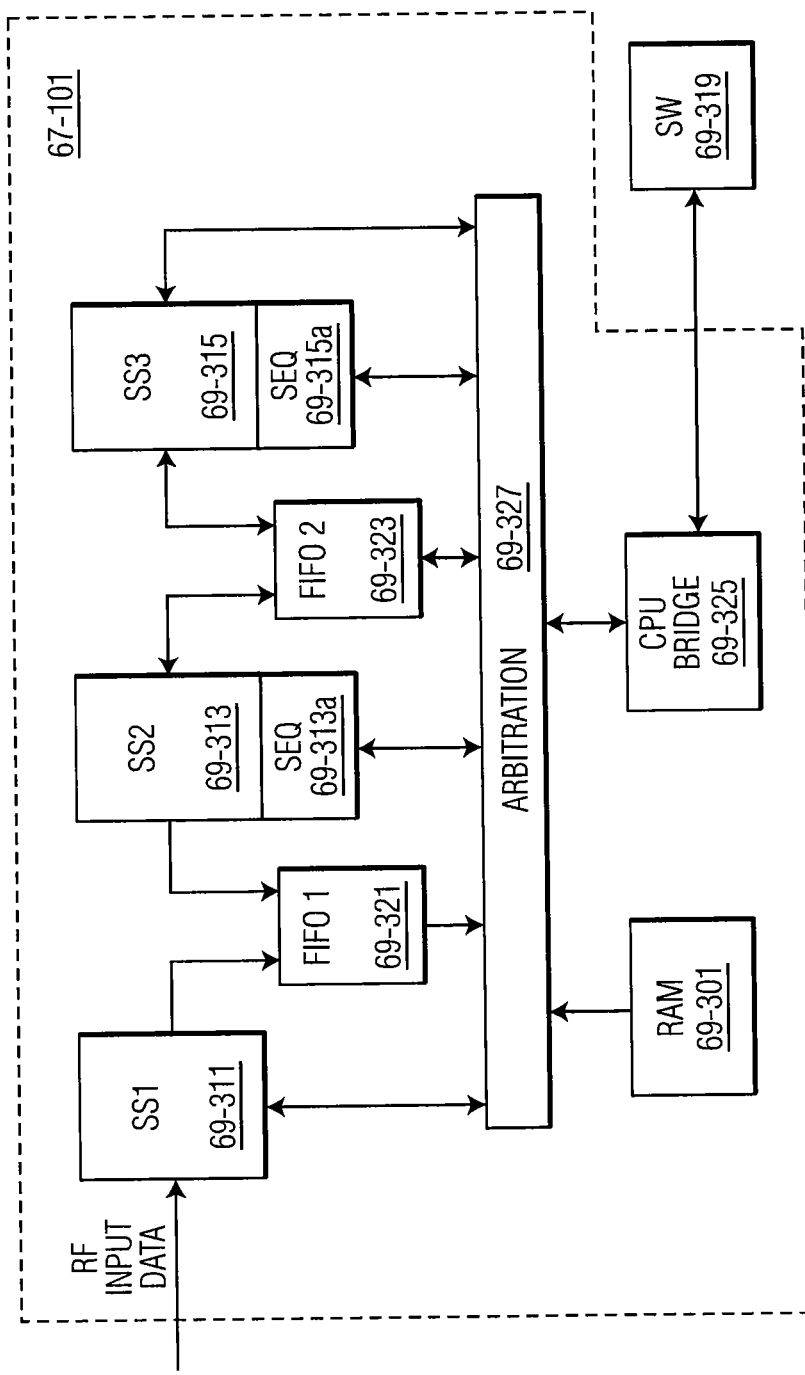
FIG. 69 is block diagram of an embodiment of the signal processing component, including an arbitration unit.

The FFT subsystem 68-215 also includes a sequencer 315$a$ (shown in FIG. 71 and described below) that accesses the channel RAM to determine how to process data. The FIFO2 68-223 controls access to the coherent RAM 68-205 for both the FFT subsystem 68-215 and the signal processing subsystem 68-213. For example, the FIFO2 68-223 notifies the FFT subsystem 68-215 when there is data to operate on in the coherent RAM 68-205. The FIFO2 68-223 also lets the signal processing subsystem 68-213 know when it is about to overwrite data that the FFT subsystem 68-215 has not used yet, FIG. 69 is block diagram of an embodiment of the signal processing component 67-101 showing additional elements, including an arbitration unit 69-327. An input sample subsystem 69-311 and a signal processing system 69-313 access a memory subsystem, or RAM 69-301, under control of a FIFO1 69-321. In one embodiment, the sequencer functionality for the signal processing subsystem 69-313 is collocated with the signal processing subsystem 69-313 in an SS2 sequencer 69-313$a$. One function of the sequencer 69-313$a$ is to access a channel RAM area of the RAM 69-301 to read out channel parameters and to write updated channel parameters back to the channel RAM area of the RAM 69-301.

The signal processing subsystem 69-313 and the FFT subsystem 69-315 access the RAM 69-301 under control of a FIFO2 69-323. In one embodiment, the sequencer functionality for the FFT subsystem 69-315 is collocated with the FFT subsystem 69-315 in an SS3 sequencer 69-315a. The FIFO1 69-321, the SS2 sequencer 69-313a, the FIF02 69-323, and the SS3 sequencer 69-315a communicate with the arbitration unit 69-327 for access to the RAM 69-301.

The arbitration unit 69-327 further communicates with a SW element 69-319 through a central processing unit (CPU) bridge 69-325 for access by the SW 69-319 to the RAM 69-301.

The input sample subsystem 69-311 sends requests for access to RAM 69-301 through the FIFO1 69-321 and receives grant signals from the arbitration unit 69-327. After a grant signal is received by the input sample subsystem 69-311, it sends an address to the FIFO1 69-321 indicating where it is storing input sample data, and the input sample subsystem stores the input sample data in the RAM 69-301.

When the signal processing subsystem 69-313 seeks to process input data samples, it sends a request for access to the input sample area of the RAM 69-301 through the FIFO1 69-321 and receives a grant signal from the arbitration unit 69-327. After a grant signal is received by the signal processing subsystem 69-313, it receives data samples from the RAM 69-301. When the signal processing subsystem 69-313 seeks to store processed coherent data in the coherent RAM area of the RAM 69-301, it sends a request signal through the FIFO2 69-323 to the arbitration unit 69-327. From the channel record, the sequencer 69-313a determines the appropriate address(es) at which to store the coherent data. The signal processing subsystem 69-313 receives a grant signal from the arbitration unit 69-327, and the storage addresses are sent by the signal processing system to the RAM 69-301, as is the coherent data to be stored.

When the FFT subsystem 69-315 seeks to process coherent data, it sends a request for access to the coherent data area of the RAM 69-301 through the FIFO2 69-323 to the arbitration unit 69-327. When the request is granted, the address, which again is known from the channel record, is sent to the coherent data area of the RAM 69-301 and the coherent data is read out to the FFT subsystem 69-315.

The SW 69-319 requests access to the RAM 69-310 through the arbitration unit 69-327 to write records in the channel RAM area which dictate the operation of the signal processing component 67-101. The SW 69-319 further requests access to the RAM 69-310 through the arbitration unit 69-327 to read data, such as TH data, report data, and error data that indicate a status of the subsystems and provide a basis for ongoing programming of the signal processing component 67-101 through the channel records in the channel RAM.

FIG. 70 is a block diagram showing an arbitration unit 70-427 and illustrating priority assignments to different entities to access a RAM 70-401 in an embodiment. The OEM processor 70-405, which accesses the RAM 70-401 through the CPU bridge 70-425 has the highest priority, or priority 0. The priorities are arbitrarily designated such that a lower number indicates a higher priority, but any other designation is possible. An input sample subsystem 70-411 has a next highest priority of 1. Because the input sample subsystem 70-411 receives a stream of RF data at a rate that is not under its control, the input sample subsystem 70-411 has less ability than other subsystems to control its own processing rate, and therefore it is assigned a high priority for access to the RAM 70-401.

A signal processing subsystem 70-413 is assigned a priority of 2 for access requests from its sequencer, a priority of 5 for access requests through a FIFO1 70-421 for reading input data samples from the input sample area of the RAM 70-401, and a priority of 6 for access requests through the FIFO2 70-423 for writing coherent data to the coherent data area of the RAM 70-401.

An FFT subsystem 70-415 is assigned a priority of 3 for access requests from its sequencer, a priority of 4 for access requests through the FIFO2 70-423 for reading coherent data from the coherent data area of the RAM 70-401, and a priority of 7 for writing NCS, TH, and report data to the NCS area of the RAM 70-401.

Figure 71:
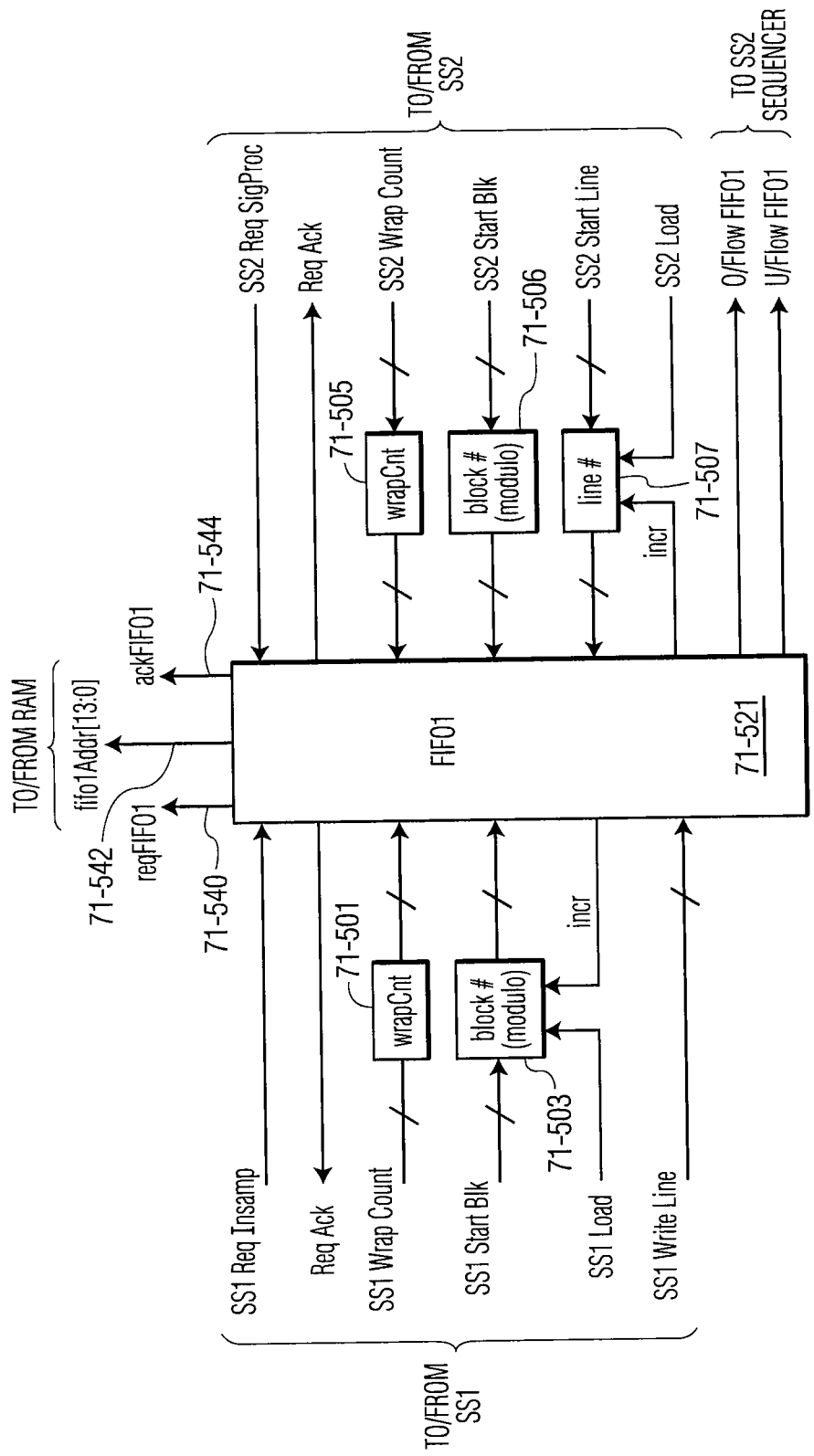
FIG. 71 is a block diagram of a control structure (FIFO1) showing some of the signaling that takes place in controlling access to an input sample RAM.
Figure 72:
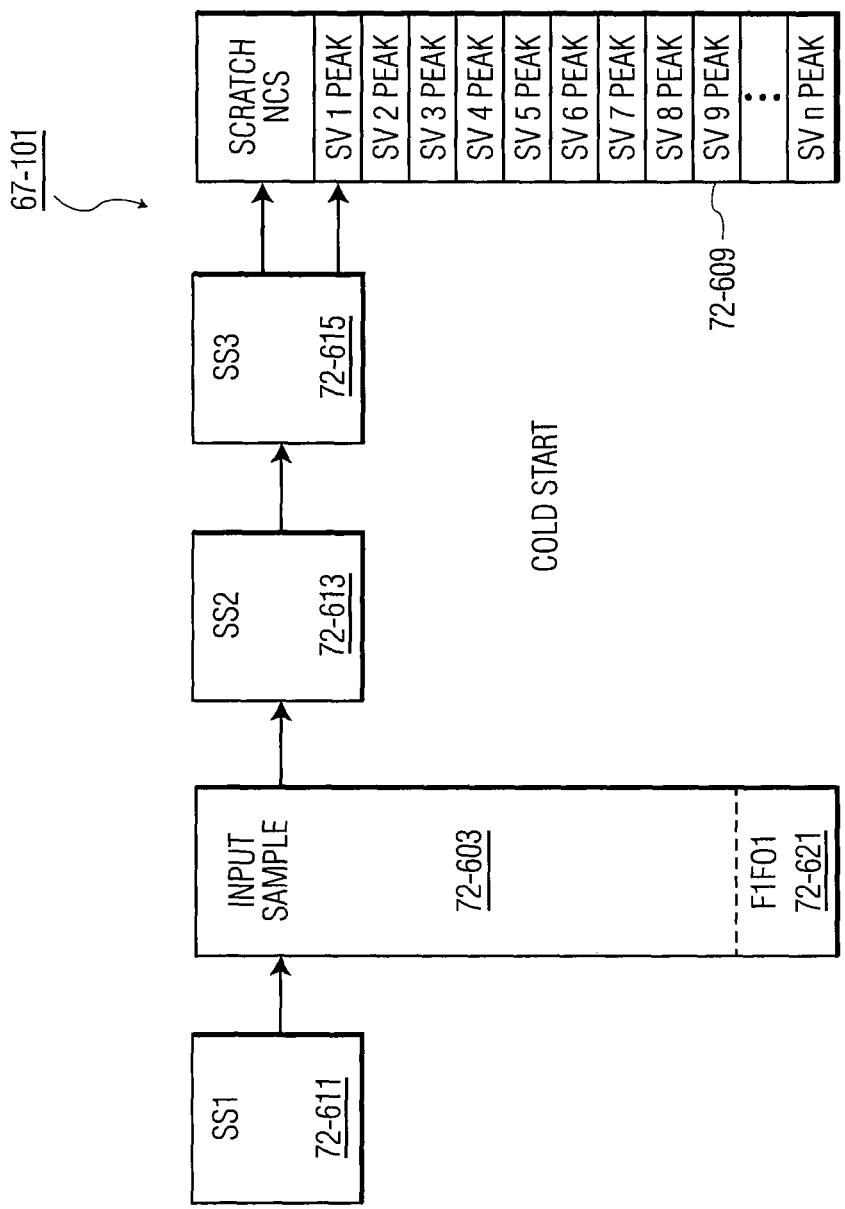
FIG. 72 is a block diagram illustrating a configuration of the signal processing component, including memory allocations, for a cold start mode.

FIG. 71 is a block diagram of a FIFO1 71-521 showing some of the signaling that takes place in controlling access to the input sample RAM 68-203. With reference to the left side of FIG. 71, and also with reference to FIG. 70, the input sample subsystem 68-211 requests access to the input sample RAM area 68-203 of the RAM 68-201 to store input data samples. The signal processing subsystem 68-213 requests access to the input sample RAM area 68-203 of the RAM 68-201 to read out input data samples.

The input sample subsystem 68-211 sends an SS1 Req Insamp signal to the FIFO1 71-521 to request to write input data samples. The FIFO1 71-521 acknowledges receipt of the request with a Req Ack signal. The input sample subsystem 68-211 sends a wrap count 71-501 and a start block number 71-503 to the FIFO1 71-521. In a circular buffer mode, which is applicable in operational modes of the signal processing component, except for the cold start mode, the input sample RAM 68-203 is written until it is filled, and then overwritten. In one embodiment, the input sample RAM 68-203 is filled from the bottom to the top. When the input sample RAM 68-203 is full, overwriting begins at the bottom. The wrap count 71-501 increments each time the input sample RAM 68-203 is filled and begins to be overwritten. The start block number 71-503 indicates the start of a block of input data samples. The start block number 71-503 is modified by a load signal, SS1 Load, from the input sample subsystem 68-211. The Load signal initiates a write operation. When a block has been written, the FIFO1 increments the block count 71-503 with an Incr signal. The Write Line, from the input sample subsystem 68-211, is a 7-bit line within a block, which is written to the FIFO1 during writes to the FIFO1.

Figure 73:
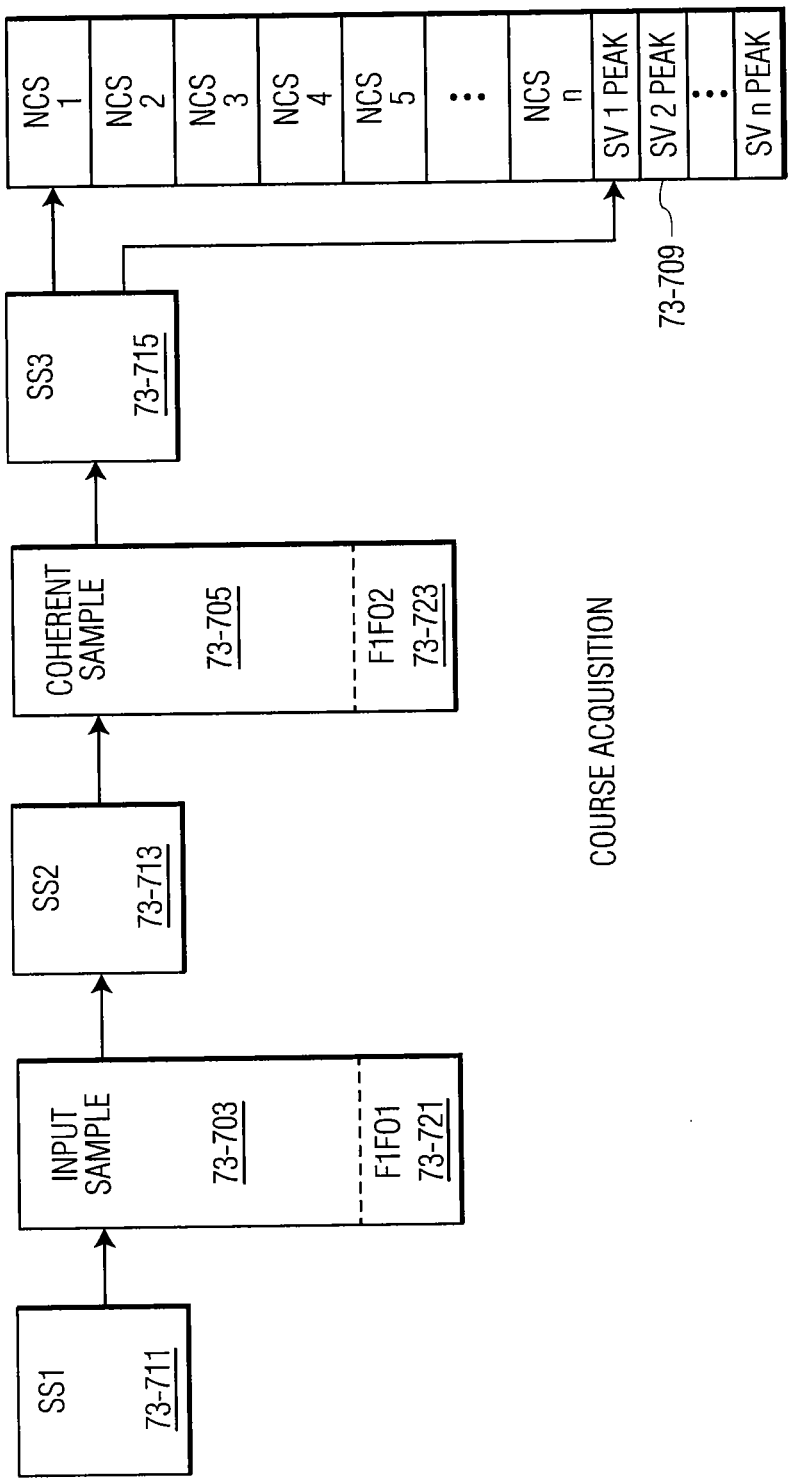
FIG. 73 is a block diagram illustrating a configuration of the signal processing component, including memory allocations, for a coarse acquisition mode.

With reference to the right side of FIG. 73, and also with reference to FIG. 70, the signal processing subsystem 68-213 requests access to data samples in the input sample RAM 68-203 with a SS2 Req Sig Proc signal. The FIFO1 71-521 acknowledges the request with a Req Ack signal. The signal processing subsystem 68-213 sends a wrap count 71-505, a start block count 71-506, and a line number 71-507 to the FIFO1 71-521.

In a circular buffer mode, which is applicable in operational modes of the signal processing component, except for the cold start mode, the input sample RAM 68-203 is written until it is filled, and then overwritten. The wrap count 71-505 increments each time the input sample RAM 68-203 is filled and begins to be overwritten. The start block number 71-506 indicates the start of a block of input data samples. The start block number 71-506 is modified by a load signal, SS2 Load, from the signal processing subsystem 68-213. The SS2 Load signal initiates a read operation.

The FIFO1 71-521 also sends an overflow and an underflow signal to the sequencer 68-217. Underflow occurs when the signal processing subsystem 68-213 is attempting to read out data from a location that has not been written yet. When underflow occurs, the signal processing subsystem 68-213 must wait, or pause. Overflow occurs, in the case of a cyclic write mode, when the top of the input sample RAM 68-203 is reached and the write pointer goes back to the bottom to begin overwriting, yet the signal processing subsystem 68-213 has not read out the data about to be overwritten, or already overwritten. Because of the streaming nature of the data received by the input sample subsystem 68-211, an overflow condition can be detected, but not prevented. In one embodiment, when an overflow occurs in the middle of processing for a channel, "garbage", or invalid data is processed until "good" data is available again. If a channel is being initialized and an overflow occurs, an error signal is sent to the SW 68-219, the channel is shut down, and the SW 68-219 decides how to proceed.

Referring to the top of the FIFO1 71-521, the FIFO1 communicates with the RAM 68-201 using a request signal 71-540, an address signal 71-542, and an acknowledge signal 71-544.

FIGS. 71, 72, 73 and 74 are block diagrams illustrating configurations of the signal processing component 67-101, including memory allocations, for various operational modes for an embodiment. The operational modes illustrated include a cold start mode, a coarse acquisition mode, a hot start mode, and a tracking mode.

The cold start mode is applicable when little or no information is available to the signal processing component 67-101 regarding its own location. For example, if the signal processing component 67-101 were installed in a handheld device that was carried far away from the location at which it last acquired GPS satellites, it would not know which satellites are visible. Therefore a very broad, low sensitivity search for satellites is performed, necessitating the processing of a large quantity of data.

The coarse acquisition mode is appropriate when some information is known about the location of the signal processing component 67-101. Typically, the identity of at least some of the visible satellites is known.

The hot start mode is appropriate when the signal processing component 67-101 has some very good information about its location. For example, the signal processing component may have navigated within the last day, establishing its location to within about a 100 mi radius. Or possibly, an external source supplied the ephemeris data and satellite time.

The track mode is appropriate when the signal processing component 67-101 has excellent information about its position, and is tracking satellites it has already acquired. In the track mode, it is possible to turn off more of the signal processing component 67-101 functionality, thus consuming less power.

Referring to FIG. 73, a configuration of the signal processing component 67-101, including memory allocation, in the cold start mode is illustrated. In the cold start mode, there is no coherent RAM area. The available RAM area includes a relatively large input sample buffer 72-603 that is used as snapshot, or one-shot input sample RAM. In one embodiment, the size of the input sample RAM 72-603 is approximately 100 Kbytes. As stated, the input sample RAM 72-603 is used in a one-shot manner. After the input sample RAM 72-603 is filled, the RF input is no longer received, and the various subsystems operate on the data in the input sample RAM 72-603 multiple times, as described below. This makes it possible to turn off the RF receiver after the input sample RAM 72-603 is filled, which reduces power consumption.

The input sample subsystem 72-611 writes input data samples into the input sample RAM 72-603 under control of the FIFO1 72-621. The signal processing subsystem 72-613 reads input data samples out of the input sample RAM 72-603 under control of the FIFO1 72-621. The signal processing subsystem 72-613 processes the input data samples and transmits them as coherent data directly to the FFT subsystem 72-615.

For a particular possible satellite, which we will call SV 1, the data stored in the input sample RAM 72-603 is reprocessed, or replayed, for every possible frequency SV 1 might have, as well as the entire possible oscillator range and Doppler range. The input sample data in the input sample RAM 72-603 can be replayed as many as twenty times for each satellite. The data is then passed to a backend storage RAM 72-609, which stored noncoherent summation data. The backend storage RAM 72-609 includes an NCS data "scratch" region, and a peak region. The scratch region stored noncoherent data in a cyclic fashion, and can be shared with channels operating in other modes that are not the cold start mode. The largest eight peaks for each satellite are saved in the peak region. The backend storage RAM 72-609 in one embodiment includes approximately 8 Kbytes for the scratch NCS area, and approximately 2.4K for the peak region, which stores about 50 peaks. As a channel completes, the SW 68-219 goes through the peak list, decides which peak might represent a signal and selects only these for verification. The peak space freed up by the rejected peaks is filled with new peaks.

As an example, the configuration of the signal processing component 67-101 for the cold start mode can include parameters of the following approximate values: a PDI of one millisecond; a frequency coverage per processing run of four KHz; and a sensitivity, or resolution, of 28 dbHz.

FIG. 73 is a block diagram of a configuration of the signal processing component 67-101, including memory allocation, in the coarse acquisition mode. In the coarse acquisition mode, the largest portion of the memory is allocated for a backend storage RAM 73-709, and an input sample RAM 73-703 is relatively small. For example, in one embodiment the input sample RAM 73-703 is approximately 10K in size. The input sample RAM 73-703 is used as a short, circular buffer. A coherent sample RAM 73-705, which stores coherent data samples, is used as a scratch buffer.

The input sample subsystem 73-711 receives input data samples and stores them in the input sample RAM 73-703. In the coarse acquisition mode, one or two visible satellites are typically known. Therefore, these known satellites can be searched for concurrently. The signal processing subsystem 73-713 processes the input sample data and fills a coherent sample RAM 73-705 with 7 milliseconds of data representing one frequency/satellite combination. The FFT subsystem 73-715 operates on the coherent data that is stored in the coherent sample RAM 73-705 and stores the resultant NCS data in the backend storage RAM 73-709. Peaks associated with the NCS data are also stored in the backend storage RAM 73-709. In this mode, the backend storage RAM 73-709 is shared between channels, but is "dedicated NCS" storage in that different regions are dedicated to NCS data from different channels. The NCS 1 data is for channel 1, the NCS 2 data is for channel 2, etc.

In the coarse acquisition mode, as much memory as possible is devoted to the backend storage RAM 73-709 because performance is improved when the OEM processor has more NCS data to operate on. As an example, the configuration of the signal processing component 67-101 for the cold start mode can include parameters of the following approximate values: a PDI of seven milliseconds; a frequency coverage per processing run of 750 Hz; and a sensitivity of 20 dbHz. In the coarse acquisition mode, the input sample RAM 73-703 is larger than PDI, and the coherent RAM 73-705 is larger than PDI. As used herein, to be larger or smaller than PDI means that the allocated memory space stores less more than or less than the amount of data that can be processed in the time period of a PDI.

Figure 74:
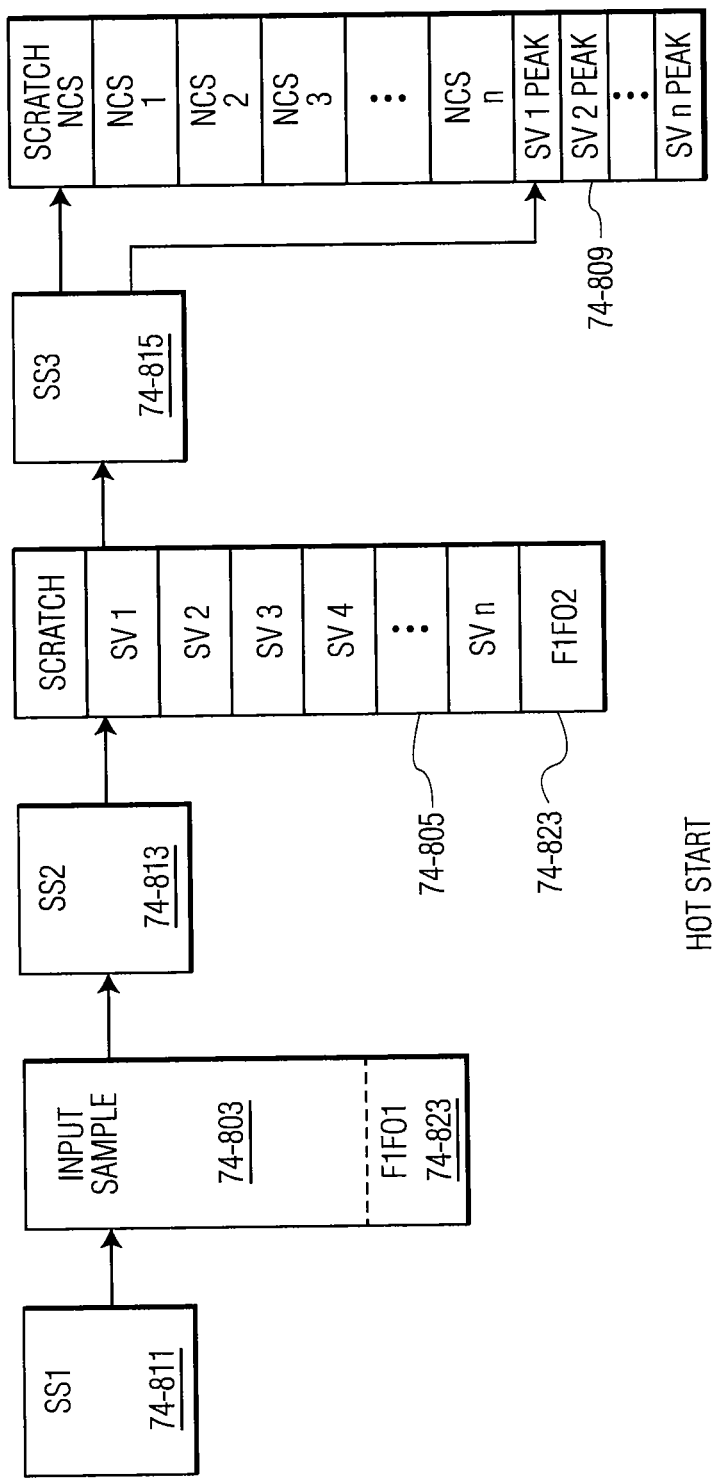
FIG. 74 is a block diagram illustrating a configuration of the signal processing component, including memory allocations, for a hot start mode.

FIG. 74 is a block diagram of a configuration of the signal processing component 67-101, including memory allocation, in the hot start mode. In the hot start mode, a full code phase search is not required. Position is known to a much greater degree than is the case for cold start mode or coarse acquisition mode. For example, the time uncertainty is approximately one microsecond. The position uncertainty might be a cell site radius in a cellular network. Some aiding information might also be available to narrow the initial location uncertainty.

In the hot start mode, an input sample RAM 74-803 is a relatively short circular buffer. For example, the input sample RAM 74-803 is 5K-20K of memory. In the hot start mode, the input sample subsystem 74-811 receives input data samples and stores them in the input sample RAM in a circular buffer manner. The signal processing subsystem 74-813 processes the input sample data and stores it in a coherent RAM 74-805. In this mode, the coherent RAM 74-805 contains many small, dedicated regions for individual satellites. In addition, the coherent RAM 74-805 includes a scratchpad, or scratch, portion that can be used by various channels concurrently, in other modes than the hot start mode. As previously described, Scratchpad data is written by for one channel in any available part of the scratchpad area, and later overwritten when another channel (which may be the same channel) writes into the scratchpad area. In contrast, dedicated areas can only be written or overwritten by data relevant to one SV.

Dedication of the areas in the coherent RAM 74-805 for individual satellites allows a smaller input sample buffer 74-803 and the ability to still run a relatively large PDI. In this mode, the input sample RAM 74-803 can be less than PDI. The FFT subsystem 74-815 processes the coherent data from the coherent RAM 74-805, and outputs NCS data which is stored in a backend storage RAM 74-809 in a dedicated fashion. That is, the backend storage RAM 74-809 is divided into dedicated regions, NCS 1, NCS 2, etc., for individual satellites. The backend storage RAM 74-809 also includes a scratch portion that is not dedicated, and can be used by other channels in other modes concurrently. The backend storage RAM 74-809 also includes a dedicated peak portion to save peaks on an SV-by-SV basis. As an example, the configuration of the signal processing component 67-101 for the cold start mode can include parameters of the following approximate values: a PDI of 10 or 20 milliseconds; a frequency coverage per processing run of 750 Hz; and a sensitivity of 15 to 12 dbHz.

Figure 75:
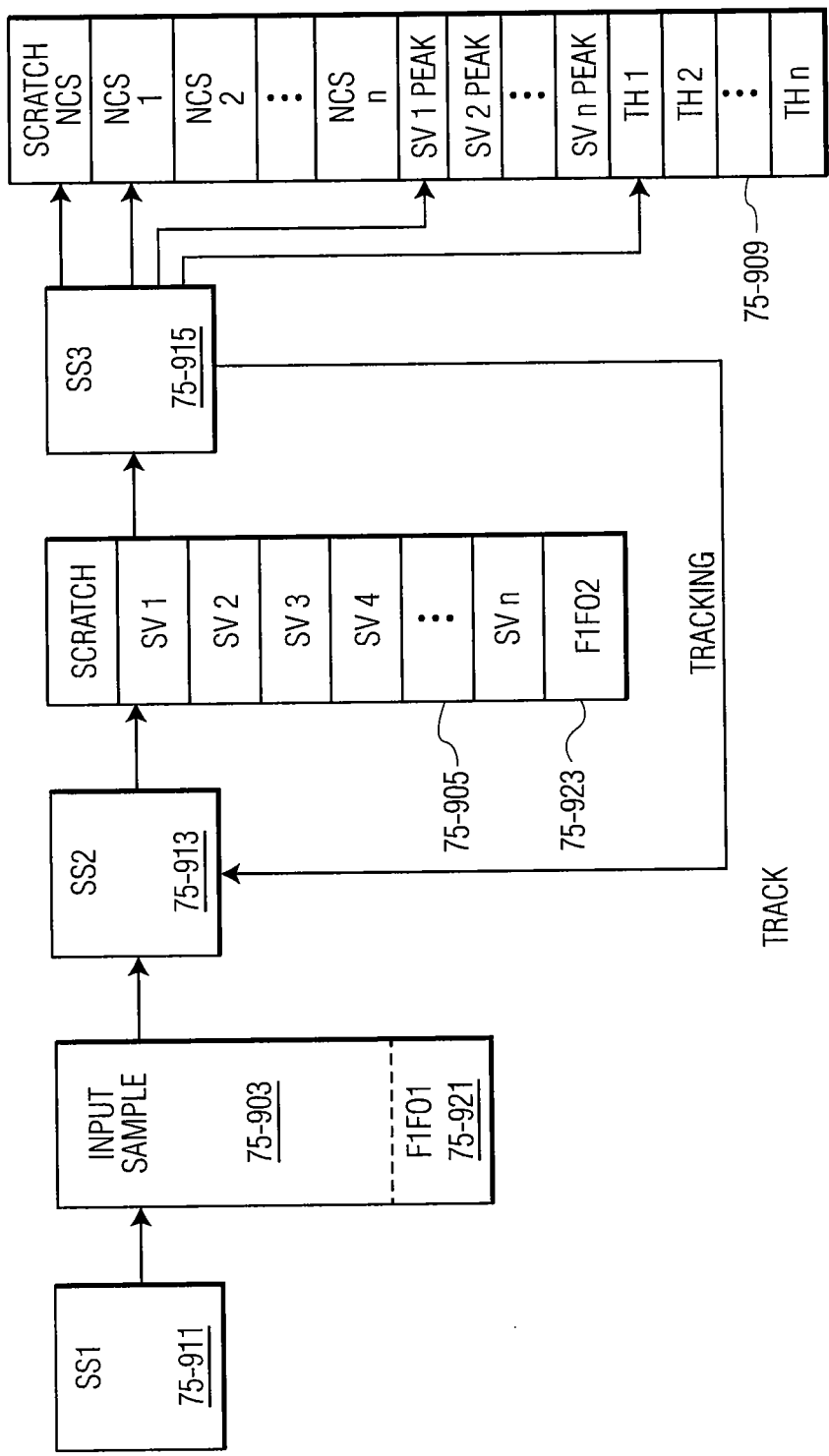
FIG. 75 is a block diagram illustrating a configuration of the signal processing component, including memory allocations, for a tracking mode.

FIG. 75 is a block diagram of a configuration of the signal processing component 67-101, including memory allocation, in the track mode. In the track mode, the signal processing component 67-101 has excellent information about its position, and is tracking satellites it has already acquired. In the track mode, it is possible to turn off more of the signal processing component 67-101 functionality, thus consuming less power.

In the track mode, the input sample RAM 75-903 is relatively small. For example, in one embodiment, the input sample RAM 75-903 is approximately 20K of memory. The input sample RAM 75-903 is smaller than PDI, for example, about 5 milliseconds. The input sample subsystem 75-911 stores input data samples in the input sample RAM 75-903 in a circular buffer fashion. The signal processing subsystem 75-913 processes the input data samples from the input sample RAM 75-903 and stores them in a coherent RAM 75-905, which is larger than PDI. The coherent RAM 75-905 includes a scratch region, which can be shared among different channels in different modes concurrently, and a dedicated region for storing coherent data on a satellite-by-satellite basis. The FFT subsystem 75-915 processes the coherent data from the coherent RAM 75-905 and stores NCS data in a backend storage RAM 75-909. The FFT subsystem 75-915 further feeds back data to the signal processing subsystem 75-913, such as the data boundary on the signal, to be evaluated and used as a basis for possible adjustment of tracking.

The backend storage RAM 75-909 includes a scratch region that can be shared among different channels in different modes concurrently, a dedicated peak region, and a track history (TH) region that stores various data as further described below. The dedicated NCS region stores NCS data for each satellite in a dedicated region, and the dedicated peak region stores peaks for each satellite in a dedicated region.

The track mode stores addition TH output data not stored in other modes. This TH data is used in various ways. For example, the TH includes coherent data that is used by a hardware tracker (not shown). The hardware tracker examines the coherent data to verify that the correct signals are being tracked. Adjustments can be made as necessary through the SW 68-219 and the channel RAM. Even though in track mode, a small search window is kept open by storing additional data selectively in the backend storage RAM 75-909. The search window is used to look for spurious large signals that may make the signal processing subsystem track wrong signals. The search window is also used to find new visible satellites as the visible satellites change.

As an example, the configuration of the signal processing component 67-101 for the track mode can include parameters of the following approximate values: a PDI of 4, 5, 10 or 20 milliseconds; a frequency coverage per processing run of 100 Hz-750 Hz; and a sensitivity of 12-50 dbHz.

Figure 76:
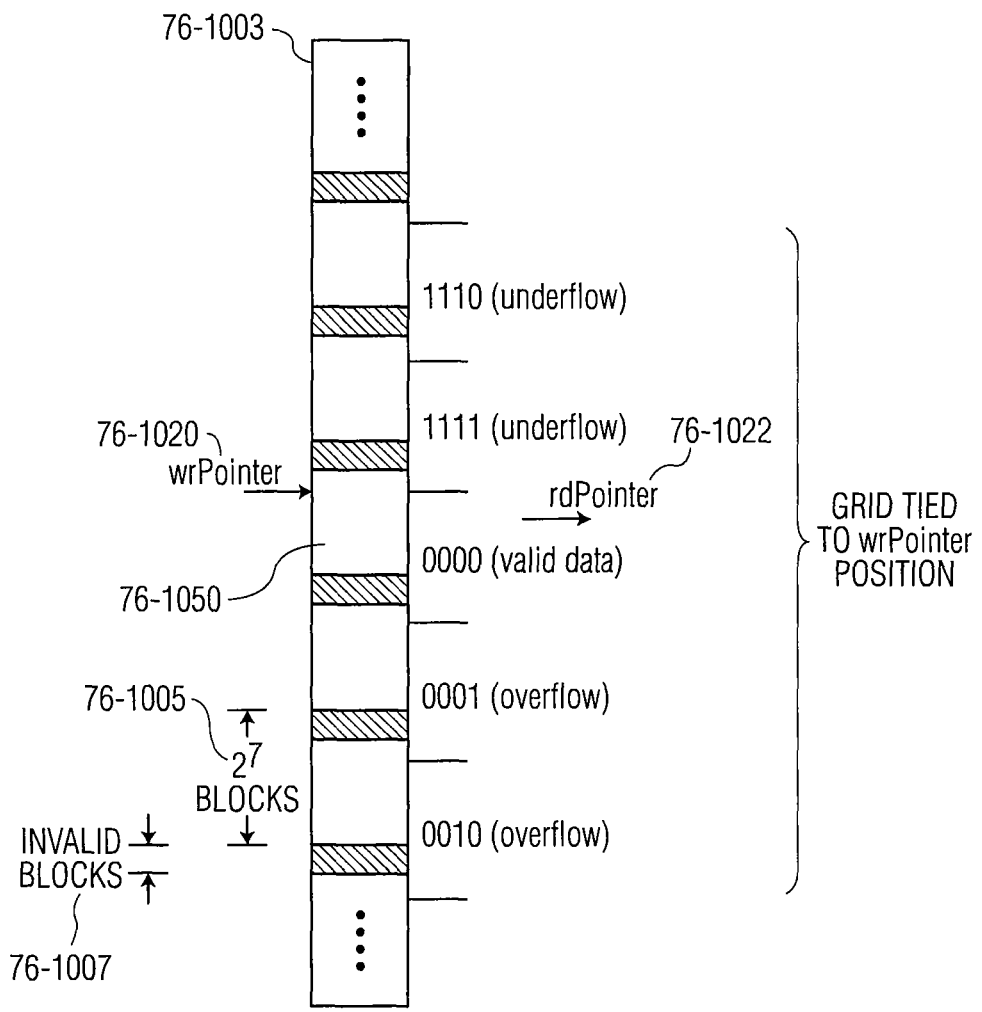
FIG. 76 is a block diagram showing some aspects of how data is stored in an input sample RAM.

FIG. 76 is a block diagram showing some aspects of how data is stored in an input sample RAM 76-1003. This diagram shows how regions of the dynamically configurable and allocable RAM 68-201 are allocated to the input sample RAM 68-203. A write pointer 76-1020 is shown on the left of the input sample RAM 76-1003, and a read pointer 76-1022 is shown on the right of the input sample RAM 76-1003. Each block of the input sample RAM 76-1003 that is represented as a clear (not cross-hatched) region is an actual address space used for the input sample RAM 68-203. A region denoted 76-1005 contains potentially valid data, and a subregion 76-1007 of invalid data, which is shown with hatching. There is only one such block region 76-1005 that contains valid data at any one time. In FIG. 76, the region of current valid data is denoted by 76-1050. The region 76-1050 is also the region to which the write pointer 76-1020 and the read pointer 76-1022 currently point, as shown. Overflow and underflow conditions are detected by comparing the value of the read pointer 76-1022 to the value of the write pointer 76-1020.

Each block region 76-1005 represents an entire address space with an invalid block 76-1001. Each block region 76-1005 includes the same addresses. For example, if a wrap pointer is tied to the top of the address, the address keeps incrementing as one progresses up the diagram. If one physically goes from the bottom block region 76-1005 to the block region 76-1005 immediately above it, one is going to the bottom of the address space. That is, the same address space is stacked over and over. The region cross-hatched invalid block regions 76-1007 are part of the full binary range that may not be used because of binary addressing. The invalid block regions 76-1007 are skipped.

On the right of the input sample RAM 76-1003, different regions are denoted, including the valid data region 76-1050, and regions in which underflow and overflow conditions would occur for a given write pointer 76-1020.

Figure 77:
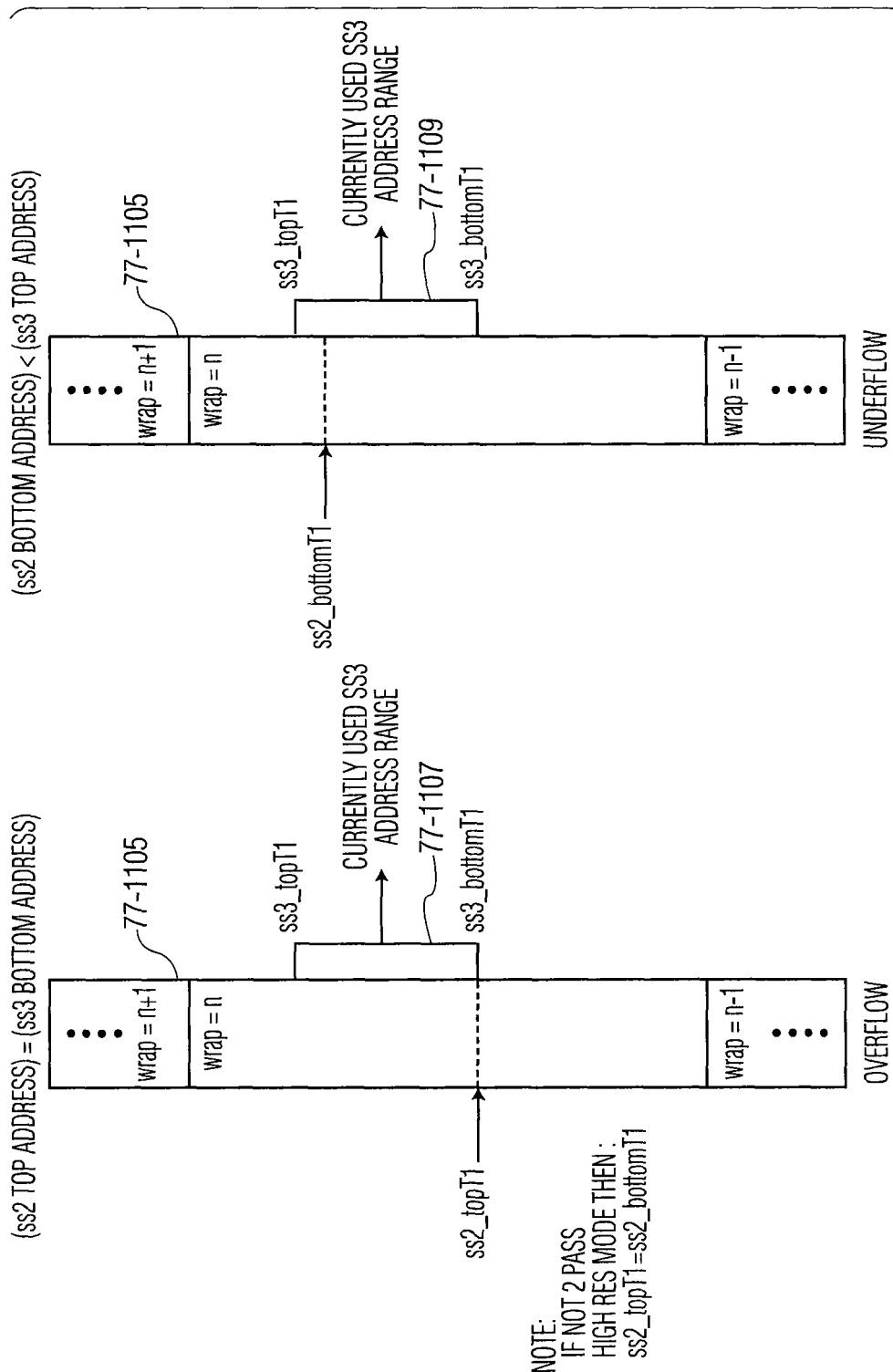
FIG. 77 is a diagram illustrating overflow and underflow conditions for a coherent RAM.

FIG. 77 is a diagram illustrating overflow and underflow conditions for a coherent RAM 77-1105. With reference also to FIG. 70, the FFT subsystem 68-215 accesses an entire range of addresses at one time in the coherent RAM 68-205. If the address range is not available, the FFT subsystem 68-215 stalls with an underflow. The diagram of FIG. 77 shows underflow and overflow conditions in the coherent RAM 77-1105 given the desire to access ranges of addresses. On the left side of FIG. 77, overflow is illustrated. A rectangle 77-1107 defines a currently used FFT subsystem 68-215 address range in the region labeled wrap=n. The total address range for the coherent RAM 77-1105, as previously described with reference to FIG. 76 and the input sample RAM 76-1003, is stacked and repeated. This is represented by the wrap number in FIG. 77. Overflow will be reached where an SS2_topT1 pointer as shown on the left is trying to write into a region from which the FFT subsystem 68-215 (SS3) is trying to read data'out. The FFT subsystem 68-215 will be stalled when the SS2_topT1 pointer reaches the region where the FFT subsystem 68-215 (SS3) is trying to read. An overflow occurs when (SS2 top address)=(SS3 bottom address). It is possible to stall the FFT subsystem 68-215 because access to the coherent RAM is controllable through the FIFO2 68-223. Less control over the input sample RAM 68-203 is possible because it is not possible to control the live RF input.

The right side of FIG. 77 shows the underflow condition. A rectangle 77-1109 defines a currently used FFT subsystem 68-215 address range in the region labeled wrap=n. ss2_bottom has not reached the top of the address range needed by the FFT subsystem (SS3) 68-215. The required range is not "full" yet. An underflow occurs when (ss2 bottom address)<(ss3 top address).

Figure 78:
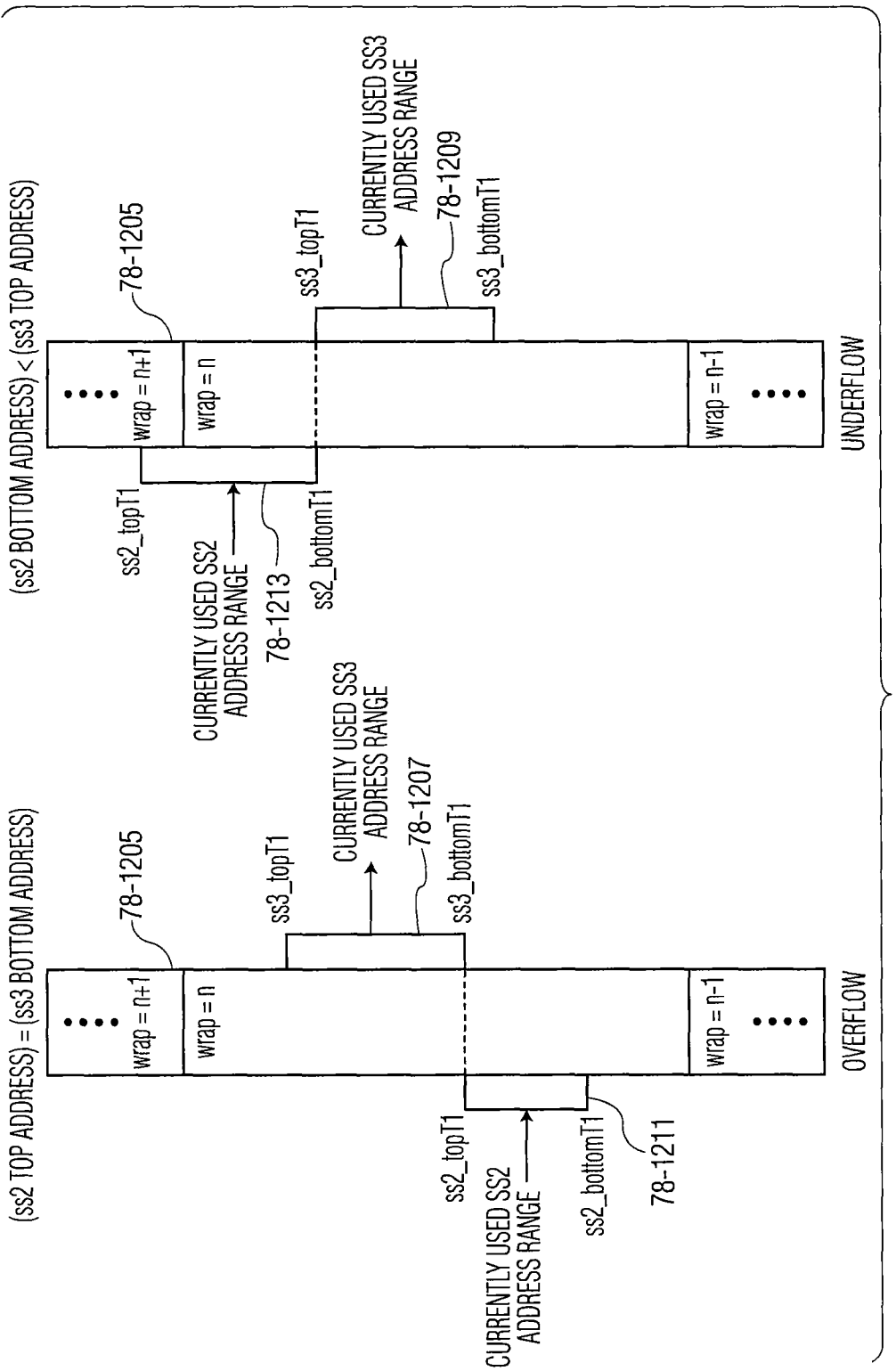
FIG. 78 is a diagram illustrating overflow and underflow conditions for a coherent RAM 1205 in a two-pass, high resolution mode, such as the track mode.

FIG. 78 is a diagram illustrating overflow and underflow conditions for a coherent RAM 77-1205 in a two-pass, high resolution mode, such as the track mode. In a two-pass mode data is written from ss2_bottom to ss2_top. Then the data in that entire range is reused by returning to the bottom and reprocessing the data from the bottom of the range to the top of the range. It has been stated that the FFT subsystem 68-215 uses blocks of data, and therefore waits for an entire block to be available before it reads and processes the data. In the two-pass mode, this is also true of the signal processing subsystem 68-213. In the two-pass mode, the signal processing system 68-213 is treated as needing access to an entire block or address range at one time. So then overflow occurs in this mode when the top of the region the signal processing subsystem 68-213 is attempting to access reaches the bottom of the area where the FFT subsystem 68-215 is trying to read data out. The signal processing subsystem 68-213 writes into the entire rectangle region 77-1211. This writing operation is actually an accumulation in which least significant bits (LSBs) are written from the bottom of the range to the top of the range in a first pass, and most significant bits (MSBs) are added from the bottom of the range to the top of the range in a second pass.

The right side of FIG. 78 shows the underflow condition in a two-pass, high resolution mode. A rectangle 77-1209 defines a currently used FFT subsystem 68-215 address range in the region labeled wrap=n. A rectangle 77-1213 defines a currently used signal processing subsystem 68-213 address range in the region labeled wrap=n. An underflow condition occurs when SS3_topT1 passes (goes above) SS2_bottomT1. That is, and underflow occurs when the FFT subsystem 68-215 attempts to read out a location above the location that the signal processing subsystem 68-213 is writing.

Figure 79:
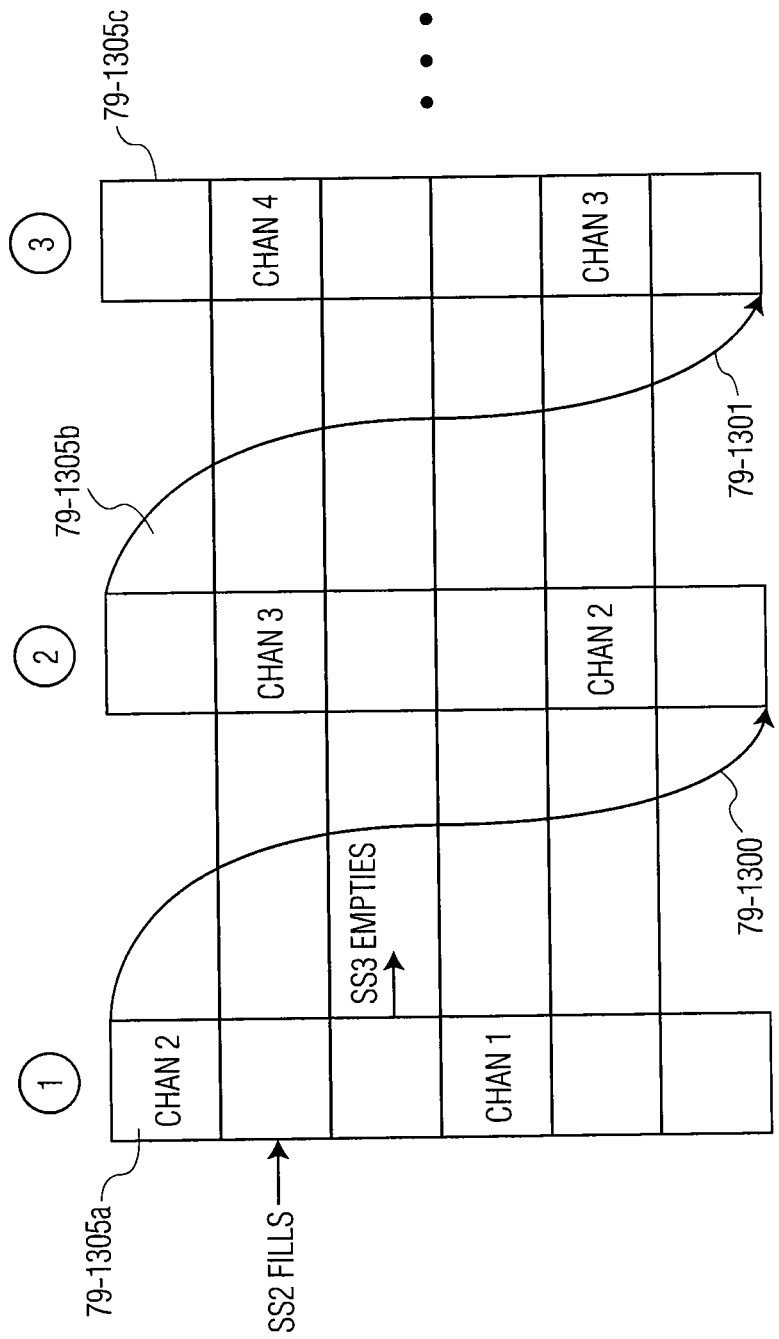
FIG. 79 is a block diagram illustrating an example of a single coherent RAM being shared between multiple channels.

Determination of underflow or overflow involves comparing address pointer of the signal processing subsystem 68-213 and the FFT subsystem 68-215. Access to the signal processing subsystem 68-213 and the FFT subsystem 68-215 is time multiplexed between different channels. When address pointers are compared, it is necessary to know whether a single channel is operating in the signal processing subsystem 68-213 and the FFT subsystem 68-215. If both the signal processing subsystem 68-213 and the FFT subsystem 68-215 are currently operating in the same channel, "live" address pointers are compared. If both the signal processing subsystem 68-213 and the FFT subsystem 68-215 are not concurrently operating in the same channel, stored pointers (from the channel RAM 68-207) are compared. With reference, for example, to FIG. 79, if the signal processing subsystem 68-213 and the FFT subsystem 68-215 are both active in the same coherent buffer region, then live address pointers are used instead of stored address pointers.

In some instances, the coherent RAM 68-205 and/or the backend storage RAM 67-109 are shared between multiple channels. This may be viewed as effectively having multiple coherent RAMs and multiple backend storage RAMs. This allows multiple channels to coherently accumulate in the same memory regions consecutively. That is, there are different modes of sharing memory such that, for example, in one mode a coherent RAM is dedicated to a channel for the duration of a context, while in another mode, the coherent RAM is shared between different channels (where a channel is using a particular subsystem during a context). However, if the signal processing subsystem 68-213 and the FFT subsystem 68-215 are trying access the same shared coherent RAM, live address pointers are used. The signal processing subsystem 68-213 knows whether the same coherent RAM region is being used by looking at the base address pointer for the coherent RAM.

FIG. 79 is a block diagram illustrating an example of a single coherent RAM being shared between multiple channels. This is an advantageous mode of memory usage when a relatively large memory area is allocated for the coherent RAM, but the signal processing system is particularly memory limited. The example of FIG. 79 shows a coherent RAM 79-1305 in three different time positions, labeled with circled numbers 1-3. Referring first to time position 1, the coherent RAM 79-1305a is written from the bottom to the top. An area for channel 1 and a partial area for channel 2 are shown. The signal processing subsystem 68-213 (SS2), as shown by the "ss2 fills" arrow, writes channel 1 data into the channel 1 area. The FFT subsystem 68-215 (SS3) reads data from the channel 1 area after the signal processing subsystem 68-213 writes it in. When the signal processing subsystem 68-213 is finished writing channel 1 data, it moves on to the channel 2 area and begins writing channel 2 data. When the physical coherent RAM area designated by 79-1305a is filled, the signal processing subsystem moves to the bottom of the coherent RAM area, and begins overwriting. This is shown by the arrow 79-1300, which shows the path of the signal processing subsystem 68-213 as it continues to write channel 2 data at the bottom of the coherent RAM 79-1305b in the time position 2.

In the time position 2, the channel 2 data will be written, and the signal processing subsystem will start writing channel 3 data in the area labeled "channel 3". The channel 3 data does not fit in the remaining coherent RAM area, so in the time position 3 the signal processing subsystem 68-213 moves to bottom of the coherent RAM area and begins overwriting the previous channel 2 data, as shown by the arrow 79-1301. As explained previously, if the FFT subsystem 68-215 catches up to the signal processing subsystem 68-213 by attempting to read data that the signal processing subsystem 68-213 has not yet written, the FFT subsystem 68-215 is stalled, or an underflow error condition occurs.

Figure 81:
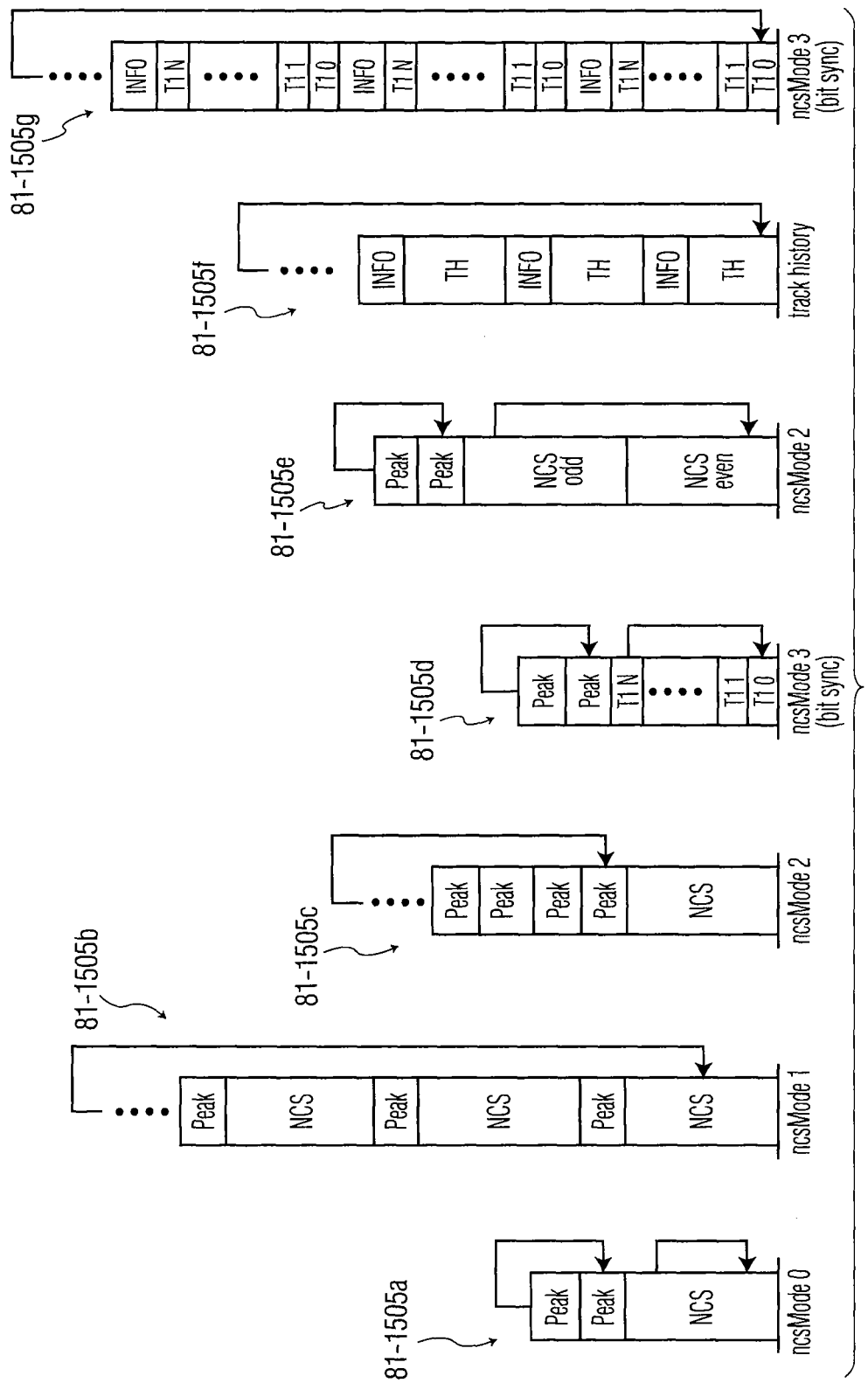
FIG. 81 is a block diagram illustrating various modes of storing data in an allocated NCS data memory area, or back-end storage RAM.

In one embodiment, some conditions should be met for using a shared coherent RAM mode as illustrated in FIG. 81. For example, the channels sharing the coherent RAM should have the same size T1s, although they may have PDIs of different sizes. The signal processing subsystem 68-213 should completely write the PDIs of one context before it leaves the context. Each subsystem using the shared coherent RAM should begin with its own stored pointers. In one embodiment, the pointers are stored in a designated region of the coherent RAM itself. Upon exiting the shared coherent RAM, each channel updates it own stored pointers.

In other embodiments, the coherent RAM area may also share a designated physical memory area with a cold start mode backend storage RAM. This is possible because in cold start mode, the backend storage RAM is a "throw-away" RAM in that it is filled, the peaks are determined from the data, and the data is not needed again. In this case, the designated memory area should be used for NCS data after the coherent data has been used, or processed. NCS data is written into the coherent RAM area in this case, but the coherent data pointers are not updated by NCS usage. The designated shared region for coherent data and NCS data should be less than two PDIs worth of data to avoid the possibility of the FFT subsystem processing data outside of its memory area.

Figure 80:
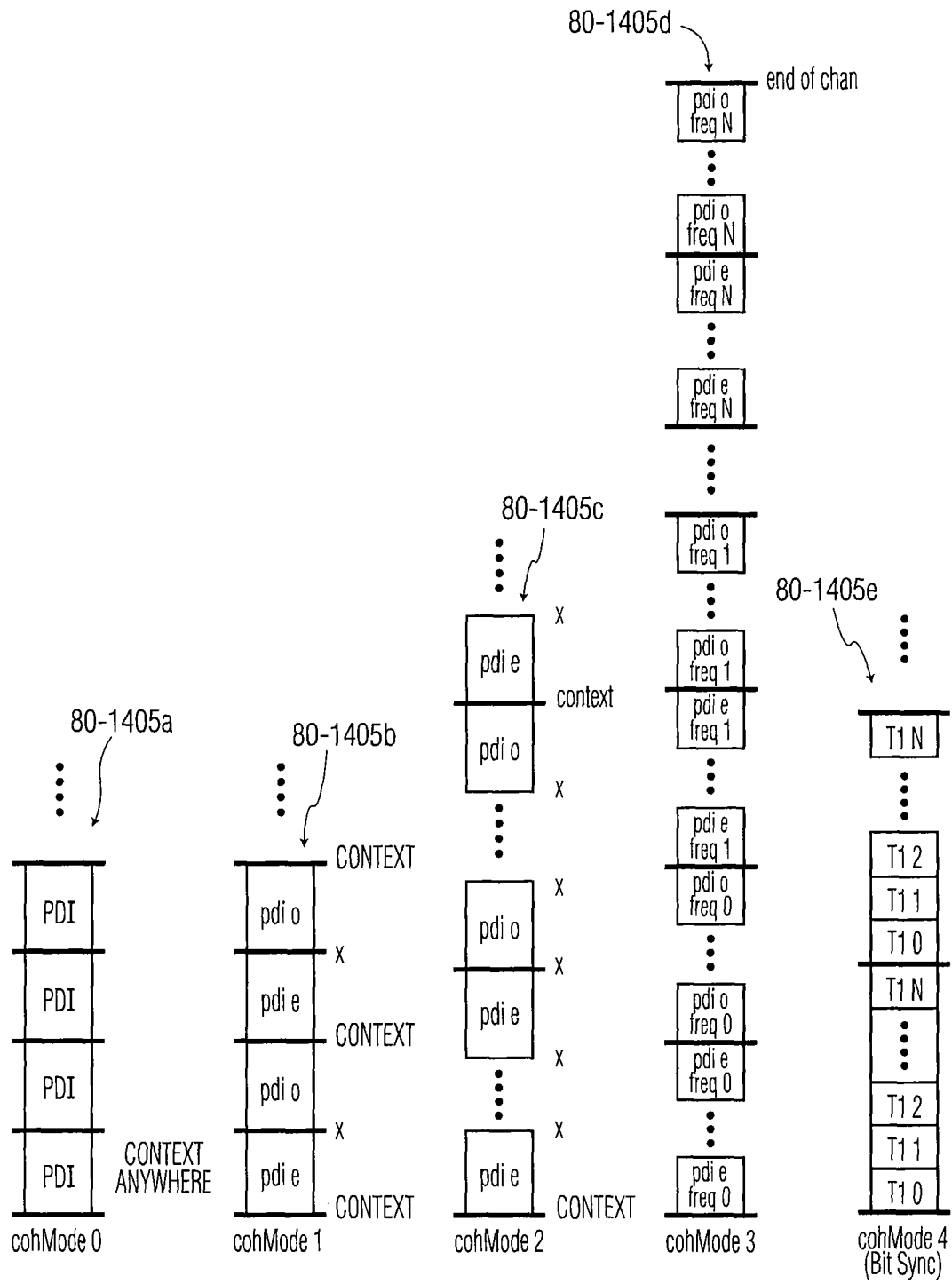
FIG. 80 is a block diagram illustrating various modes of storing data in an allocated coherent data memory area, or coherent RAM.

FIG. 80 is a block diagram illustrating various modes of storing data in an allocated coherent data memory area, or coherent RAM. At the left side of FIG. 80, in a first coherent RAM storage mode zero, a coherent RAM 80-1405a is written by the signal processing subsystem 68-213 from bottom to top, one PDI at a time. A context may be completed at any point.

In a coherent storage mode 1, the signal processing subsystem 68-213 writes a PDI of even half-chips, and then writes a PDI of odd half-chips in a coherent RAM 80-1405b. The context is then finished, and the storage of data from another context continues with even half chips and then odd half chips. Writing of the coherent RAM 80-1405b starts at the bottom and continues to the top.

In a coherent storage mode 2, the signal processing subsystem 68-213 stores multiple PDIs of even half chips alternating with multiple PDIs of odd half chips for one context in a coherent RAM 80-1405c. The signal processing subsystem then continues storing data in another context from the "context" line. The context lines show where data is stored by the signal processing subsystem 68-213 during a context in which a particular channel has possession of the signal processing subsystem 68-213.

In a coherent storage mode 3, the signal processing subsystem 68-213 stores multiple PDIs of even half-chips for a first frequency (freq 0), then multiple PDIs of odd half-chips for frequency 0 in a coherent RAM 80-1405d. Then the signal processing subsystem 68-213 stores multiple PDIs of even half-chips for a next frequency (freq 1), then multiple PDIs of odd half-chips for frequency 1, and so forth.

In a coherent storage mode 4, the signal processing subsystem 68-213 stores all the coherent data for a T1 0, then all the coherent data for a T1 1, in a coherent RAM 80-1405e. Storage continues in this fashion until the data for the final T1 is stored. The number of T1s to be stored is predetermined by software. The coherent storage mode 4 is useful in a bit synch mode in which different code offsets are stored in order to facilitate finding a data bit edge in the satellite data stream. Storage for a context may end anywhere.

FIG. 81 is a block diagram illustrating various modes of storing data in allocated areas of the backend storage RAM. In an NCS mode 0, the FFT subsystem 68-215 (SS3) stores noncoherent data in an NCS area, and peak data for a particular channel in a peak area as shown. At the end of PDI, the peak data storage moves to a new peak region, as shown. In one embodiment, the backend storage RAM 81-1505a has two peak locations within the peak area, but can have more than two in other embodiments.

In an NCS mode 1, the FFT subsystem 68-215 (SS3) stores noncoherent data in NCS areas of a backend storage RAM 81-1505b, and associated peak data in peak areas of the backend storage RAM 81-1505b, as shown. The peaks are updated when the NCS data is updated.

In an NCS mode 2, the backend storage RAM 81-1505c is used as a scratch buffer region. The FFT subsystem 68-215 (SS3) stores noncoherent data in an NCS area of a backend storage RAM 81-1505c, and peak data peak areas of the backend storage RAM 81-1505c, as shown. The peak data is updated at the end of every PDI, but the write pointer is advanced at the end of the NCS data. Because the NCS storage mode 2 is a scratch mode, the NCS data is overwritten, for example, on a half-chip basis, on a frequency basis, etc.

In an NCS mode 3, the FFT subsystem 68-215 (SS3) stores noncoherent data on a T1 basis in NCS areas of a backend storage RAM 81-1505d, and peak data in peak areas of the backend storage RAM 81-1505d, as shown. The peak data is updated at the end of every PDI, including the peak address locations. The arrows indicate the direction in which the write pointer moves when the top of an area has been reached. The NCS mode 3 is useful in a bit synch mode in which different code offsets are stored in order to facilitate finding a data bit edge in the satellite data stream.

In an NCS mode 4, the FFT subsystem 68-215 (SS3) stores odd and even half chips of noncoherent data in NCS areas of a backend storage RAM 81-1505e, and peak data in peak areas of the backend storage RAM 81-1505e, as shown. One odd PDI and one even PDI are stored per context. The peak values are updated after the even and odd PDI data is stored. The peak address locations are updated at the end of every PDI. The arrows indicate the direction in which the write pointer moves when the top of an area has been reached.

As shown, for example in FIG. 68, the track history (TH) data is stored in a TH region of the backend storage RAM 68-209. The RAM 81-1505f in FIG. 81 shows one mode of track history storage. Track history (TH) is stored in TH areas, and report information (INFO) is stored in INFO areas, as shown. The TH data is actual coherent data. The INFO data includes report information. Report information includes various reports, such as a TH report that identifies the coherent track history data and indicates the number of PDIs processed, timetags, etc. The bias sum is a continuous sum of bias over all of the PDIs. The noise sum is a continuous sum of noise magnitudes over all of the PDIs. Another report is a context report that is stored at the time of context switch. The context report includes a timetag, a number of PDIs processed, a bias sum, a noise sum, etc.

A RAM 81-1505g in FIG. 81 shows another mode of track history storage. Track history (TH) is stored in TH areas, and report information (INFO) is stored on a T1 basis in INFO areas, as shown. The TH data is actual coherent data for distinct T1s. The INFO data includes report information. Report information includes various reports, including a TH report that identifies the coherent track history data (e.g., by phase offset and code offset) and indicates the number of PDIs processed, timetags, etc. The bias sum is a continuous sum of bias over all of the PDIs. The noise sum is a continuous sum of noise magnitudes over all of the PDIs. Another report is a context report that is stored at the time of context switch. The context report includes a timetag, a number of PDIs processed, a bias sum, a noise sum, etc. The track history storage mode of the backend storage RAM 81-1505g is useful in a bit synch mode in which different code offsets are stored in order to facilitate finding a data bit edge in the satellite data stream.

The storage modes of FIGS. 79 and 80 are dictated by the channel parameters, which are store in the channel RAM 68-207 by the sequencer 68-217.

Figure 82:
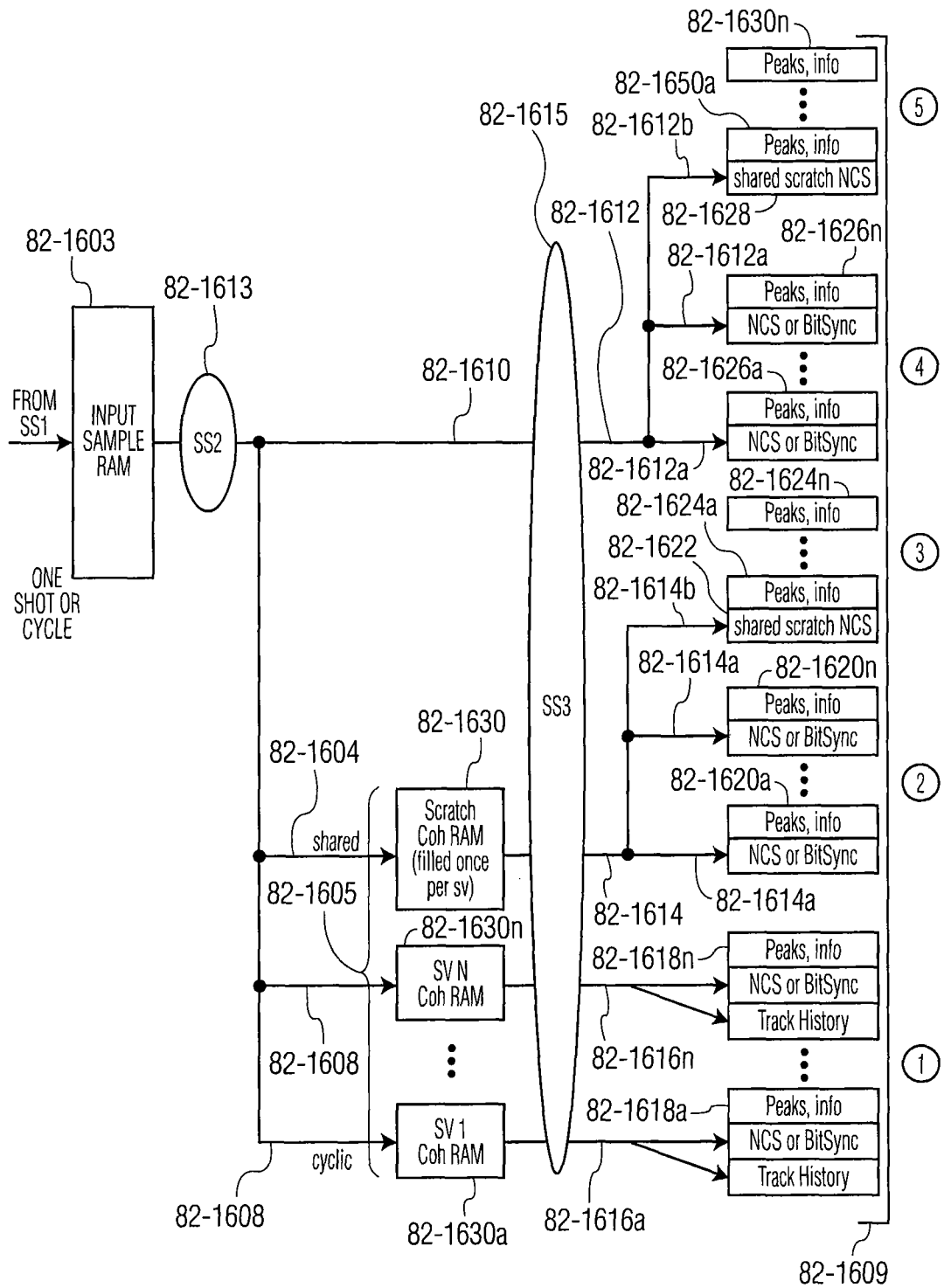
FIG. 82 is a diagram that illustrates the concept of various modes of RAM storage in different operational modes.

FIG. 82 is a diagram that illustrates various modes of RAM storage in different operational modes. On the left of the diagram, an input sample RAM 82-1603 is filled with input data samples by an input sample subsystem (SS1). The input sample RAM can be filled in a cyclic mode or in a one-shot mode, as previously described. A signal processing subsystem (SS2) 82-1613 reads data from the input sample RAM 82-1603, and processes the data. The signal processing subsystem 82-1613 outputs coherent data on one of several possible data paths 82-1604, 82-1608, and 82-1610, according to the operational mode and configuration of the signal processing system.

Referring again to the output paths of the signal processing subsystem 82-1613, an output path 82-1604 represents a path to a shared, scratch area 82-1630 of the coherent RAM 82-1605. The scratch area 82-1630 is filled once per SV. Channels do not maintain their own coherent RAMs, meaning a channel writes the scratch area (overwriting the previous channel's data) and exits each time without regard for its previous location. The physical region of RAM designated for the scratch area 82-1630 may also be alternated between backend storage RAM (for cold start mode) and coherent scratch RAM (for all other modes).

An output path 82-1608 represents a path to an SV dedicated coherent data region of the coherent RAM 82-1605. Coherent data is stored for each SV in a cyclic fashion starting at the bottom with SV1 data in a 82-1630a region and ending with SVn data in a 82-1630n region. This would be applicable, for example, when each channel maintained its own coherent RAM; entering the coherent RAM at the same place it previously exited. The SV dedicated region 82-1630 can also be occasionally used as scratch area.

An output path 82-1610 represents a path straight to an FFT subsystem 82-1615 (SS3), bypassing a coherent RAM 82-1605. This is applicable to the cold start mode. In the cold start mode, the FFT subsystem 82-1615 processes the coherent data, and sends NCS data to a backend storage RAM 82-1609 via a path 82-1612.

Referring now to the area to the right of the FFT subsystem 82-1615, different configurations of a backend storage RAM 82-1619 are represented. The circled numbers on the far right of the diagram indicate various types or modes of NCS storage. Storage mode 1 at the bottom of the diagram includes each channel having its own dedicated area of TH and non-coherent data storage. The FFT subsystem 82-1615 sends data to individual channel areas of the backend storage RAM 82-1609 via the paths 82-1616a-1616n. The channel-dedicated backend storage RAM areas 82-1618a-1618n contain peaks, peak information, NCS data, including bit synch data, and track history data.

Referring to storage mode 2, each NCS region 82-1620a-1620n, has its own corresponding peak region. The FFT subsystem 82-1615 sends data to the NCS region 82-1620 via the path 82-1614a from the shared, scratch coherent RAM 82-1630. An alternative NCS storage mode that is also appropriate for the path 82-1614, is storage mode 3. In the storage mode 3, there is a single scratch region 82-1622, shared among channels, and several dedicated peak regions 82-1624a-1624n via a path 82-1614b.

A storage mode 4 is similar to the storage mode 2 in that it includes multiple NCS regions 82-1626a-1626n, each with its own corresponding peak region. The FFT subsystem 82-1615 stored NCS data, including bit synch data, peaks and peak information, in the backend storage RAM region 82-1626 via a path 82-1612a. An alternative NCS storage mode that is also appropriate for the path 82-1612, is storage mode 5. In the storage mode 5, there is a single scratch region 82-1628, shared among channels, and several dedicated peak regions 82-1630a-1630n via a path 82-1612b.

A detailed description is provided below of the control method and apparatus of the digital signal processing component 67-101. A sequencer, which controls the sequencing of signal processing operations in the digital signal processing component, has been discussed with reference to the sequencer 68-217 and the digital signal processing component 67-101 of FIG. 70. In another embodiment, the sequencer for a signal processing subsystem is collocated with the signal processing subsystem, and the sequencer functionality for an FFT subsystem is collocated with the FFT subsystem. Such an embodiment is shown in FIG. 71. The FIGS. 83-93 and the related descriptions are applicable to either of these types of embodiments, or alternative embodiments that are not shown. As previously stated, the sequencer reads data from the channel RAM, which is programmed by software. The channel RAM stores information regarding current status of a digital signal processing component, such as the digital signal processing component 67-101. The channel RAM also stores information regarding what aspects of the signal processing are to occur next, including what the configurations of the different hardware elements are to be.

Figure 83:
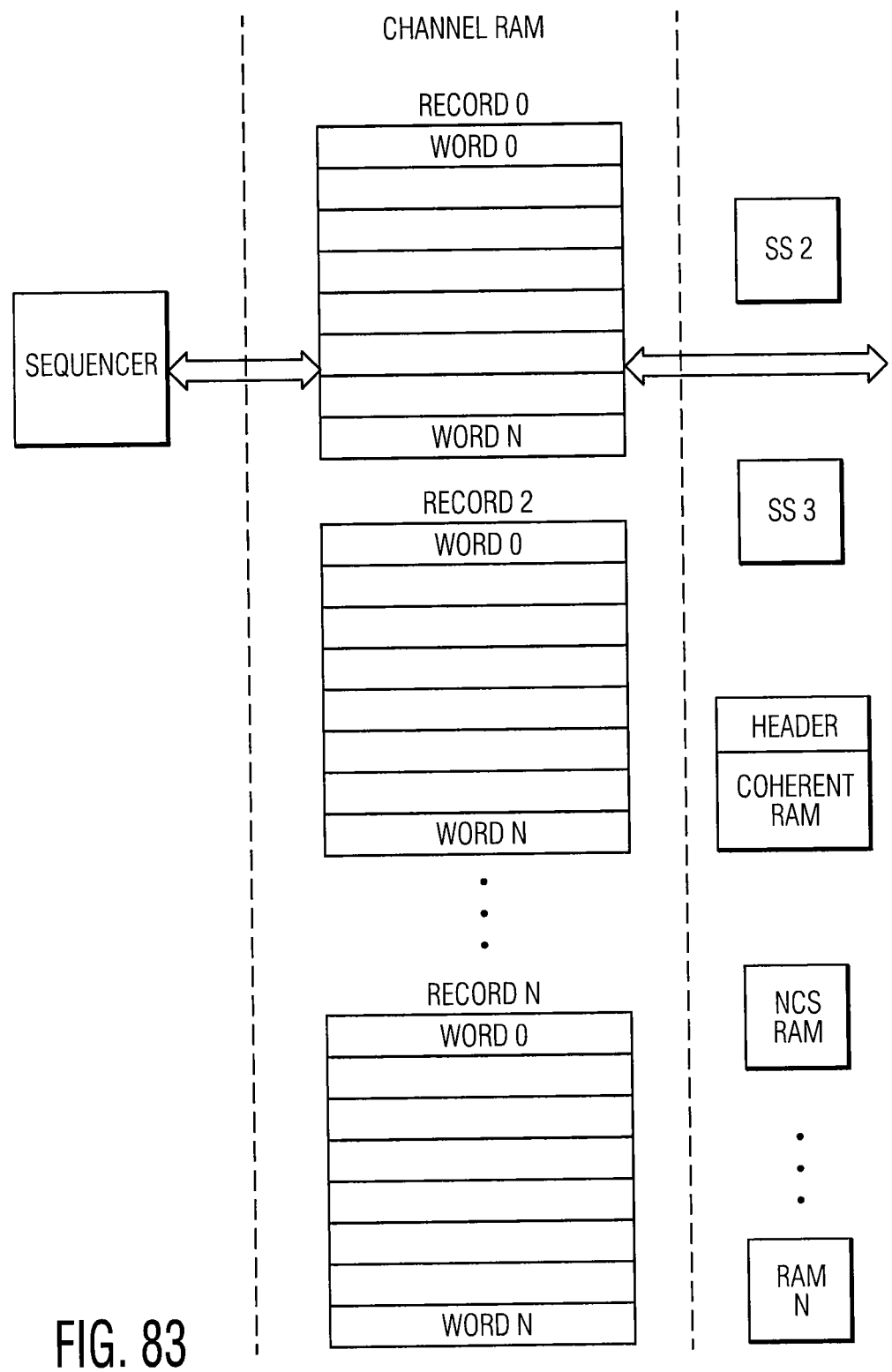
FIG. 83 is a block diagram illustrating a channel RAM and elements with which it communicates in one embodiment.

FIG. 83 is a block diagram illustrating a channel RAM and elements with which it communicates in one embodiment. The dashed lines on the right and left of the diagram conceptually show the communication between the channel RAM and the sequencer (on the left of the diagram), and the channel RAM and various other elements of a digital signal processing component such as the digital signal processing component 67-101 (on the right of the diagram). The relative locations of the elements in the diagram and the dashed lines are not significant. For example, the sequencer could actually be located with either of the subsystems shown, or could be partially located with one subsystem 2 (SS2) and partially located with subsystem 3 (SS3). Any other relative arrangement of different elements is possible. As previously stated, SS2 denotes a signal processing subsystem, and SS3 denotes an FFT subsystem.

The channel RAM sends data to, and receives data from, the sequencer, the signal processing subsystem, the FFT subsystem, the portion of RAM allocated to coherent data, the portion of RAM allocated to NCS data, and other portions of RAM allocated for data such as track history (TH), peaks, etc.

The channel RAM stores multiple channel records, labeled record 0 through record N. Each of the channel records contains multiple data words labeled word 0 through word n. In one embodiment, each channel record includes approximately 68-256 bytes of data. Word 0 in each channel record includes a pointer to the next channel record to be read from or written to. The pointer is used to move from one channel record to another. The channel record also contains all the possible operational modes, various types of signal processing being performed, current counts and states, and code phases and time alignments relative to the input samples. This information is sent as signals to the various elements shown to control processing or to signal error conditions.

The sequencer begins with word 0 in a channel record and "runs" the contents. The contents of a channel record (word 0 through word N) include pointers to addresses in all of the relevant memory areas, which indicate where to get data from and where to write data. The sequencer indicates which of the signal processing subsystem and the FFT subsystem have access to the channel RAM. The signal processing subsystem and the FFT subsystem run as separate execution threads, but are not completely independent. For example, the signal processing subsystem produces data for the use of the FFT subsystem. One of the subsystems should not run too far ahead or behind the other, as will be explained further below.

The reading of the final word (word N) in a channel record corresponds to the completion of a context. When the context is complete, updated information from the completed context is stored in the current channel record, and the sequencer moves to the record indicated in word 0 of the current channel record.

The RAM area allocated to coherent data stores, in addition to coherent data, a buffer header including parameters such as state information and further pointers. The signal processing subsystem and the FFT subsystem read their channel specific states from the header. For example, a subsystem might determine where it last left off in signal processing, or how many samples it is to process. It is convenient to store these parameters in the coherent RAM area header because the parameters are passed from one channel to the next. For example, if the signal processing subsystem placed multiple data blocks for a next channel and exited, the FFT subsystem must know where to read the multiple blocks from. In one embodiment, a known number of blocks, for example seven, are always stored for a channel. When the subsystem for which the data blocks are intended comes in, the subsystem takes the seven of data blocks; when it leaves, it writes the coherent RAM area header stating that seven more data blocks are ready.

Figure 84:
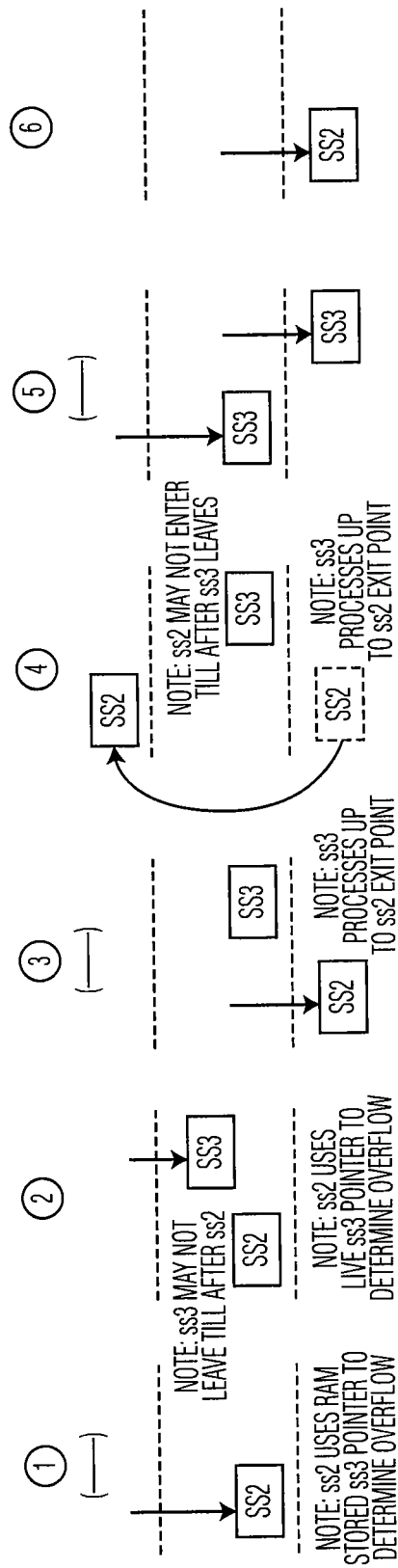
FIG. 84 is a block diagram of an embodiment of a signal processing subsystem sequencer.

The control of a signal processing component, such as component 67-101, by the sequencer of FIG. 84 includes communication among component elements and software using a semaphore word and interrupt signals. One of the aspects of signal processing component control is the sequencing of different channels that must use the hardware resources, including the signal processing subsystem (SS2), the FFT subsystem (SS3), and memory, or RAM. FIG. 84 is a conceptual representation of channel sequencing control in one embodiment. FIG. 84 shows SS2 processing on the left and SS3 processing on the right, with a "control zone" between the two subsystems. The bubbles labeled "time" through "1" represent stages of a processing epoch for each of the subsystems. During the processing epoch, a channel has possession of the subsystem. At the end of the processing epoch and before the start of a next processing epoch, the sequencer makes some determinations that include, among other things, which channel gets possession of a subsystem for processing, which subsystem(s) have access to various allocated RAM areas, and address locations for RAM access.

Figure 86:
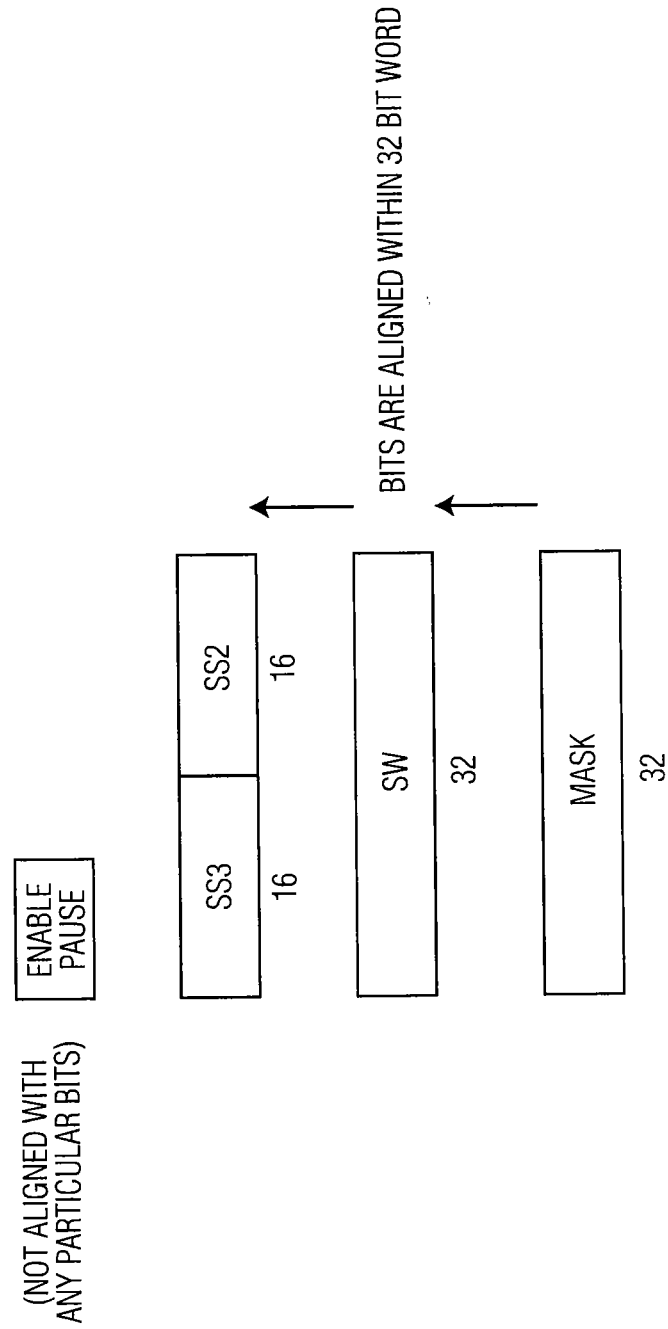
FIG. 86 is a diagram of the semaphore word structure of one embodiment.

Within the control zone of FIG. 84 are shown channel RAM pointers for SS2 and SS3. The channel RAM pointers include a buffer base pointer and a channel pointer for each of SS2 and SS3. The buffer base pointers represent actual locations in the coherent RAM. The channel pointers are the pointers stored in the channel RAM. As shown in FIG. 86, the SS2 base pointer is compared to the SS3 base pointer, and the SS2 channel pointer is compared to the SS3 channel pointer. For example, "channel 1" in SS2, compares its channel pointer to the channel pointer of "channels 2" when it enters SS2. This is to prevent one subsystem lapping another, as will be explained below with reference to lapping rules.

Also shown in the control zone are hardware registers for each of SS2 and SS3, namely an "active" register and a "pause" register for each subsystem. These registers store signal bits indicating that the subsystem is active, and that the subsystem must pause processing, respectively.

The sequencer enforces lapping rules, which prevent the signal processing subsystem from lapping the FFT subsystem, or vice versa. The sequencer also prevents and/or detects underflow and overflow error conditions. Underflow, overflow, and lapping rules are aspects of sequencing and control that were previously alluded to and will now be described in more detail.

The FFT subsystem (SS3) performs underflow detection under different conditions as follows. If the signal processing subsystem (SS2) is in a memory area when SS3 enters, SS3 uses a live SS2 pointer. As long as SS2 is still in this memory area, SS2 continuously loads the live pointer into the location that is the bottom of the SS2 T1 memory space (SS2BottomT1REG). When SS2 leaves the memory area, SS3 switches to using the last saved pointer in the location SS2BottomT1Reg.

SS2 may not enter a channel again until SS3 leaves.

If SS2 is not in buffer when SS3 enters, SS3 reads the stored SS2 pointer and loads it into SS2BottomT1Reg. SS3 then processes up to the stored SS2BottomReg, and exits.

The signal processing subsystem (SS2) performs underflow detection under different conditions as follows. If SS3 is not in the memory area when SS2 enters, SS2 reads the stored SS3 buffer pointer and loads into SS3BottomT1Reg. SS2 processes as many T1s as commanded, and if it runs out of memory space it stalls due to overflow. If SS3 enters the memory area, then live SS3 pointers are used. If SS3 leaves the memory area, then the last saved SS3BottomT1Reg pointer is used until SS3 is back in the same memory area with another channel.

If SS3 is in buffer when SS2 enters, SS2 uses live SS3 pointers up to the point where SS3 leaves and then switches to the last saved SS3BottomT1Reg pointer. SS2 processes as many T1s as commanded, and if it runs out of memory space it stalls due to overflow. If SS3 enters the memory area, then live SS3 pointers are used. If SS3 leaves the memory area, then the last saved SS3BottomT1Reg pointer is used until SS3 is back in the same memory area with another channel.

Figure 85:
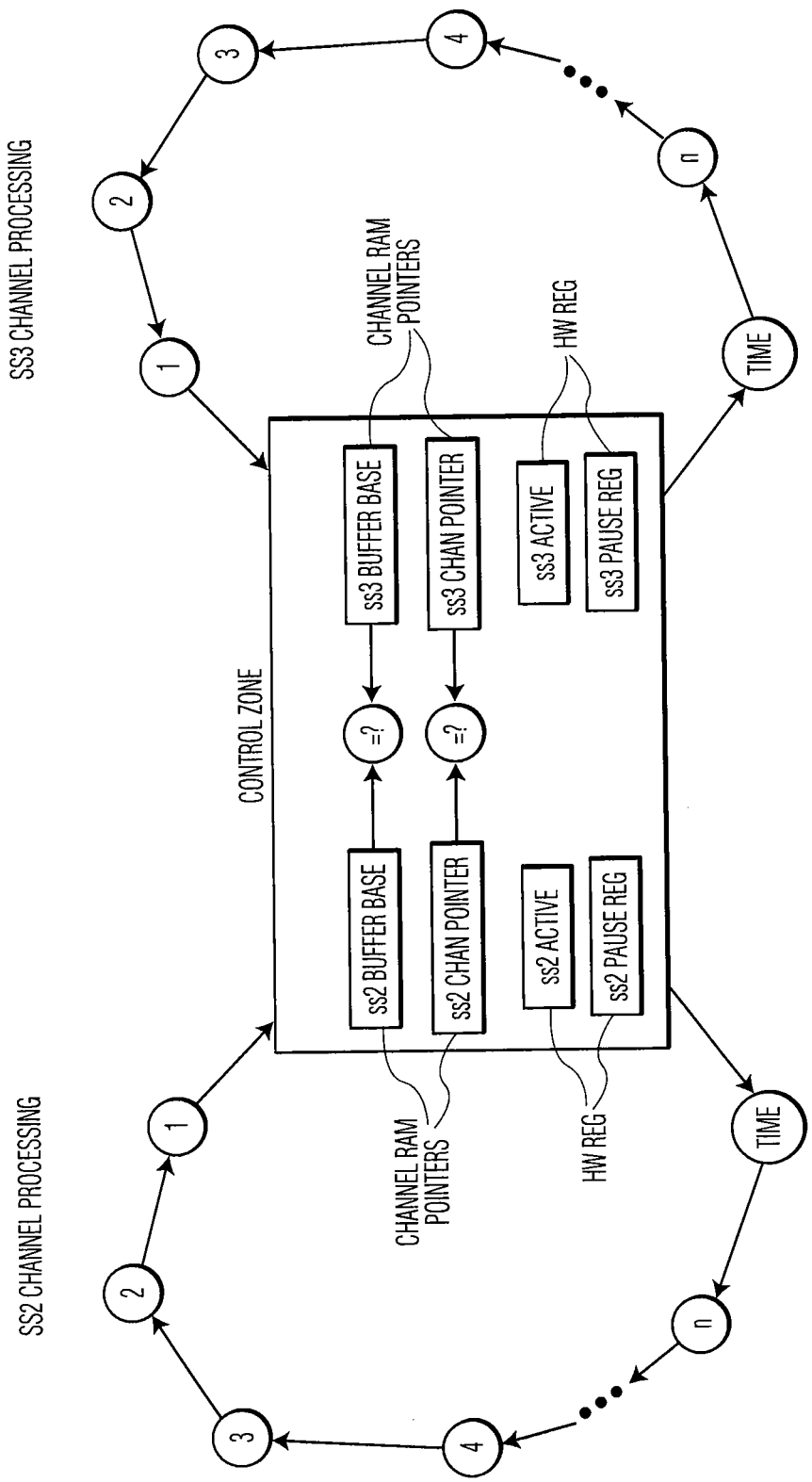
FIG. 85 is a flow diagram that illustrates the function of the signal processing subsystem sequencer in one embodiment.

FIG. 85 is a diagram that illustrates lapping rules in the interaction of SS2 and SS3. The circled numbers at the top of the figure indicate a sequence of time periods. Between each set of horizontal dashed lines is a channel in the particular time period.

Referring to time period 1, SS2 enters the channel, which means that the signal processing subsystem is in possession of the channel and is being used to process data for the channel. SS2 uses an SS3 pointer stored in the coherent RAM area to determine whether there is an overflow condition.

According to the lapping rules, if SS3 were in the channel first, SS2 could not enter until SS3 exited the channel. When SS3 is in the channel, and SS2 is not in the channel, SS3 processes all of the data in the coherent RAM for that channel (stored by SS2 from the last time SS2 was processing that channel's data), and exits when all of that channel's data is processed.

As shown in time period 2, when SS2 is in the channel, SS3 may enter the channel when SS3 (the PFT subsystem) has coherent data to operate on for that channel. According to the lapping rules, SS3 may not leave the channel until after SS2 has left the channel. Both SS2 and SS3 are in the channel, so SS2 uses a live SS3 pointer to determine whether there is an overflow condition.

As previously stated, the SS2 channel RAM base pointers are read by the sequencer, loaded into a register, and compared to the corresponding SS3 pointer to prevent lapping. If SS2 is in a channel and SS3 is in the same channel, then the sequencer on the SS3 sides knows SS3 cannot leave (because SS2 is in the same channel). The coherent RAM base pointer, on the other hand, enforces the first-in-first-out nature of the data processing. SS3 is concerned with whether SS2 produced enough data to for SS3 to consume, rather than whether SS3 can enter or leave the channel. SS2 is concerned with whether SS3 consumed enough data such that SS2 will not overwrite unconsumed data (which is prevention and/or detection of overflow and underflow conditions).

Referring again to FIG. 85, in time period 3, SS2 finishes processing data for the channel and exits the channel. SS3 processes data for the channel up to the point at which SS2 exits the channel. In time period 4, SS2 is ready to enter the channel again, but may not do so until SS3 exits.

In time period 5, SS3 has exited, and SS2 enters the channel again. In time period 6, SS2 has finished processing and leaves the channel. If SS3 has no more data from the channel to process, it does not need to enter the channel. FIG. 85 thus illustrates how data from more than one particular channel is processed by the subsystems in an interwoven or time-multiplexed manner.

The lapping rules, enforced by the sequencer, provide one part of the overall control of the signal processing component. The other part of the control is provided by the FIFO2, (as shown, for example, in FIG. 69). In one embodiment, the FIFO2 is a circular buffer into which SS2 stores data that is read by SS3. SS2 fills the FIFO2 on a T1-by-T2 basis. SS3 requires a complete PDI (which is a programmed number of T1s) to be available before it will begin reading out and processing data. The number of T1s in a PDI is determined by what the FFT element (not shown) of the FFT subsystem requires. The FFT is configurable to operate on different numbers of T1s. As an example, if the FFT is configured as a 5-sample, 16 point FFT it needs 5 samples or complete 5 T1s before it can begin reading data out. The combination of the FIFO2 and the lapping rules control the flow between the signal processing subsystem and the FFT subsystem.

The signal processing subsystem (SS2) drives the amount of data that is produced how much data t produced. SS2 is programmed to produce a certain amount of data on each context, where context implies that a channel has entered SS2, and its context will end when it leaves SS2. So in a particular context, SS2 is programmed to run for a number of milliseconds and will read data from FIFO1 until it has consumed the milliseconds it was programmed process.

Lapping Rules

Figure 87:
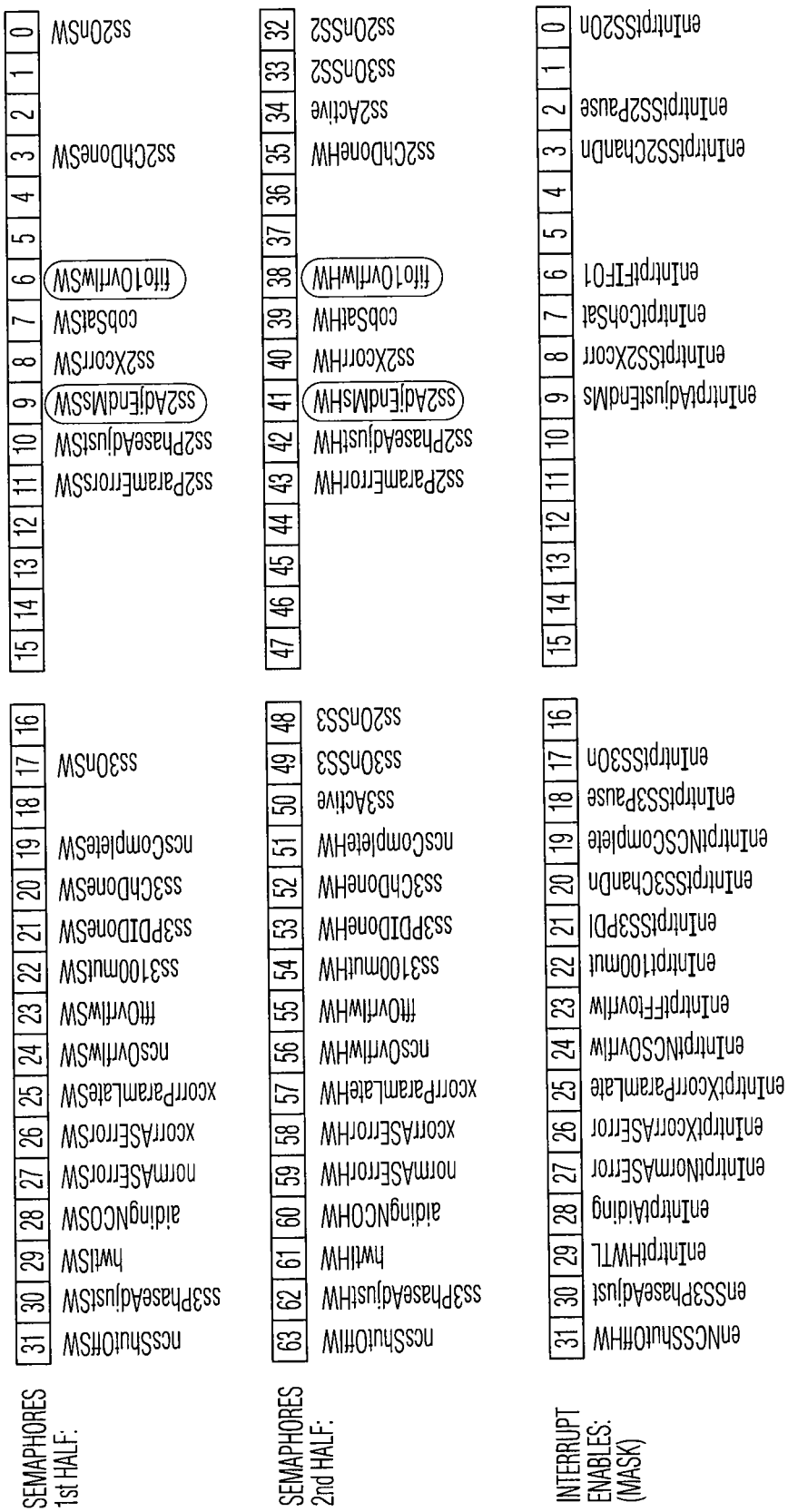
FIG. 87 shows a configuration of semaphore words in an embodiment.

The sequencer lapping rules as illustrated in FIG. 87 may be stated as follows:

1. SS2 processed channels may not lap each other;
2. SS2 may not enter a channel (make active) if SS3 is currently active with that channel (else, SS2 has "lapped" SS3 condition);
3. SS3 may not exit a channel if SS2 is currently active with that channel (for example, SS3 processing may be required to follow an SS2 condition; SS3 will process data as it becomes available if SS2 is active);
4. SS2 will process the number of milliseconds it has been programmed to process (including SW correction portion), and will remain in channel until SS2 processing is complete;
5. SS3 will process as many T1's as are available in its buffer (coherent RAM area). SS3 will process up to the stored the SS2 buffer pointers if SS2 is not active, and up to the point where SS2 completes if SS2 is active;
6. SS2 and SS3 may be prevented from continuing processing by a wait semaphore or a wait flag. For example, SS2 may be stalled by "SS3 context done" or by "SS3 PDI done", and SS3 may be stalled by a SS3 PDI done.

In applying the lapping rules, channel RAM pointers are used to determine if channels are equal. Coherent RAM pointers and "active" flags are used to determine if SS2 and SS3 are in same coherent RAM area. Using a shared coherent RAM area may mean two different channels are active in the same coherent RAM area, and shared coherent RAM areas are treated from as if only one channel is trying to access it The semaphore word and interrupts, and their role in controlling the operation of the signal processing component, will now be discussed in greater detail. FIG. 86 is a diagram of the semaphore word structure of one embodiment. The semaphore word structure includes 16 bits controlled by the signal processing subsystem (SS2) and 16 bits controlled by the FFT subsystem (SS3). The semaphore word structure further includes 32 bits controlled by software (SW), such as SW 69-319 of FIG. 71. The 32 bits controlled by SW are aligned with the bits controlled by SS2 and SS3 as explained further below. The semaphore word structure further includes 32 mask bits aligned with both the 32 bits controlled by SW and the bits controlled by SS2 and SS3. The semaphore word structure further includes enable/pause bits that are not aligned with bits in other words.

As stated, the semaphore word facilitates communication between SS2, SS3 and SW, which are not synchronous with respect to each other, by enabling the handing back and forth of flags. When a sequencer (e.g., the SS2 sequencer) is initialized, it reads the semaphore word for any SS3 or SW flags. The semaphore word provides information that determines what actions should be taken or not taken by the sequencer. FIG. 87 shows a configuration of semaphore words in an embodiment. The significance of individual bits is indicated by bit labels. The 32 bits labeled "Semaphores $1^{st}$ half" and Semaphores 2nd half" correspond to the 64 bits made up of the SS2 bits, the SS3 bits, and the SW bits in FIG. 86. The 32 interrupt enable bits correspond to the "MASK" bits in FIG. 88. There is a semaphore word as shown in FIG. 89 for each channel.

As shown, for the most part, the semaphore bits overlap. That is, a SS2 bit with a particular significance has a counterpart SS3 bit and a counterpart SW bit. Messaging between SS2, SS3 and SW includes performing an XOR and/or AND of hardware (HW) bits and SW bits with corresponding significances. HW includes the signal processing subsystem (SS2) and the FFT subsystem (SS3). Messaging is in two directions: in one direction HW lets SW know that a HW event occurred. In the other direction to command SW commands HW to perform an action. The bits function as semaphore "flags". Using a status semaphore as an example, when HW wants to notify SW of an event, HW changes the existing state of the appropriate bit. The initial starting states of two corresponding bits are the same; either zero or one. When the state of the bit is changed by HW, the XOR of the two bits is a one. When SW then looks at the semaphore word, it knows that HW set the flag because the XOR result is one. SW responds by changing the state of the corresponding bit under its control. Of course, this makes the states of the two bits the same again, thus making the XOR result for the two bits zero, and clearing the flag. The SW response to the HW flag information can be interpreted as an acknowledgment, a command, a reset or initialization, depending on the significance of the flag.

In the other direction, SW creates a command by making the XOR result zero for some bit pair of a particular significance. An example is the command to create a 100MUT report. When HW receives the command, it acknowledges by changing the bit under its control to make the XOR result a one again.

To use one set of bits as an example of a command and acknowledgment with reference to FIG. 88, the Semaphores $1^{st}$ half word includes an ss2AdjEndMsSW bit (circled), which is software controlled. The Semaphores 2nd half word includes the HW controlled counterpart, ss2AdjEndMsSW (also circled). The ss2AdjEndMsSW bit tells the HW "instead of processing the normal number of milliseconds, process additional ms". In this particular case, SW creates the command to HW by changing the state of the bit under its control and making the XOR of the two corresponding bits a zero. After HW completes the command, it sends and acknowledgment by changing the state of its ss2AdjEndMsHW bit to make the XOR a one again.

As an example of a status flag, the Semaphores $1^{st}$ half word includes fifo1OvrflwSW (circled). The Semaphores 2nd half word includes the HW controlled counterpart, fifo1OvrflwHW (also circled). When a FIFO1 overflow condition occurs, meaning SS1 overwrote a portion of data before SS2 had a chance read it out, that is communicated that with the semaphore word by changing state of the bit under HW control, and if applicable, generating a corresponding interrupt.

The third row of bits in. FIG. 87 includes interrupt enable mask bits for interrupts for a particular channel. Interrupts are related to the semaphore word. When HW has an event for which it wants to set a status semaphore bit, it can also generate an interrupt. SW determines which channel created the interrupt, because the interrupts are just lines that come out of SS2. The lines do not indicate which channel was in the subsystem when the interrupt was created. SW does this by reading the semaphore words of all of the channels to find the set bit. Interrupts are discussed in more detail below.

There are some particular bits that do not operate according to the XOR messaging just described. Instead, these bits operate as an AND of three bits. There are three such bits for SS2 and three such bits for SS3. The bits are referred to as "ON" bits and they indicate is whether the channel is to be processed or not. For example, SS3 has three "ON" bits, one of which is controlled by SS2, one of which is controlled by SS3 and one of which is controlled by SW. Any one of those sources could cause the "ON" bits to have an "OFF" connotation, or "turn the "ON" bits of" by changing the state of the bit under its control. When a subsystem initially, it first determines from the semaphore word whether it should pause. The subsystem then determines from the "ON" bits whether it may begin processing or not. If the "ON" bits are turned off, the subsystem exits loads the pointer for the next channel.

One condition that turns the "ON" bits off is a termination condition. For example, if SS3 has processed the number of PDIs to be processed, SS3 turns off its own "ON" bit and the "ON" bit of SS2 that it has control of. SS2 then turns off its own "ON", and the next time SS2 comes to that channel it will "skip".

FIG. 88 is a list of the SS2, SS3, and FIFO1 semaphores, including HW controlled semaphores, SW controlled semaphores and "pause" semaphores (which correspond to the "enable pause" block of FIG. 86).

The pause semaphore can be enabled by a number of circumstances, including errors. When the pause semaphore is enabled by completion of a channel by SS2 or SS3 completing a channel, or by completion of a PDI, SS2 will process up to the pause and stall.

In reaction to a pause semaphore, SW performs any processing required and updates the appropriate parameters. SW updates the SW portion of the channel semaphore word to clear the done semaphore. If a pause of SS2 is enabled, SW clears the HW pause register. SW reads the channel base pointer in facilitating a pause. SW also clears the pause register.

Interrupts are created when the semaphore word is updated and stored back in the channel buffer. In one embodiment, interrupts are enabled upon an acknowledgment of the semaphore write by the arbitration unit. A channel done semaphore and a PDI semaphore are toggled each time a channel competes or a PDI completes, respectively. Channel done semaphores are written back when the channel active bit in the semaphore word is cleared.

Various interrupts are under the control of different elements, as shown. The timer interrupts are controlled by SS1. These are more related to timing than to sequencing. Specifically, the timer interrupts are related to the timing of input data written into FIFO1.

As previously mentioned, an overflow condition includes one subsystem beginning to overwrite data that another subsystem has not had an opportunity to process yet. Overflow is an error condition that causes an interrupt. One of the interrupts under the control of SS2 may be "FIFO1 overflow". When FIFO1 overflow occurs upon the initiation of SS2, the interrupt has the effect of shutting down the channel. The channel updates the semaphore word and sets the interrupt flag (if enabled) upon exiting.

When FIFO1 overflow occurs during SS2 processing, the channel sets a local overflow flag and continues processing, the resultant data is recognized as "garbage data". When the channel is finished processing, it updates the semapahore word and sets the interrupt flag (if enabled) upon exiting. The channel clears the local overflow flag Interrupts are also generated when a subsystem finishes processing data for a channel. For example, when SS2 finishes processing data for a channel, the channel updates the semaphore word and sets the SS2 channel done interrupt upon exiting. When SS3 finishes processing data for a channel, the channel updates the semaphore word and sets the SS3 channel done interrupt upon exiting.

When SS3 is finished processing a PDI-worth of data, and the channel is completed also, S33 sets both the SS3 channel done and PDI done interrupts (if enabled), upon exiting channel: If SS3 is finished processing a PDI, but the channel is not completed, only the PDI done interrupt is set, and the semaphore word is written back to channel buffer, and SS3 stalls (if enabled)

Another part of the sequencer functionality is determining termination conditions. For example, the sequencer determines whether SS2 and SS3 combined have completed the required amount of processing. FIG. 88 is a list of termination conditions for SS2 and SS3. A termination condition from the perspective of SS2 is a FIFO1 overflow. This occurs when SS1 has overwritten data not yet processed by SS2. In this case, SS2 shuts off its own "ON" bit and also the "ON" bit of SS3 that it controls; it also sends out an interrupt to let SW know what has happened. From then on, every time the sequencing reaches the channel for which overflow occurred, it will skip. This gives SW time to go in and reprogram the channel RAM before it reprograms the "ON" bits.

From the perspective of SS3, termination condition occurs when SS3 has reached the PDI count, when there is an overflow in the processing path, or when an "early termination event" occurs. When SS3 has reached the PDI count, it is finished processing the data available to it. Recall that SS3 processes data on a PDI basis as it is available. SS3 can be programmed to operate for a particular number of PDIs. When the data in the applicable number of PDIS has been processed and non-coherently accumulated by SS3, SS3 seta a bit in the semaphore word to indicate a termination condition.

An early termination can be caused by certain parameters being exceeded. For example, there are autoscale values associated with coherent RAM and also with non-coherent accumulation (an exponent associated with a non-coherent summation). If that value exceeds a range, or if it grows very rapidly (how many summations does it take to reach the large exponent value is how this is determined—if it takes relatively few summations to reach a relatively large exponent value, we can say that the signal is very strong), you have a strong signal and do not need to count all 100 PDIs. Can shut down and let SW come in.

SW may also command a termination in order to cleanly shut down a channel. Generating a termination condition is a clean way for SW to shut down a channel in part because this takes the sharing of RAM between channels into account It would be undesirable to shut down a channel before it has pulled out its data from FIFO2. It does not really need to process the data from FIFO2; what is important is that it advances its pointer beyond the region, because the next channel will look at this shared pointer. This allows SW to tell SS3 to shut down, but only after is has advanced its pointer beyond where it was supposed to process. Where it was supposed to process is basically whatever data SS2 put in the buffer for SS3, and this data must be pulled out by SS3 before it exits the context.

Termination and early termination take into consideration the even and odd half frequencies. For example, SS2 processing for 10 milliseconds may mean 10 milliseconds of odd half chips, then 10 milliseconds of even half chips, and then 10 milliseconds each for multiple frequencies steps. So SS3 must pull out whatever SS2 put in. SS3 knows whether the data is odd or even and how much data there is. Accordingly, SS3 pulls out all of the data it should be expecting and then terminates. The specific characteristics of termination conditions are thus somewhat dependent on the type of processing that is occurring at the time.

The foregoing described the sequencing of operations in a signal processing component such as signal processing component 67-101, and descriptions of semaphore word messaging between component elements interrupts, and termination conditions. The following is a description of embodiments of sequencer elements and their functions.

Figure 90:
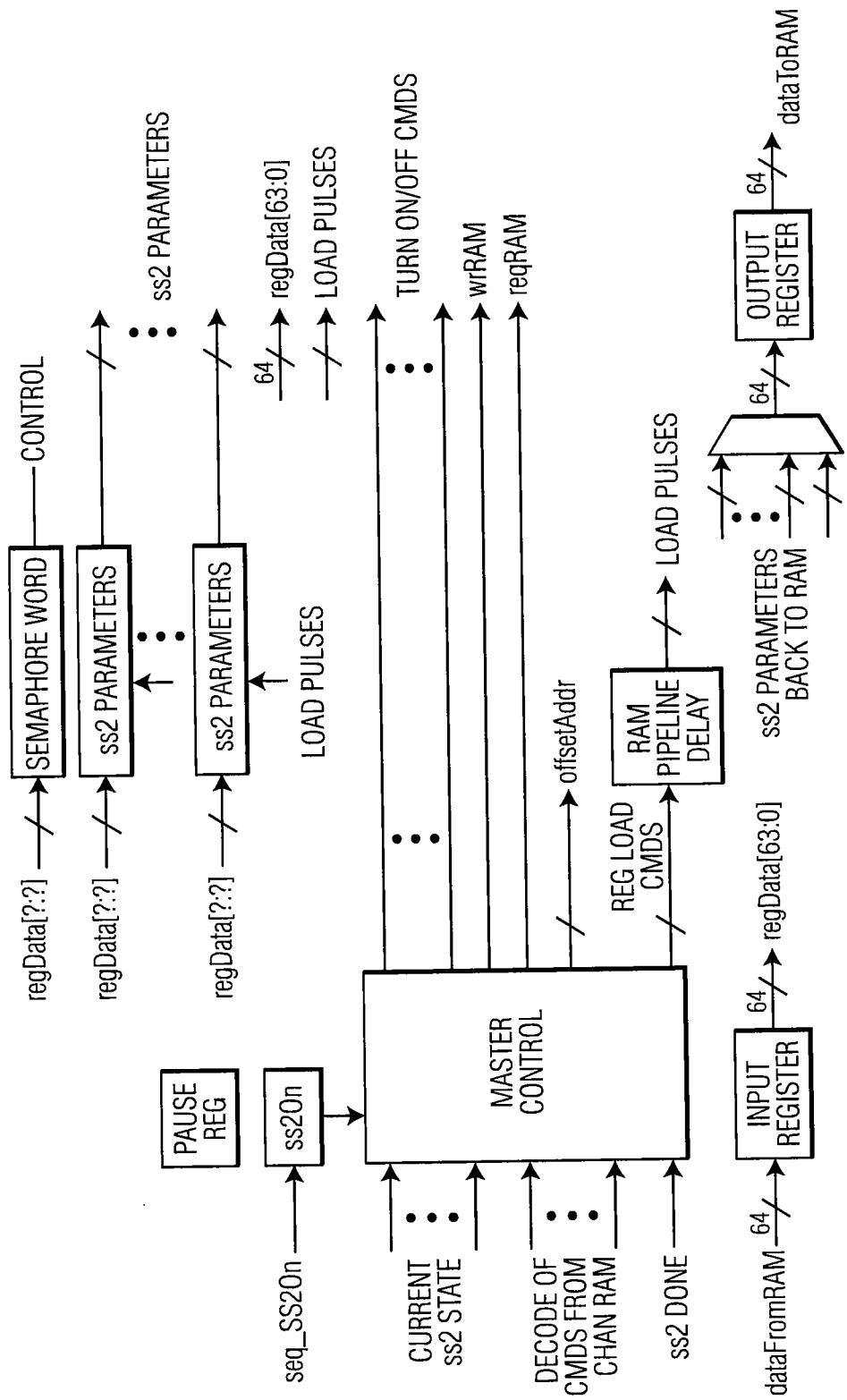
FIG. 90 is a block diagram of an embodiment of a sequencer.

FIG. 90 is a block diagram of an embodiment of a sequencer (labeled SS2 Sequencer), such as the sequencer 69-313a of FIG. 69, for a signal processing subsystem. The signal processing subsystem sequencer includes an input register, or input port, through which it reads data from the channel RAM. The signal processing subsystem sequencer also writes data back into the channel RAM through an output register, or output port. A master control element in one embodiment is a state machine that controls the signal processing subsystem sequencer. It addresses data relative to certain address bases. For example, there is a channel base address for the channel RAM, and there are base addresses for the various other allocated RAM areas (coherent RAM, NCS RAM, and so on). The base address indicates the channel record being processed, and access to the channel record is relative to the base address. The master controller controls the operation of the signal processing subsystem sequencer. The input port pulls in assorted parameters and stores them as needed in the master controller. At the end of processing the sequencer writes the updated parameters back to the channel RAM through the output port.

At the top of the diagram is shown data that is used to control the signal processing subsystem. As stated with reference to FIG. 83, the channel RAM contains parameters that are required to configure the subsystem for operation in a particular mode. A semaphore word is also used to control the signal processing subsystem. The semaphore word includes command and status information. The semaphore word is used to communicate between the signal processing subsystem, the FFT subsystem, and software, and can be stored in any memory area accessible by all of the elements requiring access to it. In one embodiment, semaphore words are stored in the channel RAM.

Figure 91:
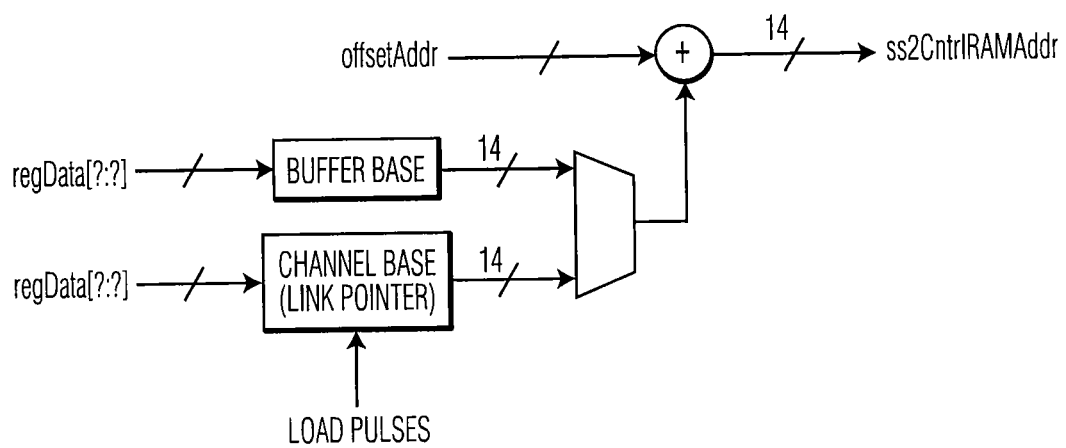
FIG. 91 is a block diagram of elements that generate a RAM address according to an embodiment.

The generation of the RAM address according to an embodiment is illustrated in FIG. 91, which shows a buffer, or RAM area, base address, or a channel base address being combined with an offset address to yield an actual RAM address for signal processing subsystem access (ss2CntrlRAMAddr). The selection of the buffer base address or the channel base address is made a select signal from the master controller to the multiplexer.

Figure 92:
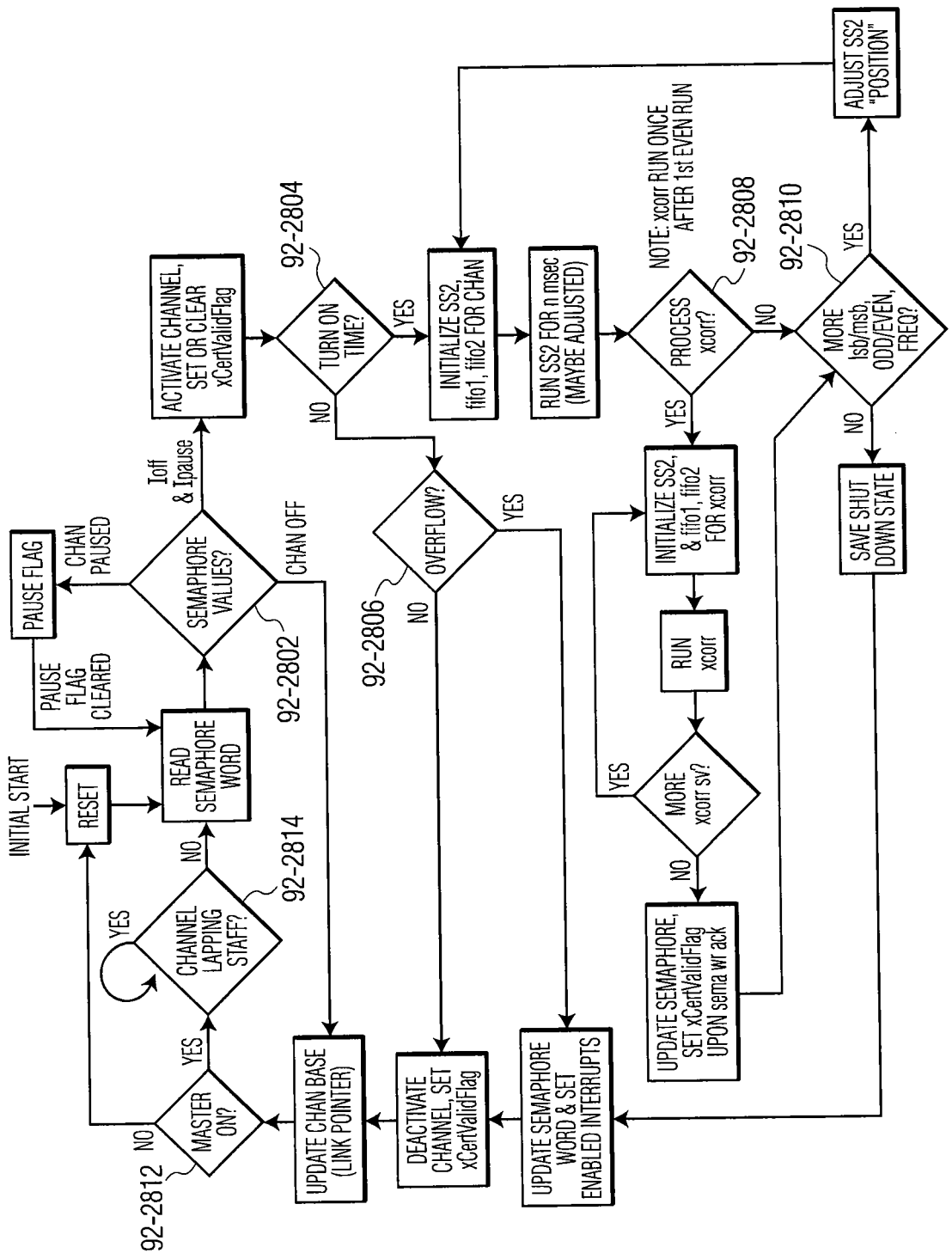
FIG. 92 is a flow diagram illustrating the operation of the sequencer.

FIG. 92 is a flow diagram illustrating the operation of the sequencer of FIG. 90. At the point labeled "initial start", SS2 is reset. The semaphore word is read by SW. As shown in a decision block 90-2802, if the channel is paused, the pause flag is cleared. If the channel is not off and not paused, the channel is activated. SW then looks at turn on time at 90-2804 to determine whether there sufficient data in the input FIFO (FIFO1) for the channel to process. If there is not, SW moves on to the next channel; if there is, then SS2 is initialized, including pulling data in from the channel RAM and other memory regions. FIFO1 and FIFO 2 are also initialized for the channel. SS2 is run for an adjustable number of milliseconds. If cross-correlation processing is programmed to occur, as shown at 90-2808, it is preformed once after the first run of even half chips. If cross-correlation processing is not programmed to occur, as shown at 90-2810, it is determined there are more frequencies to process. If there are, SS2's "position" is adjusted to with respect to the incoming data, and SS2, FIFO1, and FIFO2 are again initialized for the channel, as shown.

If there are no more frequencies to process, that is, as many even and odd half chips and frequency states as desired have been processed, the shut down state is saved and the sequencer goes to memory to update the semaphore word and set the enabled interrupts. The channel is deactivated, and a flag that was set on channel activation is reset. The channel RAM base pointer is updated, and it is determined at 92-2812 whether the master controller of FIG. 90 is still on—that is, that there is more processing to be dome before SS2 is reset. If the master controller is not on, SS2 is reset.

If the master controller is on, it is determined at 92-2814 whether the channel is stalled because of lapping. If so, the sequencer remains in that state, checking the lapping condition, until the lapping condition no longer exists. When the lapping condition is cleared, the sequencing returns to reading the semaphore word again.

Returning to the decision block 92-2802, if the channel is off, essentially SS2 moves on to the next channel by updating the channel RAM pointer and proceeding.

Returning to the decision block 92-2804, if the turn on time check indicates that there is not enough data, it is determined at 92-2806 whether there is an overflow condition. If not, the channel is deactivated. If there if an overflow condition, the semaphore word is updated to indicate that, and the channel is deactivated.

Returning to the decision block 92-2808, if cross-correlation is to be performed, SS2 and FIFO2 are initialized for cross-correlation. The cross-correlator is run, and it is determined whether there are more cross-correlation SVs. If there are, SS2 and FIFO2 are again initialized for cross-correlation. If there are not, the semaphore word is updated and processing returns to the decision block 92-2810.

Several parameters are initialized at the beginning of an SS2 "run". They may include the following parameters:
- number of milliseconds to process;
- carrier acceleration;
- carrier frequency;
- carrier phase;
- code phase;
- millisecond count within a T1;
- T1 count within an address space and within a wrap;
- address of base of current T1;
- address of base of current coherent buffer;
- autoscale and saturate flag; and
- line block and wrap of FIFO1.

Figure 93:
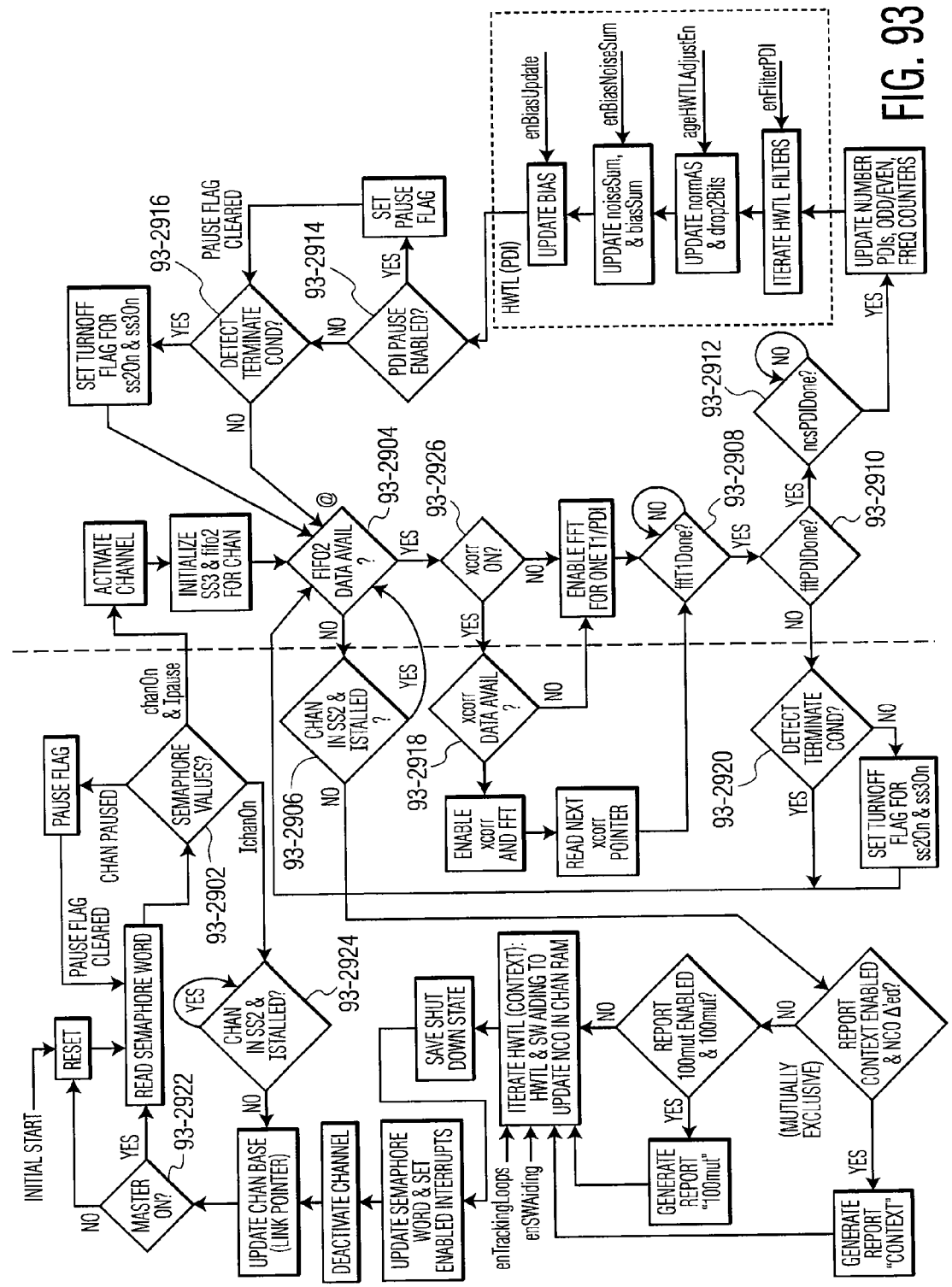
FIG. 93 is a flow diagram illustrating the operation of a sequencer for SS3.

FIG. 93 is a flow diagram illustrating the operation of a sequencer for SS3 such as the sequencer 67-315a of FIG. 71. Generally speaking, data processing on a PDI basis is represented by operations/functions to the right of the dashed line. At the point labeled "initial start", SS3 is reset.

The semaphore word is read by SW. As shown in a decision block 93-2902, if the channel is paused, the pause flag is cleared. If the channel is not off and not paused, the channel is activated. SS3 and FIFO2 are initialized for the channel. At a decision block 93-2902, it is determined whether there is any FIFO2 data available. This determination is part of lapping rule implementation, as previously discussed. If there is FIFO2 data available, it is determined at a decision block 93-2926 whether cross-correlation is to be performed. If it is not, then the FFT is enabled for one T1 or PDI. FFT processing continues until the T1 is finished, as shown at 93-2908. When FFT processing for the T1 finished, it is determined whether FFT processing for the PDI is finished, as shown at 93-2912. When FFT processing for the PDI is finished, the number of PDIs, the number of odd and even half chips, and the frequency counters are updated. A hardware tracking loop update multiple parameters as indicated. Then it is determined, at 93-2914, whether a PDI pause is enabled. If it is not, it is determined at 93-2916 whether there is a termination condition. If there is a termination condition, turnoff flags for SS2 and SS3 are set. Then processing returns to 93-2904. If there is no termination condition, processing returns to 93-2904.

If the PDI pause is enabled, or if the pause flag is set, the pause flag is then cleared and termination is detected at 93-2916.

Returning to 93-2926, if cross-correlation is to be performed, it is determined at 93-2908 whether cross-correlation data is available. If it is not, the result is the same as if no cross-correlation is to be performed, that is, the FFT is enabled for processing. If there is data available, the cross-correlator and the FFT are enabled, and a next cross-correlation pointer is read. Processing then returns to 93-2908.

Returning to 93-2910, if the PDI is not done, a termination condition is checked for at 93-2920. If there is a termination condition, processing returns to 93-2904. If there is no termination condition, the turnoff flags for SS2 and SS3 are set, and processing then returns to 93-2904.

Returning to the determination of FIFO2 data availability at 93-2904, if there is not sufficient data available, then it is determined at 93-2906 whether the channel is in SS2 and whether it is stalled. This is further implementation of the lapping rules. If the channel is in SS2 and is not stalled, then processing returns to 93-2904. If the channel is not in SS2 or the channel is not stalled, a series of reports are generated, including a context report, and if enabled, a 100MUT (100 millisecond) report. The hardware tracking loop (HWTL), as shown and labeled within the small dashed lines on the right of the figure, is iterated. A shut down state is saved. The semaphore word is updated and enabled interrupts are set. The channel is deactivated and the channel Ram base pointer is updated.

If a master controller of the SS3 sequencer is on, as shown at 93-2922, the semaphore word is read and processing continues at 93-2902. If the master controller is not on, SS3 is reset.

Returning to 93-2902, if the channel is not on, it is determined at 93-2924 whether the channel is in SS3 and is not stalled. If the channel is not in SS3 or is not stalled, the processing remains at 93-2924 until the channel is in SS3 or is stalled. Then SS3 essentially moves on to the next channel by updating the channel RAM base pointer.

If pause is enabled, SW is indicating that it wants the subsystem to stop at some juncture so that SW can comes in and make changes to programming or collect data. This can be, for example, on a PD1 basis or upon entry of a channel into the subsystem.

The GPS system of an embodiment includes a control module for use in acquiring and tracking SPS satellites. An exemplary module is discussed below. The following abbreviations are used herein: Rx—receiver, NVM—non-volatile memory, TIFF—time to first fix, and ATX—acquisition track cross-correlation.

The discussion below details the tracking system for the architecture for strong and medium signal operation. The following abbreviations may be used below: Alpha, Beta: Generic filter coefficients that may take different values at different instances; FFT: Fast Fourier Transform; SPS: Satellite Positioning System; HWTL: Hardware Tracking Loop; NCO: Numerically Controlled Oscillator; PDI: Pre Detection Integration; RAM: Random Access Memory; S_Gain: Filtered Signal amplitude estimate employed to normalize the tracking loops; SWTL: Software Tracking Loop; T1: Basic Time epoch for Subsystem 2; Threshold, Threshold1, Threshold2: Generic Threshold values that may take different values at different times.

Figure 94:
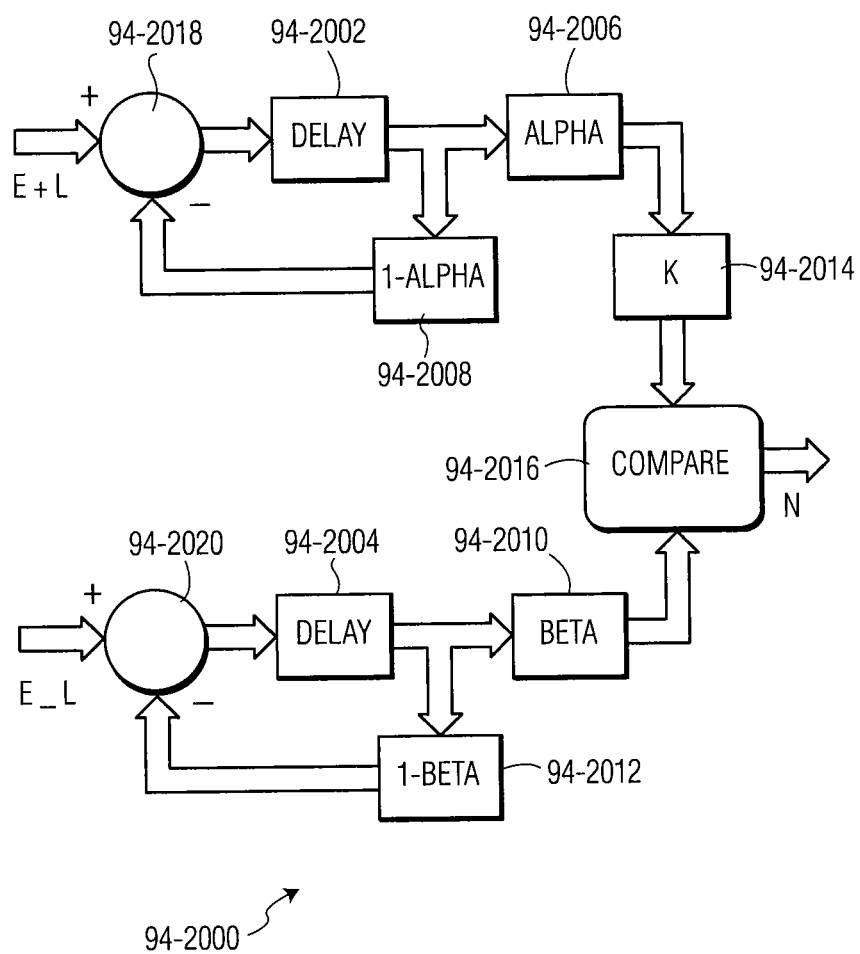
FIG. 94 shows a block diagram of a tracking loop.

FIG. 94 shows a tracking loop 94-2000 including delay circuits 94-2002 and 94-2004, alpha multiplier circuits 94-2006 and 94-2008, and beta multiplier circuits 94-2010 and 94-2012. Also shown are the constant multiplier 94-2014, a comparison circuit 94-2016, and summers 94-2018 and 94-2020.

The tracking loop 94-2000 describes an approximation for the normalized early-late triggering the changes to the code state. N is the number of least significant bits (LSBs) in the code state to change.

AAGC Normalization/Autoscale may be given by:

$$S\_Gain(t+1) = Alpha \ast S\_Gain + Beta \ast (|Ip| + |Qp|)$$

Where the S_Gain is employed to normalize the loop coefficients and "t" is the time index. Note that S_Gain may also be employed to normalize the early minus late output to determine the update to the code state in hardware.

Software Tracking Loop: The SWTL may be activated at the same time as the HWTL by software control at the end of a successful acquisition process. The SWTL is operated, for example, at a 100 ms rate. In one implementation, the SWTL includes buffered reports at the PDI rate and reports on NCO states. The software may compute more accurate error estimates use aiding information from a Navigation process and optionally outside sources in order to construct a correction approximately every 100 ms to adjust the HWTL. In certain cases the HWTL may also be disabled and the SWTL may operate autonomously, generating corrections to the hardware NCOs at rates different than 100 ms. The hardware may then provide interrupts at higher rates and the SWTL will operate at rates faster than 100 ms in such cases. The HWTL may be disabled using a control bit for each channel independently.

Hardware Inputs. The hardware provides input to the NCS Buffer and Track History (TH) Buffer at a 100 ms rate, for example. The input may include I and Q correlation outputs at each PDI for various offsets, noise sums for PDIs, AutoScale Values, NCO states sampled every PDI, Time Marks representing time of Measurement Report, and so forth.

State Initialization. The following states may be initialized using information from the Acquisition phase: a) Code Phase, b) Carrier Frequency, c) Carrier Phase, d) S_Gain (when, for example, an amplitude estimate is available).

The code discriminator may be given by the following equations:

$$D=|E|-|L|$$

$$|E|=Alpha*|Ee|+Beta*|Ee+|$$

$$|L|=Alpha*|Le|+Beta*|Le+|$$

where Ee and Le are the early and late I and Q values for one tap off from prompt and Ee+ and Le+ are the early and late I and Q values for two tap off from prompt, and:

Filtered Code Error=Alpha*Filtered Code Error+Beta*$D$

The carrier phase discriminator may be given by $$\phi=arctan(Qp,Ip),$$

where $\phi$ is computed for each PDI and a $d\phi$ is maintained in software.

The carrier frequency discriminator may be given by:

$$\delta f=Alpha*(f_+-f_-)+Beta*(Ip(t+1)*Qp(t)-Ip(t)*Qp(t+1)),$$

where t is the time index.

The architecture may iterate the tracking equations at a pre-selected rate, for example, at the PDI rate, with corrections back into the hardware each 100 ms, for example.

The phase tracking loop equations may be given by:

Carrier Phase+=Carrier Frequency+$K1*d\phi$+Aid 1

Carrier Frequency+=Carrier Frequency Rate+$K3*d\phi$++Aid 2

Carrier Frequency Rate+=$K5*\phi$+Aid 3

The frequency tracking loop equations may be given by:

Carrier Frequency+=Carrier Frequency Rate+$K4*\delta f$+Aid 2

Carrier Frequency Rate+=$K6*\delta f$+Aid 3

The code loop equations may be given by:

Code Phase+=Scale*(Carrier Phase(t)−Carrier Phase(t−1))$K7*D$+Aid4

K7 initialized to Kmax (high bandwidth value) and updated as follows $K7(t+1)$=Alpha*$K7$+Beta*Code Error Estimate If $K7$>$K$max $K7$=$K$max If $K7$<$K$min $K7$=$K$min Note that the tracking loop mode transition may be controlled by setting the gains K1 through K7. For AGC normalization, the following may apply:

S_Gain(t+1)=S_Gain_Rate*Gamma+Alpha*S_Gain+Beta*(|Ip|+|Qp|)

S_Gain_Rate(t+1)=Alpha*S_Gain_Rate+Beta*[(|Ip(t)|+|Qp(t)|)−(|Ip(t−1)|+|Qp(t−1)|)]

where, the S_Gain and the S_Gain Rate represent the estimate of magnitude of the signal and the rate of magnitude change for the signal. The S_Gain parameter may be used to normalize the tracking loop equation gains.

In one implementation, the architecture also employs Loss of Lock Detectors. For example, for Code Lock, the architecture may determine the Signal to Noise Ratio at rate according to:

Noise Power=Sum(In*In+$Qn*Qn$)

where the sum is carried over, for example, a 100 ms time period and In and Qn are I and Q outputs from a noise sum in the hardware reports at the PDI rate, and:

Signal Power=Sum($Ip*Ip+Qp*Qp$)

where the sum is carried over, for example, a 100 ms time period, and:

Signal to Noise Ratio=Signal Power/Noise Power

Filtered SNR=Alpha*Filtered SNR+Beta*Signal to Noise Ratio+Gamma*SNR_Rate

SNR_Rate=Alpha*SNR_Rate+Beta*[Signal to Noise Ratio(t)−Signal to Noise Ratio(t−1)]

Then, when Filtered SNR less than the Threshold, then Loss Of Lock has occurred.

For carrier phase lock, the architecture may estimate the filtered phase error using a two quadrant arc tan function computed every PDI, for example:

$$\phi=arctan(Qp,Ip)$$

Filtered $\phi$=Alpha*Filtered $\phi$+Beta*$\phi$

Then, when Filtered $\phi$ is greater than Threshold, then declare loss of lock.

For carrier frequency lock, the architecture may estimate filtered frequency error:

$$\delta f=Alpha*(f_+-f_-)+Beta*(Ip(t+1)*Qp(t)-Ip(t)*Qp(t+1))$$

where $\delta f$ is computed at the PDI Rate, and:

Filtered $\delta f$=Alpha*Filtered $\delta f$+Beta*$\delta f$

Then, when Filtered $\delta f$<Threshold, then declare loss of lock.

Updates to the hardware may be in the form of Aid to the HWTL equations, for example, every 100 ms as input from the software. The architecture may determine the Aid according to:

software to hardware Aid=Software Estimate−Hardware Estimate

When the HWTL is disabled, the hardware Estimate=0 for the phase and frequency and rates. The hardware will implement the aid when, for example, the software writes into pre-selected hardware registers.

In one implementation, the bit synchronization operates, for example, at 20-100 ms rates, and may be implemented in software.

The inputs to the bit synchronization process may include, from hardware, 20 ms accumulations (PDI) for 20 offsets (programmable). The Input Array histogram [20] may then include 20 ms PDI power accumulations.

The Histogram may be accumulated using the following equation for each satellite (SV):

AccumHistogram[20]+=Histogram[20]

When offset information is available, then accumulate Histograms from multiple satellites employing the following equation:

Accum HistogramMultiple $SV$[20]+=AccumHistogram[20+$SV$ Offset]

Figure 95:
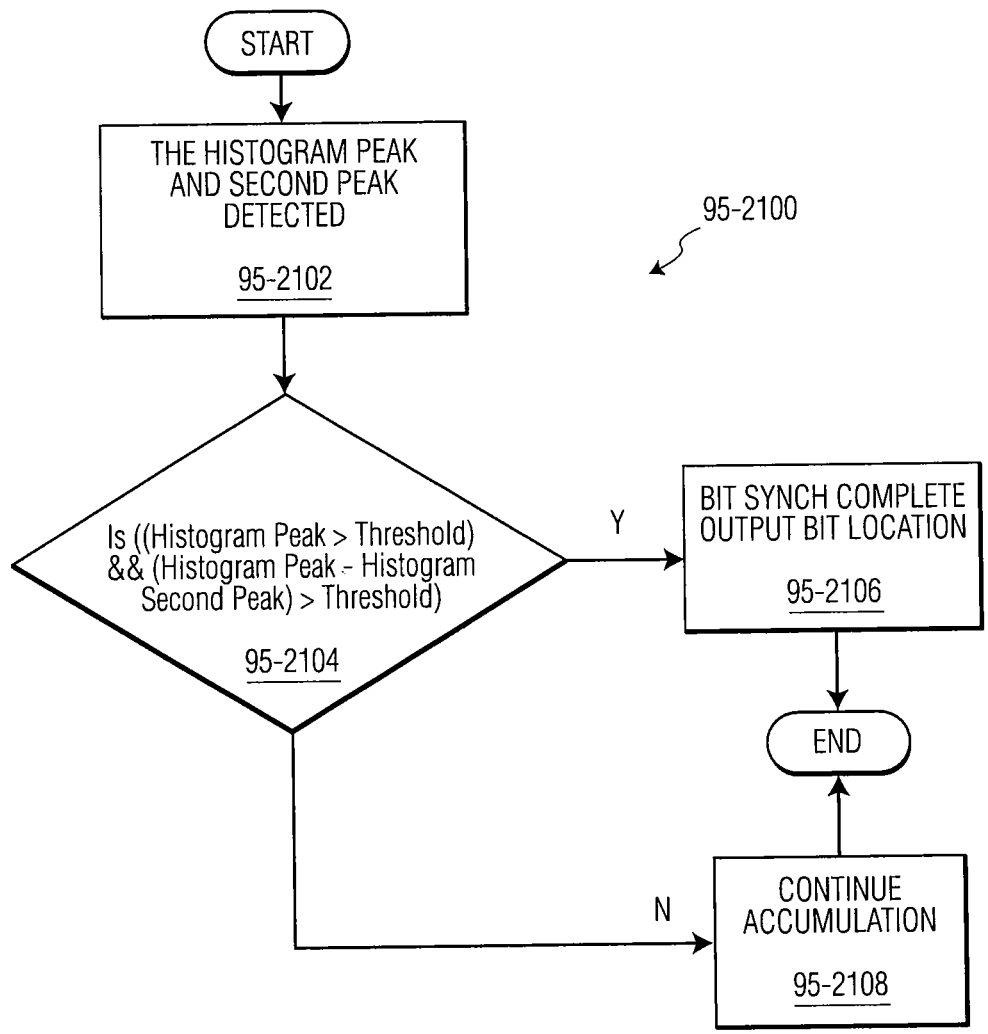
FIG. 95 shows a synchronization technique.

Then, the architecture may employ the following synchronization technique 95-2100 shown in FIG. 95 to output a bit location for synchronization. First, the histogram peak and second peak are detected (Step 95-2102). Then, if ((Histogram Peak>Threshold)&&(Histogram Peak−Histogram Second Peak)>Threshold) (Step 95-2104), then the bit synchronization is complete, and the bit location is output (Step 95-2106). Otherwise, accumulation is continued (Step 95-2108).

Figure 96:
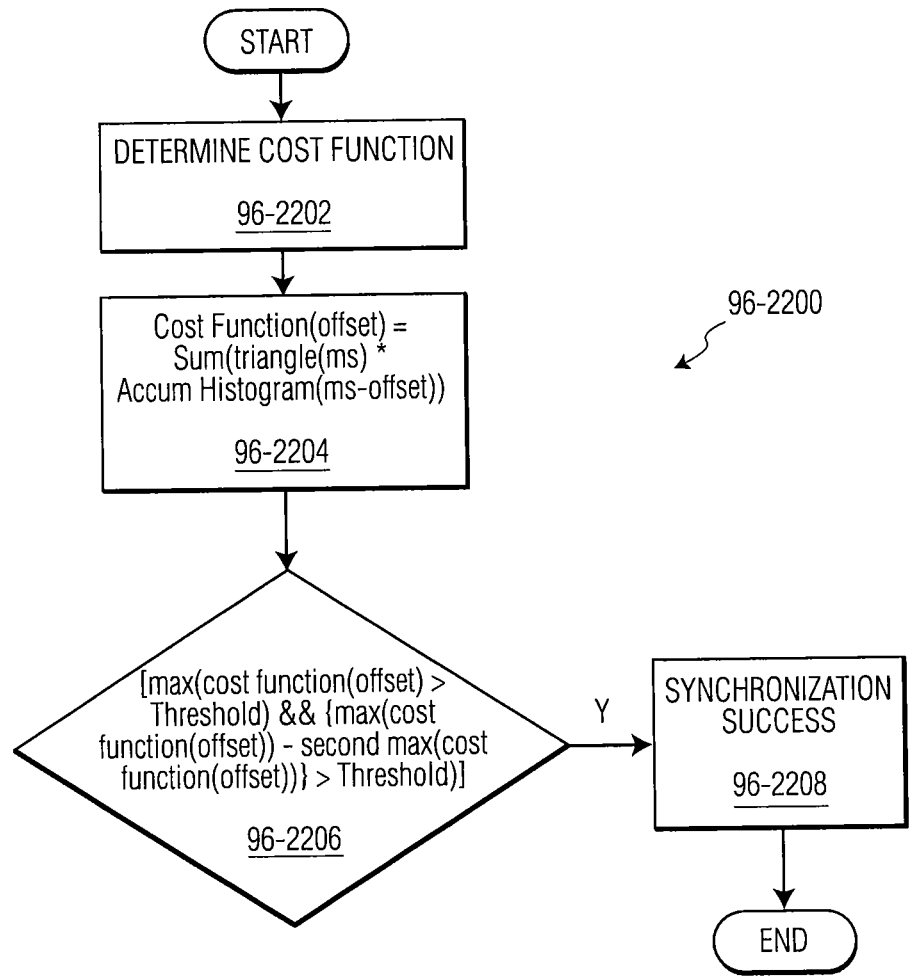
FIG. 96 shows a synchronization technique.

An alternative approach may employ the synchronization technique 96-2200 shown in FIG. 96 to output a bit location for synchronization. First, the architecture determines a cost function (Step 96-2202) by correlating a triangle, for example, 20 ms wide to the accumulated histogram. Then, Cost Function(offset)=Sum(triangle(ms)*Accum Histogram (ms-offset)) may be determined (Step 96-2204), with the sum carried over the 20 values. The maximum for the cost function (offset) may then provide the bit synchronization offset. Then, if [max(cost function(offset)>Threshold) && {max (cost function(offset))−second max(cost function(offset))}>Threshold)] (Step 96-2206), then declare bit synchronization success (Step 96-2208).

Data demodulation may operate, for example, at 20-100 ms rates, with an implementation in software. The demodulation may accept, as input, after bit synchronization success, Ip and Qp for 20 ms aligned to bit boundaries. The implementation may proceed according to: If carrier Phase Lock, then Data Bit=sign (Ip); else Data Bit=sign[(Ip+j*Qp)*exp (j*Carrier Phase Error Estimate)], where j is the complex coefficient. This approach is a more general case of differential decoding when the carrier phase estimate error is generated from the previous bit.

Frame synchronization may also operate, for example, at 20-100 ms rates, with an implementation in software. The frame synchronization may operate on a bit stream after data demodulation provided as a array of binary values per SV.

The frame synchronization may proceed according to: Cold Start—Preamble Synchronization. Identify Preamble in the bit pattern. Decode pre-determined Hand-Over-Word (HOW). Identify second preamble 6 seconds later and identify second HOW off by 1. When an approximate time is available, the frame synchronization may proceed according to: 1) Identify preamble. Decode HOW. If HOW is within time uncertainty, then declare frame synch complete; 2) Verify Frame Synch—Repeat the Identify process and confirm HOW change by 1 with 6 second offset.

When Aiding Information Available and 1 SV completed Frame Synch, then: determine pre positioning for the SVs needing frame synch using time from the first SV frame synch; determine frame starts for the SVs of interest relative to local time; and set the frame synch information. When Aiding Bits are available, then determine a cost function using the aiding bits available: Cost Function(offset) Sum (Aiding Bits(bit number)*Bit Stream (bit number+offset)), with the Sum carried over, for example, all the available aiding bits. Then, if the SV offset information is available combine the cost function for multiple SVs using the following equation:

Combined Cost Function(offset)+=Cost Function(offset+$SV$ offset)

If [max((Combined Cost Function(offset)>Threshold)&& (max(Combined Cost Function(offset))−second max (Combined Cost Function(offset))>Threshold)], then declare frame synch Complete.

Numerous communication systems rely on receiving one or more radio frequency (RF) signals. As the available frequency bands become more congested, the numerous radio frequencies used by the different communication systems start to interfere with each other. One type of interference encountered in the different communication systems is carrier wave (CW) interference or more commonly called CW jamming.

CW jamming is a source of interference in spread spectrum systems, such as CDMA cellular telephone systems and satellite positioning systems. Spread spectrum communication systems use lower power signals spread across the frequency spectrum and are subject to interference from carrier waves used in other communication systems. The problem of CW jamming is further complicated because of the geographical area covered by spread spectrum system may include the whole Earth, for example the United States' Global Position System (GPS).

Attempts to eliminate CW jamming signals have occurred by regulating frequency use and by adding dedicated circuitry to radio receivers. The added circuitry being included in radio receivers often result in additional power consumption and expense.

Therefore, there is a need for methods and systems for identifying and removing CW jamming signals that overcomes the disadvantages set forth above, and others previously experienced.

Systems consistent with the present invention provide a receiver that is capable of receiving a spread spectrum signal that contains a CW jamming signal along with a weak signal. The signal is processed with a crosscorrelator that enables the CW jamming signal to be identified, tracked, and reproduced. The replicated CW jamming signal is subtracted from the received signal after demodulation, thus enabling the weak signal to be processed.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

Figure 97:
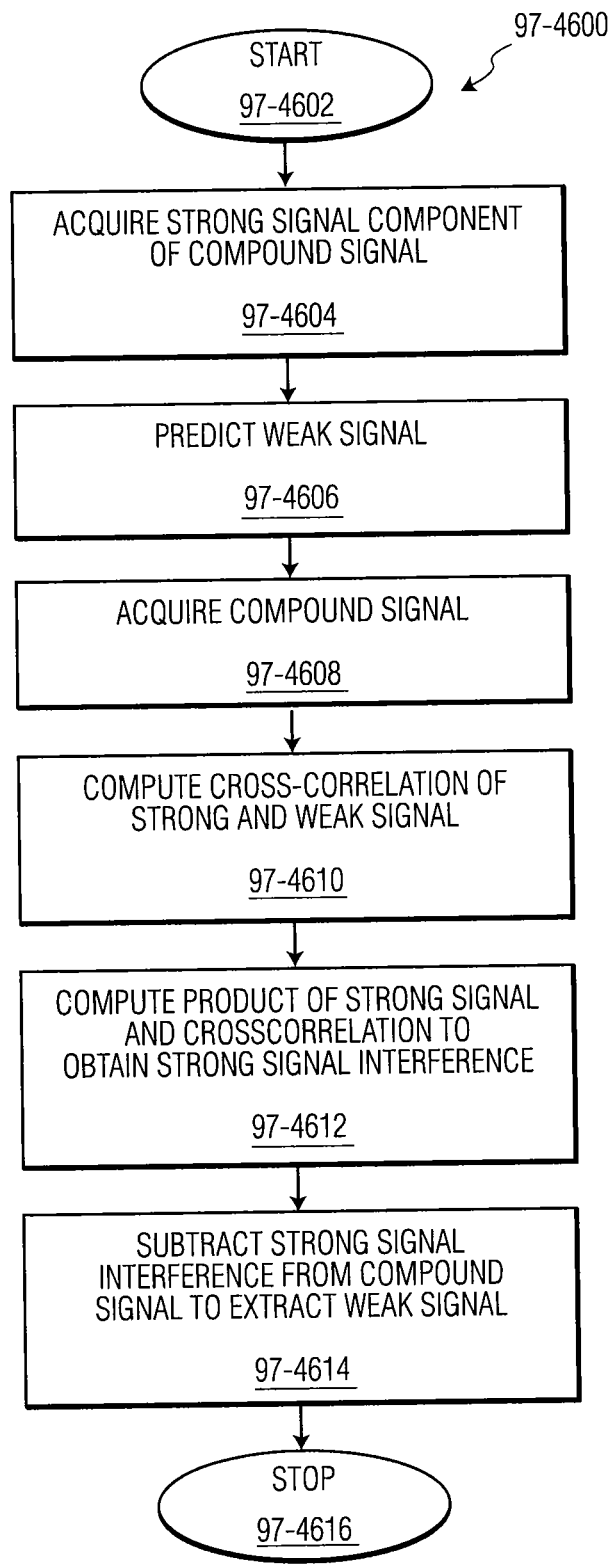
FIG. 97 is a flow diagram depicting strong signal cancellation in a weak spread spectrum signal using crosscorrelation.

Turning first to FIG. 97, a flow diagram 97-4600 depicting strong signal cancellation in a weak spread spectrum signal using crosscorrelation is shown. A strong/weak or near/far signal isolation provided by a spread spectrum, pseudo random number (PRN) code family such as used in CDMA spread spectrum systems is dependent upon the crosscorrelation between the various code members of the family. In the case of a satellite positioning system, such as GPS, the isolation of two signals at the same frequency (or multiples of the code repetition rate, in this case 1 KHz) is about 21 to 23 dB. If the relative strengths of two signals differ by more than this limit, the weaker signal cannot be discriminated using only the spreading code. A method of removing the effects of the stronger signal may be applied if the weaker signal is to be tracked.

The crosscorrelation effect is at its maximum when the relative Doppler frequency offset between the relatively strong and weak signals is an integer multiple of 1 KHz in the case of coarse acquisition code (C/A) in the GPS signals. A general solution to the problem of tracking a weak signal spread spectrum signal in the presence of a stronger spread spectrum signal is based on the premise that all aspects of the strong signal's interference can either be measured or calculated in order to remove it from the weaker signal. The solution can be implemented in any multi-channel receiver having the ability to control a channel's frequency and phase as well as selecting the desired spreading code and setting that code's phase position. The receiver typically employs two channels, one to track the weak signal and one to track the interfering strong signal. However, the channel that is used to track the strong signal is not required if the characteristics such as power, code phase and frequency of the strong signal can be obtained or accurately estimated by alternate means.

As shown generally in FIG. 97, the procedure starts 97-4602 with the strong signal being acquired 97-4604, such as by tracking the strong signal in a first channel of the receiver. The channel provides a measurement of the signal strength of the strong signal along with the phase of the carrier signal and the spreading code. Additional channels may be used to track additional strong signals (not shown in FIG. 97).

The code phase of the spreading code of the weaker signal, along with its received frequency and signal phase, are predicted 97-4606 based on the 50 Hz navigation data code data (D) by methods known in the art. A second channel in the receiver is dedicated to receiving the compound carrier signal and tracking 97-4608 the predicted weak signal component.

The second receiver channel correlates the incoming signal with the second code at the predicted frequency and signal phase. The resulting in-phase and quadrature (I,Q) measurements contain both the weak signal and the strong signal, each spread by their unique code. Correlation by multiplication of the replica code for the second signal, Code2R, with the incoming signal yields the product Code2R*(weak2*Code2+StrongX*CodeX+ . . . )

where weak2 is the power of weak signal 2, Code2 is the actual code for satellite 2 broadcasting the weak signal 2, StrongX (X=1, 3, 4, . . . ) is the power of strong signal X, and CodeX is the actual code for satellite X contained in the signal. The product Code2R*Code2 is the autocorrelation of the received code 2 and the replica code 2. The autocorrelation function has a value of 1 if the replica code is aligned with the received code. This crosscorrelation of replica code 2 with code X (Code2R*CodeX) is next computed 97-4610 to be removed from the compound signal.

Code1 and Code2 are both members of a PRN code family, and their autocorrelation and crosscorrelation properties are known. It is therefore possible to calculate the crosscorrelation of the two codes at their respective phases by simply multiplying each bit of Code1 by the corresponding (in time) bit of Code2 to produce their crosscorrelation value. Since there may be a relative Doppler frequency offset between the two codes, the phase of the codes will process past one another over time and create a new crosscorrelation function. For the GPS system the greatest delta code Doppler typically encountered is about plus or minus 9 KHz which is equivalent to six code chips per second (1540 carrier cycles per code chip), and thus the maximum recalculation rate of the crosscorrelation value is roughly 6 times per second.

The maximum crosscorrelation occurs at a frequency offset of zero with peaks occurring at intervals of 1000 Hz. There is an attenuation of the crosscorrelation as the frequency offset moves away from zero. This attenuation follows the well known $\sin(x)/x$ curve. If 10 ms measurements are used for tracking or acquisition, the attenuation factor would be equal to $\sin(\Delta freq*\pi/100\ Hz)/(\Delta freq*\pi/100\ Hz)$. This produces an attenuation of −10 dB at about a 75 Hz delta frequency. Other local peaks in the $\sin(x)/x$ curve (i.e. locally minimum attenuation) occur at 150 Hz and 250 Hz with attenuations of −13.5 dB and −18 dB, respectively. This implies that for a desired strong signal suppression of 10 dB, only the first lobe of the $\sin(x)/x$ function need be considered; however, should additional suppression be desired, the entire curve may be considered.

The next step entails computing 97-4612, for each strong signal, the product of the strong signal amplitude and the calculated frequency and time domain (code phase) crosscorrelation. The weak signal is finally extracted by subtracting 97-4614 this product from the compound signal and processing is complete 97-4616. The weak signal thus extracted is subsequently processed in the receiver circuitry as known in the art.

The in-phase (I) and quadrature amplitude (Q) of each strong signal is obtained by measurement in each strong signal's own individual receiver channel or by estimation through independent means. Because the strong signal is being actively tracked by the receiver's phase look loops, the phase of the strong signal is presumed to be near zero radians and thus nearly all the signal power is in the in-phase portion.

A signal comprising a strong signal S1 modulated with a first code Code1 summed with a weak signal w2 modulated with a second code Code2 produces (S1*code1+w2*Code2). The sum of the two signals is correlated with a replica of the second code Code2R to produce $\Sigma\{Code2R*(S1*Code1+w2*Code2)\}$, where the sum $\Sigma$ includes all chips of the PRN code used to modulate the weak signal w2. The autocorrelation of a code with itself is 1 so the preceding equation can be rewritten as $\Sigma\{S1*Code1*Code2+w2\}$. It can see that in order to obtain w2 S1*Code1*Code2 is removed. Since we know Code1 and Code2, we can easily calculate their crosscorrelation. This leaves us to estimate the value of S1 that can be done by independently tracking the strong signal on a separate channel, or by any other convenient means. This computed value of S1*Code1*Code2 would be sufficient if the strong signal S1 and the weak signal w2 where at the same frequency. The two signals are received at different frequencies, however, due to the Doppler Effect as well as other factors enumerated previously.

We know that strength of the crosscorrelation varies with the difference between these frequencies in a $\sin(x)/x$ relationship. We may therefore calculate an attenuation factor based on the difference in frequency between the strong and the weak signal and apply it to the computed crosscorrelation. Furthermore, if more than one strong signal is present, an attenuation factor is computed for each strong signal.

The code dependent portion of the crosscorrelation factor is computed from the known relative states of the PRN code generators to predict the crosscorrelation between a strong signal of unit power and zero frequency offset, and a weak signal. This factor is multiplied by the amplitude of the corresponding strong signal and adjusted for frequency attenuation before it is subtracted from the composite signal.

The various Gold codes used to modulate the PRN signals are all derived from a two code sequence G1 and G2 where the bits of the two code sequences are combined through an XOR operation after G2 has been offset some number of bits relative to G1 depending on the Gold code selected. It is known that an XOR operation using binary numbers is mathematically equivalent to multiplication of ±1. This allows expressing the equations below in term of products of ±1 while in reality the implementation could be with binary numbers with XORs.

The correlation between two C/A codes can generally be expressed as:

$$\Sigma Sat1G1(I)*Sat1G2(I)*Sat2G1(I\text{-offset})*Sat2G2(I\text{-offset})*e^{-j\Delta\theta I}$$

where
I=Summation index ranges from 0 to 1022.
Sat1$G1$(I)=Value of satellite 1's G1 coder chip at state I. Possible values are ±1.
Sat1$G2$(I)=Value of satellite 1's G2 coder chip at state I. Possible values are ±1.
Sat2$G1$(I)=Value of satellite 2's G1 coder chip at state I. Possible values are ±1.
Sat2$G2$(I)=Value of satellite 2's G2 coder chip at state I. Possible values are ±1.
offset=time difference between the satellite 1 and 2 in units of chips
$\Delta\theta$*Phase change per chip between satellite 1 and 2 in radians.

It should be noted that when the difference I-offset is less than 0, 1023 is added to the difference to maintain the value in the range of 0 to 1022. In other words, the domain of the functions returning coder chip states is limited to the range of 0 to 1022.

The computation time required to compute the 1023 bit-by-bit correlations can be accelerated by making use of standard controller instructions that perform 8, 16 or 32 bit-wise XORs with a single controller instruction. The following will demonstrate the method of computing eight chips in parallel. Those skilled in the art will immediately recognize that the scheme can be easily modified to accommodate some other convenient number of bits per controller XOR operation.

The 1023 states of G1 and G2 may be stored linearly in permanent memory. Thus, it is possible to quickly gather 8, 16, 32 or some other convenient number of bits with a single controller load instruction by computing the address of the desired chip and the shift required to align it. Thirty-two bits is a particularly convenient number because 31 divides 1023 evenly. The current implementation thus reads 32 bits at a time and uses 31 of them at a time for each of 33 intervals that span the 1023 chips of the C/A code. The 31 bit sums are broken into four parts of 8, 8, 8, and 7 bits, and each 7 or 8 bit sum is multiplied by $e^{-j\Delta\theta I}$ where I changes by 7.75 chips for each part. The form of the sum is:

$$\Sigma(e^{j\Delta\theta I*31}*\Sigma(Sat1G1(I*31+J)*Sat1G2(I*31+J)*Sat2G1(I*31+J\text{offset})*Sat2G2(I*31*J\text{-offset}))+e^{-j\Delta\theta(I*31+7.75)}*\Sigma(Sat1G1(I*31+J+8)*Sat1G2(I*31+J+8)*Sat2G1(I*31+J+8\text{-offset})*Sat2G2(I*31+J+8\text{-offset}))+e^{-j\Delta\theta(I*31+15.5)}*\Sigma(Sat1G1(I*31+J+16)*Sat1G2(I*31+J+16)*Sat2G1(I*31+J+16\text{-offset})*Sat2G2(I*31+J+16\text{-offset}))+e^{-j\Delta\theta(I*31+23.25)}*\Sigma(Sat1G1(I*31+J+24)*Sat1G2(I*31+J+24)*Sat2G1(I*31+J+24\text{-offset})*Sat2G2(I*31+J+24\text{-offset})))$$

where
I=Outer index ranges from 0 to 32;
J=Inner index ranges from 0 to 7 for the first three sums and from 0 to 6 for the last sum.

The inner sums are computed in parallel by using a 32 bit word that contains all 31 bits and using bitwise XOR to perform the multiplications and shifting and adding to sum the 1 bit products.

Note that all of the multiplications of the G1 and G2 codes in the above equation are implemented by bit-wise XOR instructions. The above algorithm is in error by at most −17 dB from an exact computation, and requires about 6000 controller operations to complete.

Periodically, as needed, the code dependent crosscorrelation factors are computed for all strong and weak signal pairs with small frequency differences, i.e. frequency differences that could cause strong-weak crosscorrelation interference. In the current implementation strong signals are those with $C/N_0$>40 dB and weak signals are those with $C/N_0$>30 dB. Because 10 ms integrations of I and Q measurements are used by the code and phase tracking loops, the maximum "significant" frequency difference (modulo 1000 Hz) is 90 Hz. In the preferred embodiment the code dependent cross correlation factor for each possibly interfering pair of signals is computed for each of the measurements that might potentially be used by the tracking and signal processing algorithms. For example, if early, punctual and late measurements are used by the tracking loops, the correlation factors for each of these code alignments is computed and stored in the tables.

These tables only need be updated at a 10 Hz rate because the maximum Doppler difference is less than 9 KHz or less than six chips per second. In addition to maintaining the crosscorrelation table, the frequency attenuation of the crosscorrelation due to the frequency difference is computed at the 10 Hz rate. The attenuation can be expressed as:

$$\text{Frequency Attenuation}=\sin(\Delta F\bmod 1000*\pi/100)/(\Delta F\bmod 1000*\pi/100)$$

where
$\Delta F$=Frequency difference between a strong and weak signal in Hz, and
Mod=modulo offset to give a range of −500 Hz to +500 Hz.
The attenuation only needs to be recomputed if the frequency difference changes by more than 5 Hz.

An estimate of the phase and amplitude of the strong signal is required to remove the crosscorrelation. The method used in the preferred embodiment is to track the strong signal on its own dedicated channel and collect the I, Q measurements output over the exact same interval that the weak signal I, Q samples are taken. The known phase and frequency of the replica signal that is used to track the strong signal is an excellent approximation of the actual phase and frequency of the strong signal. Furthermore, because the strong signal is in phase lock, the magnitude of the I measurement provides a good approximation of the amplitude of the strong signal. Finally, the bi-phase modulation of the strong signal data bits D may cause the phase of the strong signal to rotate 180 degrees whenever the data bits transition from a 1 to 0 or from a 0 to 1. In the current implementation, the phase of the strong signal is corrected by adding 180 degrees to the phase of the replica signal whenever the sign of the I measurement for the strong signal is negative.

Every 10 ms a new set of I, Q correlation data is available from the channel assigned to track the weak signal. The tables of crosscorrelation factors are checked to predict the presence of any interfering strong signals. If strong signals are predicted, the following subtraction is performed to remove the strong signal crosscorrelations:

FirstCodeOffset=WeakCodeState−StrongCodeState−
    StrongDoppler*$\Delta T$-TableEntry0CodeState;

DeltaPhase=WeakCarrierPhase−StrongCarrierPhase−
    StrongDoppler*$\Delta T$+DeltaKHz*StrongCodeState;

FirstPhase=FirstCorrelationPhase+DeltaPhase;

SecondPhase=SecondCorrelationPhase+DeltaPhase;

FirstMag=FirstCorrelationMag+
    FirstCodeOffsetFraction*StrongI*FrequencyAttentuation;

SecondMag=SecondCorrelationMag*(1−FirstCode-
    OffsetFraction)*StrongI*FrequencyAttenuation;
    and CorrectedWeakIQ=WeakIQ−FirstMag*$e^{-jFirstPhase}$−
    SecondMag*$e^{-jSecondPhase}$ where
WeakCodeState=Code state of last output to the weak signals channel;
StrongCodeState=Code state of last output to the strong signals channel;
StrongDoppler=Doppler of last output to the strong signals channel;
$\Delta T$=Difference in time between outputs to the weak and strong channels;
TableEntry0CodeState=Code state difference of the first element of the crosscorrelation table;
WeakCarrierPhase=Carrier phase angle of last output to the weak signal channel;
StrongCarrierPhase=Carrier phase angle of last output to the strong signal channel;
DeltaKHz=Nearest integer multiple of 1 KHz of the difference between the weak and strong channels Doppler, in units of KHz;
FirstCorrelationPhase=Phase entry in the crosscorrelation table for the chip indicated by FirstCodeOffset;
SecondCorrelationPhase=Phase entry in the crosscorrelation table for the chip indicated by FirstCodeOffset +1 chip;
FirstCorrelationMag=Magnitude entry in the crosscorrelation table for the chip indicated by FirstCodeOffset;
SecondCorrelationMag=Magnitude entry in the crosscorrelation table for the chip indicated by FirstCodeOffset+1 chip;
FirstCodeOffsetFraction=Fraction of a chip in FirstCodeOffset;
StrongI−Absolute value of I correlation from the strong channel;
FrequencyAttenuation=Attenuation due to frequency offset;
WeakIQ=IQ correlation from the weak signal's channel; and
CorrectedWeakIQ=IQ correlation corrected for crosscorrelation from the strong signal.

CorrectedWeakIQ is computed for the early, on time, and late correlators by shifting the FirstCodeOffset appropriately, such as by half a chip each. These modified correlations are then used normally in the carrier and code tracking software for the weak signal. The algorithm attenuates the crosscorrelation by at least 10 dB without attenuating the weak signal, and is repeated for each strong signal that may be interfering with the weak signal.

Figure 98:
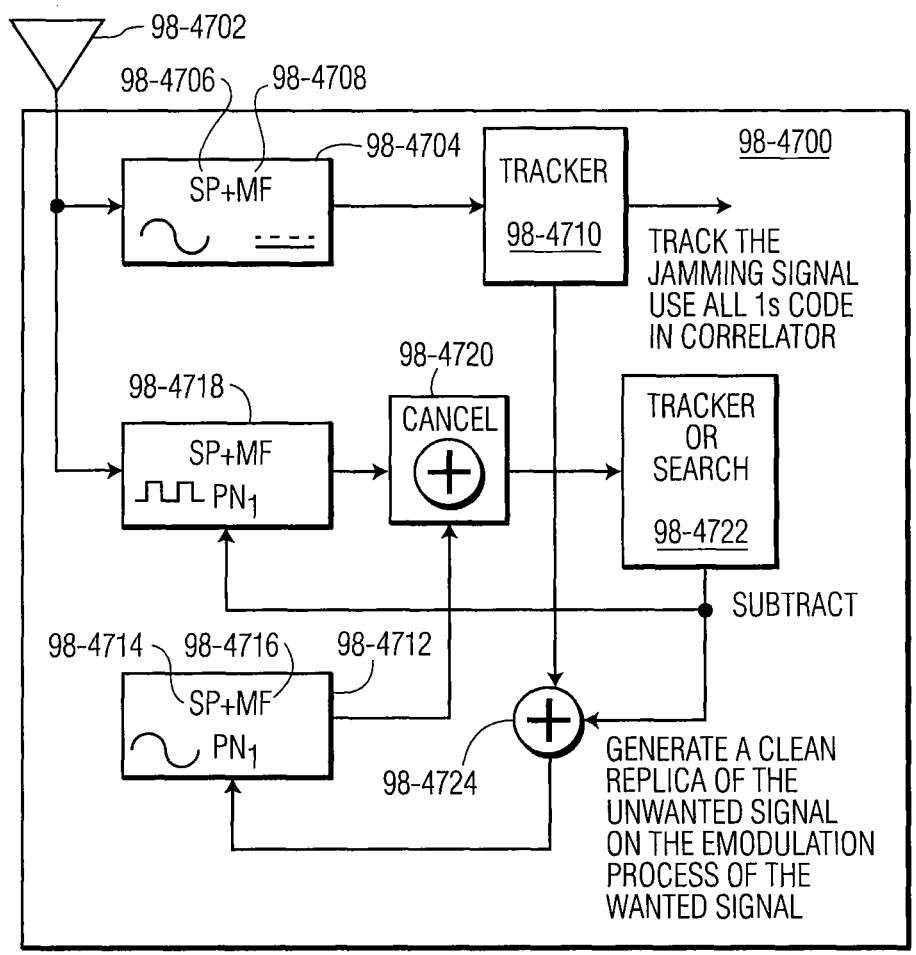
FIG. 98 shows a signal-processing diagram for identifying and removing CW jamming signals where the cancelled signal may be the CW jamming signal.

While FIG. 97 has described crosscorrelation to cancel a strong signal having a PRN from a weak signal having different PRN, the procedure may be modified to cancel a CW jamming signal and enhance a weak signal having a PRN. In FIG. 98, a signal-processing diagram for identifying and removing CW jamming signals where the cancelled signal of FIG. 97 may be a CW jamming signal is shown. The receiver 98-4700 receives a spread spectrum signals at antenna 98-4702. The crosscorrelator 98-4704 is placed in a mode to identify CW jamming signals. In that mode, the crosscorrelator employs all ones for a PRN code. The crosscorrelator 98-4704 may have a signal processor 98-4706 and a match filter 98-4708 that despreads the spread spectrum signal. The resultant signal is the CW jamming signal (the strong signal) and is tracked in the tracker 98-4710. An example of the tracker 98-4710 in the current implementation may be a phase lock loop circuit.

The identified CW jamming signal is then used to generate a replica CW jamming signal 98-4712. The replica CW jamming signal may be created using a signal processor 98-4714 and a match filter 98-4716. In other implementations, other approaches to generating a desired signal may be employed. Examples of other approaches include, but are not limited to voltage controlled oscillators, digital signal processing, analog signal processing.

The spread spectrum signal received by receiver 98-4700 is then processed by a crosscorrelator 98-4714 with dispreading codes rather than the all ones. The received weak signal in the spread spectrum signal is demodulated by the signal processor in the crosscorrelator 98-4718. The generated CW jamming signal is canceled from the weak signal by a canceller 98-4720. The resultant signal is then tracked by a tracker 98-4722. The CW jamming signal that is being tracked by tracker 98-4310 is further processed to remove the desired weak signal from the tracked CW jamming signal by signal combiner 98-4724.

The identification of the CW jamming signal has been described as occurring with three crosscorrelators 98-4704, 98-4718 and 98-4712. But in practice, only one crosscorrelator may be used allowing the crosscorrlator to distinguish between PRN codes and to identify and remove CW jamming signals. Thus, the generation of a replica of the unwanted signal (CW jamming signal) occurs during the demodulation of the wanted signal.

Figure 99:
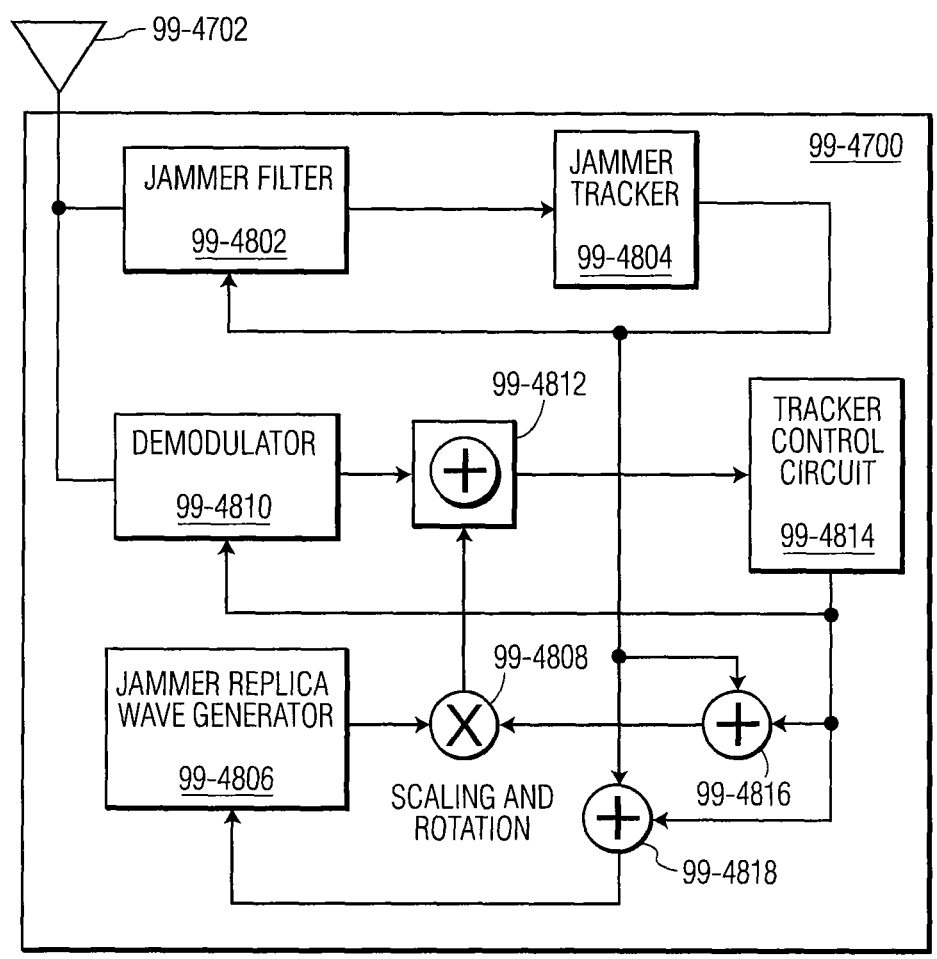
FIG. 99 shows a block diagram of electrical components.

Turning to FIG. 99, a block diagram of electrical components of FIG. 98 is shown. The spread spectrum signal containing the weak signal and the CW jamming signal are received at the receiver 98-4700 via antenna 98-4702. The spread spectrum signal is demodulated and the CW jammer signal is filtered by the jammer filter 99-4802. The resulting CW jamming signal is tracked by jammer tracker 99-4804. The tracked jamming signal is then replicated by a jammer replica wave generator 99-4806 as a replicated CW jamming signal. The CW signal has the characteristic of a constant phase, therefore the replicated CW jamming signal is scaled and rotated 99-4808 to an appropriate phase to be subtracted from the demodulated weak signal. The weak signal is demodulated by a demodulator 99-4810. The phase and magnitude replicated CW jamming signal is then subtracted from the weak signal from the demodulator 99-4802 by a signal canceller 99-4812. The resulting weak signal is then the signal is tracked by a track control circuit 99-4814. The track control circuit 99-4814 outputs the weak signal to the demodulator 99-4810 and two signal combiners 99-4816 and 99-4818. The weak signal is subtracted from the CW jammer signal by the signal combiner 99-4816 and the resulting signal is used to scale and rotate the replicated CW jamming signal. Similarly, the weak signal is subtracted from the CW jamming signal by signal combiner 99-4818 in order to provide a more accurate CW jamming signal to be replicated by the jammer replica wave generator 99-4806.

Even though the current implementation has been described with CW jamming signals in general, one skilled in the art would recognize that specific known signals such as IS-95 pilot signals, Galileo signals, or other known carriers may be identified, tracked and remove from a demodulated desired signal. Unlike other known methods of identifying and removing CW jamming signals prior to signal processing or at the front end of a receiver, the current approach identifies and removes the CW jamming signal at the back end. This is advantageous when desired signals are received at low signal strength, such as in CDMA or satellite positioning system. The signal strength is not sufficient to support preprocessing of the signal while maintaining the desired weak signals.

Figure 100:
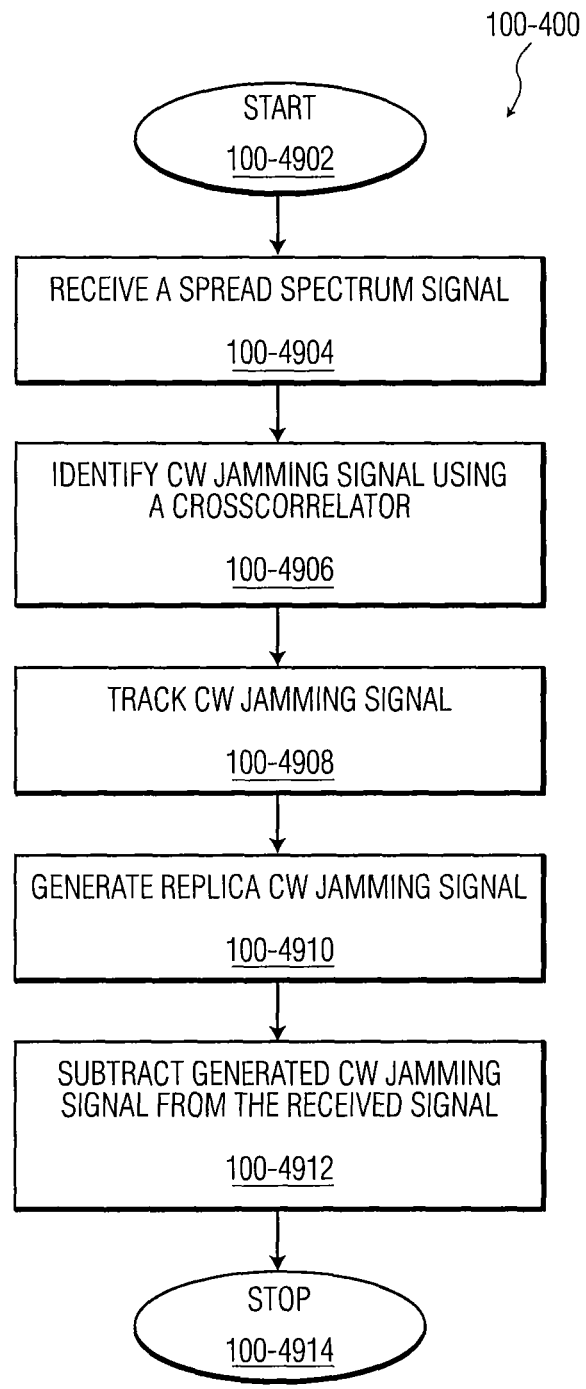
FIG. 100 shows a flow diagram of the identifying and removing CW jamming signals.

Turning to FIG. 100, a flow diagram 100-4900 of the identifying and removing CW jamming signals is shown. The procedure starts 100-4902 with a receiver receiving a spread spectrum signal 100-4904. The signal may be filtered and the CW jamming signal is identified 100-4906 using a crosseorrelator. Once the CW jamming signal is identified 100-4906, it is tracked 100-4908. The tracked CW jamming signal is then replicated 100-4910 by a jammer replica wave generator. The replicated CW jammer signal is then subtracted from the received signal 100-4912. The CW jamming signal has been removed from the received signal and processing is complete 100-4914.

Figure 101:
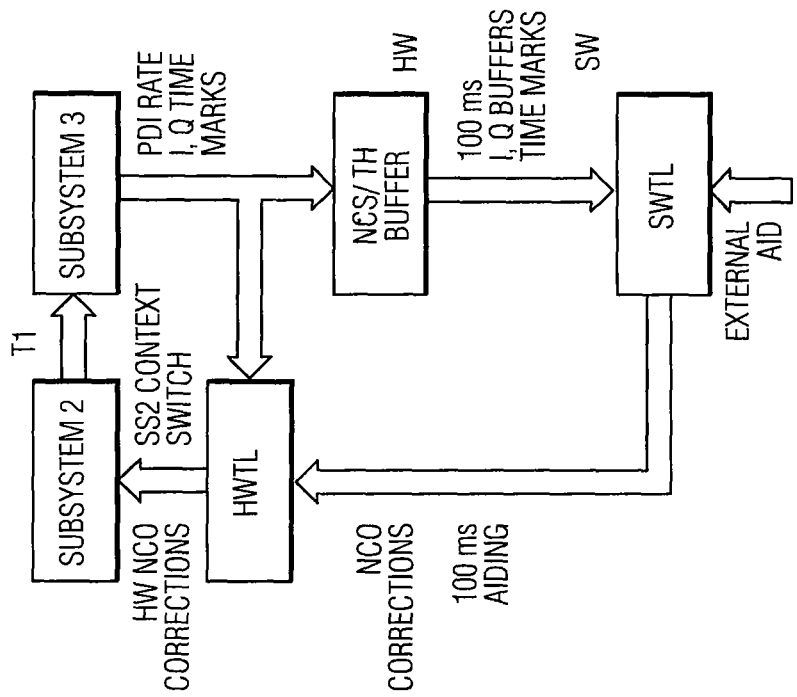
FIG. 101 is an exemplary high level implementation of a tracking system for strong and medium signal operation.

In FIG. 101, an exemplary high level implementation of a tracking system in for strong and medium signal operation is shown. The Hardware Tracking Loop ("HWTL") operates at Pre Detection Integration ("PDI") rate. The implementation is done in Subsystem 3. Implementation details available in HWTL ASIC Design Specs. The hardware ("HW") may not transition on its own from Acquisition mode to tracking mode and activate HWTL autonomously. The mode transition to activate HWTL will be under software ("SW") control at the successful completion if Acquisition process. Typically the inputs from the hardware will be:

Ie, Qe and Il, Ql, $f_{+e}$, and $f_{-e}$, $f_{+1}$ and $f_{-1}$ for early and late taps;
Ie=In Phase Correlation for early tap;
Qe=Quad Phase Correlation for early tap;
Il=In Phase Correlation for late tap;
Ql=Quad Phase Correlation for late tap;
$f_{+e}$=Correlation Magnitude for +1 frequency bin offset for early tap;
$f_{-e}$=Correlation Magnitude for −1 frequency bin offset for early tap;
$f_{+1}$=Correlation Magnitude for +1 frequency bin offset for late tap;
$f_{-1}$=Correlation Magnitude for −1 frequency bin offset for late tap; and
Autoscale Values from HW for normalization purposes.

As an example the following states may be initialized utilizing information from Acquisition: 1. Code Phase; 2. Carrier Frequency; 3. Carrier Phase; and 4. Filtered Signal amplitude estimate used to normalize the tracking loops ("S_Gain") (if amplitude estimate is available). In this example, the code discriminator may be $$D=|e|-|l|,$$

$$|e|=\text{sqrt}(Ie*Ie+Qe*Qe), \text{ and}$$

$$|l|=\text{sqrt}(Il*Il+Ql*Ql),$$

and the carrier phase discriminator may be $$\phi=\text{sign}(Ip)*Qp,$$

$$Ip=Ie+Il, \text{ and}$$

$$Qp=Qe+Ql,$$

and the carrier frequency discriminator may be $$\delta f=f_+ - f_-,$$

$$f_+ = f_{+e} + f_{+1}, \text{ and}$$

$$f_- = f_{-e} + f_{-1}$$

where all computation is done using magnitudes or magnitude approximations.

The subsystem 2 processing may be described by

Carrier Phase+=Carrier Frequency,

Carrier Frequency+=Carrier Frequency Rate, and

Code Phase+=Delta Carrier Phase.

As an example, the tracking loop equations may be described by

Carrier Phase+=K1*+ϕK2*δf+Aid 1,

Carrier Frequency+=K3*ϕ+K4*δf+Aid 2,

Carrier Frequency Rate+=K5*ϕK6*δf+Aid 3, and

Code Phase+=K7*D+Aid4.

The gains K1 through K7 may be input from SW at 100 ms rates. The HWTL mode transitions may be controlled through the values of these gains.

As a general example, the tracking modes and mode transition may be described by the following description.

Controlled by SW at 100 ms rate through setting the gains K1-K7.

In Init Mode, the Tracking Loops may be initialized with a wide bandwidth (preferably at approximately 1/10 of iteration rate PDI) frequency Loop. Code Loop is initialized with wide bandwidth (preferably at 5 Hz*Acq Error Estimate) Transition to Narrow Bandwidth Frequency Loop if filtered frequency error estimate<threshold1. Transition to wide carrier phase loop if filtered frequency error estimate<threshold2. Recommended PDI is 4 ms. Preferably the FFT mode is 8 point.

In the narrow frequency loop, after entry from Init Mode. The Tracking Loops may be set to narrow bandwidth frequency Loop (preferably at approximately 1/20 of PDI rate). Narrow Code Loop (preferably at approximately bandwidth 1/3 Hz) if estimated code error<0.1 chips Transition to carrier phase loop if filtered frequency error estimate<threshold1. Transition to Init Mode if filtered frequency error estimate>threshold2. Preferably the PDI is 4 ms and the FFT mode is 8 point.

In the wide carrier phase loop, after entry from Init Mode or Narrow Frequency Loop. The Tracking Loop may be set to wide carrier (preferably at approximately a bandwidth 1/4 of PDI rate) and narrow frequency combined loop using K1-K7. Narrow Code Loop (preferably at approximately a bandwidth 1/3 Hz) if estimated code error<0.1 chips Transition to Narrow Frequency Loop if (carrier Phase lock lost and filtered frequency error estimate<threshold1). Transition to Init Mode if (carrier Phase lock lost and filtered frequency error estimate<threshold2). Transition to Narrow Carrier Loop if filtered carrier phase error<Threshold. Preferably at approximately PDI 4 ms in absence of bit sync and 20 ms in presence of bitsynch and with a FFT mode of 20 point.

In the Narrow Carrier Phase Loop, after entry from Wide Carrier Phase Loop. Tracking Loop set to narrow carrier (preferably at approximately a bandwidth 1/10 of PDI rate) and narrow frequency combined loop using K1-K7. Narrow Code Loop (preferably at approximately a bandwidth ⅓ Hz) if estimated code error<0.1 chips Transition to Narrow Frequency Loop if (carrier Phase lock lost and filtered frequency error estimate<threshold1). Transition to Init Mode if (carrier Phase lock lost and filtered frequency error estimate<threshold2). Preferably at approximately a PDI 4 ms in absence of bit sync and 20 ms in presence of bitsynch and FFT mode is 20 point.

In the following Mode Transition Table, the columns are the source modes and rows are the destination modes. The entry in the table describes the transition condition.

Mode Transition Table 46

|  | Init | Narrow Freq | Wide Carrier | Narrow Carrier |
|---|---|---|---|---|
| Init | X | filtered frequency error estimate < threshold1 | filtered frequency error estimate < threshold2. | X |
| Narrow Freq | filtered frequency error estimate > threshold2 | X | filtered frequency error estimate < threshold1 | X |
| Wide Carrier | Mode if (carrier Phase lock lost and filtered frequency error estimate > threshold2). | if (carrier Phase lock lost and filtered frequency error estimate > threshold1). | X | X |
| Narrow Carrier | if (carrier Phase lock lost and filtered frequency error estimate > threshold2). | if (carrier Phase lock lost and filtered frequency error estimate > threshold1 | X | X |

Code Loop Transition Table 47

|  | Init (High Bandwidth) | Low Bandwidth |
|---|---|---|
| Init (High Bandwidth) | X | estimated code error < 0.1 chips |
| Low Bandwidth | estimated code error > 0.1 chips | X |

All modes may transition out of the tracking system if code and frequency lock are lost and acquisition may commence.

Figure 102:
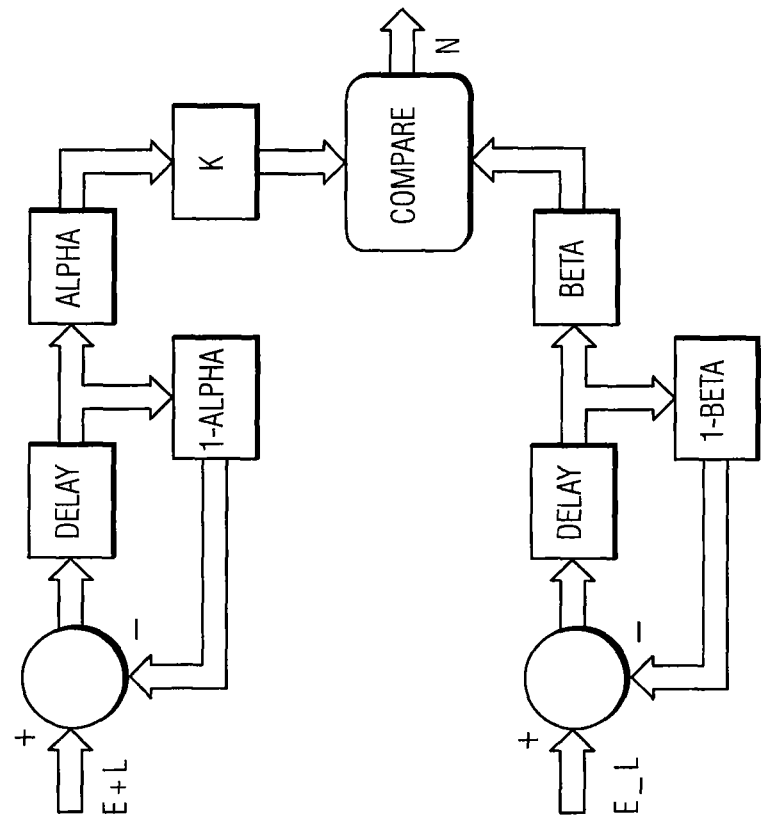
FIG. 102 is a block diagram of a hardware update.

FIG. 102 shows the hardware update. At the end of processing for the Subsystem 3 the Carrier Phase, Carrier Frequency, Carrier Frequency Rate and Code Phase is updated in the Subsystem 2 state.

The code state has a coarse resolution and the code phase equations can accumulate small code phase updates and when the code lsb is reached the code state in subsystem 2 will be updated. This can be accomplished using the following mechanization. This mechanization describes an approximation for the normalized early-late triggering the changes to the code state. N is the number of LSBs in the code state to change.

AGC Normalization/Auto Scale $S\_Gain(t+1) = Alpha * S\_Gain + Beta*(|Ip|+|Qp|)$ The S_Gain is used to normalize the Loop Coefficients. "t" is the time index. S_Gain may also be used to normalize the early minus late output to determine the update to the code state in HW.

The SWTL will be activated at the same time as the HWTL by SW control at the end of successful acquisition process. The SWTL is operated at 100 ms rate. The input consists of buffered reports at the PDI rate and reports on NCO states. The SW is expected to compute more accurate error estimates use aiding from NAV and or outside sources and construct single correction every 100 ms to adjust the HWTL. In special cases the HWTL may also be disabled and SWTL may operate autonomously generating corrections to the HW NCOs at rates different than 100 ms. The HW will provide interrupt at higher rates and the SWTL will operate at rates faster than 100 ms in such cases. The HWTL can be disabled using a single control bit for each channel independently.

Inputs From HW

NCS Buffer and Track History Buffer at 100 ms rate. Contents: I and Q correlation outputs at each PDI for various offsets, Noise sums for PDIs, AutoScale Values, NCO States sampled every PDI, Time Mark representing time of Measurement Report.

State Initialization:

The following states will be initialized using information from Acquisition.
1. Code Phase;
2. Carrier Frequency;
3. Carrier Phase; and
4. S_Gain (if amplitude estimate is available)

Code Discriminator:

The code discriminator is given by the following equation.

$$D=|E|-|L|$$

$$|E|=Alpha*|Ee|+Beta*|Ee+|$$

$$|L|=Alpha*|Le|+Beta*|Le+|$$

where Ee and Le are the early and late I and Q values for one tap off from prompt and Ee+ and Le+ are the early and late I and Q values for two tap off from prompt.

Filtered Code Error=Alpha*Filtered Code Error+ Beta*D.

Carrier Phase Discriminator:

$$\phi=\arctan(Qp,Ip)$$

The $\phi$ is computed for each PDI and a d$\phi$ is maintained in software.

Carrier Frequency Discriminator:

$$\delta f=Alpha*(f_+-f_-)+Beta*(Ip(t+1)*Qp(t)-Ip(t)*Qp(t+1))$$

where t is the time index.

Tracking Equations:

The tracking equations will be iterated at PDI rate. The corrections back into HW will be generated at 100 ms.

Phase Tracking Loop:

Carrier Phase+=Carrier Frequency+$K1*d\phi$+Aid 1

Carrier Frequency+=Carrier Frequency Rate+ $K3*d\phi$++Aid 2

Carrier Frequency Rate+=$K5*\phi$+Aid 3

Frequency Tracking Loop:

Carrier Frequency+==Carrier Frequency Rate+ $K4*\delta f$+Aid 2

Carrier Frequency Rate+=$K6*\delta f$+Aid 3

Code Loop:

Code Phase+=Scale*(Carrier Phase($t$)−Carrier Phase ($t$−1))$K7*D$+Aid4.

K7 initialized to Kmax (high bandwidth value) and updated as follows:

$K7(t+1)$=Alpha*$K7$+Beta*Code Error Estimate

If K7>Kmax K7=Kmax
If K7<Kmin K7=Kmin

The tracking loop mode transition is controlled through the gains K1 through K7.

AGC Normalization:

S_Gain($t$+1)=S_Gain_Rate*Gamma+Alpha*S_Gain+ Beta*(|$Ip$|+|$Qp$|)S_Gain_ Rate($t$+1)=Alpha*S_Gain_Rate+Beta* [(|$Ip(t)$|+|$Qp(t)$|)−(|$Ip(t-1)$|+|$QP(t-1)$|)]

The S_Gain and the S_Gain Rate represent the estimate of magnitude of the signal and the rate of magnitude change for the signal. The S_Gain will be used to normalize the tracking loop equation gains.

Loss Of Lock Detectors:
Code Lock

Compute the Signal to Noise Ratio at 100 ms rate. The computation may be performed as follows:

Noise Power=Sum($In*In+Qn*Qn$), where the sum is carried over 100 ms time period. In and Qn are I and Q outputs from Noise sum in the HW reports at PDI rate.

Signal Power=Sum($Ip*Ip Qp*Qp$), where the sum is carried over 100 ms time period.

Signal to Noise Ratio=Signal Power/Noise Power

Filtered $SNR$=Alpha*Filtered $SNR$+Beta*Signal to Noise Ratio+Gamma*$SNR$_Rate

SNR_Rate=Alpha SNR_Rate+Beta*[Signal to Noise Ratio($t$)−Signal to Noise Ratio($t$−1)]

If Filtered SNR<Threshold declare Loss Of Lock

Carrier Phase Lock:
Estimate the filtered phase error using a 2 Quad arctan function
φ=arctan (Qp,Ip)
computed every PDI
Filtered φ=Alpha*Filtered φ+Beta*φ
If Filtered φ>Threshold declare loss of lock.
Carrier Frequency Lock:
Estimate Filtered Frequency Error $\delta f$=Alpha*($f_+ - f_-$)+Beta*($Ip(t+1)*Qp(t) - Ip(t)*Qp(t+1)$))

where δ f is computed at the PDI Rate.

Filtered $\delta f$=Alpha*Filtered $\delta f$+Beta*$\delta f$

If Filtered $\delta f$<Threshold declare loss of lock.

The update to the HW may be in the form of Aid to the HW Tracking Loop equations. This may be implemented every 100 ms as input from the Software. The Aid may be computed by using the following generic equations.

SW to HW Aid=Software Estimate−$HW$ Estimate

If the HWTL is disables the $HW$ Estimate=0

For the phase and frequency and rates the HW will implement the aid one time only when the SW writes into appropriate registers.

Measurement Report Processing:
The Pseudorange and Rate measurements may be constructed as per the description in the HW to SW interface.

The Bit Synch may operate at 20-100 ms rates and may be implemented in SW.

Inputs:

The HW may provide 20 ms accumulations (PDI) for 20 offsets (programmable). The Input Array histogram[20] may consists of 20 ms PDI power accumulations. The Histogram may be accumulated using the following equation for each SV:

AccumHistogram[20]+=Histogram[20]

If offset information is available accum Histograms from multiple SVs may be accumulated using the following equation:

Accum HistogramMultiple $SV$[20]+=AccumHistogram[20+$SV$ Offset]

First example approach:
The histogram peak and second peak detected.
If ((Histogram Peak>Threshold) && (Histogram Peak− Histogram Second Peak)>Threshold) Bit Synch Complete Output Bit Location
Else continue accumulation.
Second example approach:
Compute cost function by correlating a triangle 20 ms wide to the accumulated histogram.

Cost Function(offset)=Sum(triangle(ms)*Accum Histogram(ms−offset))

The sum is carried over the 20 values of ms. The max for the cost function(offset) will provide the bit synch offset.

If[max(cost function(offset)>Threshold&& {max(cost function(offset))−second max(cost function(offset))}>Threshold)]declare bit synch success.

Data Demodulation:
The Data Demodulation may operate at 20-10 ins rates. Implementation is in SW.
After Bit Synch success Ip and Qp for 20 ms aligned to bit boundaries.
If carrier Phase Lock Data Bit=sign($Ip$)

Else

Data Bit=sign[($Ip+j*Qp$)*exp($j$*Carrier Phase Error Estimate], where j is the complex coefficient. This algorithm is a more general case of differential decoding when the carrier phase estimate error is generated from the previous bit.

Frame Synch:
The Frame Synch may operate at 20-10 ms rates and be implementation in SW.
Bit stream after data demodulation provided as an array of binary values per SV.

Example approach:
Cold Start (No Information available)
Preamble Sync. Identify Preamble in the bit pattern.
Decode HOW. Identify second preamble 6 seconds off and identify second HOW off by 1.
Approximate Time Available
Identify preamble. Decode HOW. If HOW is within time uncertainty declare frame synch complete.
Verify Frame Synch. Repeat the process and confirm HOW change by 1 with 6 second offset.
Aiding Information Available and 1 SV completed Frame Synch The following steps may be executed:
Compute pre positioning for the SVs needing frame synch using time from the first SV frame synch.
Compute frame starts for the SVs of interest relative to local time.
Set the frame synch information.
Aiding Bits available
Compute a cost function using the aiding bits available.

Cost Function(offset)=Sum(Aiding Bits(bit number)*Bit Stream(bit number+offset))

The Sum is carried over all the available aiding bits.
If SV offset information is available combine the cost function for multiple SVs using the following equation Combined Cost Function(offset)+=Cost Function(offset SV offset)

If[max((Combined Cost Function(offset)>Threshold)&&(max(Combined Cost Function (offset))−second max(Combined Cost Function (offset))>Threshold)]Declare frame synch Complete.

The GPS system of an embodiment includes a system or apparatus and the associated methods for clock control. A low power real time clock (RTC) is operated continuously in a Global Positioning System (GPS) receiver unit. Power is conserved in the GPS receiver unit by shutting down selected components during periods when the GPS receiver unit is not actively acquiring satellite information used to calculate the location of the GPS receiver unit. A K32 (typically a nominal 32,768 Hz) oscillator residing in a low power time keeping circuit accurately preserves GPS time when the selected components are shut off. The K32 oscillator generates the RTC or low power clock. The terms low power clock and RTC are used interchangeably herein.

A method and apparatus for determining whether the RTC is accurate enough to be used on start-up is disclosed. In one embodiment, actual loss of RTC clock cycles, such as during a brownout episode, is detected. In one embodiment, an output of an RTC clock oscillator is half-wave rectified and placed on the input to a resistor-capacitor (RC) circuit with a calculated RC time constant. The output of the RC circuit is placed on one input of a voltage comparator. A reference voltage is placed on the other input of the voltage comparator. If the RTC oscillator misses a predetermined number of cycles, the output voltage of the RC circuit on the voltage comparator decays and the comparator detects the loss of clock cycles, which is reflected on the voltage comparator output.

Figure 103:
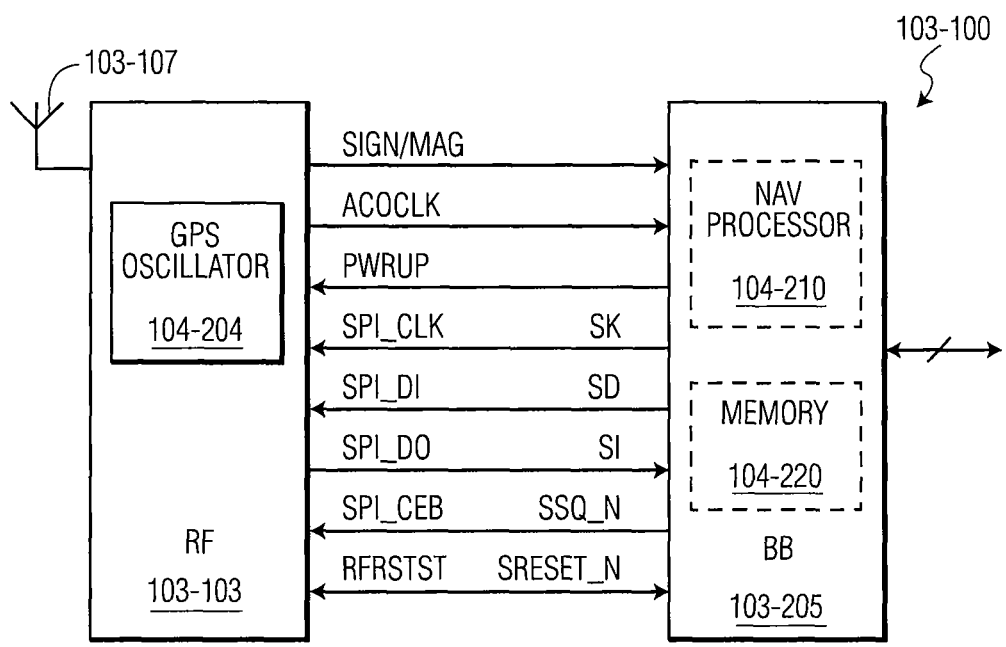
FIG. 103 is a block diagram of an embodiment of a GPS receiver.

FIG. 103 is a block diagram of a GPS receiver unit 103-100 according to one embodiment. The GPS receiver 103-100 includes radio frequency (RF) functionality shown here residing on an RF chip 103-103. The GPS receiver unit 103-100 further includes baseband functionality shown here residing on baseband chip 103-105. Various components that perform various functions will be described in certain arrangements herein, but the invention as disclosed contemplates alternative arrangements. For example, the baseband chip 103-105 may include a navigation processor 104-210 and a memory device 104-220, as shown. In other embodiments, the navigation processor and the memory device may not reside on the baseband chip 103-105, but may communicate with the baseband chip 103-105 through, for example, a peripheral interface. In yet other embodiments, all of the components shown and functionalities described reside on one chip.

The RF chip 103-103 includes a GPS oscillator 104-204, which is a high accuracy oscillator used to keep GPS time. The following is an overview of general operation of the GPS receiver unit 103-100 according to one embodiment. Components named in the following overview will be shown and described below. Power is conserved in GPS receiver unit 103-100 by shutting down selected components, including the GPS oscillator 104-204, during periods when the GPS receiver unit is not actively acquiring satellite information used to calculate the location of the GPS receiver unit. A K32 (typically a nominal 32,768 Hz) oscillator residing in a low power time keeping circuit accurately preserves GPS time when the selected components are shut off.

The GPS oscillator 104-204 generates a clock signal, referred to as the M11 clock signal, that is used to accurately determine GPS time based upon signals detected from the plurality of satellites. An edge aligned ratio counter continuously monitors the K32 and M11 clock signals with free running counters, and when an edge of the K32 clock signal aligns with an edge of the M11 clock signal within a predetermined small tolerance, the K32 and M11 counter values are latched. Since the GPS timing generator that produces the T20 epochs is driven by the M11 clock, the free running M11 counter can also be latched at a T20 epoch to establish a relationship between that counter and the T20 epoch. Thus, the GPS receiver unit 103-100 is able to correlate the timing and the rates of the K32 clock signal and the GPS M11 clock signal with the T20 timing epoch. The correlated timing and rates of the K32 clock signal, the GPS M11 clock signal and the T20 epoch are provided to the navigation processor 104-210 so that a sufficiently accurate estimate of GPS time at a T20 epoch is calculated to allow determination of the PN code periods in the signal structures of acquired satellite PN code signals.

During operation of the GPS receiver unit, frequencies of the local GPS oscillator and the K32 oscillator are detected at various operating temperatures such that a temperature/frequency is defined for both oscillators. The data for both temperature/frequency tables are stored in a memory.

Selected components residing on the GPS receiver unit, including the GPS oscillator, are then shut down (deactivated) to conserve power. The low power time keeping circuit remains on. Periodically, after a predetermined period of time, the system is powered up in response to a wake-up command generated by an alarm unit. The K32 clock signal from the low power time keeping circuit is recalibrated based upon the actual operating temperature of the K32 oscillator and data from the K32 clock temperature/frequency table. Thus, the K32 clock rate is periodically updated to more accurately track GPS time.

At a particular point in time, a navigation update is performed in accordance with the requirements of the particular system application. The periodically recalibrated K32 clock signal and data from the GPS clock temperature/frequency table are used to set the M11 clock signal rate and GPS time. Positions of the GPS satellites are then estimated such that the real GPS time can be quickly determined from the received satellite signals. Once the precise GPS time is determined from the detected satellite signals, the M11 and K32 signals are latched together and correlated with the real GPS time at a T20 epoch, as described above, to further improve and update their temperature calibration tables. The selected components are then shut off once again to conserve power.

The process described above is repeated as necessary so that accurate GPS time is maintained by the low power time keeping circuit. When a user of the GPS receiver unit requests position information, the GPS receiver unit determines position from the GPS satellites more quickly because the GPS satellite positions and ranges are estimated with a higher degree of precision based on more accurate time keeping. That is, the power consuming and time consuming process of detecting sub-frame data and determining sub-frame timing to set the GPS time accurately enough to estimate the ranges to the GPS satellites using conventional processes is avoided.

Referring again to FIG. 103, the RF chip 103-103 and the baseband chip 103-105 communicate through a system interface 103-109. In one embodiment, the system interface 103-109 is a serial peripheral (SPI) interface, but in other embodiments, the system interface could be any adequate messaging scheme. The RF chip 103-103 receives signals from satellites in view via an antenna 103-107. The satellite signals are sampled and sent to the navigation processor as a serial stream on the SIGN/MAG line. The baseband chip 103-105 and its components operate with an ACQCLK signal that is generated from a GPS oscillator crystal, and typically has a frequency that is a multiple of $F_O$. Various other signals are exchanged via the system interface as show. A power up (PWRUP) signal is sent to the RF chip 103-103 to power up the powered down components of the RF chip 103-103 prior to acquisition and navigation. An SPI_CLK signal is sent to the RF chip 103-103 from the baseband chip 103-105 for synchronization. Data lines SPI_DI and SPI_DO carry data back and forth. A chip enable signal (RFRST) is sent to the RF chip 103-103 on the RFRST line and a reset signal (SRE-SET_N) is sent to the baseband chip 103-105 on the RFRST line. In other embodiments, various different protocols are used to exchange information between the RF chip 103-103 and the baseband chip 103-105.

Figure 104:
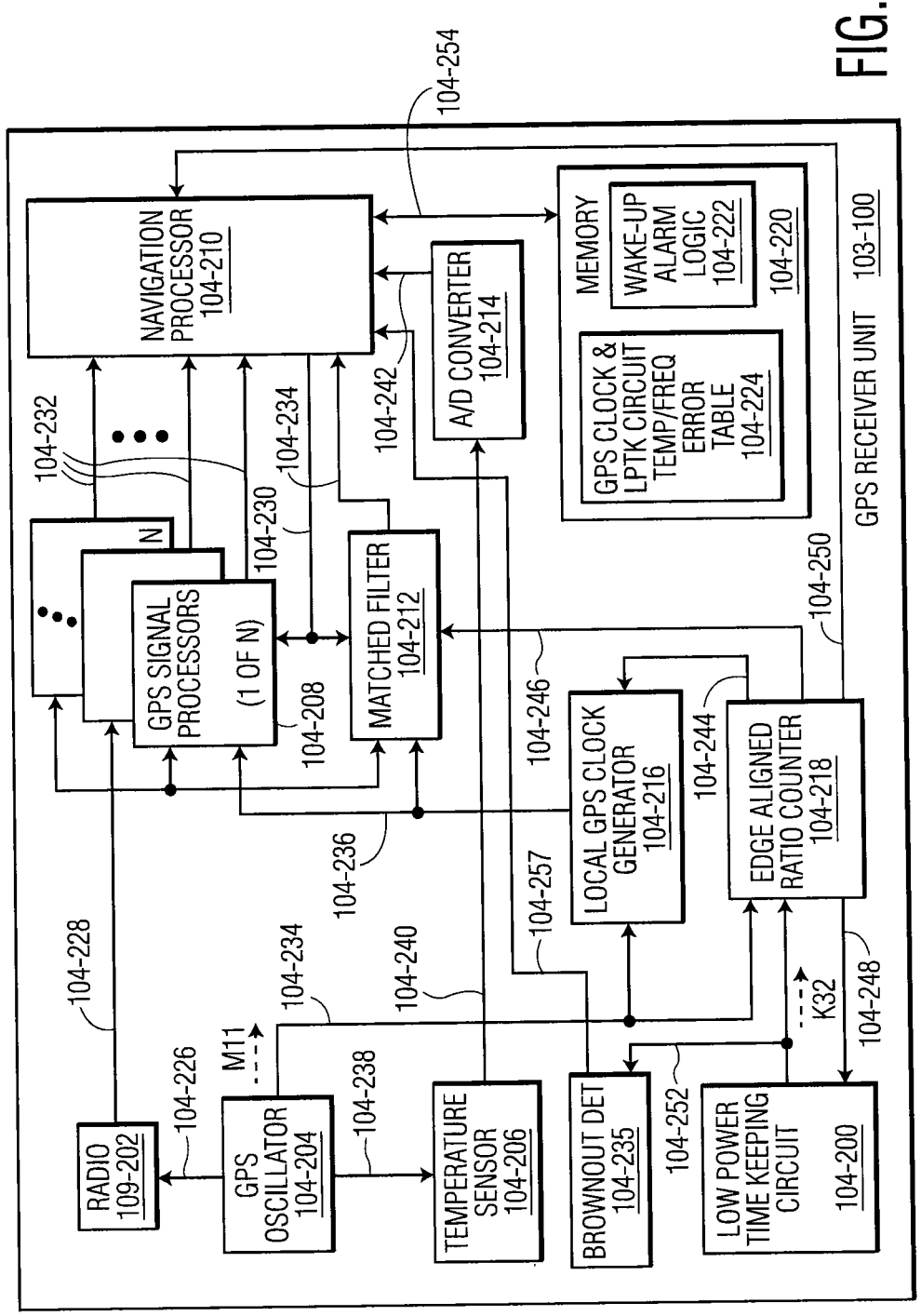
FIG. 104 is another block diagram of the embodiment of the GPS receiver.

FIG. 104 is a block diagram illustrating selected components of the GPS receiver unit 103-100, including a low power time keeping circuit 104-200. GPS receiver unit 103-100 includes at least a radio 104-202, the local GPS oscillator 104-204, temperature sensor 104-206, a plurality of GPS signal processor channels 104-208 (1 through N), the navigation processor 104-210, matched filter 104-212, A/D converter 104-214, local GPS clocks generator 104-216, edge aligned ratio counter 104-218, memory 104-220 and low power time keeping circuit 104-200. Memory 104-220 further includes the wake-up alarm logic 104-222 and an allocated portion for the GPS clock Low Power Time Keeping (LPTK) Circuit error temperature/frequency error table 104-224. FIG. 148 is generally limited to illustrating those components relevant to the operation and functioning of the invention. Other components, not shown, are included in the GPS receiver unit 103-100. These components are omitted because a discussion of the operation and functionality is not necessary for the disclosure.

Radio 104-202 detects a plurality of GPS signals from a plurality of satellites. In one embodiment the radio 104-202 selects the GPS L1 band (1575.42 MHz). However other embodiments may select other suitable signals. Radio 104-202 also receives a timing signal from local GPS oscillator 104-204, via connection 104-226. The timing signal, in one embodiment, is generated by a crystal (not shown) residing in the local GPS oscillator 104-204 that oscillates at substantially 10.949 mega-hertz (MHz), and is referred to as the M11 clock signal. Other embodiments may employ a local GPS oscillator operating at a different frequency clock signal without departing substantially from the operation and functionality of the invention.

The received GPS signals and the M11 timing signal are provided to the plurality of GPS signal processors 104-208 and matched filter 104-212. Each one of the plurality of GPS signal processors 104-208 corresponds to a particular signal channel. FIG. 104 indicates that there are N GPS signal processors. For instance, an exemplary embodiment of the GPS receiver unit 103-100 may employ twelve GPS signal processors (N=12) that are configured to process in parallel twelve signal channels.

The signal processors 104-208 and matching filter 104-212 receive a sequence of pre-positioning commands from the navigation processor 104-210, via connection 104-230, that indicate specific GPS PN codes that each signal processor is to search for. Information provided by navigation processor 104-210 may also include Doppler correction values, GPS oscillator error correction values, PN code phase information and/or other relevant information regarding the incoming satellite signals.

In one embodiment, the matched filter 104-212 determines the current PN code phase of a detected signal and provides the information to the signal processors 104-208 to allow the signal processor channel to more rapidly acquire that signal. When one of the signal processors 104-208 detects a signal on a channel such that the PN code, code phase and frequency correction matches that of one of the incoming GPS signals, the GPS signal processor synchronizes to and tracks the incoming satellite signal. Another embodiment employs only the matched filter 104-212 to determine position (although with a lesser degree of accuracy since the matched filter 104-212 determines the current code phase of a signal at a point in time and does not continually track it). Current embodiments of the matched filter also permit fast multiplexing of the matched filter that does allow continuous, accurate tracking of all acquired satellite signals.

The matched filter 104-212 and/or the GPS signal processors 104-208 provide code phase information regarding the acquired signals to the navigation processor 104-210, via connections 104-234 and/or 104-232, respectively. Navigation processor 104-210 then calculates the position of the GPS receiver unit 103-100 after sufficient information from at least four GPS satellite signals has been provided by the matched filter 104-212 and/or the GPS signal processors 104-208. The location information is then output to an interface system (not shown) so that a user may learn of the position of the GPS receiver unit 103-100.

The local GPS oscillator 104-204 provides a signal having a predefined oscillation frequency. For example, but not limited to, the oscillation frequency of a crystal (not shown) residing in one embodiment of the local GPS oscillator 104-204 is configured to equal 10.949296.875 megahertz (MHz). Here, the precise nominal value of the oscillation frequency equals $137 F_O/128$. $F_O$ is a fundamental parameter of the GPS system equal to 10.23 MHz. The GPS L1 frequency of the received GPS signals is $154 F_O$. The chip rate of the Clear/Acquisition GPS PN codes used in commercial system s is $F_O/10$. One embodiment of the GPS oscillator 104-204 is referred to as outputting an M11 clocking signal, where the term "M11" corresponds to the $137 F_O/128$ frequency of 10.949296.875 MHz. Other signals of the GPS system, including frequencies and codes used by military receivers, are also related to $F_O$.

The local GPS oscillator 104-204 provides the M11 clocking signal, via connection 104-234, to the local GPS clocks generator 104-216. Local GPS clocks generator 104-216 derives a plurality of clock signals from the M11 clocking signal. These clocks correspond to the local GPS time-base. Of particular interest, one of the plurality of clocks is known as the local timing epoch, the T20 clock. The T20 clock derives its name from the fact that it is 20 ms between clock ticks. Many of the code phases measured in the GPS signal processors 104-208 and the matched filter 104-212 are referenced to a common T20 epoch. Selected clocking signals generated by the local GPS clocks generator 104-216 are provided to the GPS signal processors 104-208 and the matched filter 104-212 over connection 104-236.

The low power time keeping circuit 104-200, described in detail below, provides a clocking signal to the edge aligned ratio counter 104-218, via connection 104-252. The clocking signal rate, in one embodiment, is provided by a crystal oscillating at substantially 32.768 kilohertz (kHz), and is referred to as the K32 clock signal. Also, the low power time keeping circuit 104-200 provides information to the navigation processor 104-210 (connections not shown). Typically, the information provided to the navigation processor 104-210 by the low power time keeping circuit 104-200 is an estimate of the GPS time at a T20 epoch. Other embodiments may employ a different frequency clock signal without departing substantially from the operation and functionality of the invention.

A brownout detection circuit 104-235, shown and described in more detail below with reference to FIGS. 105 and 106, detects loss of RTC clock cycles. The brownout detection circuit 104-235 detects a situation in which loss of RTC clock cycles have made the RTC too inaccurate to use on start-up and notifies the navigation processor accordingly, as described in more detail below.

The edge aligned ratio counter 104-218 provides input to the local GPS clocks generator 104-216 (via connection 104-244), to the matched filter 104-212 (via connection 104-246), and to the low power time keeping circuit 104-200 (via connection 104-248). For convenience of illustration, connections 104-244, 104-246 and 104-248 are illustrated as separate connections. However, one or more of these connections could be implemented as a single connection. The edge aligned ratio counter 104-218 also provides information to the navigation processor 104-210 via connection 104-250. The edge aligned ratio counter 104-218 continuously counts and monitors the K32 and M11 clock signals, and when an edge of the K32 clock signal aligns with an edge of the M11 signal, within a predetermined small tolerance, the K32 and M11 counter values are latched. At the time of latching, the edge aligned ratio counter 104-218 provides a signal to the local GPS clocks generator 104-216 so that the current T20 clocking count is latched to relate the K32 and M11 counts to the T20 epoch. In the same manner, the edge aligned ratio counter 104-218 provides a signal to the low power timekeeping circuit 104-200, via connection 104-248, that causes the current low power timekeeping circuit 104-200 estimate of GPS time to be latched. Thus, the GPS receiver unit 103-100 is able to correlate the timing and the rates of the K32 clock signal and the GPS M11 clock signal with the T20 epoch and, the current low power timekeeping circuit 104-200 GPS time. When the correlated timing and rates of the K32 clock signal, the GPS M11 clock signal, the low power time keeping 104-200 GPS time and the T20 epoch count are provided to the Navigation processor 104-210, the low power time keeping circuit 104-200 estimate of GPS time at a T20 epoch can be calculated and the relative rates of these two clocks can be estimated from counter ratios of the two clocks in the edge aligned ratio counter 104-218. In order to estimate the relative clock frequency, two sets of counter values from successive edge alignment events are differenced and the ratios of the differences taken.

Note that the rate and timing phase of all clocks can be accurately related. The EARC free running M11 counter and T20 epoch generator are both driven by the M11 clock. Hence, latching the M11 counter at a T20 epoch relates the counter values and T20 epoch times. The RTC time and the EARC free running K32 counter are both driven by the K32 clock. Hence, latching the K32 counter at a RTC alarm event relates the counter values and the RTC times. The RTC has an alarm circuit that produces a pulse, useful as a latching signal, at a desired RTC time. Using the FARC to latch the free running K32 and M11 counters at an edge alignment event relates the K32 and M11 counter values. Differencing the respective K32 and M11 counter values from two alignment events allows the ratio of the K32 and M11 clock rates to be related. Finally, when GPS signals are being tracked, calculation of the GPS solution provides the precise GPS time at a T20 epoch and the rate of the T20 epochs relative to GPS time. Hence, the K32 and M11 clock rates can be related to GPS clock rate and the RTC and T20 epoch times can be related to GPS time.

One skilled in the art will appreciate that the above described operation of the GPS receiver unit 103-100 is intended as a general description of one system used by an embodiment of a GPS receiver unit. Not all GPS receiver unit components are described or illustrated, as such components may not necessarily relate to the invention. Thus, the description of the above-described components residing in the GPS receiver unit 103-100 is generally limited to describing the operation and functionality of those components to the extent necessary for the understanding of the invention. Furthermore, a GPS receiver unit or other processor systems employing the invention may have the components shown in FIG. 104 connected in a different order and manner than shown in FIG. 104, or may not include all of the component shown in FIG. 104, or may include additional components connected in some manner with the components shown in FIG. 104. Any such variations in GPS receiver unit or a processor system that utilizes the invention are intended to be within the scope of this disclosure and be protected by the accompanying claims.

Temperature sensor 104-206 detects the operating temperature of the local GPS oscillator 104-204, via connection 104-238. The sensed temperature information is then provided to the A/D converter 104-214 over connection 104-240. A/D converter 104-214 converts the sensed operating temperature information into a suitable format and provides the information to the navigation processor 104-210, via connection 104-242. Temperature sensor 104-206 and A/D converter 104-214 may be implemented using well-known components and techniques employed in the art of detecting temperatures. The temperature sensing functions performed by temperature sensor 104-206 and/or A/D converter 104-214 may be implemented with any type of electronic, solid state and/or firmware type temperature sensors or means commonly employed in the art of sensing temperatures. Such a temperature sensor employed in the invention is implemented by a combination of software and firmware using components and techniques commonly employed in the art of sensing temperatures. Detailed operation of temperature sensor 104-206 and A/D 104-214, including their individual components, are not described in detail other than to the extent necessary to understand the operation and functioning of invention. One skilled in the art will realize that the temperature sensor 104-206 and the A/D converter 104-214 may be implemented using a variety of well known devices without departing substantially from the functionality and operation of the invention.

Navigation processor 104-210 processes the received temperature information such that a frequency error in the GPS oscillator signal due to the operating temperature of the local GPS oscillator 104-204 is determined. An exemplary process for determining this frequency error employs a table having temperature and frequency error information for a range of operating temperatures. In one embodiment, the GPS clock temperature/frequency error table 104-224 resides in a non-volatile memory 104-220. Initially, a frequency/temperature error algorithm, such as a polynomial representation of the frequency error as a function of temperature of a typical oscillator crystal, is employed to approximate the temperature related frequency error. As the GPS receiver unit 103-100 is operated over time, the portion of the temperature/frequency error table 104-224 for the GPS clock data is filled with more accurate information of the frequency error at particular operating temperatures for the local GPS oscillator 104-204 based upon measurements of frequency error based on GPS satellite range and range rate measurements at various operating temperatures. Solution of the GPS navigation equations allows a determination of receiver spatial velocity and local oscillator frequency error (rate of change of GPS time error), as well as spatial position and GPS time error. The oscillator frequency error so determined is paired with the current oscillator temperature as a new update point in the temperature/frequency error table 104-224.

Prior to entering the navigation mode, the receiver uses the temperature/frequency error table 104-224 to aid in the satellite acquisition process. Upon receiving the current operating temperature, the navigation processor 104-210 looks up the table information for the GPS clock residing in the temperature/frequency error table 104-224. The actual operating temperature of the local GPS oscillator 104-204 is correlated with the data in the temperature/frequency error table 104-224 to estimate the frequency error in the signal generated by the local GPS oscillator 104-204. This GPS clock frequency error information is provided to the GPS signal processors 104-208 and the matched filter 104-212, via connection 104-230. Alternatively, when the temperature/frequency error table 104-224 is only partially filled out and does not contain sufficient data for the exact current operating temperature, a frequency/temperature error extrapolation or interpolation algorithm may be used to estimate the error in the GPS oscillator signal due to the operating temperature of the local GPS oscillator 104-204. This algorithm makes use of the points in the table at the nearest temperatures to the current operating temperature along with the shape of the nominal temperature vs. frequency curve of the type of GPS clock oscillator crystal in use.

Figure 105:
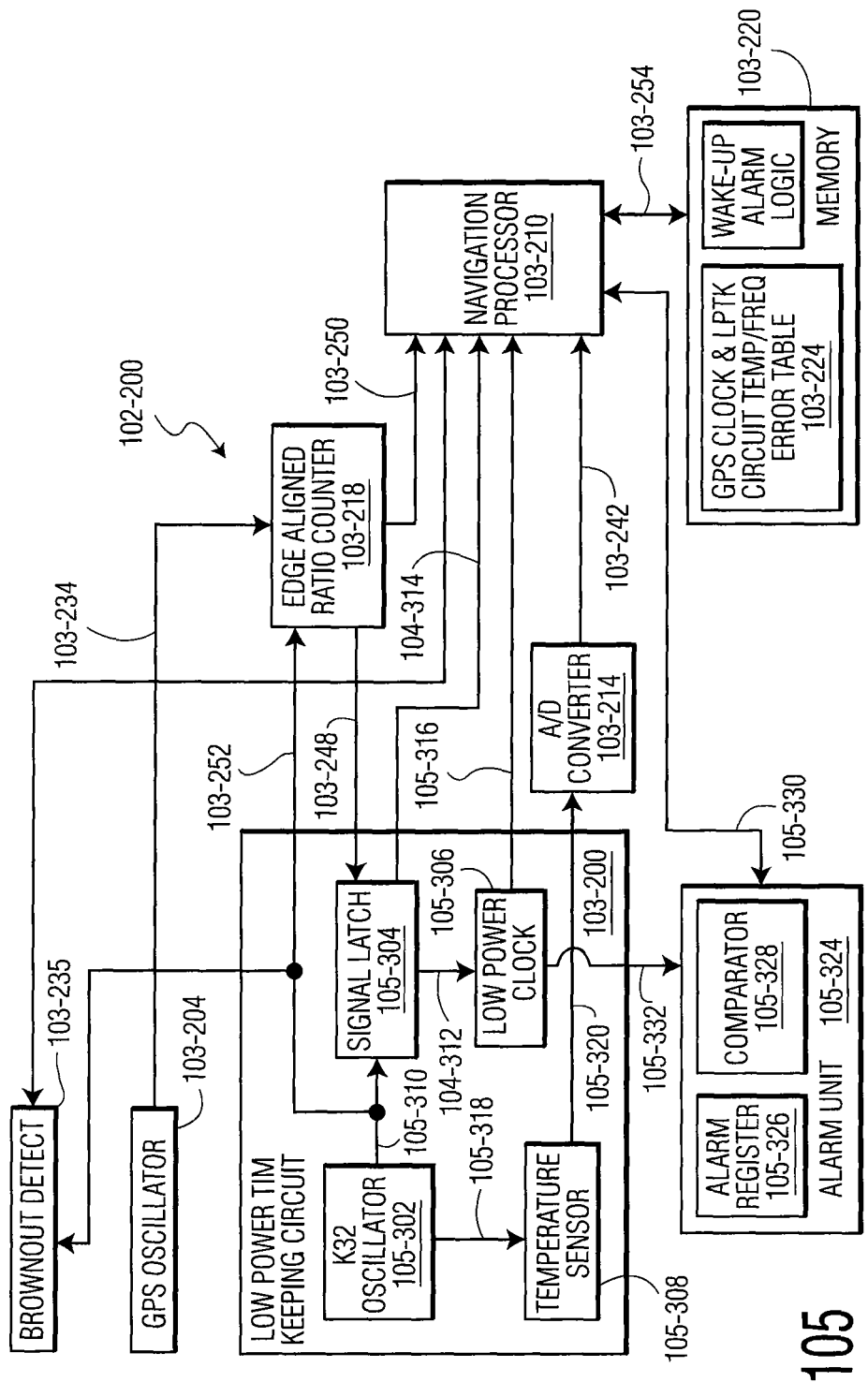
FIG. 105 is another block diagram of the embodiment of the GPS receiver.

FIG. 105 is a block diagram illustrating additional detail of the GPS receiver unit 103-100. Low power time keeping circuit 104-200 further includes at least a K32 oscillator 105-302, a signal latch 105-304, a temperature sensor 105-308 and a low power clock, or real time clock (RTC) 105-306.

K32 oscillator 105-302 outputs the RTC clock signal, also referred to as the K32 clock signal, having a frequency substantially equal to 32.768 kHz, via connection 105-310. Since the K32 oscillator 105-302 provides a K32 clock signal having a time resolution of 32768 Hz, which equals approximately 30 microseconds, the K32 oscillator 105-302 provides a clocking signal having a frequency well within the ±0.5 ms resolution of a single PN code period.

The RTC clock signal is sent to the brownout detection circuit 104-235 on connection 105-310. The brownout detection circuit 104-235 is explained in more detail below.

K32 oscillator 105-302 provides its output K32 clock signal to the counter in the low power clock 105-306 and to the edge aligned ratio counter 104-216. When the edge aligned ratio counter 104-216 determines that an edge of the K32 clock signal aligns with an edge of the M11 signal, within a predetermined small tolerance, a latch signal is provided to the signal latch 105-304, via connection 104-248. The current value of the low power clock counter 105-306 is latched in signal latch 105-304 when the edge alignment signal is received, via connection 104-248. The latched value in signal latch 105-304 is provided to the navigation processor 104-254, via connection 105-316. The signal on connection 105-316 is thus the low power clock signal, or RTC clock signal. The edge aligned ratio counter 104-216 provides the latched values of the M11 and K32 counters in the edge aligned ratio counter at the alignment event epoch to the navigation processor 104-210. Because the T20 epochs can be directly related to the GPS oscillator M11 clock (not shown), the M11 counter value in the edge aligned ratio counter 104-216 can be related to the K32 counter value in the low power clock 105-306 as an offset of a specific number of integral M11 clock ticks. The number of clock ticks is integral (has no fractional clock tick component) because the counter values were all acquired when the K32 and M11 clock edges were aligned within a small (negligible) window of error. Because the low power clock 105-306 has been closely calibrated to the time and rate of the GPS system time, knowing the value of the low power clock 105-306 and an offset to a specific T20 epoch in the local GPS time line allows the GPS time of the low power time keeping circuit 104-200 to be transferred accurately to the T20 epoch. Since all UPS measurement signal processing is related to T20 epochs, the measurements can now be made relative to an accurate local GPS time estimate.

The K32 oscillator 105-302 and the low power clock 105-306 are, relatively, very low-power consuming devices, particularly when compared to the selected components residing in the GPS receiver unit 103-100 that are powered down in a manner described below. Furthermore, the K32 oscillator 105-302 and the low power clock 105-306 are commercially available and relatively inexpensive. Alternatively, and preferably, the K32 oscillator 105-302 and low power clock 105-306 can be integrated into the GPS device 103-100 to provide even lower cost, smaller size and more accurate time-transfer performance.

As illustrated in FIG. 105, a temperature sensor 105-308 detects the operating temperature of the K32 oscillator 105-302, via connection 105-318. The sensed temperature information is then provided to the A/D converter 104-214, via connection 105-320. A/D converter 104-214 converts the sensed temperature information into a suitable format and provides the K32 operating temperature information to the navigation processor 104-210, via connection 104-242. Temperature sensor 105-308 may be implemented using well-known components and techniques employed in the art of detecting temperatures. The temperature sensing functions performed by temperature sensor 105-308 may be implemented with any type of electronic, solid state or firmware type temperature sensor or means commonly employed in the art of sensing temperatures, Such a temperature sensor 105-308 employed in the invention is implemented by a combination of software and firmware using components and techniques commonly employed in the art of sensing temperatures. Detailed operation of temperature sensor 105-

308 is not described in detail other than to the extent necessary to understand the operation and functioning of the invention. One skilled in the art will realize that the temperature sensor 105-308 may be implemented using a variety of well known devices without departing substantially from the functionality and operation of the invention. Any such embodiments of temperature sensor 105-308 that are employed as a part of the invention are intended to be within the scope of this disclosure and to be protected by the accompanying claim.

A portion of the temperature/frequency error table 104-224, included in memory 104-220, is used to store temperature/frequency data for the K32 oscillator 105-302. Navigation processor 104-210 calculates a frequency error associated with the signal from the K32 oscillator 105-302 based upon the current operating temperature of the K32 oscillator 105-302, much like the local GPS oscillator 104-204 frequency error described above. As the GPS receiver unit 103-100 is operated over time, the temperature/frequency error table 104-224 is filled with more accurate information of the frequency error at particular operating temperatures for the K32 oscillator 105-302 based upon measurements of frequency error at various operating temperatures. Unlike the case of the M11 GPS oscillator, the navigation processor 104-210 does not have a direct means of measuring the error in the K32 oscillator. However, while navigating, the navigation processor 104-210 can accurately estimate the error in the M11 signal from the GPS oscillator 105-302 and then use the edge aligned ratio counter 104-216 to transfer the GPS time from a T20 epoch to a low power clock value at a K32 tick having a known offset of a near-integral number of M11 ticks from a T20 epoch. Since GPS range measurements are made relative to T20 epochs, the T20 epochs have GPS time errors that are accurately known when navigation solutions are available from GPS measurements. Transferring the accuracy of the T20 epoch GPS time to the low power clock 105-306 during navigation calibrates the K32 clock signal at the current K32 oscillator 105-302 temperature.

Alternatively, when data for the K32 oscillator 105-302 in the temperature/frequency error table 104-224 is only partially filled out, an embodiment of the invention employs a frequency/temperature error algorithm, such as a polynomial representation of the frequency error as a function of temperature of a typical K32 oscillator crystal 105-302, to approximate the temperature related frequency error of the K32 clock signal based on extrapolation or interpolation from the nearest temperature value or values having a valid table value. Such an algorithm mathematically correlates frequency errors and operating temperatures.

To conserve power, many of the GPS receiver unit 103-100 components, and other components of the GPS device, are shut off. During periods of time when the components are shut off to conserve power, referred to as the sleeping period or the sleep mode, the invention accurately keeps track of GPS time, as described below. Thus, when the GPS receiver unit 103-100 leaves the sleep mode, such as in response to a "wake-up event" or in response to another signal indicating that position is to be determined, the GPS time is accurately maintained such that a minimal amount of time is required to track the GPS satellites to determine the location of the GPS receiver unit 103-100.

For example, but not limited to, the local GPS oscillator 104-204, radio 104-202, local GPS clocks generator 104-216 and/or GPS signal processors 104-208 may have been powered down by the navigation processor 104-210 to conserve power. Powering down the selected components, when the components are not required to actively process incoming GPS satellite signals, reduces overall power consumption by the GPS receiver unit 103-100, thereby extending limited power source life in a portable GPS receiver unit 103-100. Typically, components that consume relatively large amounts of power during operation are selected for the power down. It is understood that the designer of the GPS receiver unit 103-100 selects the components that are to be shut off during the power down process. Since there are a great number of components residing in the GPS receiver unit 103-100 that may be powered down, many of which have not been described, one skilled in the art will appreciate that a detailed description and inventory of the components that may be powered down are too numerous to conveniently list and describe in detail. Any such combinations of components that are powered down in accordance with the invention are intended to be within the scope of this disclosure and to be protected by the accompanying claims.

Powering down the selected components in conventional GPS receivers results in the loss of GPS satellite signal tracking. When such conventional GPS receivers power up after loss of the GPS satellite signals, several seconds are required for the reacquisition of the GPS satellite signals and/or the establishment of GPS time of sufficient accuracy for navigation using those signals. The time required for satellite signal and time reacquisition in the conventional GPS receivers results in a corresponding power use. Therefore, the low power time keeping circuit 104-200 that accurately maintains GPS time during the sleeping period enables a GPS receiver unit 103-100 to more quickly reacquire the GPS satellite signals, thereby saving power resources.

The wake-up command is provided to the GPS receiver unit 103-100 on a periodic basis. The time between the periodic wake-up commands is determined based upon the specific architecture or application of the GPS receiver unit 103-100 in which the low powered time keeping circuit 104-200 has been implemented. The time between wake-up commands is selected such that the time error accumulated between the local replica PN code phase estimated by the navigation processor 104-210 after the power down period and incoming PN codes is less than or equal to ±0.5 ins of the actual PN code phase of the incoming GPS satellite signals. In the event that the PN code estimated by the navigation processor 104-210 exceeds the ±0.5 ms criteria, the navigation processor 104-210 initiates a conventional process to acquire GPS satellite information. Typically, the receiver 103-100 must estimate the likely error accumulation and choose the correct algorithm accordingly. Since the algorithm chosen may be too optimistic (using the fast acquisition rather than the conventional acquisition), the navigation processor 104-210 must verify the time accuracy hypothesis by comparing the resulting position and time error solution with the a priori assumed values. If the combined time and time-equivalent position errors in fact exceeded ±0.5 ms, the resulting solution will typically differ from the a priori values by recognizably large errors. If the error is not greater than ±0.5 ms, GPS time has been maintained with sufficient accuracy by the low power time keeping circuit 104-200.

The alarm unit 105-324 performs the functionality of implementing the periodic wake-up commands, also referred to as periodic navigation updates. The alarm unit 105-149-324 includes at least an alarm register 105-326 and a comparator 104-238. In one embodiment, prior to shutdown, the navigation processor 104-210 executes the wake-up alarm logic 104-222 to define the periodic times that the alarm unit 105-324 is to wake up the GPS receiver unit 103-100. In another embodiment, the time periods are predefined.

These time periods defining when the wake-up commands are issued are provided to the alarm register 105-326 via connection 105-330. In one embodiment, the time periods are defined in GPS time units (TOW and week number). In another embodiment, another suitable time period such as real time is used to define time periods.

Once the GPS receiver unit 103-100 is placed into a sleep mode, the alarm unit 105-324 monitors the K32 clock signals provided from the low power clock 105-306 (that is not shut down during sleep mode) to determine the current sleep mode time. The comparator 105-328 compares the current sleep mode time with the periodic times that the alarm unit 105-324 is to wake up the GPS receiver unit 103-100. When the current sleep mode time and the periodic times match, the alarm unit 105-324 generates a periodic wake-up command. This periodic wake-up command initiates a power up of the components that were powered down during the sleeping period.

In one embodiment, the periodic wake-up command initiates a power up using special purpose, dedicated hardware. For example, the wake-up command actuates one or more power switches such that the components that were powered down during the sleeping period are provided power. In another embodiment, the wake up command is provided to the navigation processor 104-210 such that the wake-up alarm logic is executed to wake up the components that were powered down during the sleeping period.

The alarm unit 105-324, and its associated components, may be implemented using well-known components and techniques employed in the art of generating wake-up commands. Detailed operation of the alarm unit 105-324 and its associated components are not described in detail other than to the extent necessary to understand the operation and functioning of invention. One skilled in the art will realize that the alarm unit 105-324, and its associated components, may be implemented using a variety of well known devices without departing substantially from the functionality and operation of the invention. Any such embodiments of the alarm unit 105-324, and its associated components, that are employed as a part of the invention are intended to be within the scope of this disclosure and to be protected by the accompanying claims.

Alternative embodiments may employ other suitable processors (not shown) that perform the power down and power up functions. Such a processor and its related components would not be powered down during the sleeping period. Such an alternative processor would be configured to generate the periodic wake-up command. The processor may be a component of another system (not shown in FIGS. 103 and 104) residing in the GPS receiver unit 103-100, or be a stand alone dedicated processor residing in the GPS receiver unit 103-100. Any such alternative embodiment implemented in a GPS receiver unit 103-100 to perform the functionality of generating periodic wake-up commands is intended to be within the scope of this disclosure and to be protected by the accompanying claims.

Also, the user may instruct the GPS receiver unit 103-100 to power up the components upon receiving a manually initiated wake-up command that corresponds to a positional query. For example, when the user of the GPS receiver unit 103-100 wants to be informed of the present location of the GPS receiver unit 103-100, the use initiates a manual wake-up command. A suitable means are provided for the user to query the GPS receiver unit 103-100. The means to manually initiate a wake-up command may be implemented using well-known components and techniques employed in the art of activating devices. Detailed operation of a means to manually initiate a wake-up command is not described in detail other than to the extent necessary to understand the operation and functioning of invention. One skilled in the art will realize that the means to manually initiate a wake-up command may be implemented using a variety of well known devices without departing substantially from the functionality and operation of the invention. Any such embodiments of the means to manually initiate a wake-up command that are employed as a part of the invention are intended to be within the scope of this disclosure and to be protected by the accompanying claims.

When the wake-up command initiates start up, the clocking signals (e.g., T20 epochs) provided by the local GPS clocks generator 104-216 will not be within the accuracy required to enable the GPS receiver unit 103-100 to perform a position update without first reacquiring satellite signals and collecting a six-second sub-frame of date to re-establish a common local GPS time frame for GPS satellite range measurements. However, if the PN code estimated by the navigation processor 104-210 after the end of the power down period, based upon time kept by the low power time keeping circuit 104-200, and incoming PN codes can be maintained to be less than or equal to ±0.5 Ms of the actual PN code time of the incoming GPS satellite signals, GPS satellite signals are quickly re-acquired and measurements relative to a common local GPS time frame can be taken and used in navigation without performing the conventional process of acquiring GPS satellite signals and establishing a common time frame.

Prior to the power down, the time and rate relationships between the K32, M11 and GPS clock signals were known. By maintaining the K32 clock signal accuracy, the K32 clock signal is used by the edge aligned ratio counter 104-218 to latch the K32 clock signal and M11 signal, thereby recalibrating the M11 signal and the T20 epochs derived from it. Thus, the GPS oscillator 104-204 is recalibrated. The navigation processor 104-210 then sets up the matched filter or signal processor channels to acquire the PN code phases of satellites calculated to be visible. The matched filter or signal processor channel set up takes advantage of the GPS oscillator versus temperature data previously stored to compensate for frequency error in the GPS oscillator. When code phase measurements are obtained, these values are converted from a knowledge of which chip in a PN code period is currently being received to which chip in the overall GPS signal structure is being received. This conversion is made by using the assumed current GPS time and receiver position to calculate which PN chip of the overall signal structure should be arriving at the receiver and assuming the chip actually arriving is the instance of this chip in a PN code period that is closest to the one that should be arriving. If the hypothesis that the combined local GPS time estimate and the time-equivalent receiver position error is correct, the translation into the overall GPS signal structure will be correct and a consistent set of GPS range measurements will be determined. In other words, if the error of the PN code estimated by the navigation processor 104-210 after the end of the power down period (after leaving the sleep mode) and incoming PN codes is less than or equal to ±0.5 ms of the actual PN code time of the incoming GPS satellite signals, position information is correctly updated. The computed position and time must be compared to the a priori estimates to verify that the error was in fact less than ±0.5 ms. If the verification fails, a six-second sub-frame must be collected to establish the common time frame for measurement.

The position and time error information acquired by the GPS receiver unit 103-100 is then used to update the M11 and K32 clock errors. Both the GPS oscillator 104-204 and the K32 oscillator 105-302 are updated for frequency error. The K32 low power clock 105-306 is updated for correct GPS time. The GPS receiver unit 103-100 is then placed back into a sleep mode to conserve power. The above-described process is then repeated when the next wake-up command is received. This periodic updating, therefore, conserves power while maintaining the accuracy of the clock signals such that the GPS unit does not have to reacquire satellite positions using conventional processes.

Whenever the wake-up command is received, the K32 clock signal is used to update the M11 clocking signal. However, the K32 clock signal derived from the K32 oscillator 105-302 is subject to some error in that the K32 oscillator 105-302 frequency is temperature dependent. That is the K32 oscillator 105-302 frequency is different for different operating temperatures. In one embodiment, the temperature sensor 105-308 senses the operating temperature of the K32 oscillator 105-302. The navigation processor 104-210 compares the detected operating temperature of the K32 oscillator 105-302 with information residing in the LP clock temperature/frequency error table 105-322. Based upon the time between the periodic wake-up commands and the sensed operating temperature of the K32 oscillator 105-302, an error correction factor is determined such that the K32 time and rate are corrected to account for the operating temperature of the K32 oscillator 105-302. That is, the time of the K32 clock signal is corrected by the error factor to account for the actual operating temperature of the K32 oscillator 105-302. As described above, in one embodiment, the data in the LP clock temperature/frequency error table 105-322 is based upon historical data collected during actual operation, and is therefore highly accurate.

Once the K32 clock signal is recalibrated, time associated with the M11 signal is recalibrated. In one embodiment, the temperature sensor 104-206 senses the temperature of the GPS oscillator 104-206. The navigation processor 104-210 compares the detected operating temperature of the GPS oscillator 104-206 with information residing in the GPS clock temperature/frequency error table 104-224. Software then uses this rate correction as time progresses to scale the interval between T20 epochs based on the M11 clock to maintain the correct GPS time estimates at each epoch. Further, the initial value of GPS time at the T20 epochs just after wake-up is determined by transferring the GPS time from the K32 low power clock 105-306 to the M11-based T20 epochs using the edge aligned ratio counter 104-216 as previously described. Since the M11 oscillator was off during the sleep period, its elapsed time cannot be scaled the same as the K32 low power clock 105-304 elapsed time. As described above, in one embodiment, the data in the temperature/frequency error table 104-224 is based upon historical data collected during actual operation, and is therefore highly accurate. Then, when the K32 clock signal (now temperature corrected) is used to update the M11 clock signal (also temperature corrected), the PN code estimated by the navigation processor 104-210 after the power down period is less than or equal to ±0.5 ms of the actual PN code time of the incoming GPS satellite signals.

In an alternative embodiment, a wake-up event may be programmed to occur more frequently than that required for navigation updates. Such wake-up events would only serve the purpose of sampling the current temperature of the K32 oscillator. Based on the average of the temperatures of the current and prior wake-up events, the elapsed time between the two wake-up events is scaled to correct for the change in temperature. The resulting correction can be either applied to the low power clock 105-306 or else simply stored in a non-volatile memory until future calculations require use of the correction. Furthermore, this alternative may be upgraded to provide for a dynamic wake-up period. That is, the time between wake-up commands may be changed depending upon the particular operating conditions encountered. If the total temperature change in the K32 oscillator 105-302 during the power down period exceeds the predefined threshold, the time period between wake-up commands is decreased by a suitable amount of time. On the other hand, if the total temperature change is less than the predefined temperature threshold, the interval of time between wake-up commands is increased by some suitable amount of time. Thus, the power consumed to maintain an accurate temperature is minimized relative to the requirements of the current environment of temperature dynamics.

As an enhancement of the foregoing alternative, navigation processor 104-210 may consider the total change in operating temperature of the K32 oscillator since the last periodic wake-up command and the current periodic wake-up command. If the temperature change exceeds a predefined threshold, the navigation processor 104-210 may immediately initiate a navigation update process to reacquire GPS satellite signals to ensure that the integrity of the low power clock 105-306 is maintained within acceptable limits.

Figure 106:
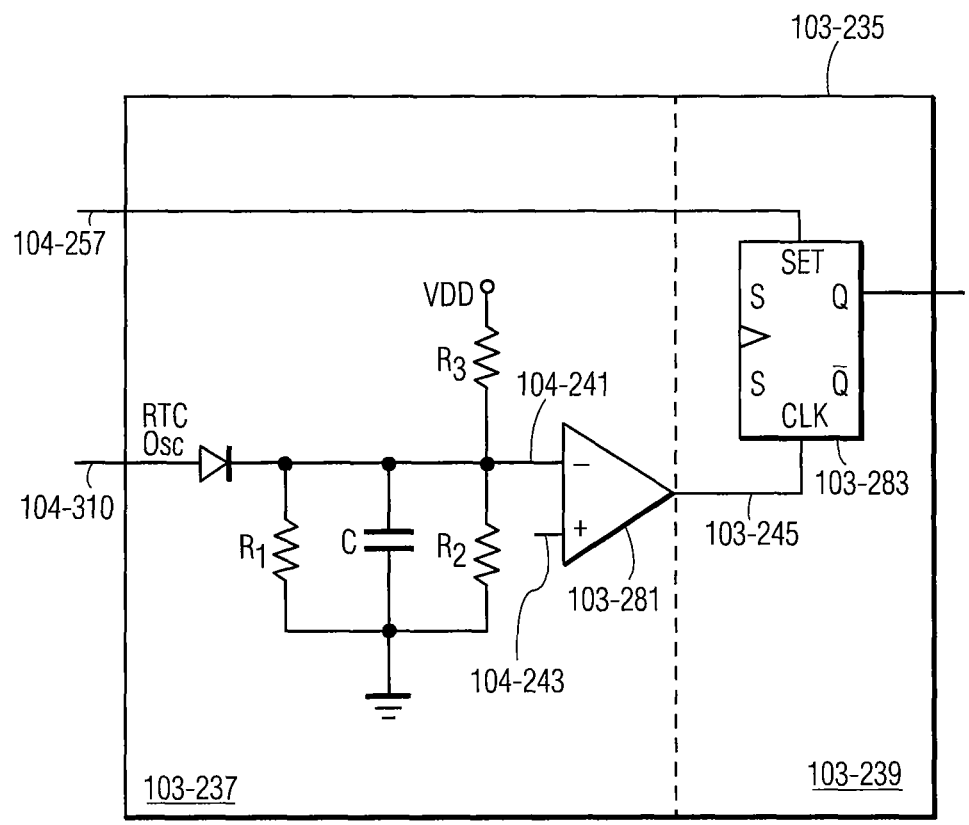
FIG. 106 is a block diagram of an embodiment of a brown-out detection circuit.

FIG. 106 is a block diagram of one embodiment of the brownout detection circuit 104-235 according to one embodiment The brownout detection circuit 104-235 includes a detection circuit 104-237 and a status circuit 104-239. The RTC clock signal is input to the detection circuit 104-237 on the line 310. The RTC clock signal is half-wave rectified by the diode shown. The half-wave rectified RTC clock signal is input to a resistor-capacitor (RC) circuit that includes components $R_1$, $R_2$, and the capacitor shown. An output of the RC circuit on line 104-241, referred to herein as the decay voltage, is one input to a voltage comparator 104-281.

As long as the RTC oscillator is operating, the detector 104-237 maintains some average DC voltage at the comparator input. The other input to the voltage comparator 104-281 is a reference voltage 104-243, which is the output of a voltage divider formed by $V_{DD}$ and resistor $R_3$. The voltage reference is sized for the lower range of battery voltage near end of life. This also ensures that the filtered, rectified clock voltage will climb above this threshold unless the clock is off for a substantial number of cycles. To accomplish this, the RC time constant is made relatively long. This makes the detection circuit 104-237 insensitive to exact battery voltage. The long time constant also reduces the power consumption of the circuit 104-237, because relatively little energy is required from the oscillator to the detector circuit 104-237.

The status circuit 104-239 includes the flip-flop 104-283. The flip-flop 104-283 indicates a low or high logic value on its output 104-259. As just explained, the output of the detection circuit clears the flip-flop 104-283 when the RTC is not good. The flip-flop 104-283 is set to indicate the RTC is GOOD by a signal on the set input 104-257.

When power is first applied, the detector circuit 104-237 and flip-flop 104-238 will respond in less time than it takes for the oscillator to power up, and thus the detected voltage at the input of the comparator 104-281 will exceed the threshold. Hence, the status circuit will be reset to NOT GOOD, when the battery has been removed and is replaced.

If the RTC oscillator clock stops long enough, the comparator input voltage will fall below threshold and clear the flip-flop to indicate the RTC clock is NOT GOOD.

The status flip-flop 104-238 is set indicate the RTC clock is GOOD by the navigation processor or other processor that has the responsibility to initially acquire GB satellites and produce a time and position solution without being able to use the RTC time. Once the processor has produced the time and position solution, the processor sets the RTC, verifies that the RTC is correctly propagating time, and finally sets the flip-flop 104-238 to indicate the RTC clock is GOOD. As long as the RTC oscillator continues to operate and produce the RTC clock, the voltage will remain above, threshold and the RTC status will remain GOOD.

If the RTC oscillator fails for some period, the voltage at the comparator input will gradually decay. After a sufficient number of missed clocks, the flip-flop 104-238 is set to indicate the RTC clock is NOT GOOD. The flip-flop 104-238 remains in this state until the processor again reestablishes time. One of the chief objectives of the detection circuit 104-235 is to protect against oscillator stoppage due to battery end of life and/or temperature variations. If the issue is end of life, the backup battery is likely to remain below the threshold required for oscillation. If the issue is temperature, the time constants associated with temperature are relatively slow. Furthermore, once the oscillator has stopped due to the battery experiencing low temperature, the oscillator will likely require a higher voltage to restart than the voltage (and current) being supplied when it stopped. Hence, a time constant that requires even thousands of cycles is acceptable.

The detection circuit 104-235 can be written to and read from in various manners in different embodiments. For example, in some embodiments, the detection circuit 104-235 resides on the RF chip 103-103, and in other embodiments resides on the baseband chip 103-105. The output 104-259 of the status circuit 104-239 may be read using a command according to a bus or interface protocol, or may be directly monitored. Similarly, the set input 104-257 of the status circuit 104-239 may be toggled by any software or hardware mechanism according to the specific architecture of an embodiment.

For example, a microprocessor bus interface may read and write the flip-flop 104-283. In this situation, reading the flip-flop 104-283 may require the peripheral bus strobe to be active, the write line to be inactive, the peripheral select decode to activate an appropriate select signal, and a local RTC block decode to assert a "RTC_GOOD" signal. Reading and writing the flip-flop 104-283 according to a bus protocol is contemplated, for example, when the brownout detection circuit resides on the baseband chip.

In another embodiment, the RTC oscillator and the brownout detector circuit 104-235 reside on the RF chip. This allows a quieter environment for the oscillator, enhancing the ability to accurately calibrate the RTC oscillator and to locate this oscillator closer to the temperature sensor for calibration purposes. In this case, the interface to the flip-flop 104-283 would be different. For example, a message decode from a serial IO port would select the flip-flop 104-283 for reading and latch this bit into a message, subsequently clocked out over the port to a processor on the baseband chip.

Many circuit variations are within the scope of the disclosed brownout detection circuit. The particular circuit components shown are but one embodiment to perform the desired function. Many other circuits are possible and practical for particular environments. For example, the capacitor in the detector circuit must be very small for mixed signal integration. Thus, the simple RC time constant may be replaced by some additional electronics to amplify the effective capacitance. Similarly, the asynchronous set interface to the flip-flop 104-283 may actually be a synchronous set interface from a processor bus. These are known circuit techniques that enhance the concept by reducing circuit size or power consumption.

Figure 107:
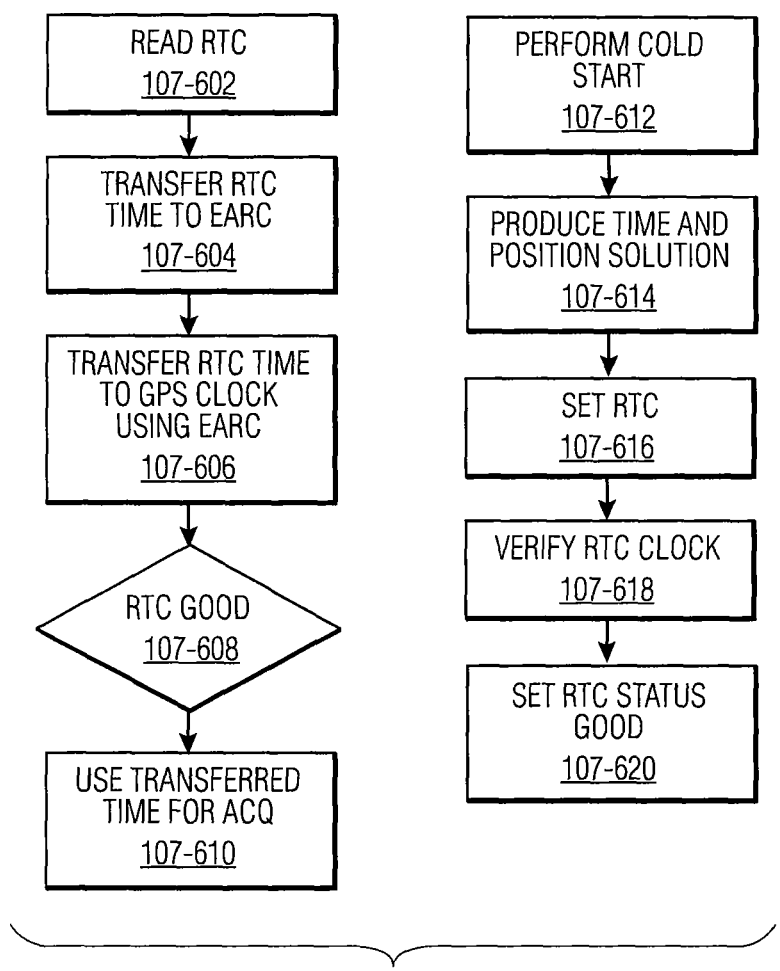
FIG. 107 is a flow diagram illustrating a brownout detection process of one embodiment.

FIG. 107 is a flow chart showing the operation of the brownout detection circuit 104-235 according to an embodiment. At start-up of the GPS receiver 103-100, as shown at 107-602, the navigation processor 210 reads the RTC at 602. This RTC time is transferred to the EARC at 107-604. At 608, the status of the RTC is checked by reading the output 104-259 of the detector 104-235. If the RTC is GOOD, the navigation processor proceeds to use the transferred RTC time to begin acquisition at 107-610. If the RTC is NOT GOOD, one course of action is for the navigation processor 104-210 to proceed with a cold start at 107-612. At 107-614, the navigation processor 104-210 produces a time and position solution. With the time solution, the navigation processor 104-210 set the RTC at 107-616. The navigation processor 104-210 verifies that the RTC clock is running at 107-618. If the RTC clock is verified, the navigation processor 104-210 sets the RTC status GOOD at 107-620 by sending a signal to the status circuit 104-239. If the RTC clock is not verified, the navigation processor 104-210 again attempts to verify that the RTC clock is running at 107-618.

Figure 108A:
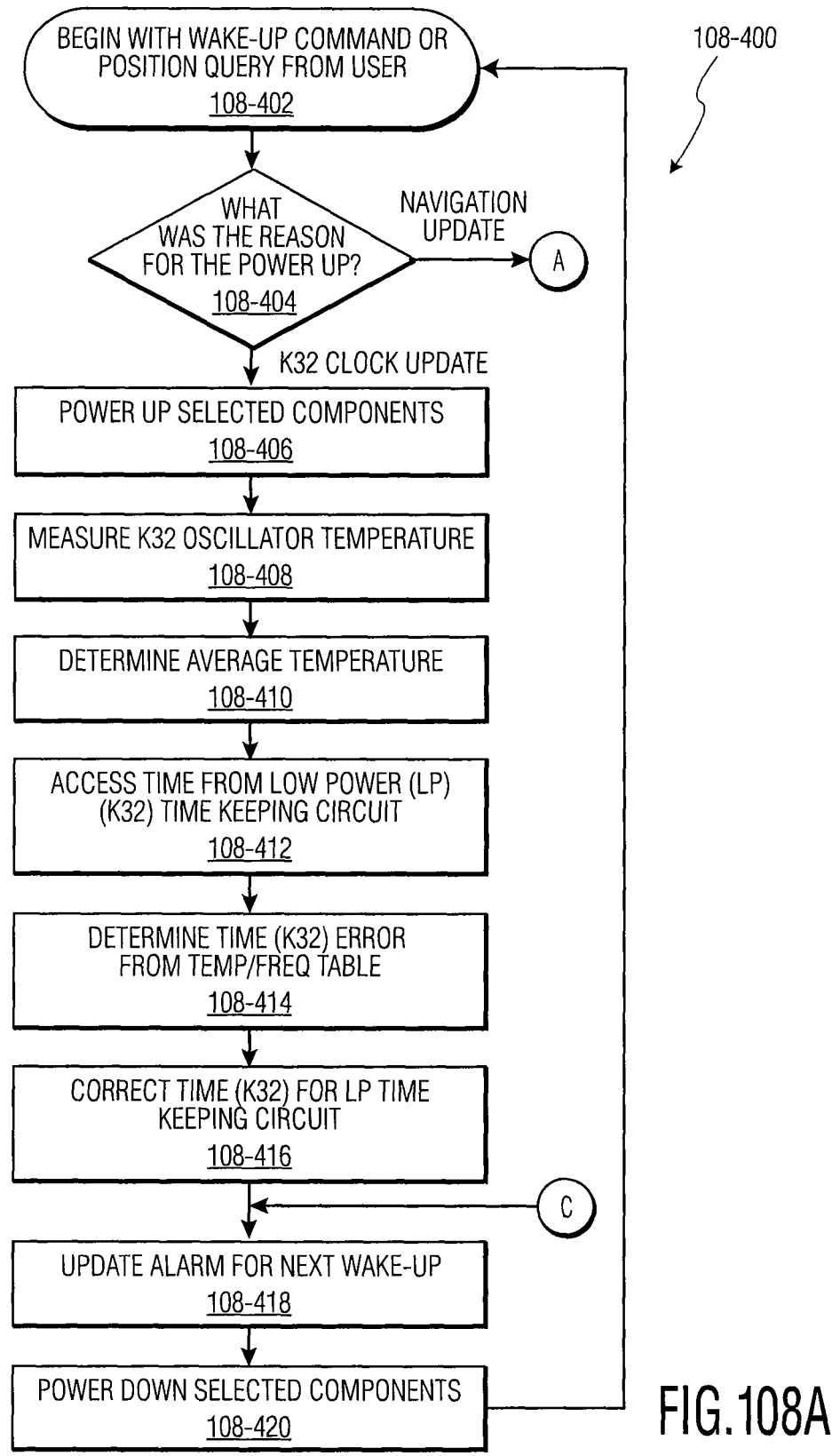
FIGS. 108A, 108B, and 108C are a flow chart illustrating one embodiment of a process that includes using an RTC clock signal to update a GPS clock signal, and determining whether or not an estimated GPS time is sufficiently accurate to acquire position of a GPS receiver.
Figure 108B:
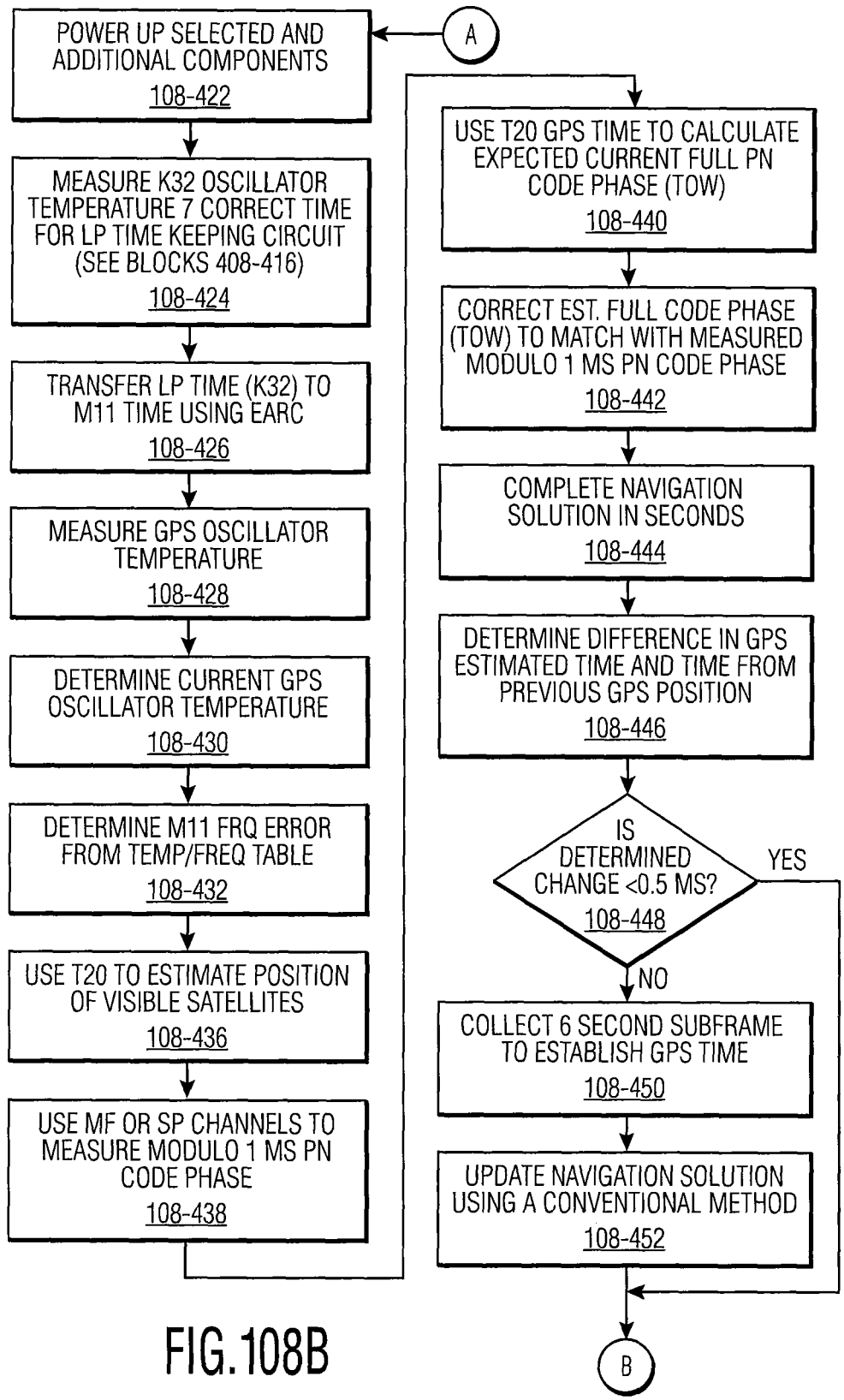
Figure 108C:
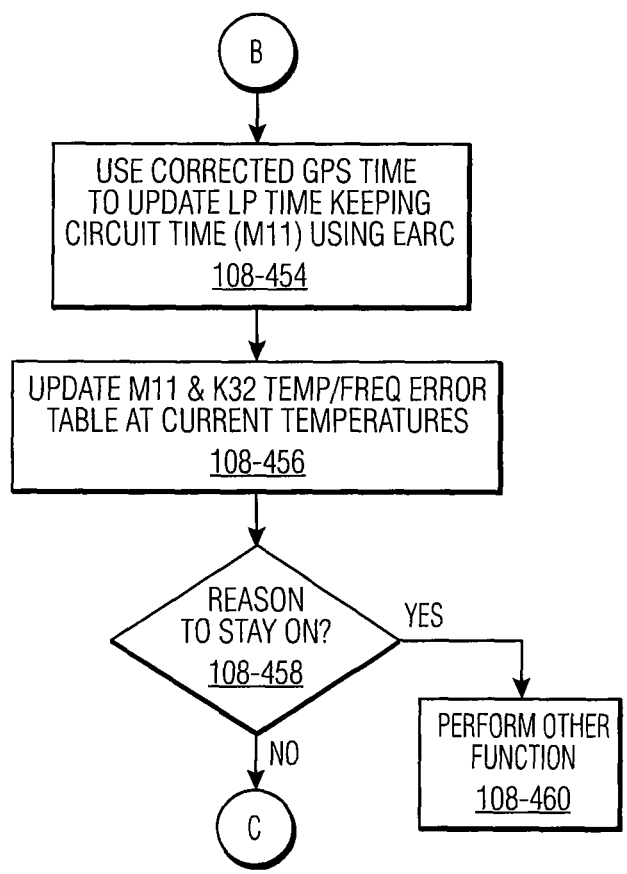

The brownout detection process illustrated in FIG. 107 is one embodiment of a process that is performed along with other processes described herein. For example, FIGS. 108A, 107B and 107C illustrate an embodiment of a process that is contemplated to be performed with the process of FIG. 107. Referring now to FIGS. 108A, 107B and 107C, flow chart 108-400 illustrates an embodiment of a process that includes using the K32 clock signal to update the M11 clock signal. The process of flow chart 108-400 further includes determining whether or not the estimated GPS time is sufficiently accurate to acquire position of the GPS receiver unit 103-100. If the time error between the PN code estimated by the navigation processor 104-210 during the power down period and incoming PN codes is less than or equal to ±0.5 ms of the actual PN code time of the incoming GPS satellite signals, the K32 clock signal and the M11 clock signal are updated. The process of flow chart 108-400 further includes updating the M11 clock signal associated with the GPS oscillator 104-204 and the K32 clock signal associated with the K32 oscillator 105-302 with detected GPS satellite information. After the update, the GPS receiver unit 103-100 then returns to a sleep, or powered down, mode.

The flow chart 108-400 further illustrates an embodiment of the wake-up alarm logic 104-222. In some alternative implementations, the functions described may occur out of the order noted in the flow chart 108-400, the functions described may occur concurrently, some of the functions described may be eliminated, or additional functions may be included.

The process begins at block 108-402 when a wake-up command is generated by the alarm unit 105-324. Alternatively, the process may also begin when a user queries the GPS receiver unit 103-100 to provide position information (a "navigation update").

At block 108-404, a determination is made whether the reason for the power-up was a wake-up command or a position query from the user. If the reason for the power-up was the generation of the wake-up command by the alarm unit 105-324 such that the GPS receiver unit 103-100 is to update the K32 based time maintained by the low power timekeeping circuit 104-200, then the process proceeds to block 108-406. However, if the reason for the power-up is to provide location information in response to a position query from the user, the GPS receiver unit 103-100 initiates a navigation update by proceeding to block 108-422.

At block 108-406, selected components that are employed in the recalibration of the K32 clocking signals as described below, are powered up. Other components of the GPS receiver unit 103-100 are not powered up at block 108-406 to conserve power. For example, the GPS receiver unit 103-100 may include a display (not shown) that indicates to the user at least determined position information. If the GPS receiver unit 103-100 is performing a periodic navigation update, the user may not be interested in either knowing that the device is performing a navigation update or in knowing the position information. Thus, the display (not shown) is not powered up at block 108-406, thereby conserving power.

At block 108-408, temperature sensor 105-308 measures the temperature of the K32 oscillator 105-302. At block 108-410, an average temperature is determined for the K32 oscillator 105-302 during the time that the GPS receiver unit 103-100 was in the sleep mode. At block 108-412, the K32 based time maintained by the low power time keeping circuit 104-200 is accessed. Based upon a time error at block 108-414, based upon information in the temperature/frequency error table 104-224, a correction factor as described above is applied to the K32 based time determined. This correction factor is then used to correct the K32 based time maintained by the low power time keeping circuit 104-200 at block 108-416.

In one embodiment, the time for the next wake-up command is determined at block 108-418. Accordingly, the wake-up time is updated in the alarm register 105-326. Alternatively, other embodiments employ a predefined time interval between the periodic wake-up commands and/or provide periodic wake-up commands from other components.

At block 108-420, the selected powered-up components (at block 108-406) are powered down. Since the K32 based time maintained by the low power time keeping circuit 104-200 has been updated, these selected components are powered down to conserve power resources. The process proceeds back to block 108-402 to await the next wake-up command or a position query from the user.

If a position query is received block 108-404, the GPS receiver unit 103-100 understands that it is to accurately determine the location of the GPS receiver unit 103-100 and to indicate the location to the user, and the process proceeds to block 108-422. That is, the user desires a navigation update.

Accordingly, components of the GPS receiver unit 103-100 described below are powered-up at block 108-422. Components associated with the updating of the M11 based time are powered-up at block 108-422. For example, the radio 104-202, the GPS oscillator 104-204, the temperature sensor 104-206, the navigation processor 104-210, the match filter 104-212, the A/D converter 104-214, the local GPS clocks generator 104-216, the edge aligned ratio counter 104-218 and/or the memory 104-220 are re-powered.

Furthermore, the GPS receiver unit 103-100 may include additional components, not associated with the updating of the M11 based time, that are powered-up at block 108-422. For example, a display (not shown) and associated circuitry may be used to indicate to the user the determined position information. Thus, the display must be powered-up. In contrast, the display did not need to be powered-up at block 108-406 because the location information was not displayed during the update of the K32 based time as described above (blocks 406-416). In one embodiment, these additional components are powered up concurrently with the above described components at block 108-406.

In another embodiment, the powering up of these additional components is delayed until the navigational update is completed. Accordingly, block 108-422 would be shown as two separate blocks, with the powering up of the additional components shown with a new block inserted at a later point in the flow chart 108-400. After the GPS receiver unit 103-100 has determined an updated position, these additional selected components are powered up such that the updated position is indicated to the user. For example, the GPS receiver unit 103-100 may include a display (not shown) and associated circuitry that indicates to the user at least determined position information. Such an alternative embodiment delaying repowering of these additional selected components only when a position update is requested is particularly advantageous for conserving power. That is, if the selected additional components are not required for the recalibration of the clocks and the associated navigation update, maintaining the selected components in a sleep mode when a wake-up command is received further conserves power.

At block 108-424, temperature sensor 105-308 measures the temperature of the K32 oscillator 105-302 and corrects the K32 based time maintained by the low power time keeping circuit 104-200 by correcting the time using a correction factor determined from the temperature/frequency error table 104-224 using the process described above in blocks 108-408 through 108-416. That is, the K32 based time is corrected for any temperature/frequency deviations occurring during the sleeping period.

At block 108-426, the updated K32 based time is transferred to the M11 based time by the edge line ratio counter 104-216. Thus, the GPS receiver unit 103-100 has powered up its components and used the corrected K32 based time from the low power time keeping circuit 104-200 to accurately update GPS time from the M11 clocking signal provided by the GPS oscillator 104-204. However, in one embodiment, error in the M11 clocking signal may have occurred due to temperature changes of the GPS oscillator 104-204. Accordingly, at block 108-428, temperature sensor 104-206 measures the temperature of the GPS oscillator 104-204. At block 108-430, the current GPS oscillator 104-204 temperature is determined. At block 108-432, the M11 frequency error is determined from the temperature/frequency table.

At block 108-436, the updated T20 epoch is used to estimate the position and the Dopplers of the visible GPS satellites 103-102, 103-104, 103-106 and/or 103-108. Based upon the estimated position of the visible satellites 103-102, 103-104, 103-106 and/or 103-108, the GPS receiver unit 103-100 employs the matched filter 104-212 or the GPS signal processors 104-208 to measure the PN code phase (modulo 1 ms) for the visible satellites 103-102, 103-104, 103-106 and/or 103-108 at block 108-438. Then, at block 108-440, the estimated T20 epoch is used to calculate the expected current full PN code phase, as a time of week (TOW), for each of the satellites 103-102, 103-104, 103-106 and/or 103-108. That is, the GPS receiver unit 103-100 has used the updated M11 clocking signal from the GPS oscillator 104-204 to accurately estimate a modulo 1 ms PN code phase to calculate an expected complete PN code phase as a time of week.

At block 108-443 the full code phase is corrected to match the measured PN code phase (modulo 1 ms). At block 108-444 the navigation solution is computed based upon the estimated corrected full PN code phase. Next, at block 108-446, the computed navigation solution is compared with the previous navigation solution in units of time.

At block 108-448, a determination is made whether the calculated position of the GPS receiver unit 103-100 has changed by less than ±0.5 ms (less than 1 PN code) from the previous navigation solution time. If the determined change is greater than ±0.5 ms (the NO condition) the process proceeds to block 108-450 such that the GPS receiver unit 103-100 collects an entire 6 second sub-frame from each of the GPS satellites 103-102, 103-104, 103-106 and/or 103-108 to establish GPS time. At block 108-452, the GPS receiver unit 103-100 employs a conventional method to update the navigation solution, thereby accurately determining the position of the GPS receiver unit 103-100.

However, if at block 108-448 the change in position is determined to be less than or equal to ±0.5 ins (the YES condition) the GPS receiver unit 103-100 has accurately maintained GPS time with the low power timekeeping circuit 104-200. Accordingly, the process proceeds to block 108-454 such that the corrected T20 time is used to update the low power time keeping circuit 104-200 M11 time using the edge aligned ratio counter 104-218 in a manner described above. Thus, the K32 clocking signal is correlated with the accurately determined GPS T20 time in preparation for the next power down period.

In one embodiment, the data residing in the temperature/frequency error table 104-224 is updated with the temperature and frequency information collected above. That is, this embodiment employs acquired temperature and frequency data to continuously update the temperature/frequency error table 104-224 data, thereby improving the accuracy of subsequent correction factors determined from the temperature/frequency error table 104-224.

At block 108-458, a determination is made whether or not the GPS receiver unit 103-100 is to stay on. If the GPS receiver unit 103-100 is to stay on (the YES condition), the process proceeds to block 108-460 such that the GPS receiver unit 103-100 performs other functions. Such other functions are not described in detail herein as such functions may not necessarily be related to accurately maintaining time during power down periods. After these other functions have been performed, the process proceeds back to block 108-418 such that the next time of the wake-up command is determined as described above.

If at block 108-458 a determination is made that there is no reason for the GPS receiver unit 103-100 to stay on (the NO condition), the process proceeds directly to block 108-418. That is, the process proceeds to block 108-418 such that the GPS receiver unit 103-100 is powered down to conserve energy while the low power time keeping circuit 104-200 accurately maintains GPS time.

The above described embodiments of a GPS receiver unit 103-100 are generally described as updating the K32 clock signal derived from the K32 oscillator 105-302 and the M11 clocking signal derived from the GPS oscillator 104-204 such that accurate GPS time is maintained during periods when the GPS oscillator 104-204 is powered down. Other embodiments update a variety of other clocking signals associated with the determination of location from GPS satellites. Furthermore, the GPS oscillator 104-204 was described as providing a signal having an oscillation frequency substantially equal to 11 MHz. Similarly, the K32 oscillator 105-302 was described as generating a signal having a frequency of oscillation substantially equal to 32 kHz. Other embodiments of GPS receiver units may be implemented with a GPS oscillator and/or an oscillator residing in the low power time keeping circuit that have frequencies of oscillation different from the oscillation frequencies of the GPS oscillator 104-204 and the K32 oscillator 105-302. Furthermore, the low power time keeping circuit was described as providing a clocking signal substantially at 32 kHz that was used for maintaining the GPS time accuracy during the periods of time that the components were powered off. The clocking signals provided from the low power time keeping circuit 104-200, in other embodiments, are used to provide clocking signals to other components residing in a GPS receiver unit. However, such components are not described in detail other than to the extent necessary to understand the operation and functionality of the invention.

In an alternative embodiment, temperature sensors 104-206 and 105-308 are replaced by, or incorporated into, a single temperature sensor suitably located so that the operating temperatures of the GPS oscillator 104-204 and the K32 oscillator 105-302 are detected. Such a temperature sensor may be further configured to provide a signal directly to the navigation processor 104-210. This embodiment reduces the number of components, and may provide a corresponding decrease in costs, size and power consumption.

For convenience of illustration in FIGS. 103 and 104, and for convenience of explaining the operation and functionality of the invention, processing the sensed temperatures and calculating the total frequency error in the signal from the K32 oscillator 105-302, and the GPS oscillator 104-204, was described and shown as being implemented by the execution of logic by the navigation processor 104-210, such logic residing as a portion of the wake-up alarm logic 104-222. Alternatively, the processing could be implemented by a different processor. Furthermore, the logic for processing sensed temperatures and logic for calculating the total frequency error in the signal from the K32 oscillator 105-302 could reside in dedicated logic modules (not shown) residing in memory 104-220, or in another suitable memory. Additionally, the LP clock temperature/frequency error table 105-322 and/or the GPS clock temperature/frequency error table 104-224 was shown as residing in memory 104-220 for convenience. Sensed temperatures tables could reside in alternative locations and/or in suitable alternative storage mediums. Any such alternative implementations are intended to be within the scope of this disclosure and to be protected by the accompanying claims.

Further to the description above, the GPS system of an embodiment includes an Edge-Aligned Ratio Counter (EARC), as described below. Definitions follow for some terms used herein. These definitions are provided as representative examples and are not considered to limit the embodiments realized hereunder. A "Sampling Edge" is an edge of the "reference clock", which may be rising or falling, specified as the "sampling point". A "Sampling Point" is an edge of the "reference clock" used to sample the value of the "sampled clock". A "Sampled Value" is the logic value, zero or one, of the "sampled clock" taken at the "sampling point". A "Target Edge" is the edge of the "sampled clock", which may be rising or falling, that the "sampling point" attempts to align with. "Advance" is a "sampling point" that occurs later in the cycle of the "sampled clock" than the prior "sampling point".

Continuing with definitions, "Slew" is the change in offset between "reference clock sampling edge" and "sampled clock target edge". Slip is an alternate term for "slew". "Coarse Slew" is the "slew" that is the smaller of the two "slew" values caused by $R_0$ and $R_1$. "Fine Slew" is the "slew" that is the larger of the two "slew" values caused by $R_0$ and $R_1$. "Retard" is a slew after which the "sampling point" occurs earlier in a cycle of the "sampled clock" than the prior "sampling point".

Further, a "Load Pulse" transfers the "reference clock" counter and "sampled clock" counter values to their respective registers when the "target edge" is detected during a "fine slew". "Magic Gate" is an alternate name for "load pulse".

Figure 109:
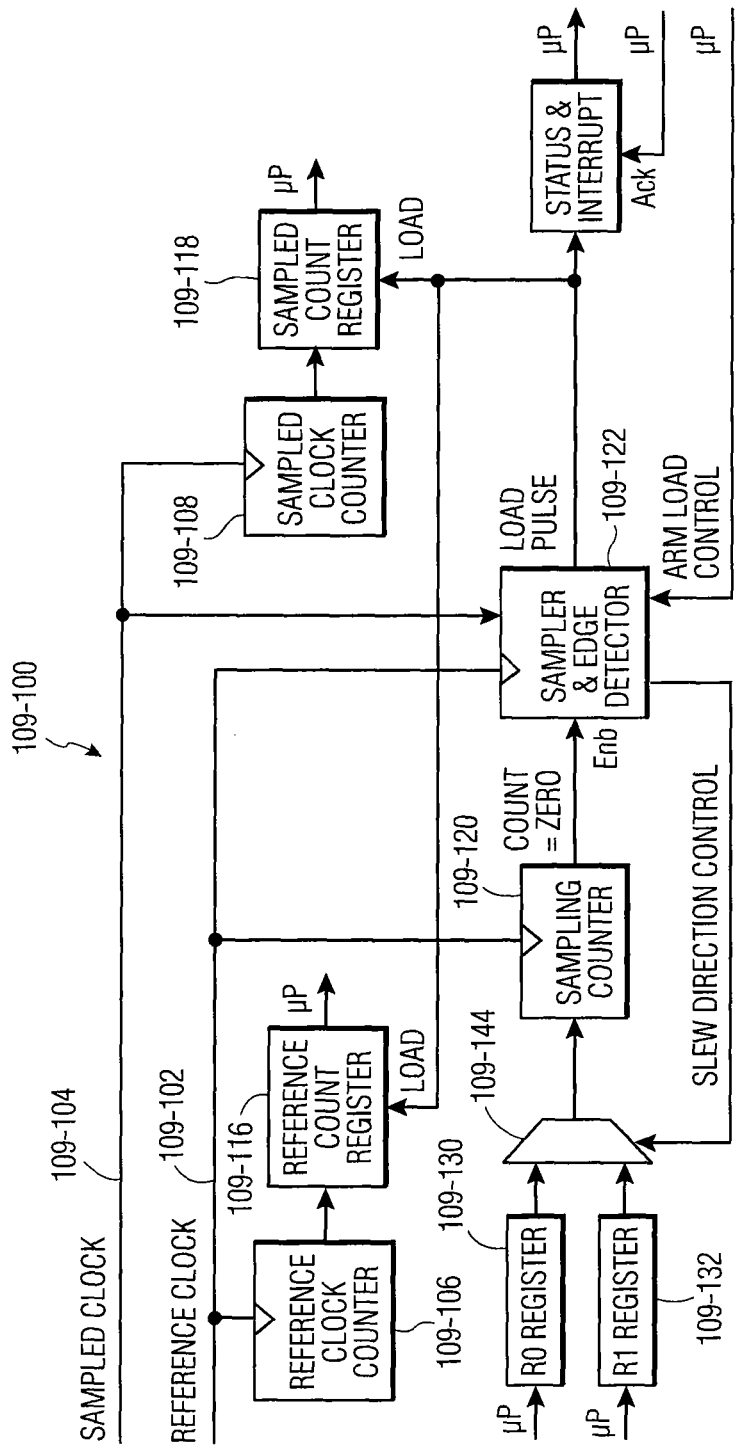
FIG. 109 is a block diagram of an Edge-Aligned Ratio Counter (FARC), under an embodiment.

FIG. 109 is a block diagram of an Edge-Aligned Ratio Counter (EARC) 109-100, under an embodiment. Generally, the purpose of a ratio counter is to measure the frequency of a first clock relative to a second clock. This can be done by counting the cycles $C_1$ of the first clock for a specific number of cycles $C_2$ of the second clock. Then the ratio of clock frequency $F_1$ to clock frequency $F_2$ is $R=R_1/F_2 \cong C_2/C_1$. The approximation in this formula stems from the fact that if the two clocks are not synchronous, there will always be an ambiguity of up to two cycles of the counted clock $C_1$ during the specified number of $C_2$ cycles. Because it is not known exactly how much of the last partial cycle of $C_1$ has elapsed, the inequality $C_2/(C_1+2) \leq R \leq C_2/C_1$ expresses the measurement uncertainty. In order to improve the accuracy of the measurement, the measurement interval can be increased. This provides an improvement at the expense of measurement time and power consumption in the circuit.

The EARC of an embodiment improves measurement accuracy with significantly reduced measurement time by arranging to make the measurements between points in time at which the edges of the two clocks are aligned. By doing so, the ratio of clock cycles is a ratio of integer values and the cycles of ambiguity are removed. As described below, the edges cannot be perfectly aligned by this method, but they can be typically aligned to sub-nanosecond accuracy, but the embodiment is not so limited. The exact alignment accuracy that can be achieved is a function of the approximate ratio of the clock frequencies and the characteristics of the clocks, such as jitter and ranges of variation in the frequencies.

Referring to the EARC 109-100 of FIG. 109, the two clock signals that are measured are the reference clock 109-102 and the sampled clock 109-104. The reference clock 109-102 drives a first free running continuous counter referred to as the Reference Clock Counter 109-106. The sampled clock 109-104 drives a second free running continuous counter referred to as the Sampled Clock Counter 109-108. The Reference Clock Counter 109-106 couples to an associated Reference Count Register 109-116, and the Sampled Clock Counter 109-108 couples to an associated Sampled Count Register 109-118. In order to make measurements, the Reference Count Register 109-116 and the Sampled Count Register 109-118 are loaded with the counter values at instants in time when the clock edges of the two clocks 109-102 and 109-104 are closely aligned.

Following loading of the Reference Count Register 109-116 and the Sampled Count Register 109-118, a microprocessor (not shown) reads the values in the Reference Count Register 109-116 and the Sampled Count Register 109-118. To calculate the frequency ratio, two sets of counter values are read, where each set of counter values is taken at a point of edge alignment. The differences in the two counter values read are then used to calculate the frequency ratio using the formula $$R = (C_2^{Ref} - C_1^{Ref})/(C_2^{Smp} - C_1^{Smp}),$$

where
$C_1^{Ref}$ = Reference Clock Count value at alignment time 1
$C_2^{Ref}$ = Reference Clock Count value at alignment time 2
$C_1^{Smp}$ = Sample Clock Count value at alignment time 1
$C_2^{Smp}$ = Sample Clock Count value at alignment time 2.

Since the counter values $C_2^{Ref}$, $C_1^{Ref}$, $C_2^{Smp}$, $C_1^{Smp}$ are captured at points when the two clock edges are closely aligned, the cycle count differences are integral values and the result is high accuracy.

In order to capture the counter values $C_2^{Ref}$, $C_1^{Ref}$, $C_2^{Smp}$, $C_1^{Smp}$ when the edges are aligned, a down counter is used to measure certain intervals using the reference clock 109-102, but the embodiment is not so limited. This down counter is referred to herein as the Sampling Counter 109-120. The Sampling Counter 109-120 is coupled to receive the contents of an $R_0$ Register 109-130 and an $R_1$ Register 109-132 via at least one multiplexer 109-144. The Sampling Counter 109-120 is clocked with signals from the Reference Clock 109-102.

In operation, the Sampling Counter 109-120 is loaded using one of two count values, $R_0$ or $R_1$, from the $R_0$ Register 109-130 or the $R_1$ Register 109-132, respectively. Each time the counter value of the Sampling Counter 109-120 reaches zero, the Sampling Counter 109-120 provides an enable signal Enb to the Sampler and Edge Detector 109-122, thereby enabling the reference clock 109-102 edge to sample the value of the sampled clock 109-104. The samples are used to detect edges of the sampled clock 109-104, as described below.

Figure 110:
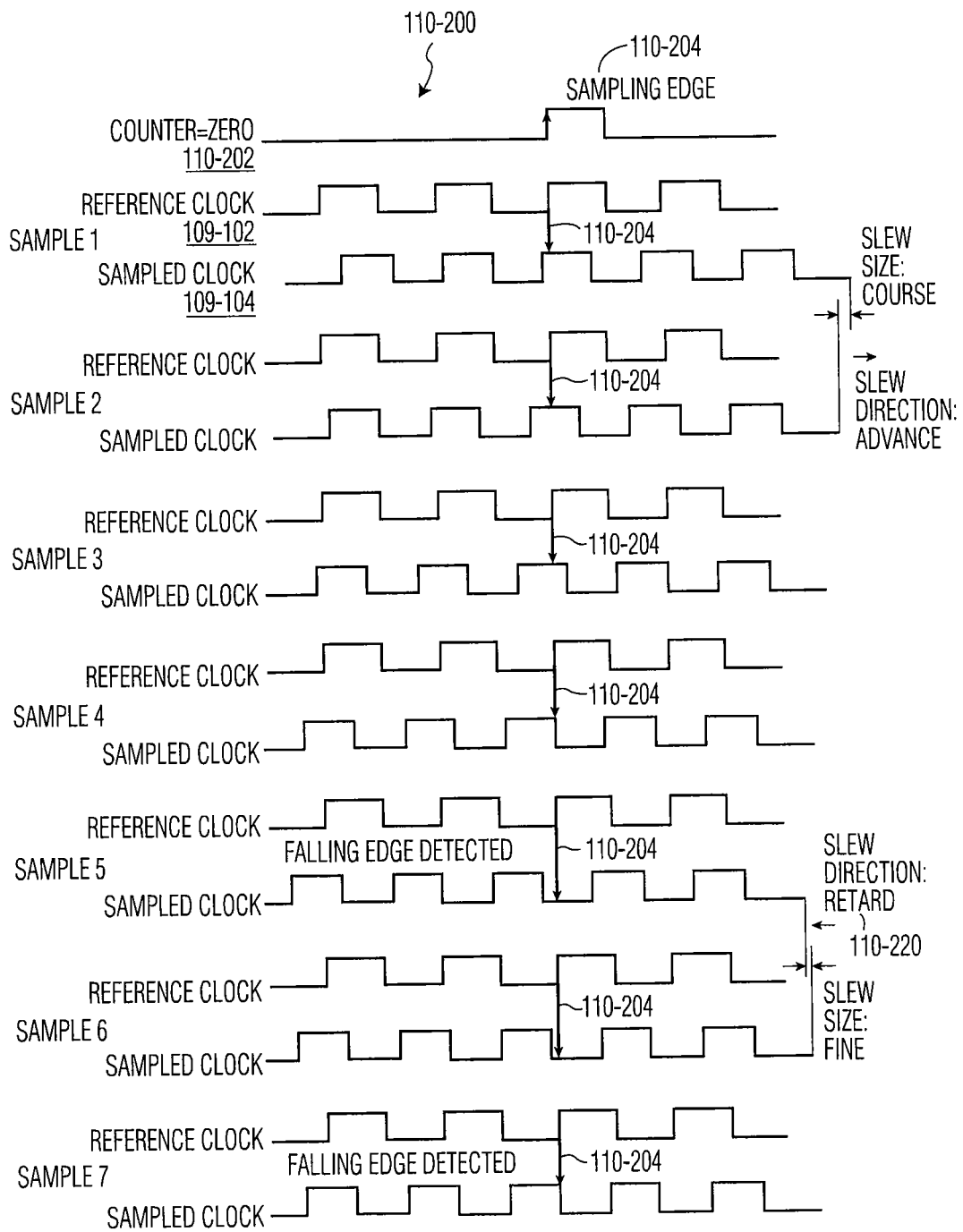
FIG. 110 shows sampling and edge detection, under an embodiment.

FIG. 110 shows sampling and edge detection 110-200 using the EARC, under the embodiment of FIG. 109. The top line 110-202 shows the sampling event that occurs when the down counter hits the zero value. At the sampling edge 110-204, the sampled clock 109-104 value is captured by the reference clock 109-102 edge. The first instance of this sampling process is shown at Sample 1 event. The sampling edge 110-204 of the reference clock 109-102 is shown pointing to the sampled clock 109-104 value that is captured. At the Sample 1 event, the captured value is a one.

When the down count reaches zero, the Sampling Counter 109-120 is reloaded with a value from either the $R_0$ Register 109-130 or the $R_1$ Register 109-132 under control of the Sampler and Edge Detector 109-122. Since this is the first sample, no edge has been detected. Assume for this example that the first down count uses a value from the $R_0$ Register 109-130 referred to herein as the $R_0$ value. Since no edge was detected, the $R_0$ value will be loaded again. After a number of cycles of the reference clock 109-102 equal to $R_0$ cycles, the Sampling Counter value is again zero and the sampled clock 109-104 is again sampled 110-204 as shown at Sample 2 event. Note that the sample value is still a one, but that the sampling point of the reference clock 109-102 is slightly "advanced" relative to the sampled clock 109-104. Since both Sample 1 and Sample 2 have the same value, one, no edge has been detected and the $R_0$ value is again loaded into the Sampling Counter 109-120. At the Sample 3 and Sample 4 events, values of one are again sampled 110-204 and the $R_0$ value is again loaded into the Sampling Counter 109-120.

Continuing at the Sample 5 event, the sampled value is now a zero. If a falling edge is the target edge to be detected, and knowing that the sample phase is advancing, a transition from a one to a zero sample value implies that a falling edge 110-210 has been detected. When a falling edge 110-210 is detected, the value loaded to the Sampling Counter 109-120 is switched. Since the $R_0$ value had been the value in use, the value is switched to a value from the $R_1$ Register 109-132 referred to as the $R_1$ value when the target edge is detected.

The R1 value is chosen for loading into the Sampling Counter 109-120, as described herein, to cause the sampling phase of the reference clock 109-102 to slew in the opposite direction 110-220 relative to the sampled clock 109-104, a direction referred to herein as the "retard" direction 110-220. Thus, at the Sample 6 event, the sampling phase is earlier (i.e., it has retarded). Since no edge has been detected (this edge is the same value, zero, as the previous edge) the $R_1$ value is again loaded into the Sampling Counter 109-120. Then, at the Sample 7 event, the sampled value transitions to one. The zero to one transition of the sampled value, coupled with the fact that the "retard" slew value ($R_1$ value) is being used, indicates a "falling" edge has been detected. Consequently, the $R_0$ value is loaded into the Sampling Counter 109-120 for use as the count down value.

The example above shows that the sampling instant can slew back and forth across a desired edge of the sampled clock 109-104, assuming correct choices of the $R_1$ and $R_1$ values. The example therefore shows the concept of advancing and retarding the sampling instant as a function of the value loaded into the Sampling Counter 109-120. Also demonstrated is the concept that the slew increments of each of the $R_0$ and $R_1$ values may differ. In the example illustrated, the $R_0$ value is a coarse slew and the $R_1$ value is a fine slew, where the coarse slew moves the sampling point farther along the sampled clock period than the fine slew, but the embodiment is not so limited.

In the EARC 109-100 of an embodiment the Reference Clock Counter 109-106 and Sampled Clock Counter 109-108 are registered when the desired edge is detected. In practice, the edge detection that occurs while using the fine slew is used to latch these values, but the embodiment is not so limited. This choice is made because the fine slew results in a smaller error in edge alignment and a corresponding smaller error in the sampled clock measurement period.

Figure 111:
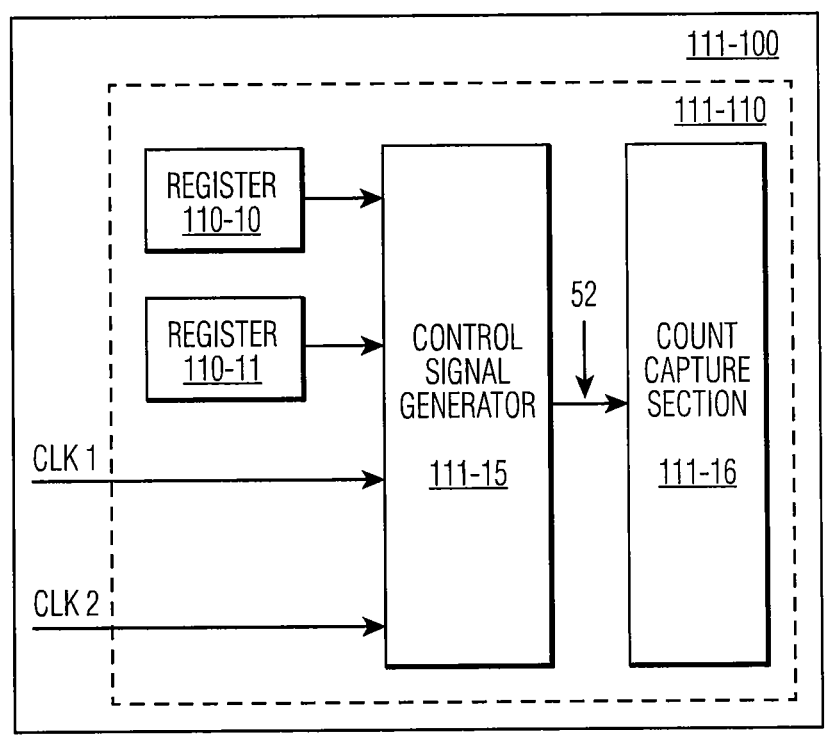
FIG. 111 is a block diagram of a communications device, under an embodiment.

As an example of the EARC, FIG. 111 is a block diagram of a personal communications device 111-100 with ratio counter provisions according to the invention is illustrated. Clock ration counter 111-110 includes a register 111-10 and a register 111-11. There is also provided a control signal generator 111-15 that alternately selects and receives an input value from register 111-10 and register 111-11 as well as an input of a clock signal CLK 1 from a clock under examination. This may be, for example, a clock signal from the clock signal source (clock) of a telecommunications receiver. A second clock signal CLK 2 is received from a second clock source under evaluation. CLK 2 may be, for example, a clock signal from a clock source of a global positioning system (GPS) receiver. The values stored in register 111-10 and 111-11 are pre-selected. The selection of these values is discussed in more detail below. Control signal generator 111-15 responds to these inputs by producing a control signal S2 that is provided to count capture section 111-16.

Figure 112:
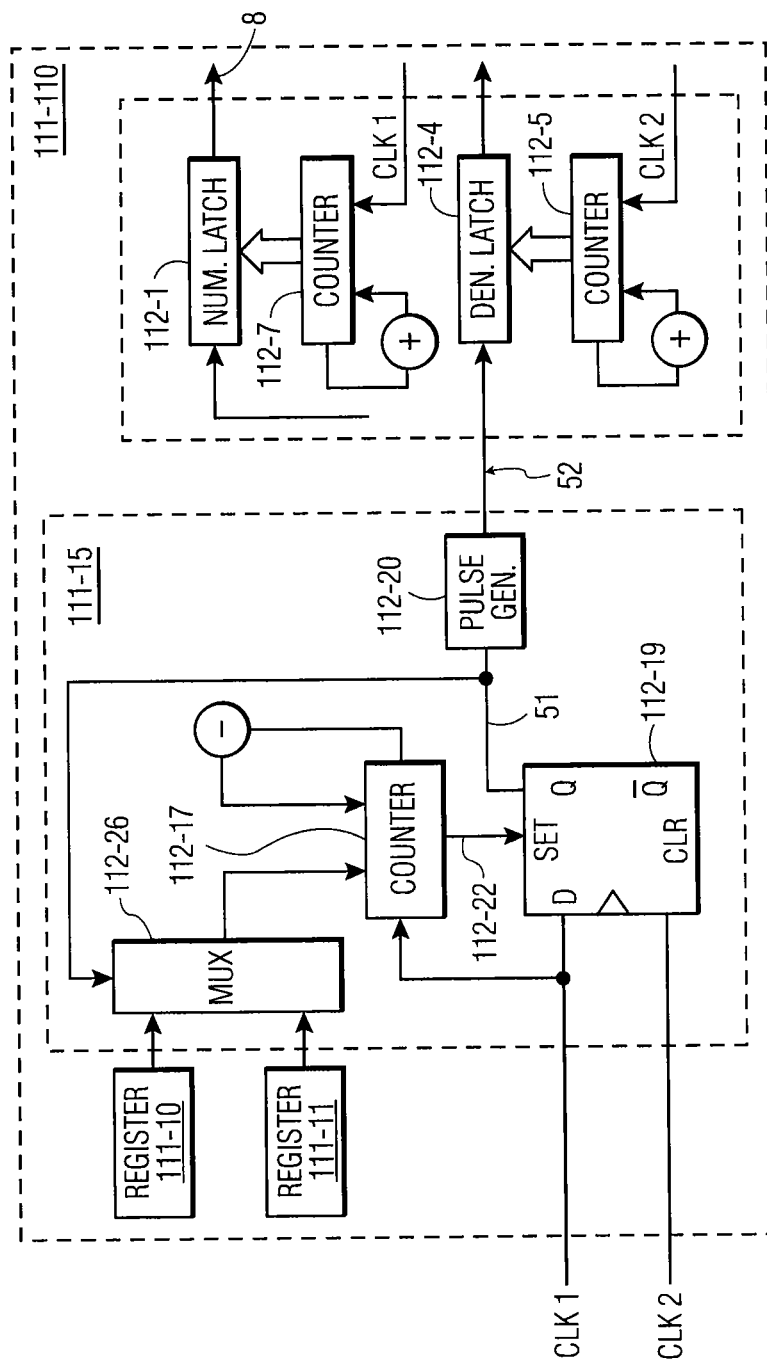
FIG. 112 is a block diagram of a communications device, under an embodiment.

FIG. 112 shows a more detailed description of an embodiment of the ration counter 112-110 according to the invention. It can be seen that control signal generator 111-15 includes multiplexer 112-26, a decrementing counter 112-17, a flip-flop 112-19 and a pulse generator 112-20. Multiplexer 112-26 is used to select between the input from either register 111-10 or register 111-11 in accordance with an edge transition signal S1 from flip-flop 112-19. Depending upon which register, 111-10 or 111-11, is selected by multiplexer 112-26, the contents of the selected register, 111-10 or 111-11, are input to decrementing counter 112-17. The value loaded into decrementing counter 112-17 is then decremented by one (1) for each pulse of the clock signal CLK 1. Once the contents of decrementing counter 112-17 have reached zero (0) value, decrementing counter 112-17 issues an enable signal 112-22 to flip-flop 112-19. Flip-flop 112-19 then outputs an edge transition signal S1, in accordance with the inputs of clock signals CLK 1 and CLK 2. The edge transitions signal S1 from flip-flop 112-19 is also fed to pulse generator 112-20. In response to edge transition output S1, pulse generator 112-20 generates a control signal S2. Control signal S2 is then used to enable numerator latch 112-1 and denominator latch 112-4 so as to receive the contents of incrementing counters 112-7 and 112-5, respectively. The contents of numerator latch 112-1 and denominator latch 112-4 can be read out and used to specify the ration between the frequency of clock signal CLK 1 and the frequency of clock signal CLK 2.

Figure 113:
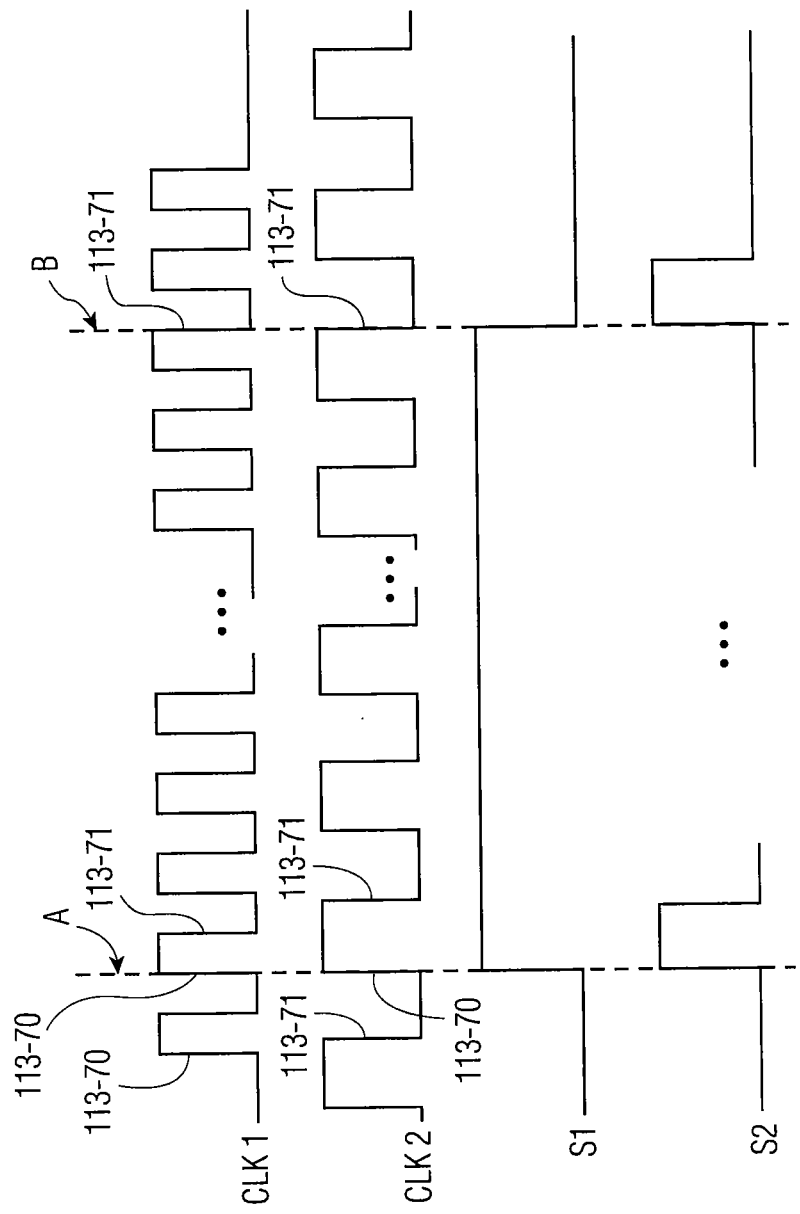
FIG. 113 is a timing diagram showing a relation between various clock signals and a control signal output.

FIG. 113 illustrates a relation between a clock signal CLK 1 and a clock signal CLK 2 and edge transition signal S1. Both CLK 1 and CLK 2 have a leading edge 113-70, and a trailing edge 113-71. For purposes of discussion, it will be understood that leading edge 113-70 and trailing edge 113-71 are transitioning edges. From FIG. 113 it can be seen that the instances at which clock signal CLK 1 and clock signal CLK 2 have transitioning edges which coincide and are in synchronization with each other is a reoccurring, although not constant, scenario. FIG. 113 shows that at the point A, a leading edge 113-70 of clock signal CLK 1 begins to transition from low to high at the same time that a leading edge 113-70 of clock signal CLK 2 begins to transition from low to high. In response, edge transition signal S1 from flip-flop 112-19 changes from low to high and a control signal S2 is generated. Similarly, at point B, a trailing edge 113-71 of clock signal CLK 1 begins to transition from high to low at the same time that a trailing edge 113-71 of clock signal CLK 2 begins to transition from high to low. In response, edge transition signal S1 from flip-flop 112-19 changes from high to low and control signal S2 is again generated.

Figure 114:
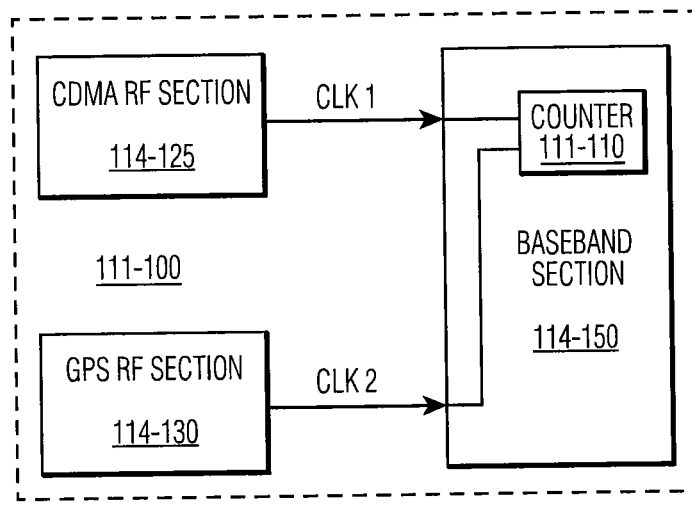
FIG. 114 is a block diagram of a communications device, under an embodiment.

With reference to FIG. 114, a further embodiment of portable communications device 100 is illustrated. Here it can be seen that the ratio counter 111-110 of the invention is incorporated as a part of a baseband section 114-150 of portable communications device 111-100. There is provided a code division multiple access (CDMA) radio frequency (RF) section 114-125 which provides a clock signal CLK 1 to the ratio counter 111-110 of the baseband section 114-150. Further, global positioning system (GPS) radio frequency section 114-130 is provided which provides a second clock signal CLK 2 to the ratio counter 111-110 of the baseband section 114-150. The ratio counter output is utilized by the circuitry of the portable communications device 111-100 to optimize circuit operations and allow for reduced power consumption.

In personal communication device 111-100, information indicative of the ratio between the frequencies of the two clock signals CLK 1 and CLK 2 is generated and output for use by device circuitry. One of either register 111-10 or register 111-11 is used to store a value representing a reference clock frequency while the other of register 111-10 or register 111-11 is used to store a value representing a close approximation of the frequency of a second clock. These values are then alternately used to generate a control signal S2 for causing the count value of decrementing counters 112-5 and 112-7 to be captured and, if desired, read out. Typically, in the portable communications device 111-100 of FIG. 114, the clock signal CLK 1 driving the CDMA. RF section 158-125 is relatively stable and of a known frequency. While the GPS clock signal CLK 2 driving the CPS RF section 114-130 is often generated by a crystal oscillator and is less stable thus, the accuracy of the frequency of CLK 2 at any given time is prone to vary. This is due to the fact that the frequency of a crystal oscillator tends to fluctuate as the temperature changes. Given this, register 111-11 is loaded with a value that is a close approximation of the frequency of the GPS clock signal CLK 2 is loaded into register 111-11 as the second value.

In a preferred embodiment of the invention, the values loaded into register 111-10 and register 111-11 are chosen in accordance with calculations based upon the principles of convergents of continued fractions. More particularly, convergents of continued fractions are used to generate a series of rational approximations to an actual ration. These rations are then used as the values input into the registers 111-10 and register 111-11, respectively.

The continued fraction expansion of real number x is expressed by an equation as follows:

$$a_0 + [1/(a_1 + [1/(a_2 + \ldots)])].$$

Here, the integers $a_1, a_2, a_3 \ldots$ are partial quotients. Rational numbers have a finite number of partial quotients, while the rational numbers have an infinite continued fraction expansion. If the number x has partial quotients $a_0, a_1, \ldots,$ the rational number pn/qn formed by considering the first n partial quotients $a_0, a_1, \ldots,$ a sub n is called the nth convergent of x. The convergence of that number provides a rational approximation with a small denominator to a given real number. Successive convergence will have error that oscillates positive and negative and which sequentially converges to the exact ratio between, for example, the frequency of clock signal CLK 1 and clock signal CLK 2. in view of this, continued fraction expansions are useful for selecting the values (divisors) which should be loaded into register 111-10 and register 111-11 of the FARC 111-100.

Figure 115:
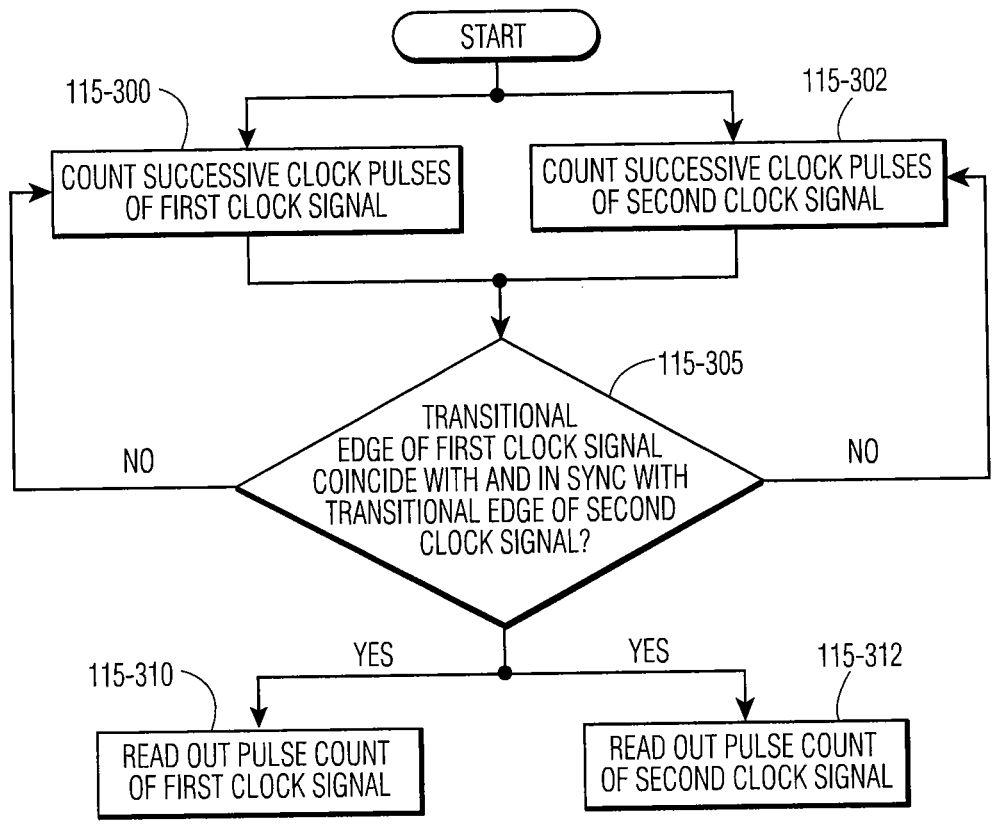
FIG. 115 is a flow diagram for a method of determining a ration between frequencies of two or more clocks, under an embodiment.

FIG. 115 is a flowchart illustrating the method of determining a ratio between two clock frequencies of the invention. Successive clock pulses of a first clock signal are counted 115-300 for a predetermined duration of time and successive clock pulses of a second clock signal are counted 115-302 for the duration of time. It is then determined whether a transitioning edge of the first clock signal coincides with and is in synchronization with a transitioning edge of the second clock signal 115-305. If so, a control signal is generated which signals the elapse of the duration of time. Read out the count of clock pulses of the first clock signal 115-310 and the second clock signal 115-312 upon the elapse of the duration of time.

The ratio counter 111-110 of the invention can be implemented in hardware, software, firmware, or a combination thereof. In a preferred embodiment(s), the invention 111-100 is implemented in software or firmware that is stored in a memory and that is executed by a suitable instruction execution system. If implemented in hardware, as in an alternative embodiment, the invention 111-100 can implemented with any or a combination of the following technologies, which are all well known in the art: a discrete logic circuit(s) having logic gates for implementing logic functions upon data signals, an application specific integrated circuit having appropriate logic gates, a programmable gate arrays(s) (PGA), a fully programmable gate array (FPGA), etc.

The flow chart of FIG. 115 shows the architecture, functionality, and operation of a possible implementation of the ratio counting method of the invention in software. In this regard, each block represents a module, segment, or portion of code, which comprises one or more executable instructions for implementing the specified logical function(s). It should also be noted that in some alternative implementations, the functions noted in the blocks may occur out of the order noted in FIG. 115. For example, two blocks shown in succession in FIG. 115 may in fact be executed substantially concurrently or the blocks may sometimes be executed in the reverse order, depending upon the functionality involved, as will be further clarified herein below.

In CDMA signal environments, cross- and/or auto-correlation problems occur that need to be corrected. The GPS system of an embodiment includes systems that perform a verification of the signal strength for locking if the detected signal is weaker in signal strength than is expected by the receiver. If the expected determined (locking) signal is strong, or, at least, not weak, then no verification is required. However, if, by Signal-to-Noise Ratio measurements, or other methods, the determined signal is found to be below a predetermined signal strength, then the receiver may be receiving an improper locking signal, and thus, auto- or cross-correlation ghost signals may be the signal that the receiver is locking onto. The present invention discusses how to reduce or eliminate such auto and/or cross correlation problems.

Figure 116:
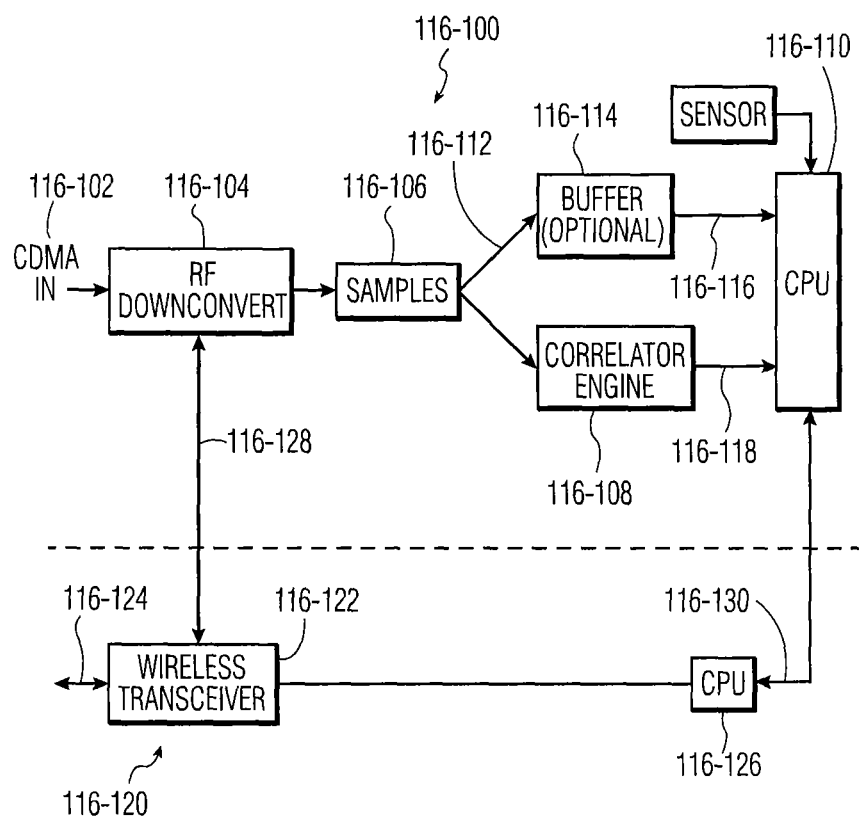
FIG. 116 is a typical CDMA signal flow.

FIG. 116 illustrates a typical Code Division Multiple Access (CDMA) signal flow. In many systems 116-100, e.g., GPS receiver systems, cellular telephone systems, etc., CDMA input signals 116-102 enter an RF downconverter 116-104 for conversion to baseband signals. These baseband signals are then sampled in a sampler 106 to obtain digital samples of the CDMA input signals 116-102. Typically, especially in a GPS receiver system 116-100, these samples are then sent to Correlator engine 116-108 and then on to Central Processing Unit (CPU) 116-110.

The present invention allows for a separate path for the signals 116-112 to reach the CPU 110. The signals 116-112, which are the same samples that are used in the Correlator engine 116-108, are sent directly to the CPU 116-112, or, optionally, through a buffer 116-114. Although the signals 116-112 can be sent directly to the same CPU 116-112 for processing, which CPU is typically an ARM7, signals 116-112 can be sent to a separate Digital Signal Processor (DSP), or, alternatively, to a CPU 116-112 that incorporates the DSP and ARM7 on a single integrated circuit (IC) chip. Further, the Correlator engine 116-108, CPU 116-110, and optional buffer 116-114 can be on a single IC chip to allow for lower power consumption, smaller packaging of the system 116-100, etc. The RF downconverter 116-104 can also be integrated with Correlator engine 116-108, CPU 116-110, sampler 116-106, and optional buffer 116-114 to provide a single IC chip system 116-100 if desired. Further, for ease of integration, CPU 116-110 can accept signals 116-116 and 116-118 at different ports, or signals 116-116 and 116-118 can be sent to separate CPUs 116-110, e.g., signals 116-116 can be sent to a DSP, while signals 116-118 can be sent to an ARM7. Other configurations where single or multiple CPUs 116-110 can be realized with the present invention. FIG. 116 is illustrative, but not exhaustive, of the possibilities of signal flow within the scope of the present invention.

Typically, in a communications system, the GPS receiver system 116-100 is co-located with another system that allows for transmission, such as a cellular telephone system 116-120. The cellular telephone transceiver 116-122, typically located in a cellular handset, can transmit and receive signals 116-124 on a wireless or hardwired link. Such a system 116-120 is embodied in the cellular telephone network, Personal Communications System (PCS) network, or can also be embodies as a Personal Data Assistant (PDA), laptop computer, or any other device that can transmit and/or receive data via wireless or hard-wired communications links.

Such a communications system 116-120, when co-located with the GPS receiver system 116-100, uses the GPS receiver system 116-100 to determine location and use the determined location for various purposes, e.g., location services, determining or computing the location of the wireless transceiver 116-122, determining directions to a predetermined or desired location, pinpointing the location of the wireless transceiver 116-122 for emergency and/or law enforcement personnel, etc.

As such, the present invention is useful in a location services system, where users which to use their mobile GPS receiver systems 116-100, possibly located inside of a cellular telephone, to get directions, get assistance finding nearby points of interest, restaurants, or other physical locations that may be difficult to locate without some sort of mapping aid. A cellular telephone or other mobile device can display, either visually or otherwise, the user's location, the user's location on a map, a route or part of a route between the user's location and the desired destination, or any number of things that can be used for location services.

Further, the present invention is also useful in a dead reckoning system, wherein at least one sensor, such as a gyroscope, odometer, or other sensor, provides inputs to the GPS receiver system 116-100 to selectively assist in computing a position of the GPS receiver system 116-100. Such systems are typically used in automobiles that travel into places where tunnels and other natural and man-made structures interfere with the receipt of GPS signals, but can also be used on or in conjunction with cellular telephones, wireless transceivers, or other devices.

Further, since both the wireless transceiver 116-122 and GPS receiver system 116-100 are typically integrated circuits, for ease of packaging, lower power consumption, or other reasons, the GPS receiver system 116-100 and the wireless transceiver 116-122 can be located on a single integrated circuit, or can share circuitry between the wireless transceiver and the GPS receiver system 116-100. For example, the GPS receiver system 116-100 can use the Central Processing Unit (CPU) 116-126 of the wireless transceiver 116-122 to perform mathematical calculations needed to determine the position of the wireless transceiver 116-122, either instead of or in parallel with CPU 116-110. Further, the wireless transceiver 116-122 can share other portions of the circuitry, such as a local oscillator to provide a reference frequency 116-128 to the GPS receiver system 116-100, and the reference frequency 116-128 can either be the same as or different from the reference frequency used by the wireless transceiver 116-122.

The wireless transceiver 116-122 can accept data 116-130 from the GPS receiver system 116-100, as well as provide data 116-130 to the GPS receiver system 116-100. Data 116-130 accepted by the wireless transceiver includes raw UPS data, pseudoranges, or a determined position. Data 116-130 provided by the wireless transceiver includes ephemeris information, time information, and coarse position information.

Figure 117:
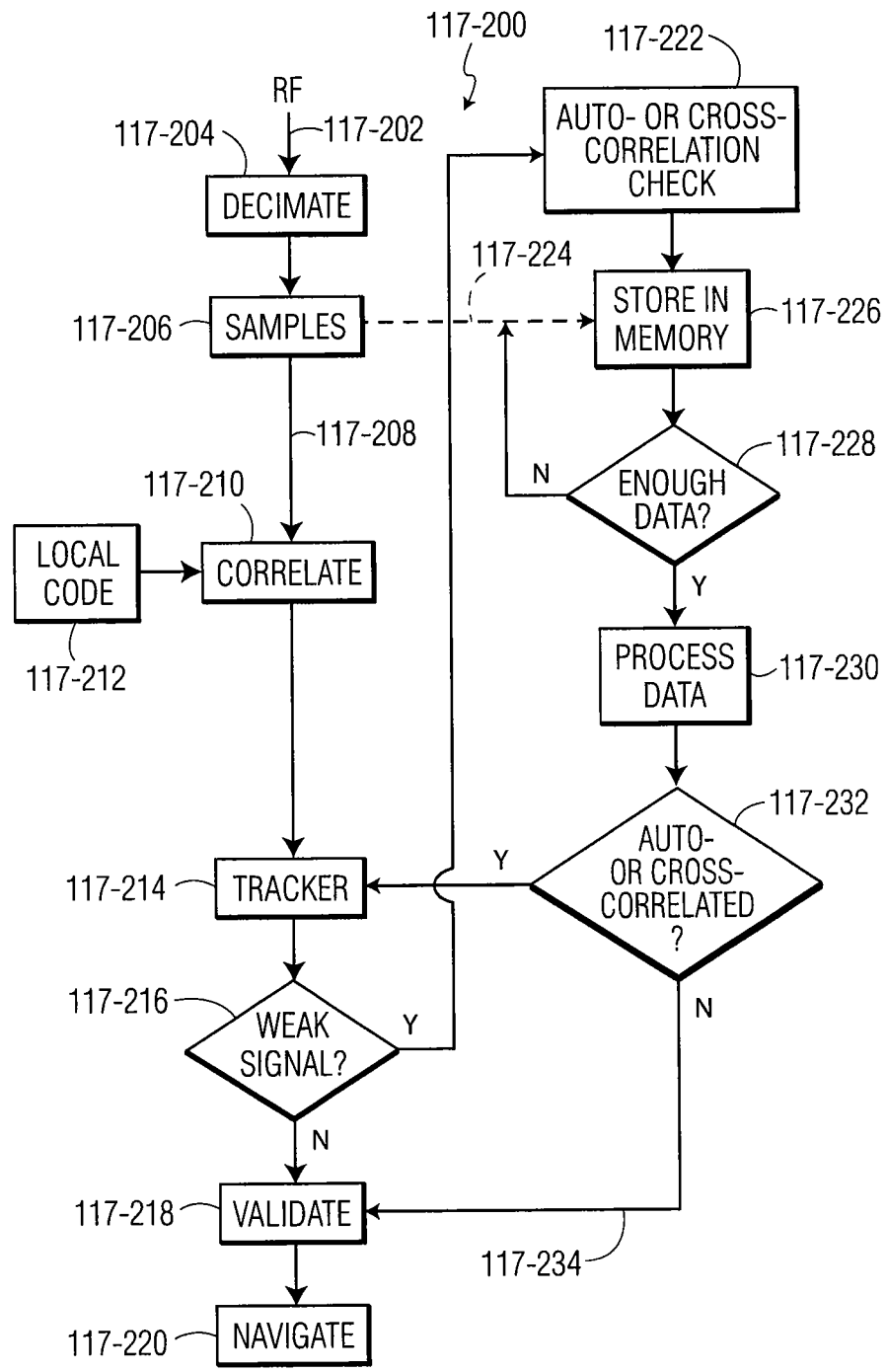
FIG. 117 is an auto and cross correlation check, under an embodiment.

FIG. 117 illustrates an auto and cross correlation check in accordance with the present invention.

System 117-200 shows RF signal 117-202 entering system 117-200, where it is decimated in block 117-204. The result of decimate block 117-204 is the reduced bandwidth samples from RF signal 117-202, shown as block 117-206. These samples 117-208 are typically passed to a Correlator engine 116-108 shown in FIG. 160. The local code 117-212 is then correlated against the incoming samples 117-208 in block 117-210, which is then passed to the tracker 117-214 such that system 117-200 can track the RF input signal 117-202.

Related art designs do not determine whether the tracker 117-214 is tracking the carrier of desired signal, or whether tracker 117-214 is tracking a spurious signal, which may be a cross-correlated spur or an auto-correlated spur. The present invention provides a method and apparatus for verifying whether the tracker 117-214 is tracking the correct or desired signal before the signal is validated for use in navigation.

The signal strength of the signal being tracked is checked in block 117-216. If the signal strength is greater than a predetermined strength, e.g., greater than 35 dB-Hz, then the system 117-200 knows that the signal is strong enough that it is not a spurious signal, and the signal is validated in block 117-218, and passed to the navigation system in block 117-220. However, if the signal is not of sufficient strength, the auto-correlation check block 117-222 is entered. Block 117-222 can be the same block for a cross-correlation check, or can be a different block of computer code, hardware circuitry, or integration of hardware, software, firmware, other devices and methods used to perform similar functions to those described herein. Further, block 117-222 can be a threshold Signal-to-Noise Ratio (SNR) verification, or other such verification to determine whether auto/cross correlation conditions exist. Such a check block can have one characteristic of the signal checked, can have multiple characteristics to check, or can select from one or more characteristics to be checked either automatically or manually selected, depending on the design or desires of the user.

Samples 117-206 are stored in memory as shown by path 117-224 and block 117-226. If the samples do not comprise enough data, e.g., if there is less data than a predetermined amount of data, block 117-228 will loop around until there is enough data in the system. As shown in FIG. 161, the system 117-200 continues to store sample data until there is enough data to process. For example, in the GPS system, 2 msec of data is desired to perform processing to determine whether the signal is the proper signal.

Block 117-230 shows processing the stored data to determine whether the signal that has been tracked (or locked onto) in block 117-214 is the proper signal within the signal window. In a cross-correlation situation, the proper signal can be determined by a correlation to a different satellite code being stronger than the correlation to a desired (or current) satellite code. In an auto-correlation situation, the proper signal can be determined by a correlation to a different delay of the same satellite code being stronger than the correlation to the locally generated code delay. Decision block 117-232 shows that the system 117-200 verifies that the signal is or is not the proper signal, again, via SNR verification or other methods.

The correlation methods used on the verification signal, which is on a second path relative to the incoming signal, include computing the correlation between the sample data and the same prn code and local reference frequency of the tracked signal (signal that has been locked to), computing the correlation between the sample data and a different prn code but the same local reference frequency as the tracked signal, computing the correlation between the sample data and the same prn code and local reference frequency that is a multiple of the prn repeat frequency of the tracked signal, computing the correlation between the sample data and a different prn code and different local reference frequency that is a multiple of the prn repeat frequency of the locked signal, and other correlations and methods. If the signal is the proper signal, the signal is verified and validated via path 117-231. If the signal is not the proper signal, then the tracker 117-214 is redirected or otherwise controlled to the proper signal, which proper signal was determined in block 117-230.

Figure 118B:
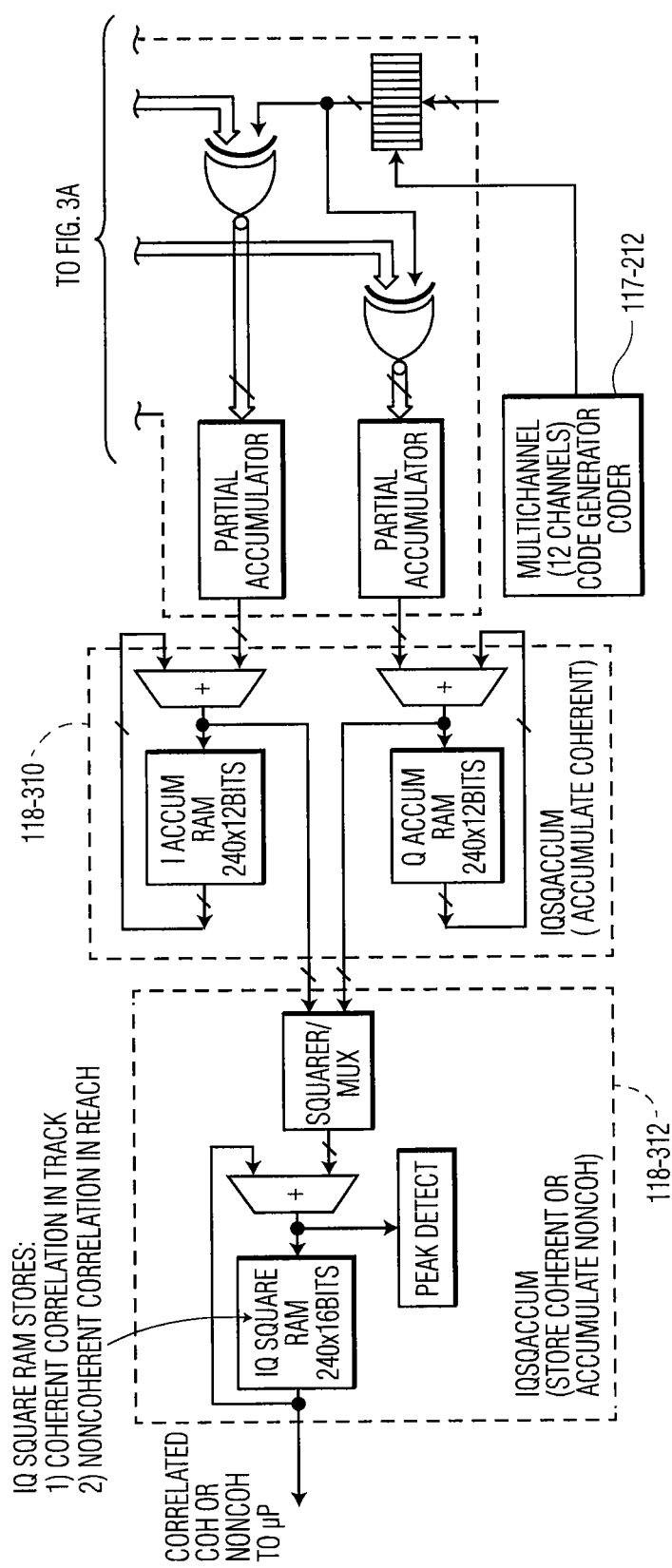

FIGS. 118A and 118B illustrate an embodiment of the present invention.

System 118-300 shows GPS Clear/Acquisition (also known as Coarse/Acquisition) (C/A) (CDMA formatted RF signals) data 116-102 entering the downconverter 116-104, which downconverts the CDMA signal to baseband for processing. The downconverter passes the signals to the decimators 117-204, which are part of the sample block 116-106. These are passed to serial shift registers 118-302, and then each placed in parallel into two additional registers, parallel register 118-304 and shift register 118-306. Shift register 118-306 is loaded and then shifted out of the register 118-306, whereas parallel register 118-304 is loaded and read directly by the CPU 116-110. Parallel registers 118-304 provide signals 116-116 that are delivered directly to the CPU (microprocessor) 116-116, whereas shift registers 118-306 provide signals to the correlator engine 116-108. A Doppler rotator 118-308 is used to properly align in frequency the signals being fed into the correlator 116-108.

Local code, emanating from coder 117-212, is used to correlate against the incoming samples in determining the proper signal to lock onto within the sampled signals from sampler 116-106. The signals are accumulated in the accumulator 118-310, and a peak detector 118-312 determines the signal that is passed to the tracker, which is signal 116-118 shown in FIG. 160. Coder 117-212 is shifted in time and/or phase to assist in correlation. This shift is typically done by a separate circuit, and in the present invention, can be done by a data path executive when the incoming signal is determined to be an auto-correlated or cross-correlated signal.

Figure 119:
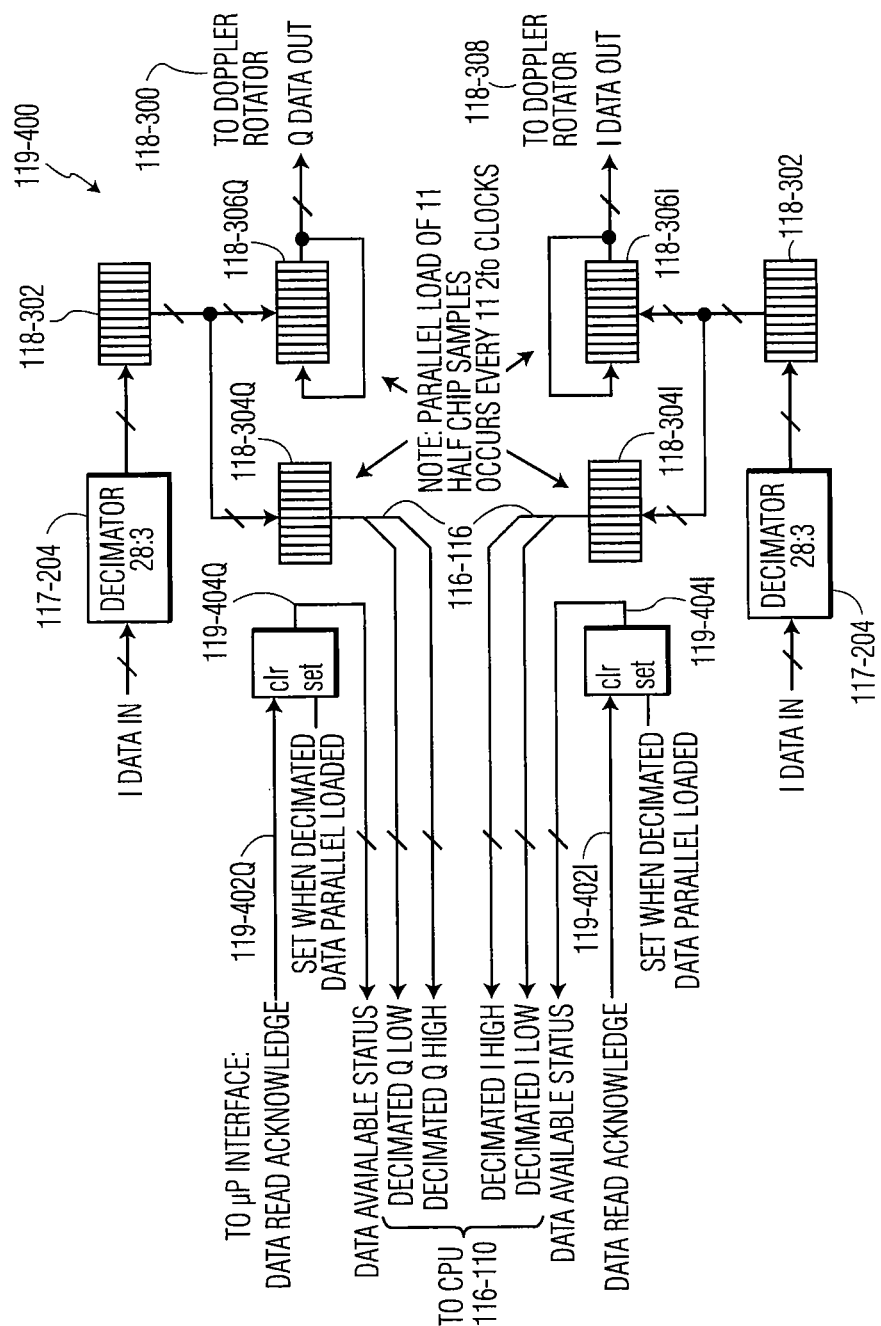

FIG. 119 illustrates details of the sample block of the present invention.

System 119-400 shows the decimators 117-204 feeding the serial shift registers 118-302, which each store, in parallel, their data in serial shift registers 118-304 and 118-306. For clarity, parallel registers 118-304 and sift registers 118-306 have been shown as parallel registers 118-304I and 118-304Q, and shift registers 118-306I and 118-306Q, to indicate whether the registers contain I data or Q data, respectively. Shift registers 118-306 pass their data to the Doppler rotator 118-308, whereas parallel registers 118-304 pass their parallel data, i.e., signals 116-116, directly to the CPU 116-110. Again, CPU 116-110 can be the same CPU that processes the Doppler rotated correlated signals, or a separate CPU. Further, even if the CPUs are separate, they can be co-located on a single IC chip if desired.

Additional control lines couple the CPU 116-110 to the capture clock (sampler) 106. Lines 119-402I and 119-402Q indicate when the CPU 116-110 has read the data from associated shift registers 118-306I and 118-306Q, respectively. Further, data available status lines 119-404I and 119-404Q are set to a known value, either high or low, to inform the CPU 116-110 that the parallel registers 118-304I and/or 118-304Q are available for reading. Once the parallel registers 118-304I and/or 118-304Q are read, the data available status registers 119-404I and/or 119-404Q can be cleared.

Figure 120:
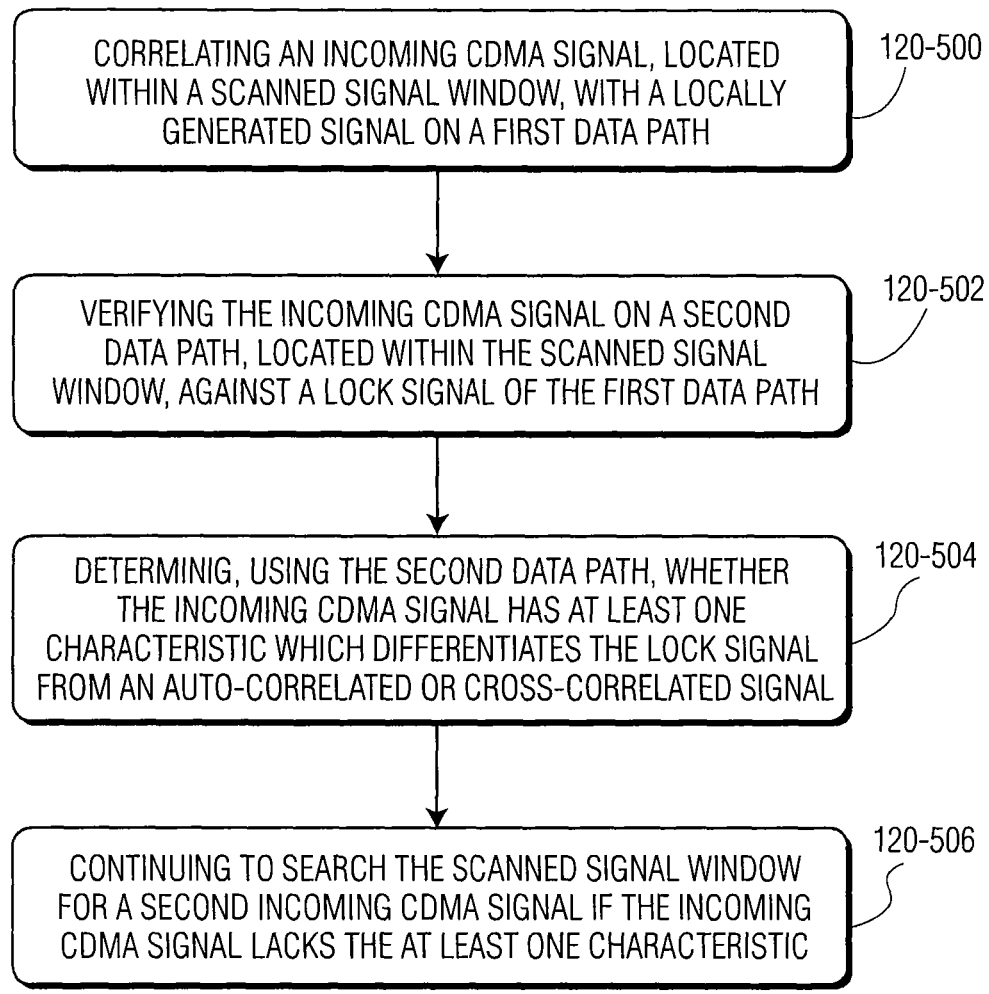

FIG. 120 is a flowchart illustrating the steps used to practice the present invention.

Block 120-500 illustrates correlating an incoming CDMA located within a scanned signal window, with a locally generated signal on a first data path.

Block 120-502 illustrates verifying the incoming CDMA signal, on a second data path, located within the scanned signal window, against a lock signal of the first data path.

Block 120-504 illustrates determining, using the second data path, whether the incoming CDMA signal has at least one characteristic that differentiates the lock signal, or locally generated signal, form an auto-correlated or cross-correlated signal.

Block 120-506 illustrates continuing to search the scanned signal window for a second incoming CDMA signal if the lock signal lacks the at least one characteristic.

In summary, a dead reckoning system in accordance with the present invention comprises a GPS receiver and at least one sensor. The GPS receiver, comprises a first data path and a second data path. The first data path correlates an incoming GPS signal, located within a scanned signal window, with a locally generated signal. The second data path verifies the incoming GPS signal, located within the scanned signal window, against a lock signal, and determines whether the incoming GPS signal has at least one characteristic that differentiates the incoming GPS signal from an auto-correlated signal. The GPS receiver can change the locally generated signal to continue to search the scanned signal window for a second incoming GPS signal if the incoming GPS signal lacks the at least one characteristic. The sensor selectively provides a dead reckoning input to the GPS receiver for use in computing a position of the GPS receiver.

When integrating components of a GPS system with wireless communications systems (which include cellular, paging, two-way paging, Personal Data Assistant, Bluetooth, and PCS systems, as described above), the GPS system must have the capability to acquire and track the GPS satellites under the conditions that the typical wireless communications system user will encounter. Some of those conditions, e.g., indoor use, dense urban areas use that has a limited sky view, such as in downtown areas with skyscrapers blocking satellite views, etc., although manageable for terrestrial-based wireless communications systems, are difficult situations for GPS systems. For example, traditional standalone mode GPS, e.g., where the GPS receiver acquires the signals from GAS satellites, tracks the satellites, and, if desired, performs navigation without any outside information being delivered to the GPS system, has problems with long Time To First Fix (TTFF) times, and, further, has limited ability to acquire the GPS satellite signals under indoor or limited sky-view conditions. Even with some additional information, TTFF times can be over thirty seconds because ephemeris data must be acquired from the GPS system itself, and also requires a strong signal to acquire such information reliably. These requirements of the GPS system have impacts on the reliability of position availability as well as power consumption in handheld wireless communications system devices.

To overcome these problems, the present invention allows for multiple modes of operation depending on various factors. The GPS system of the present invention can be used in a standalone mode, for example, when the GPS receiver is receiving a strong signal, has recent ephemeris or almanac data, or when an exact position is not required. However, if the GPS system of the present invention is not receiving a strong enough GPS signal, e.g., the handheld wireless communication device is being used indoors, the GPS system of the present invention can switch to a different mode of operation, e.g., a mode of operation where the wireless communication system helps or "aids" the GPS system to acquire, track, and/or navigate using the GPS signals received by the GPS receiver and additional information supplied by the wireless communications system. This mode of operation is called a "network aided" mode. Further still, the GPS system of the present invention, when being used in an even harsher signal reception environment, can be completely dependent on the wireless communications system to provide position information to the GPS receiver or mobile handset, and the GPS system of the present invention would then operate in a wireless communications network provided or "network based" mode of operation. The GPS system of the present invention can switch between these modes of operation based on several variables, as well as user-selected preferences or demands, and can switch either via local or remote control, or via either automatic or manual commands given to the GPS system.

Aspects of the GPS system of an embodiment may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the GPS system of an embodiment include: microcontrollers with memory (such as electronically erasable programmable read only memory (EEPROM)), embedded microprocessors, firmware, software, etc. Furthermore, aspects of the GPS system of an embodiment may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used herein, refer to this patent as a whole and not to any particular portions of this patent. When the word "or" is used in reference to a list of two or more items, that word covers all of the following interpretations of the word: any of the items in the list, all of the items in the list and any combination of the items in the list.

The above description of illustrated embodiments of the GPS system is not intended to be exhaustive or to limit the invention to the precise form disclosed. While specific embodiments of, and examples for, the GPS system are described herein for illustrative purposes, various equivalent modifications are possible within the scope of the GPS system, as those skilled in the relevant art will recognize. The teachings of the GPS system provided herein can be applied to other electronic systems, not only for the electronic systems described above.

The elements and acts of the various embodiments described above can be combined to provide further embodiments. These and other changes can be made to the GPS system of an embodiment in light of the above detailed description.

All of the above references and United States patents and patent applications are incorporated herein by reference. Aspects of the embodiments described herein can be modified, if necessary, to employ the systems, functions and concepts of the various patents and applications described above to provide yet further embodiments of the GPS system.

In general, in the following claims, the terms used should not be construed to limit the GPS system to the specific embodiments disclosed in the specification and the claims, but should be construed to include all electronic systems that operate under the claims. Accordingly, the GPS system is not limited by the disclosure, but instead the scope of the GPS system is to be determined entirely by the claims.

While certain aspects of the GPS system are presented below in certain claim forms, the inventors contemplate the various aspects of the GPS system in any number of claim forms. Accordingly, the inventors reserve the right to add additional claims after filing the application to pursue such additional claim forms for other aspects of the GPS system.

What is claimed is:

1. A satellite positioning system (SPS) receiver configured to operate in a plurality of operational modes, the SPS receiver comprising:
   a memory including a plurality of channel records, each channel record corresponding to a respective satellite signal received by the SPS receiver;
   a control processor coupled to the memory and configured to monitor a status of each channel record of the plurality of channel records and to assign one of the plurality of SPS operational modes to each channel record of the plurality of channel records responsive to the status of the channel record; and
   a signal processing system coupled to the processor and to the memory wherein the signal processing system includes:
      an input sample subsystem coupled to the memory, the input sample subsystem being configured to receive SPS data and to store the received SPS data into the plurality of channel records;
      a first signal processing subsystem coupled to the memory, wherein the first signal processing subsystem includes a first sequencer that accesses a first one of the plurality of channel records, and a matched filter that performs correction on the SPS data in the accessed channel record and, responsive to the SPS operational mode assigned to the first channel record by the control processor, configures the first sequencer and matched filter to process the SPS data stored in the first channel record in accordance with the assigned operational mode;
      a second signal processing subsystem coupled to the memory, wherein the second signal processing subsystem includes a second sequencer that accesses a second one of the plurality of channel records, and a Fast Fourier Transform (FFT) subsystem that performs FFT on the SPS data in the accessed channel record and, responsive to the operational mode assigned to the second channel record by the control processor, configures the second sequencer and the FFT subsystem to process the SPS data stored in the second channel record in accordance with the assigned operational mode,
   wherein the FFT subsystem is configured to process signals output by the matched filter.

2. The SPS system of claim 1, wherein each of the first sequencer and the second sequencer includes a memory interface coupled between the respective sequencer and the memory.

3. The SPS system of claim 1, wherein memory includes a memory subsystem and the control processor, the first sequencer and the second sequencer are coupled to the memory subsystem to arbitrate among memory requests made by the control processor, the first sequencer and the second sequencer.

4. The SPS system of claim 1, wherein the first signal processing subsystem and the second signal processing subsystem process respectively different ones of the plurality of channel records and each of the first signal processing subsystem and the second signal processing subsystem processes the plurality of channel records in a time-multiplexed manner.

5. The SPS system of claim 4, wherein each channel record of the plurality of channel records includes a pointer to a next one of the plurality of channel records to be processed and the first sequencer and the second sequencer each accesses the pointer to the next channel record in the time multiplex processing of the plurality of channel records.

6. The SPS system of claim 1, wherein the first signal processing subsystem further includes a coherent accumulator and the first sequencer configures the coherent accumulator responsive to configuration data stored in the channel record.

7. The SPS system of claim 6, wherein the control processor stores channel parameters into the channel record and the first sequencer accesses the stored channel parameters to configure the matched filter and the coherent accumulator and the second sequencer accesses the stored control parameters to configure the FFT processor.

8. The SPS system of claim 6, wherein the matched filter of the signal processing system is configurable into a low-resolution mode or a high-resolution mode responsive to the assigned operational mode in the channel record.

9. The SPS system of claim 1, wherein the control processor is configured to concurrently assign respectively different ones of the plurality of operational modes to respective ones of the channel records responsive to the status of the respective channel record.

10. The SPS system of claim 1, where each of the first and second sequencers changes the status of the respective first and second channel record as the channel record is processed by the respective first and second signal processing systems.

11. The SPS system of claim 1, wherein each of the first sequencer and the second sequencer periodically saves the channel record while processing the satellite data in the channel record.

12. The SPS system of claim 1, wherein each channel record includes a semaphore, the semaphore including:
 a first plurality of data bits controlled by the first signal processing subsystem;
 a second plurality of data bits controlled by the second signal processing subsystem; and
 a third plurality of data bits controlled by the control processor.

13. The SPS system of claim 12, wherein the first plurality of data bits and the second plurality of data bits each overlaps the third plurality of data bits.

14. A method for controlling a satellite positioning system (SPS) receiver including a memory, a control processor, a first signal processing subsystem including a first sequencer, and a second signal processing subsystem including a second sequencer, the SPS receiver being configured to operate in a plurality of operational modes, the method comprising:
 storing, in the memory, a plurality of channel records, each channel record corresponding to a respective satellite signal received by the SPS receiver;
 monitoring, by the control processor, a status of each of the plurality of channel records and assigning one of the operational modes to each channel record responsive to the status of the channel record;
 configuring, by the control processor, the first sequencer to access a first one of the plurality of channel records, responsive to the operational mode assigned to the first channel record;
 configuring, by the control processor, the second sequencer to access a second one of the plurality of channel records, responsive to the operational mode assigned to the second channel record;
 configuring, by the control processor, the first signal processing subsystem to perform matched filtering of a first one of the plurality of channel records responsive to the operational mode assigned to the first channel record; and
 configuring, by the control processor, the second signal processing subsystem to perform Fast Fourier Transform (FFT) processing on a second one of the plurality of channel records responsive to the operational mode assigned to the second channel record by the control processor,
 wherein the second signal processing subsystem is configured to perform FFT processing on signals output by the matched filter.

15. The method of claim 14 further comprising:
 requesting access to the plurality of channel records in the memory by the control processor;
 requesting access to the first channel record in the memory by the first sequencer;
 requesting access to the second channel record in the memory by the second sequencer; and
 arbitrating, in a memory subsystem, among the memory access requests made by the control processor, the first sequencer and the second sequencer.

16. The method of claim 14, including processing respectively different ones of the plurality of channel records by the first and second signal processing systems in a time-multiplexed manner.

17. The method of claim 16, wherein each channel record includes a pointer to a next one of the plurality of channel records to be processed and time multiplexed processing of the plurality of channel records includes accessing the pointer to the next channel record after completing the processing of a current one of the channel records.

18. The method of claim 14, wherein the first signal processing subsystem includes a matched filter and a coherent accumulator and the configuring of the first signal processing subsystem includes configuring the matched filter and the coherent accumulator by the first sequencer responsive to configuration data stored in the channel record.

19. The method of claim 18, wherein the configuring of the matched filter includes configuring the matched filter into a low-resolution mode or a high-resolution mode responsive to the assigned operational mode in the channel record.

20. The method of claim 18 further comprising storing channel parameters into the first channel record by the control processor and accessing the stored channel parameters from the first channel record by the first sequencer to configure the matched filter and the coherent accumulator.

21. The method of claim 18, wherein the second signal processing subsystem includes a fast Fourier transform (FFT) processor and the configuring of the second signal processing subsystem includes configuring the FFT processor by the second sequencer responsive to the configuration data stored in the channel record.

22. The method of claim 14, further comprising concurrently assigning respectively different ones of the plurality of operational modes to respective ones of the channel records responsive to the status of the respective channel record.

23. The method of claim 14, further comprising periodically saving by each of the first and second signal processing sequencers, the respective first and second channel records while processing the first and second channel records.

* * * * *